United States Patent [19]

Iritani et al.

[11] Patent Number: 5,782,102
[45] Date of Patent: Jul. 21, 1998

[54] AUTOMOTIVE AIR CONDITIONER HAVING CONDENSER AND EVAPORATOR PROVIDED WITHIN AIR DUCT

[75] Inventors: Kunio Iritani, Anjo; Shigeo Numazawa, Nagoya; Kenichi Fujiwara, Kariya; Yasushi Yamanaka, Nakashima-gun; Akira Isaji, Nishio; Nobunao Suzuki, Toyohashi, all of Japan

[73] Assignee: Nippondenso Co., Ltd., Kariya, Japan

[21] Appl. No.: 781,047

[22] Filed: Jan. 9, 1997

Related U.S. Application Data

[62] Division of Ser. No. 332,062, Nov. 1, 1994, Pat. No. 5,642,627, which is a division of Ser. No. 138,207, Oct. 20, 1993, abandoned, which is a division of Ser. No. 873,430, Apr. 24, 1992, Pat. No. 5,299,431.

[51] Int. Cl.[6] .................................. F25D 17/06; F25B 41/00
[52] U.S. Cl. .................................. 62/197; 62/90; 62/324.6
[58] Field of Search .................................. 62/160, 324.6, 62/90, 173, 197

[56] References Cited

U.S. PATENT DOCUMENTS

| | | | |
|---|---|---|---|
| 2,780,077 | 7/1957 | Jacobs | 62/90 |
| 3,026,687 | 3/1962 | Robson | 62/90 X |
| 3,139,735 | 7/1964 | Malkoff | 62/90 |
| 3,402,564 | 9/1968 | Nussbaum | 62/173 |
| 3,469,412 | 9/1969 | Gluffre | 62/173 |
| 3,520,147 | 7/1970 | Glackman | 62/173 |
| 3,738,117 | 6/1973 | Engel | 62/90 |
| 3,798,920 | 3/1974 | Morgan | 62/90 |
| 4,523,715 | 6/1985 | Ohsawa | 236/49.3 |
| 4,546,617 | 10/1985 | Suzuki | 62/180 |
| 4,667,480 | 5/1987 | Bessler | 62/180 |
| 4,920,756 | 5/1990 | Howland | 62/90 |
| 4,984,433 | 1/1991 | Worthington | 62/90 |
| 4,991,405 | 2/1991 | Sakano | 62/244 |
| 5,316,074 | 5/1994 | Isaji | 62/156 |

FOREIGN PATENT DOCUMENTS

| | | |
|---|---|---|
| 0008418 | 2/1983 | Japan . |
| 60-2847 | 1/1985 | Japan . |
| 60-29558 | 2/1985 | Japan . |
| 60-219114 | 11/1985 | Japan . |
| 0103727 | 5/1988 | Japan . |
| 41011 | 1/1992 | Japan . |

*Primary Examiner*—William E. Wayner
*Attorney, Agent, or Firm*—Cushman Darby Cushman IP Group of Pillsbury Madison & Sutro LLP

[57] ABSTRACT

An automotive air conditioner which conditions air making use of radiation of heat of a condenser and absorption of heat of an evaporator effectively. The evaporator 207 and the condenser 203 are disposed in a duct 100. A bypass passageway 150 is provided sidewardly of the condenser 203 in the duct 100, and a flow rate of air bypassing the condenser 203 is controlled by pivotal motion of an air mixing damper 154. Another bypass passage is provided sidewardly of the evaporator 207 in the duct 100, and a flow rate of air bypassing the evaporator 207 is controlled by pivotal motion of a bypass damper 159. Air is conditioned to an optimum blown out air temperature by varying the cooling rate at the evaporator 207 and the heating rate at the condenser 203 and is blown out to a room of an automobile from spit holes 141, 142 and 143. An outside heat exchanger is provided outside the duct 100, and a flow of refrigerant is changed over suitably among the outside heat exchanger 202, the evaporator 207 and the condenser 203 to perform cooling operation, heating operation, dehumidifying operation, dehumidifying heating operation and defrosting operation.

15 Claims, 75 Drawing Sheets

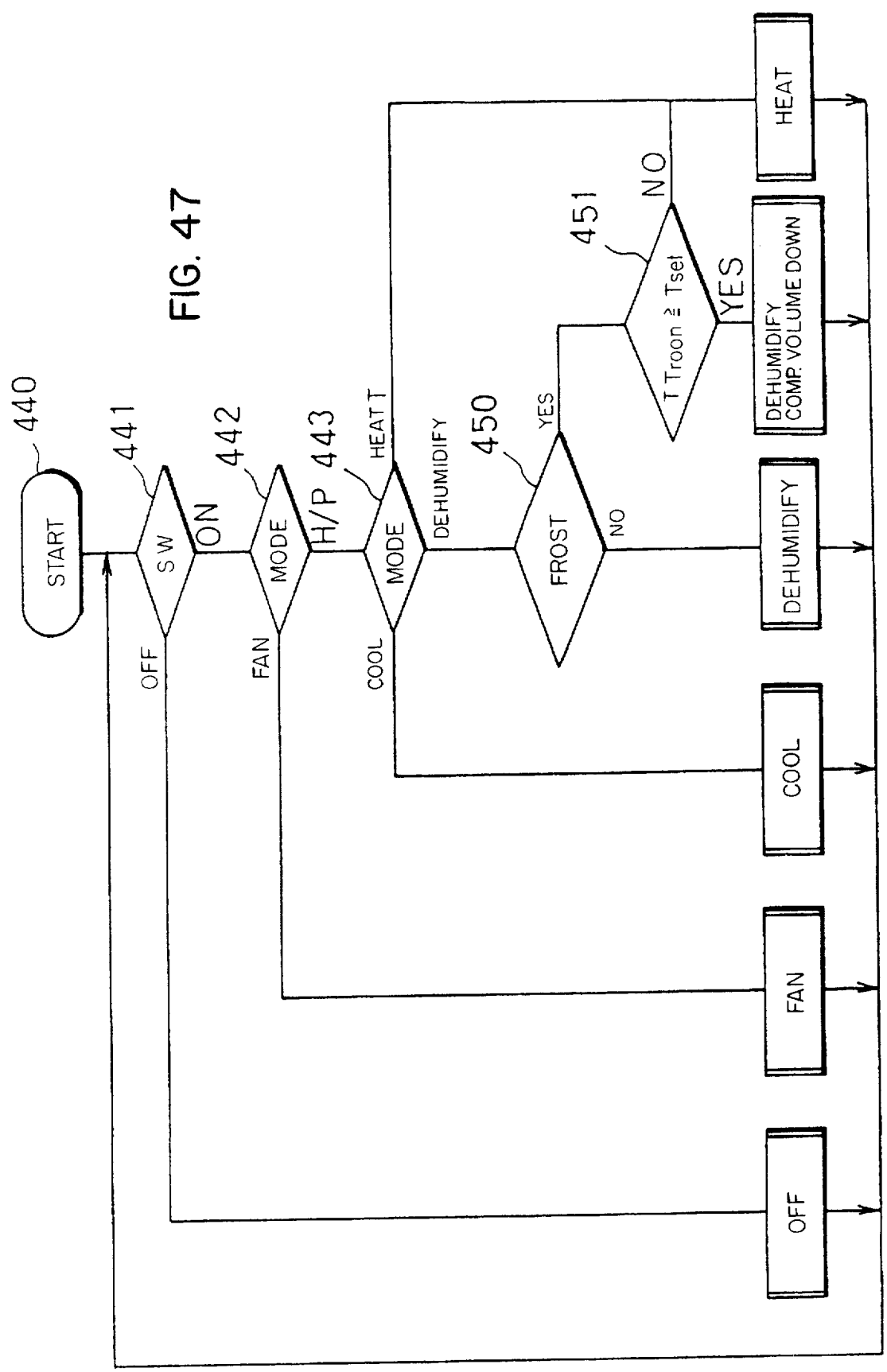

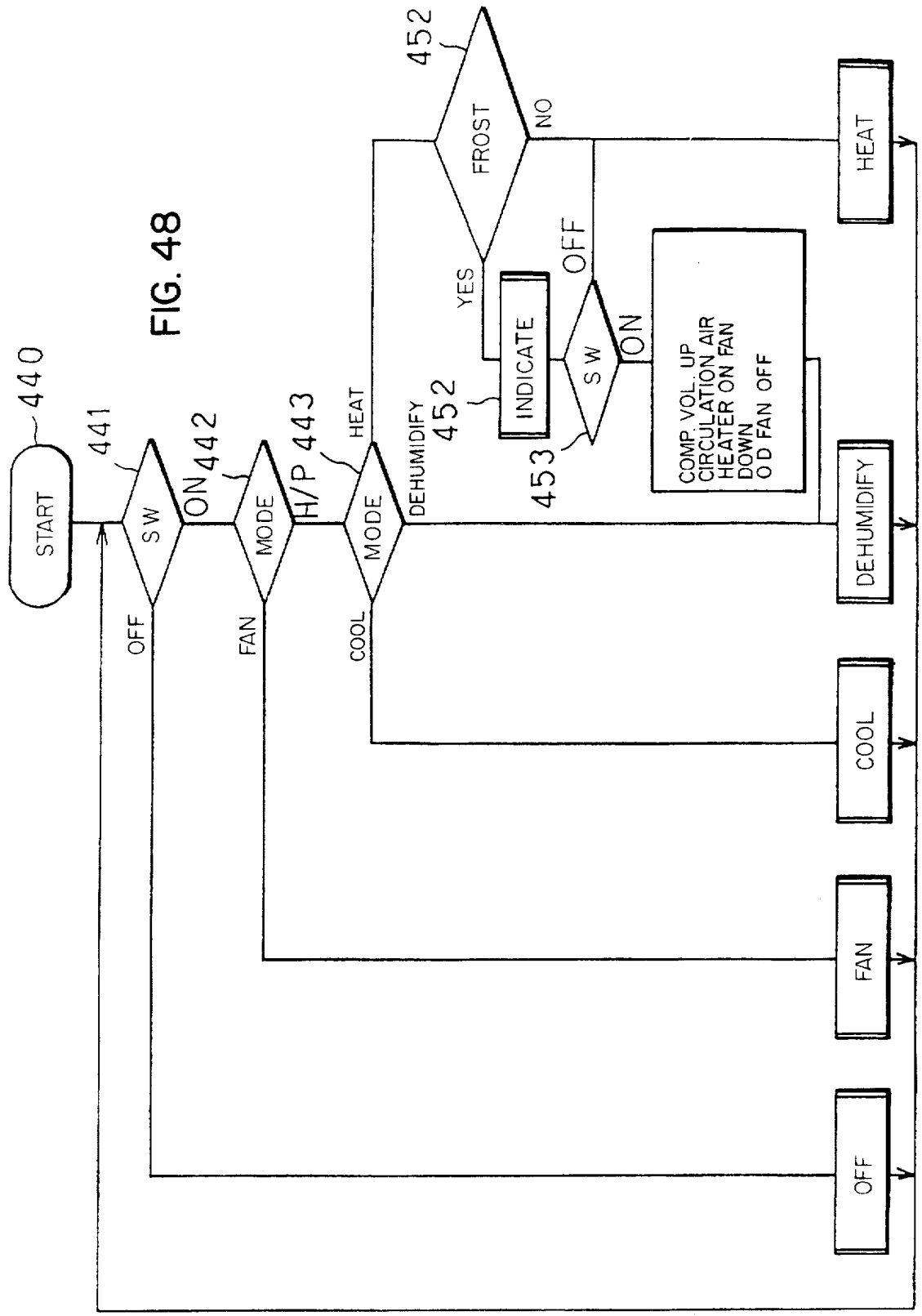

AUTOMOTIVE AIR CONDITIONER HAVING CONDENSER AND EVAPORATOR PROVIDED WITHIN AIR DUCT

This is a division of application Ser. No. 08/332,062, filed Nov. 1, 1994, now U.S. Pat. No. 5,642,627 which was a DIV of Appln. Ser. No. 08/138,207 filed Oct. 20, 1993, now abandoned, which was a DIV of Appln. Ser. No. 07/873,430 filed Apr. 24, 1992, now U.S. Pat. No. 5,299,431 issued Apr. 5, 1994.

BACKGROUND OF THE INVENTION

1. Field of the Invention

This invention relates to an automotive air conditioner for conditioning air in a room of an automobile. The automotive air conditioner of the present invention is effectively applied to an automobile which does not have a surplus heat source such as, for example, an electric automobile.

2. Description of the Prior Art

Usually, an automotive air conditioner makes use, in order to heat air,of heat from cooling water for an engine for driving an automobile. However, heating of air is performed using a heat pump when the amount of heat of cooling water for an engine is insufficient or when an automobile does not originally have engine cooling water such as an electric automobile.

For example, in an automotive air conditioner disclosed in Japanese Patent Laid-Open Application No. 60-219114, a flow of refrigerant is changed over by means of a four-way valve such that an inside heat exchanger is used either as an evaporator to cool air or as a condenser to heat air.

With the automotive air conditioner wherein cooling operation and heating operation are performed alternatively by changing over of a four-way valve in this manner, since the single heat exchanger changes its function immediately between a function of an evaporator and another function of a condenser, there is the possibility that, particularly when the function is changed over, a large amount of moisture may be blasted from a surface of the inside heat exchanger toward the inside of the room of the automobile.

In particular, water condensed on a surface of the inside heat exchanger during cooling operation is evaporated from the surface of the inside heat exchanger as a result of changing over to heating operation and then carried into the room of the automobile by a blower. Such blasting of a large amount of water will instantaneously fog a windshield and/or window glass. The fog will make an obstacle to a field of view in driving the automobile and is very inconvenient.

SUMMARY OF THE INVENTION

It is an object of the present invention to provide an automotive air conditioner for an automobile, which has an engine of the type wherein engine cooling water does not make a sufficient heat source or has no surplus heat source such as an electric automobile, wherein desirable air conditioning can be performed making full use of a variation of heat involved in condensation and evaporation in a refrigerating cycle.

Particularly, according to the present invention, heat exchangers disposed in a duct are specified in function as a heater and an evaporator so that it is prevented that a single heat exchanger alternatively functions as a heater or an evaporator. In other words, it is another object of the present invention to provide an automotive air conditioner which prevents such a situation even when an operating mode in air conditioning is changed over that a large amount of moisture is evaporated to cause fogging of the windshield of an automobile and so forth.

It is a further object of the present invention to provide an automotive air conditioner wherein the capacity of a compressor can be variably controlled by driving the compressor by means of an electric motor and air conditioning can be performed efficiently with a low power by suitably controlling the discharging capacity of the compressor and re-heating of air by means of a heater.

It is a still further object of the present invention to provide an automotive air conditioner wherein cooling operation or heating operation can be performed efficiently by controlling a flow of refrigerant to an outside heat exchanger which is provided to complement the capacities of a heater and an evaporator disposed in a duct.

It is a yet further object of the present invention to provide an automotive air conditioner wherein cooling operation, dehumidifying operation and heating operation can be performed effectively by variably controlling an air flow bypassing an evaporator and a heater disposed in a duct by means of a damper.

It is a yet further object of the present invention to provide an automotive air conditioner wherein cooling operation, dehumidifying operation and heating operation can be achieved by suitably controlling a flow of refrigerant discharged from a compressor between an evaporator and a heater disposed in a duct and an outside heat exchanger disposed outside the duct.

It is a yet further object of the present invention to provide an automotive air conditioner wherein cooling operation, dehumidifying operation and heating operation can be achieved better by varying the heat exchanging capacities of an outside condenser and an outside evaporator provided to complement the condensing and evaporating functions of a heater and an evaporator.

It is a yet further object of the present invention to provide an automotive air conditioner wherein the operation thereof can be changed over between heating operation in which refrigerant circulates in the order of a compressor, a heater, decompressing means and an outside heat exchanger and dehumidifying operation in which the refrigerant flows in the order of the compressor, the heater, the outside heat exchanger, the decompressing means and an evaporator by changing over the flow of the refrigerant and heating operation can be maintained while preventing fogging up of the windshield and so forth by changing over the operation suitably to dehumidifying operation when necessary even in a condition of heating operation.

It is a yet further object of the present invention to provide an automotive air conditioner wherein the operation is changed over between a heating operation condition and a dehumidifying operation condition by changing over means and defrosting of an outside heat exchanger can be achieved by changing over, even in a heating operation condition, the operation to a dehumidifying operation condition in a condition wherein it is forecast that the outside heat exchanger may be frosted.

It is a yet further object of the present invention to provide an automotive air conditioner wherein the operation is changed over between a heating operation condition and a dehumidifying operation condition by changing over means and defrosting of an evaporator can be achieved well by changing over, even in dehumidifying operation, the operation to heating operation in a condition wherein it is forecast that the evaporator may be frosted.

It is a yet further object of the present invention to provide an automotive air conditioner wherein the condensing pressure of refrigerant in a heater can be varied to control the temperature of the heater by performing condensing of the refrigerant, in dehumidifying operation, by both of the heater and an outside heat exchanger and varying the condensing capacity of the outside heat exchanger.

It is a yet further object of the present invention to provide an automotive air conditioner wherein the pressure of refrigerant in an evaporator is prevented from dropping below a predetermined value thereby to prevent fogging up of an inside evaporator by providing a flow of refrigerant which bypasses the inside evaporator and changing over the refrigerant between a flow which flows to the inside evaporator side and another flow which flows to the bypass passageway by means of a solenoid valve.

It is a yet further object of the present invention to provide an automotive air conditioner wherein high pressure side refrigerant in a refrigerating cycle can have a sufficient subcooling degree and efficient operation of the refrigerating cycle can be performed by dividing an inside heater into a plurality of inside heaters and using the inside heater on the upstream side of a refrigerant flow as a condenser which performs condensing of the refrigerant while using the inside heater on the downstream side of the refrigerant flow as a subcooler which performs radiation of heat of condensed high pressure liquid refrigerant.

It is a yet further object of the present invention to provide an automotive air conditioner wherein the amount of heat to be absorbed upon operation of a heat pump is increased to enhance the heating capacity by using an inside heater as a condenser and using both of an inside evaporator and an outside heat exchanger as evaporators when the heating load is high such as upon starting of heating operation under a low temperature and particularly when heating by inside air circulation is performed.

It is a yet further object of the present invention to provide an automatic air conditioner wherein an inside heater is divided into an inside condenser and an inside subcooler and throttling amount control of expanding means can be performed appropriately even in a condition wherein refrigerant does not substantially flow into either of the inside condenser and the inside subcooler in a cycle in which the throttling amount of the expanding means is varied so that a predetermined subcooling amount may be obtained with the inside subcooler.

It is a yet further object of the present invention to provide an automatic air conditioner wherein a receiver for suitably absorbing a variation of a flow rate of refrigerant which circulates in a refrigerating cycle can be installed well in the refrigerating cycle.

It is an additional object of the present invention to provide an automatic air conditioner wherein, even in case frost is detected on a surface of an evaporator when dehumidifying operation is to be performed, defogging of the evaporator can be performed without involving a great variation of the temperature of air to be blasted.

In order to attain the objects, according to the present invention, the construction is employed wherein an evaporator and a heater which constitute a refrigerating cycle are disposed in a duct which defines an air passageway.

Further, according to the present invention, a bypass passageway is formed sidewardly of a heater in a duct, and the amount of air to pass the bypass passageway and the amount of air to pass the heater are variably controlled continuously using an air mixing damper.

Further, according to the present invention, the cooling capacity of an evaporator in a duct and the heating capacity of a heater in the duct are suitably controlled by suitably controlling a flow and a flow rate of refrigerant to flow into the heater and the evaporator in the duct and also into an outside heat exchanger outside the duct.

Further, according to the present invention, a compressor is driven by an electric motor, and the speed of rotation of the electric motor is continuously controlled by a controller to variably control the discharging capacity of a compressor.

Further, according to the present invention, an outside heat exchanger is disposed outside a duct so that the heat exchanging performance of a heater or an evaporator may be complemented by the outside heat exchanger.

Further, according to the present invention, changing over means is disposed so that a flow of refrigerant passing an outside heat exchanger may be changed over in response to an operation condition required for the automotive air conditioner, that is, a heating operation condition or a cooling operation condition.

Further, according to the present invention, an outside heat exchanger is divided into an outside condenser used only for condensation and an outside evaporator used only for evaporation and varying means are provided for varying the condensing function of the outside condenser and the evaporating function of the outside evaporator.

Further, according to the present invention, changing over means is provided so as to effect changing over control among a cooling operation condition wherein refrigerant circulates in the order of a compressor, an outside heat exchanger, decompressing means and an evaporator, a heating operation condition wherein refrigerant circulates in the order of the compressor, the heater, the decompressing means and the outside heat exchanger and a dehumidifying operation condition wherein refrigerant circulates in the order of the compressor, the heater, the outside heat exchanger, the decompressing means and the evaporator.

Further, according to the present invention, in a condition wherein it is forecast that the windshield of a room of an automobile is fogged, changing over means is controlled to be driven to change over the operation from a heating operation condition to a dehumidifying operation condition.

Further, according to the present invention, in a condition wherein freezing of an evaporator is forecast, changing over means is controlled to be driven to change over the operation from a dehumidifying operation condition to a heating operation condition.

Further, according to the present invention, means is provided for changing over, in a condition wherein freezing of an outside heat exchanger is forecast, refrigerant to be admitted into an outside heat exchanger from a low pressure condition after passing expanding means to a high pressure condition before passing the expanding condition.

Further, according to the present invention, means for varying the capacity of an outside heat exchanger is provided, and upon dehumidifying operation in which both of the outside heat exchanger and a heater perform condensation of refrigerant, the capacity of the outside heat exchanger is varied to vary the condensing temperature of the heater.

Further, according to the present invention, a bypass passageway for flowing refrigerant bypassing an inside evaporator is provided, and a flow of refrigerant is controlled to be changed over by a solenoid valve between a flow which flows to the inside evaporator side and another flow which flows to the bypass passageway side.

Further, according to the present invention, an inside heater is divided into a plurality of inside heaters, and the inside heater on the upstream side in a flow of refrigerant operates as an inside condenser while the inside heater on the downstream side in a flow of refrigerant functions as an inside subcooler.

Further, according to the present invention, an inner heater functions as a condenser while an outside heat exchanger functions as an evaporator upon heating operation, and when the heating load is particularly high, changing over of a flow of refrigerant is controlled so that also the inside evaporator operates as an evaporator together with the outside heat exchanger.

Further, according to the present invention, such a construction is employed that an inside heater is divided into an inside condenser and an inside subcooler to achieve a refrigerating cycle in which the throttling amount of an expansion valve is controlled so that a predetermined subcooling degree can be obtained, and refrigerant flows into the inside subcooler upon heating operation and upon dehumidifying operation.

Further, according to the present invention, such a construction is employed that a refrigerating cycle wherein a receiver is disposed on the upstream side of expanding means in a flow of refrigerant Is formed and the location of the receiver is always positioned on the upstream side of the expanding means even if the operation is changed over to any of cooling operation, heating operation or dehumidifying operation.

Further, according to the present invention, an automotive air conditioner adopts such a construction that, when a frosted condition of an evaporator is forecast or detected upon dehumidifying operation wherein a heat exchanger on the upstream side in a duct functions as a refrigerant evaporator and another heat exchanger on the downstream side in the duct functions as a refrigerant condenser, the condition of an outside heat exchanger is changed over between a condition wherein it is not used as a heat exchanger between refrigerant and air or it is used as a refrigerant condenser to another condition wherein it is used as a refrigerant evaporator.

Because the construction described above is employed, with the automotive air conditioner, the evaporator disposed in the duct only performs cooling of air while the heater disposed in the duct only performs heating of air. Accordingly, such a situation is eliminated that a single heat exchanger alternatively performs cooling of air or heating of air in accordance with an operation condition. Besides, since cooling of air by the evaporator and heating of air by the heater are used in combination, appropriate temperature control can be achieved while performing dehumidification of air.

Further, with the automotive air conditioner, the cooling capacity can be varied to vary the temperature of air after passing the evaporator by variably controlling the discharging capacity of the compressor.

Further, with the automotive air conditioner, while the outside heat exchanger is disposed outside the duct and performs heat exchanging between outside air and refrigerant, the heat exchanging function of the heater or the evaporator by changing over a flow of refrigerant to flow to the outside heat exchanger between a flow of refrigerant to flow to the heater and a returning flow of refrigerant from the evaporator. In this instance, the outside heat exchanger has a function as a condenser or a function of an evaporator by changing over the flow of refrigerant. However, since the outside heat exchanger performs heat exchanging between air outside the duct and refrigerant, even if moisture is produced by a large amount at some location upon changing over operation, this will not make an obstacle to driving of the automobile or the like.

Further, with the automotive air conditioner, since the bypass passageways are provided sidewardly of the evaporator and the heater and the ratio of a flow rate of air flowing through either one of the bypass passageways to another flow rate of air flowing through the evaporator or the heater is controlled by the damper, cooling of air and heating of air in the duct can be controlled. As a result, useless cooling and useless re-heating of air can be eliminated.

Further, with the automotive air conditioner, since the outside heat exchanger is divided into the outside condenser and the outside evaporator installed separately, also the outside heat exchanger is always specified in function, and the outside condenser and the outside evaporator are installed at optimum locations in accordance with respective functions. Further, in this instance, since the varying means is employed for varying the heat exchanging functions of the outside condenser and the outside evaporator, the functions of the condenser and the evaporator installed in the duct can be variably controlled in connection with the functions of the outside condenser and the outside evaporator.

Further, with the automotive air conditioner, since the bypass passage for flowing refrigerant bypassing the evaporator is provided and a flow of refrigerant is controlled to be changed over between the evaporator side and the bypass passageway side, when the pressure of refrigerant in the evaporator becomes lower than a predetermined value, refrigerant can be flowed to the bypass passageway side. Since refrigerant does not flow through the evaporator when refrigerant flows to the bypass passageway side, the pressure of refrigerant in the evaporator rises as a result. Then, when the pressure of refrigerant in the evaporator rises higher than the predetermined value, refrigerant is changed over so that it may be flowed to the evaporator side again. The pressure of refrigerant in the evaporator can be controlled to the predetermined value by performing such changing over as described just above.

Further, with the automotive air conditioner, since the inside heater is formed separately as a heat exchanger which functions as a condenser and another heat exchanger which functions as a subcooler for subcooling condensed liquid registrant, refrigerant on the high pressure side in the refrigerating cycle can have a sufficiently high subcooling degree, and efficient operation of the refrigerating cycle can be performed.

Further, with the automotive air conditioner, upon heating operation, radiation of heat is performed by the inside heater while the inside heat exchanger serves as an evaporator in which absorption of heat is performed, and when the heating load is particularly high such as upon starting of heating in a low temperature condition, refrigerant passes also through the evaporator so that absorption of heat may be performed also in the evaporator. The heating capacity can be enhanced by increasing the amount of heat absorption in this manner.

Further, with the automotive air conditioner, the inside heater is divided into the condenser and the subcooler, and a temperature sensing tube is provided for varying the throttling amount of the expanding means so that the subcooling degree of refrigerant on the exit side of the inside condenser may be substantially constant in order that refrigerant passing the subcooler may have a predetermined subcooling degree. In the refrigerating cycle having such a construction as described just above, even in a condition wherein no refrigerant flows into the inside condenser and the inside subcooler, operation of the refrigerating cycle can be performed with certainty by employing a fixed throttle in addition to throttling for the expanding means provided by the temperature sensing tube.

Further, with the automotive air conditioner, since, upon dehumidifying operation, the heat exchanger on the upstream side in the duct functions as a refrigerant evaporator and the heat exchanger on the downstream side in the duct functions as a refrigerant condenser, when air passes through the evaporator on the upstream side, it is cooled, whereupon saturated vapor is removed from the air, whereafter it is heated when it passes through the heater on the downstream side, and after then, it is blasted into the room of the automobile. Then, if the temperature of the evaporator drops to a temperature at which frosting occurs or to a temperature near to such temperature at which frosting occurs, the controlling apparatus detects or forecasts such frosting by means of the frost sensor. Then, the controlling apparatus controls the flow passage changing over means to change over the outside heat exchanger from a condition wherein the not used as a heat exchanger is not used as a heat exchanger between refrigerant and air or is used as a refrigerant condenser to another condition wherein the outside heat exchanger is used as a refrigerant evaporator.

Then, since the evaporator and the outside heat exchanger both function as refrigerant evaporators, the evaporating pressure is raised, and frosting of the heat exchanger on the upstream side is prevented.

BRIEF DESCRIPTION OF THE DRAWINGS

FIG. 47 is a flow chart showing another example of refrigerating cycle control of the present invention;

FIG. 48 is a flow chart showing a further example of refrigerating cycle control of the present invention;

DETAILED DESCRIPTION OF THE PREFERRED EMBODIMENTS

Figure 1:
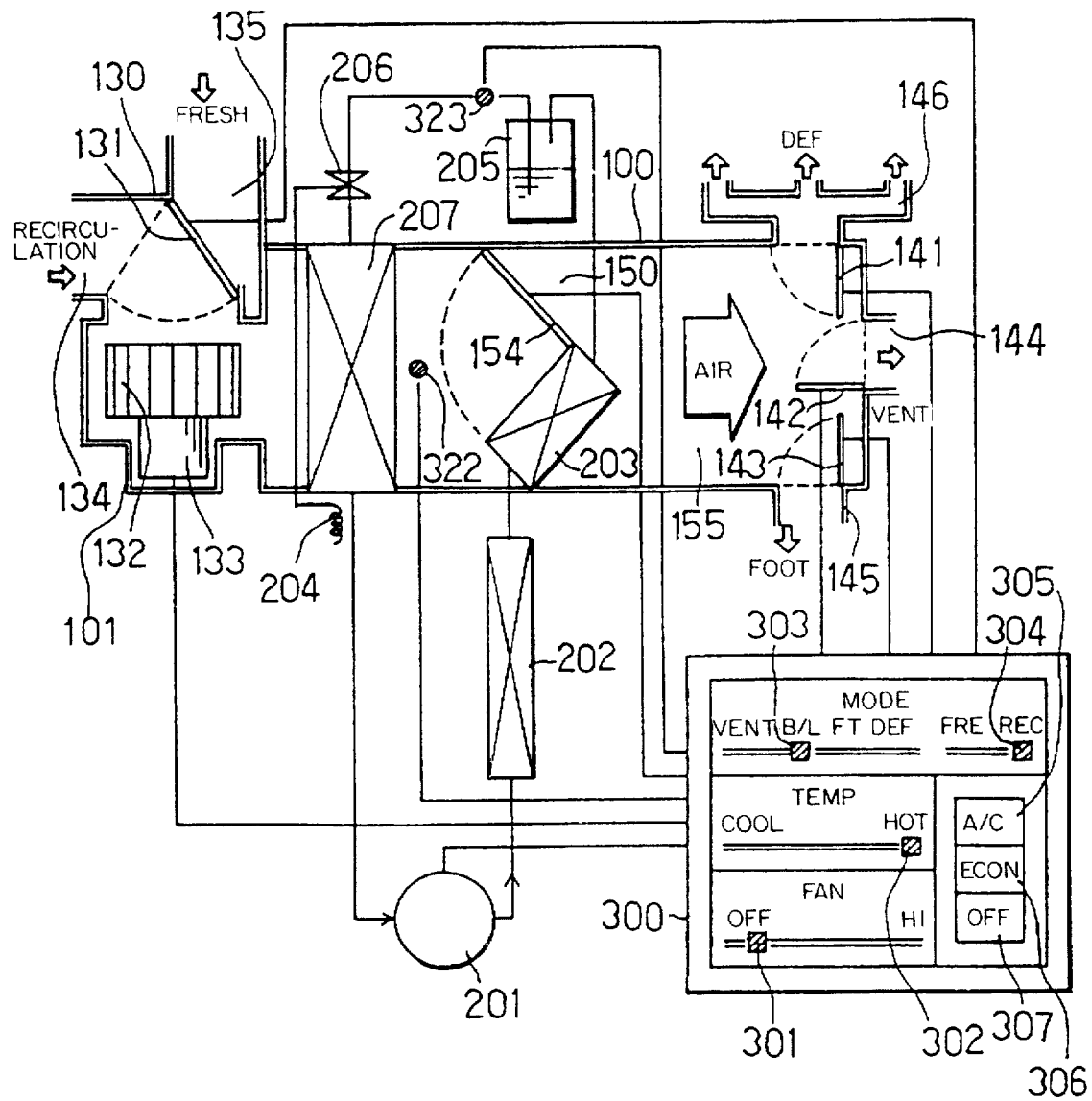
FIG. 1 is a diagrammatic view showing a preferred embodiment of the present invention.

In the following, embodiments of the present invention will be described with reference to the drawings. Referring to FIG. 1, a duct 100 which defines an air passageway is disposed in a room of an automobile. A fan case 101 is connected to an end of the duct 100, and a blower 132 is disposed in the fan case 101. The blower 132 is driven to rotate by a motor 133 disposed at a central location thereof. An inside/outside air changing over section 130 is connected in the fan case 101, and an inside air inlet port 134 and an outside air inlet port 135 are opened at the inside/outside air changing over section 130. An inside/outside air changing over damper 131 is disposed in the inside/outside air changing over section 130, and air to be introduced into the duct 100 can be changed over between inside air and outside air of the automobile.

The duct 100 has a plurality of spit holes formed at an end portion thereof for blowing out conditioned air into the room of the automobile. The spit holes include a vent spit hole 144 for principally blowing out a cool wind toward the head and breast portions of passengers, a foot spit hole 145 for principally blowing out a warm wind toward the legs of passengers, and a def spit hole 146 for principally blowing out a warm wind toward the windshield. A vent damper 143, a foot damper 143 and a def damper 141 are provided at the spit holes 144, 145 and 146 for controlling air flows to the spit holes 144, 145 and 146, respectively.

An evaporator 207 of a refrigerating cycle is disposed in the duct 100, and a condenser 203 of the refrigerating cycle is disposed on the downstream side of the evaporator 207 similarly in the duct 100. It is to be noted that the evaporator 207 operates as a cooler which takes heat of vaporization away from air for conditioning or air upon heat exchanging thereby to cool the air. Meanwhile, the condenser 203 operates as a heater which radiates heat of condensation to air upon heat exchanging thereby to heat the air.

A bypass passageway 150 is disposed sidewardly of the inside condenser 203 in the duct 100, and an air mixing damper 154 is disposed for pivotal motion at an end thereof in the duct 100 for variably continuously controlling the ratio between the amount of air flowing through the bypass passageway 150 and the amount of air flowing through the condenser 203.

It is to be noted that the refrigerating cycle includes a compressor 201 which is driven by an electric motor not shown to compress and discharge refrigerant. Since the compressor 201 is disposed in an enclosed casing integrally with the electric motor, the location thereof is not limited to a particular location. It is only preferable for the compressor 201 to be disposed at any other location than within the room of the automobile for the convenience of maintenance and so forth. Refrigerant in a high temperature, high pressure condition discharged from the compressor 201 is condensed by an outside heat exchanger 202. The outside heat exchanger 202 operates only as a condenser and is disposed at a forward location in the advancing direction of the automobile so that good heat exchanging can be effected with outside air. In other words, the outside heat exchanger 202 meets with a driving wind during driving of the automobile so that refrigerant thereof can be cooled well. Meanwhile, the condenser 203 is coupled to the outside heat exchanger 202 by way of a refrigerant pipe. Liquid refrigerant condensed by passage through the condenser 203 flows once into a receiver 205. The receiver 205 has a comparatively great volume so that it can keep surplus refrigerant in the form of liquid therein. An interface between gas and liquid appears in the receiver 205, and only liquid refrigerant is delivered to expanding means 206 side. The expanding means 206 is, in the present automotive air conditioner, a temperature differential expansion valve which varies the throttling amount thereof in response to a degree of superheat of refrigerant on the exit side of the evaporator 207. In particular, the expansion valve 206 receives a signal from a temperature sensing tube 204 and varies the throttling amount thereof in response to the signal so that the superheat on the exit side of the evaporator 207 may normally be constant. The expansion valve 206 is disposed in the proximity of the evaporator 207. On the other hand, while the location of the receiver 205 described above is not particularly limited, it is preferably disposed outside the room of the automobile, for example, in the engine room for the convenience of maintenance and so forth.

An operation panel 300 is disposed at a location within the room of the automobile at which it can be visually observed readily by a passenger. The operation panel 300 includes a fan lever 301 for controlling the speed of rotation of the blower motor 133, a temperature adjusting lever 302 for controlling the opening of the air mixing damper 154, a mode changing over lever 303 for controlling the spit hole dampers 142, 143 and 141, an operating lever 304 for controlling the inside/outside air changing over damper 131 to make a changing over operation, an air conditioner switch 305 for starting operation of the automotive air conditioner, an economy switch 306 for causing the automotive air conditioner to operate in a power saving mode, and an off switch 307 for stopping operation of the automotive air conditioner.

A temperature sensor 322 detects a temperature of air on the exit side of the evaporator 207, and normally the discharging amount of the compressor 201 is controlled in accordance with a signal from the temperature sensor 322 so that the temperature of air on the exit side of the evaporator 207 may range from 3 to 4 degrees. However, when the economy switch 306 is switched on, the discharging amount of the compressor 201 is variably controlled in response to a signal from the sensor 322 so that the air temperature on the exit side of the evaporator 207 may range from 10 to 11 degrees.

A sensor 323 detects a pressure of refrigerant on the upstream side of the expanding means 206. A refrigerant pressure detected by the sensor 323 is substantially equal to a pressure of refrigerant in the compressor 203, and a saturation condensation temperature of refrigerant in the condenser 203 is calculated from the pressure.

Subsequently, operation of the automotive air conditioner having such construction as described above will be described.

If the air conditioner switch 305 is switched on and the fan switch 301 is set to any of positions LO, MID and HI, then the compressor 201 starts its rotation and the fan motor 133 is rotated at a selected speed. Gas refrigerant in a high temperature, high pressure condition discharged from the compressor 201 is condensed at part thereof in the outside heat exchanger 202 and condensed at the remaining part thereof in the condenser 203 disposed in the duct 100. Refrigerant thus condensed into liquid is then separated from gas in the receiver 205, and only the liquid refrigerant is supplied to the expanding means 206. The liquid refrigerant is adiabatically expanded into mist of a low temperature and a low pressure by the expanding means 206 and then supplied into the evaporator 207. In the evaporator 207, the mist refrigerant exchanges heat with air supplied thereto from the blower 132. In particular, the mist refrigerant takes heat of vaporization away from the air so that it is vaporized while it remains in a low pressure condition. The thus vaporized gas refrigerant is sucked into the compressor 201 again.

Figure 2:
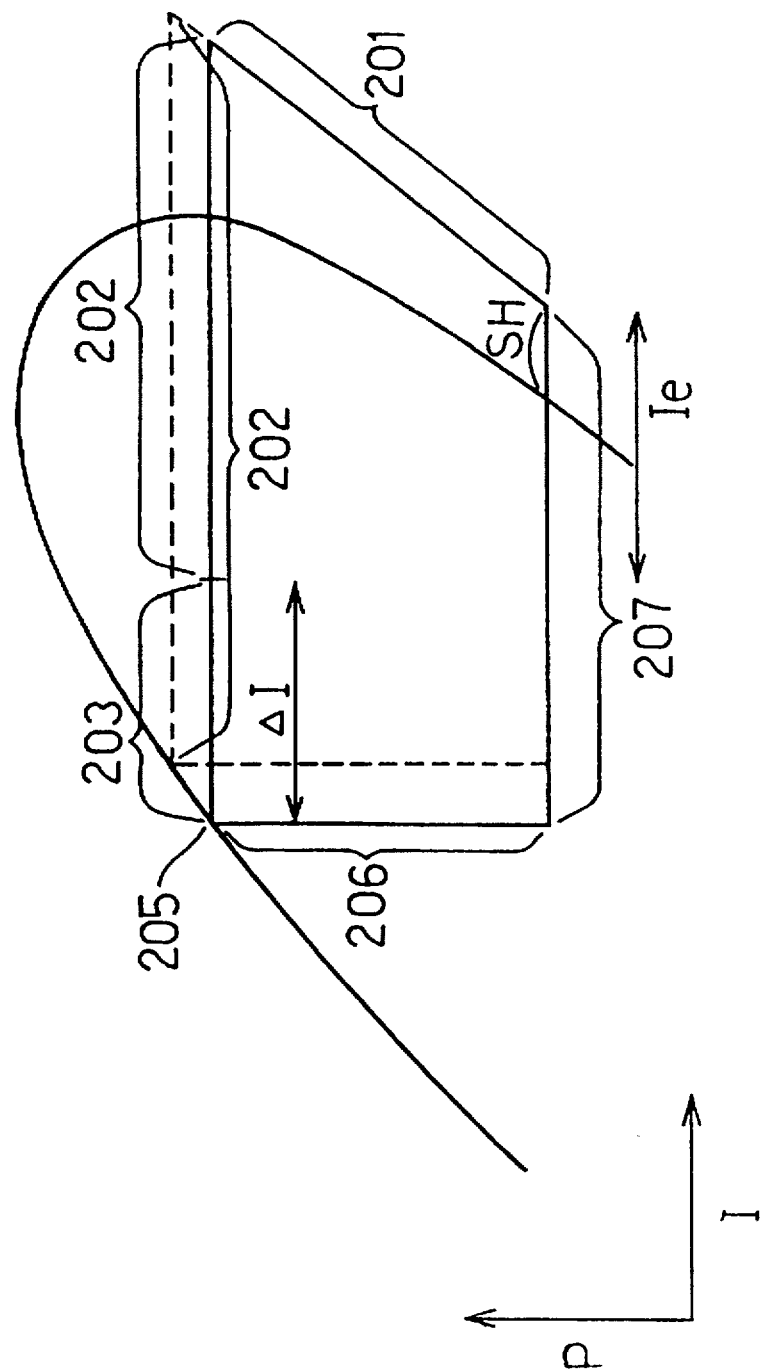
FIG. 2 is a Mollier chart illustrating an operating condition of the automotive air conditioner shown in FIG. 1.

FIG. 2 is a Mollier chart illustrating an operation condition of the refrigerating cycle. A solid line in FIG. 2 shows a condition wherein the air mixing damper 154 assumes its fully open position as shown in FIG. 1. In other words, the solid line shows a condition wherein blasting air flows into the condenser 203. As seen from FIG. 2, condensation is performed by the outside heat exchanger 202 and the condenser 203. In this condition, an enthalpy $\Delta I$ obtained in the condenser 203 is consumed for heating of air, and accordingly, air having passed the evaporator 207 and the condenser 203 will perform a cooling action by an amount corresponding to an enthalpy Ie.

A broken line in FIG. 2 shows a condition wherein the air mixing damper 154 assumes its fully closed condition. In this condition, no flow of air is introduced into the condenser 203. Accordingly, condensation of refrigerant is performed all by the outside heat exchanger 202. In this instance, however, since the effective capacity of the heat exchangers is decreased by the capacity of the condenser 203, the pressure necessary to condense refrigerant is increased. In particular, the pressure on the discharging side of the compressor 201 is increased a little. On the other hand, the pressure on the sucking side of the compressor 201 is maintained constant independently of the opening of the air mixing damper 154 because it is controlled by the expanding means 206.

Then, in such a condition wherein the air mixing damper 154 is in a fully closed position as indicated by the broken line in FIG. 2, since the loss in enthalpy by the condenser 203 can be ignored, the cooling function of the evaporator 207 can be used as it is for cooling.

Subsequently, a condition of a flow of air in this instance will be described. Air selectively supplied by the inside/outside changing over damper 131 is supplied into the evaporator 207 by the blower 132. Here, when the air passes the evaporator 207, it is cooled by vaporization of refrigerant so that it has a temperature ranging from 3 to 4 degrees on the exit side of the evaporator 207, and in this condition, it comes to the bypass passageway 150 and the condenser 203.

The air flow is suitably selected by the air mixing damper 154. In particular, in a condition wherein maximum cooling is required, the air mixing damper 154 closes the condenser 203 so that the cooled air is introduced as it is to the spit hole side. In case it is desired to raise the temperature of air to be blown out, the air mixing damper 154 is opened so that part of the air may be introduced into the condenser 203. Air introduced into the condenser 203 is re-heated in the condenser 203 to a predetermined temperature and then mixed, in an air mixing chamber 155, with air having passed the bypass passageway 150.

The thus conditioned air is blown out into the room of the automobile from a selected one or ones of the dampers 142, 143 and 141. When the mode switch 303 is at its vent mode position, only the vent damper 142 is opened while the other dampers 143 and 141 remain closed. Consequently, a cooling wind will be blown out principally to the head and breast portions of passengers. On the other hand, when the mode switch 303 is at its bi-level mode position, the def damper 141 is closed while the vent damper 142 and the foot damper 143 are opened. Consequently, a warm wind having passed the condenser 203 will be blown out principally from the foot spit hole 145 toward the feet of passengers while a cooling wind having passed the bypass passageway 150 is blown out principally from the vent spit hole 144 toward the head and breast portions of the passengers.

When the mode lever 303 is brought to its foot mode position, only the foot damper 143 is opened while the other dampers 142 and 141 are closed. As a result, air having passed the condenser 203 is blown out from the foot spit hole 143 toward the feet of passengers.

When the mode lever 303 is set to its def mode position, only the def damper 141 is opened while the other dampers 142 and 143 are closed. As a result, dehumidified air having passed the condenser 203 is blown out from the def spit hole 146 toward the windshield of the automobile.

It is to be noted that, in the automotive air conditioner described above, when the mode lever 303 is set to the foot mode position, air having passed the condenser 203 will be blown out as it is to the foot portions of passengers. Here, as seen from the Mollier chart of FIG. 2, in the condition described above, the difference in enthalpy at the evaporator 207 is greater by a predetermined amount Ie than the difference in enthalpy at the condenser 203. However, since a considerable part of the cooling capacity of the evaporator 207 is consumed to condense moisture in the air on a surface of the evaporator 207, air having passed the evaporator 207 and the condenser 203 will rise in temperature. In particular, even if the temperature of the outside air is low, since air cooled when it passes the evaporator 207 is re-heated in the condenser 203, the temperature of air when it passes the condenser 203 is raised to 20 to 25 degrees or so. However, since the temperature is comparatively low as a temperature of air to be blown out upon heating, it is desirable, in an operating condition wherein heating is required, to use a PCT heater and some other auxiliary heat source.

Figure 19:
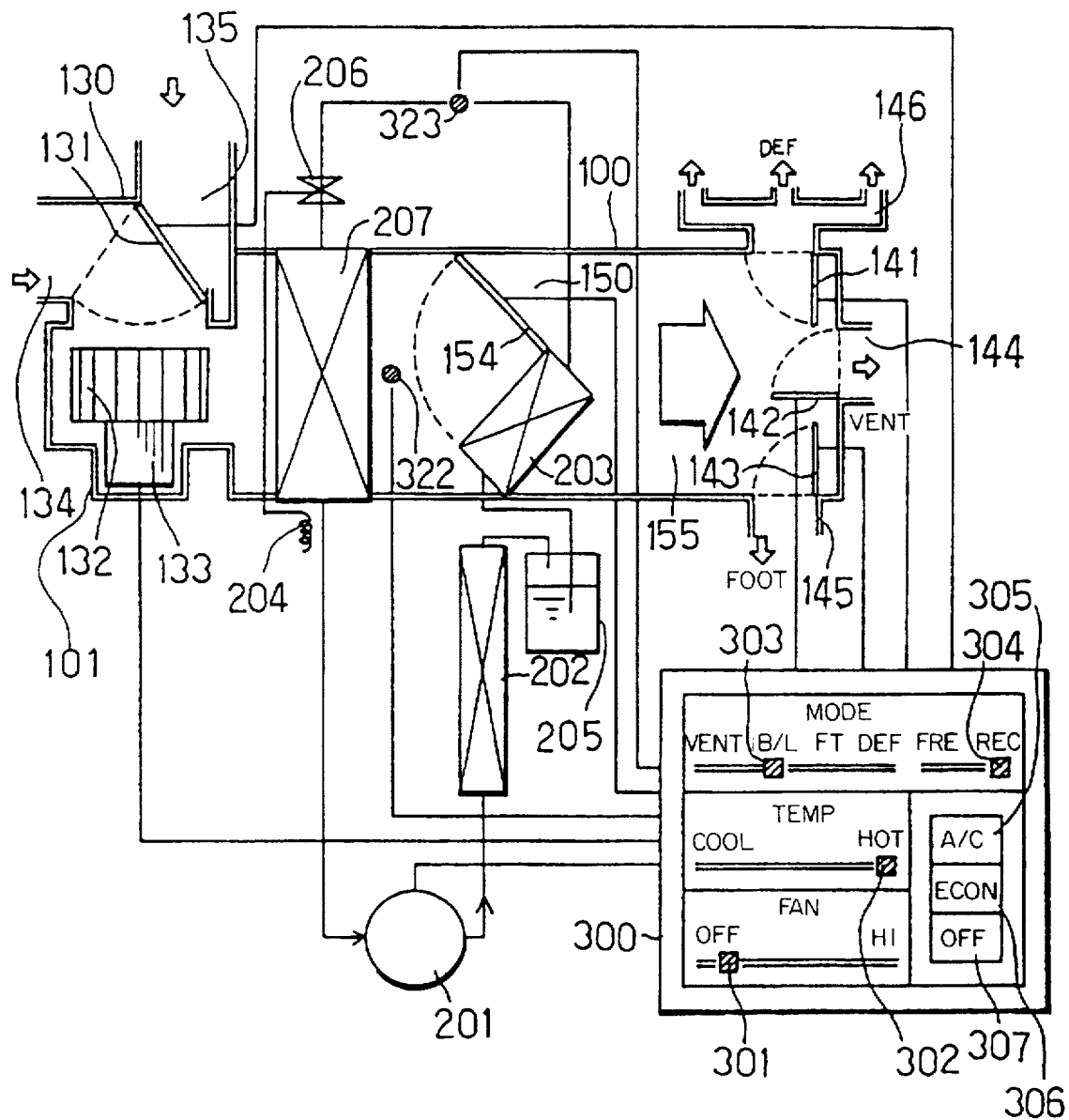
FIG. 19 is a diagrammatic view showing a yet further preferred embodiment of the present invention.

While the receiver 205 in the automotive air conditioner of FIG. 1 is disposed on the downstream of the condenser 203, it may otherwise be disposed on the downstream of the outside heat exchanger 202 as shown in FIG. 19. In this instance, condensation of refrigerant is completed at the outside heat exchanger 202, and the heat exchanger 203 acts as a subcooler which radiates heat of high temperature, high pressure liquid refrigerant introduced thereinto from the receiver 205. Accordingly, in the present invention, the heat exchanger disposed in the duct 100 is not necessarily limited to the condenser 203, but includes a subcooler. Accordingly, in the present invention, a condenser, a subcooler or the like which radiates heat of high temperature, high pressure refrigerant will be generally referred to as a heater.

Figure 3:
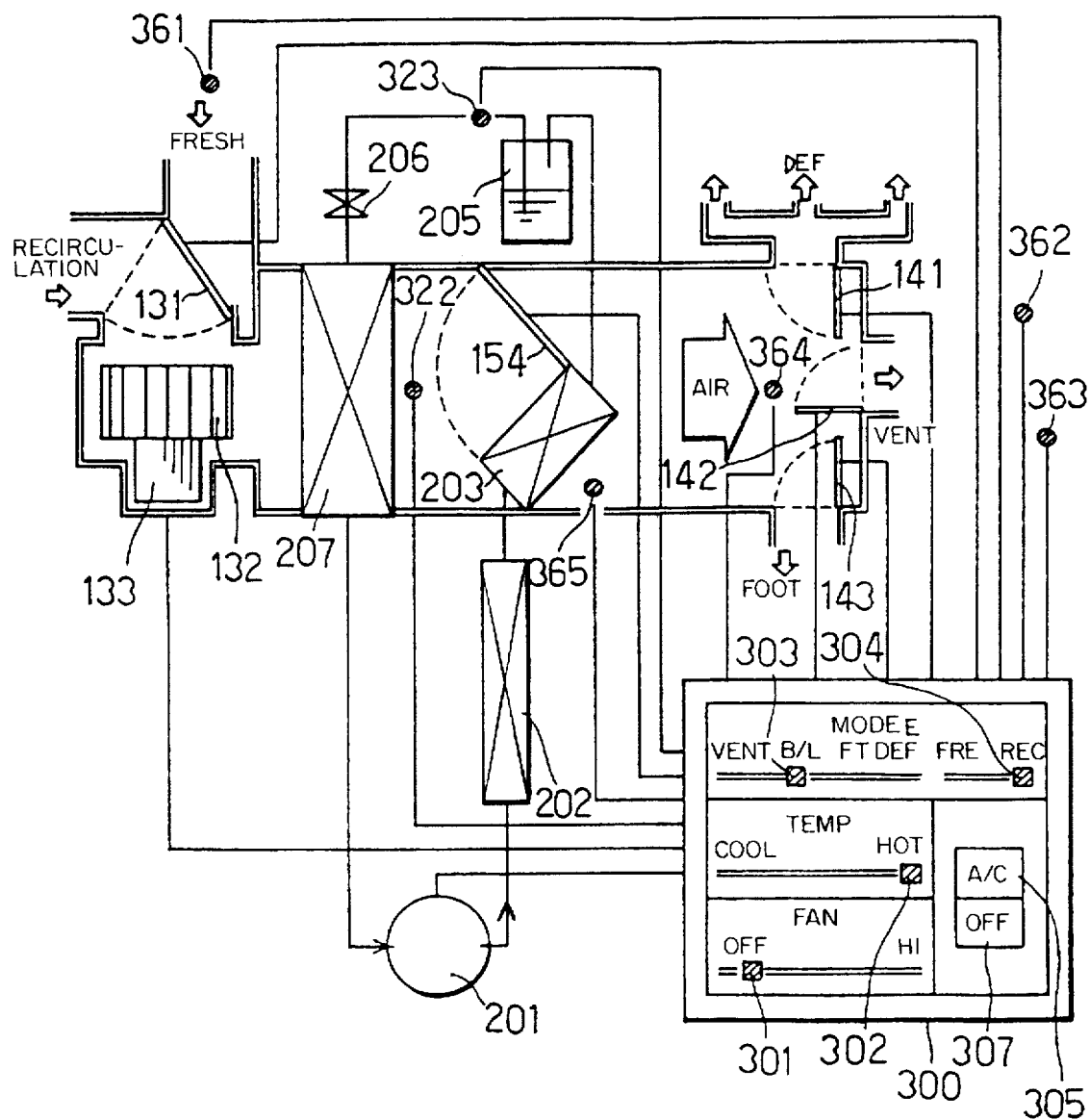
FIG. 3 is a diagrammatic view showing another preferred embodiment of the present invention.

Further, while, in the automotive air conditioner of FIG. 1, the opening of the air mixing damper 154, the speed of rotation of the blower motor 133 and the speed of rotation of the compressor 201 are set by manual operations of a passenger of the automobile, they may otherwise be set automatically. FIG. 3 shows such an automatic automotive air conditioner. Referring to FIG. 3, a sensor 361 detects a temperature of outside air, and another sensor 362 measures a temperature of air in the room of the automobile. A solar radiation sensor 363 measures an amount of the sunlight incident into the room of the automobile, and a temperature sensor 364 measures a temperature of blown out air. Another temperature sensor 365 is disposed on the exit side of the condenser 203 and measures a temperature of air having passed the condenser 203.

Figure 4:
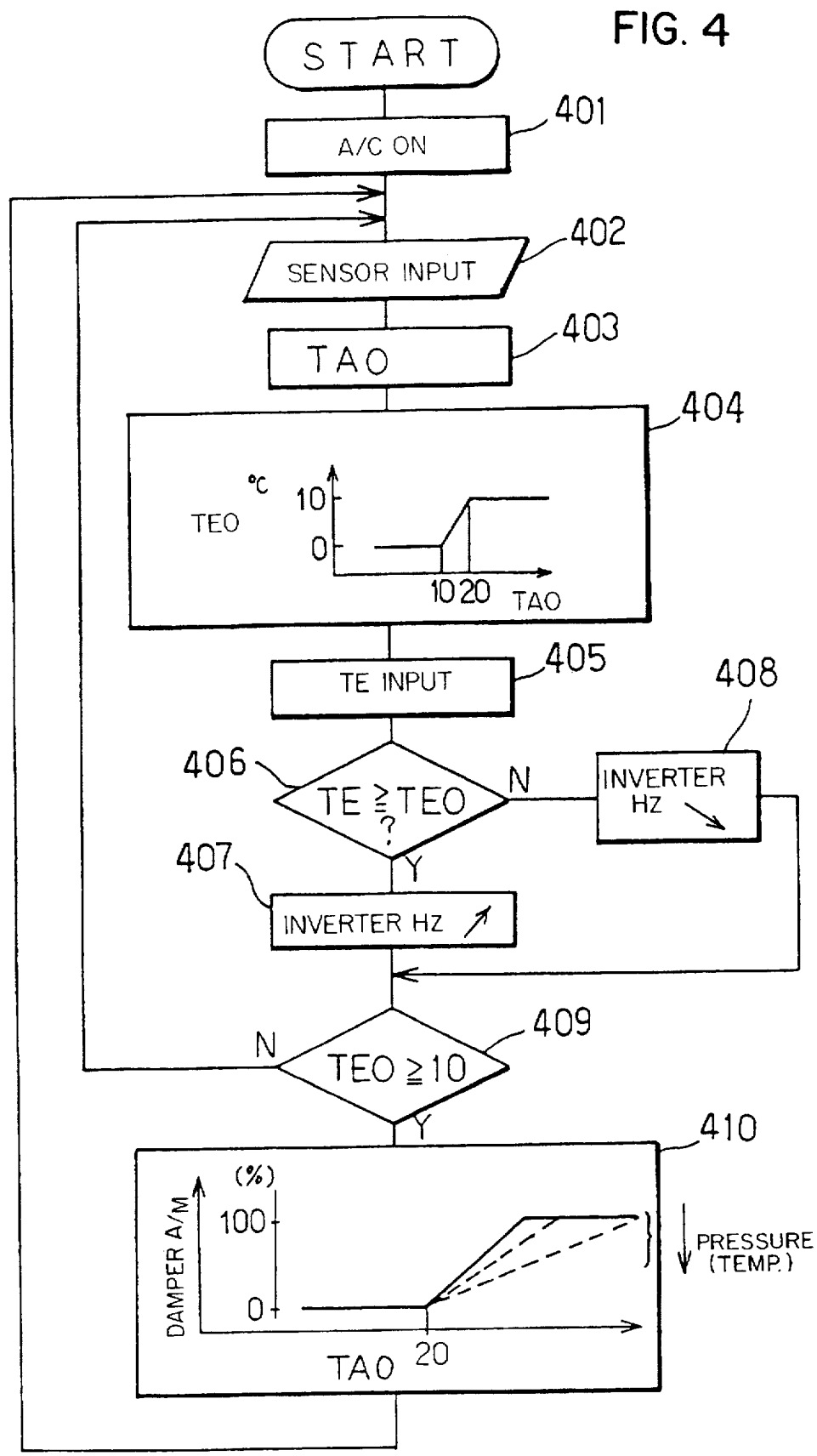
FIG. 4 is a flow chart illustrating an example of control of the automotive air conditioner shown in FIG. 3.

An example of control of the automatic automotive air conditioner will be described subsequently with reference to FIG. 4 which illustrates a flow chart of the control. If switching on of the air conditioner switch 305 is detected at step 401, then inputs from the various sensors are received at step 402. Then, a necessary blown out air temperature Tao is calculated in accordance with the inputs at step 403 Then at step 404, it is determined in accordance with a value of the necessary blown out air temperature Tao whether or not the operation of the compressor 201 should be in an economy mode. In particular, if the necessary blown out air temperature Tao is equal to or higher than a predetermined value, for example, 20 degrees, the temperature Teo at the exit of the evaporator 207 is set to a higher temperature side preset temperature, for example, to 10 degrees. On the other hand, when the necessary blown out air temperature Tao is lower than another predetermined value, for example, 10 degrees, the air temperature at the exit of the evaporator 207 is set, at the lower temperature side thereof, to another preset temperature, for example, to 3 degrees.

Then at step 405, a temperature Te of air at the exit of the evaporator 207 is received from the sensor 322. The temperature Te thus received at step 405 and the air temperature Teo obtained at step 404 are compared with each other at step 406. When the actual blown out air temperature Te is higher than the aimed blown out air temperature Teo, this is a condition wherein a higher capacity is required for the refrigerating cycle, and consequently, the frequency of an inverter not shown is raised at step 407 to increase the discharging capacity of the compressor 201. On the contrary when the actual temperature Te is lower than the aimed temperature Teo, this is a condition wherein the capacity of the refrigerating apparatus is excessively high, and consequently, the frequency of the inverter is lowered at step 408 to decrease the discharging capacity of the compressor 201. Variation of the discharging capacity of the compressor 201 is performed when the aimed temperature Teo is lower than the higher temperature side preset temperature, for example, 10 degrees, and the routine described above is repeated by way of step 409. Then, in case it is judged at step 409 that the aimed temperature Teo is higher than the higher temperature side preset temperature, the control sequence advances to step 410, at which the opening of the air mixing damper 154 is controlled. While the opening of the air mixing damper 154 is controlled in accordance with the aimed temperature Tao, it is influenced further by a temperature of refrigerant in the condenser 203. In particular, when a pressure of refrigerant obtained from the pressure sensor 323 is high, it is judged that also the temperature of refrigerant is high, and in this instance, even if the aimed temperature Tao is equal, the opening of the air mixing damper 154 is varied so that the air mixing damper 154 may be pivoted by a smaller amount.

In particular, in the present automotive air conditioner, as control of a cooling operation, the discharging capacity of the compressor 201 is first varied to achieve power saving operation and then the air mixing damper 154 is pivoted so that the temperature control may be available to the high temperature side.

Figure 5:
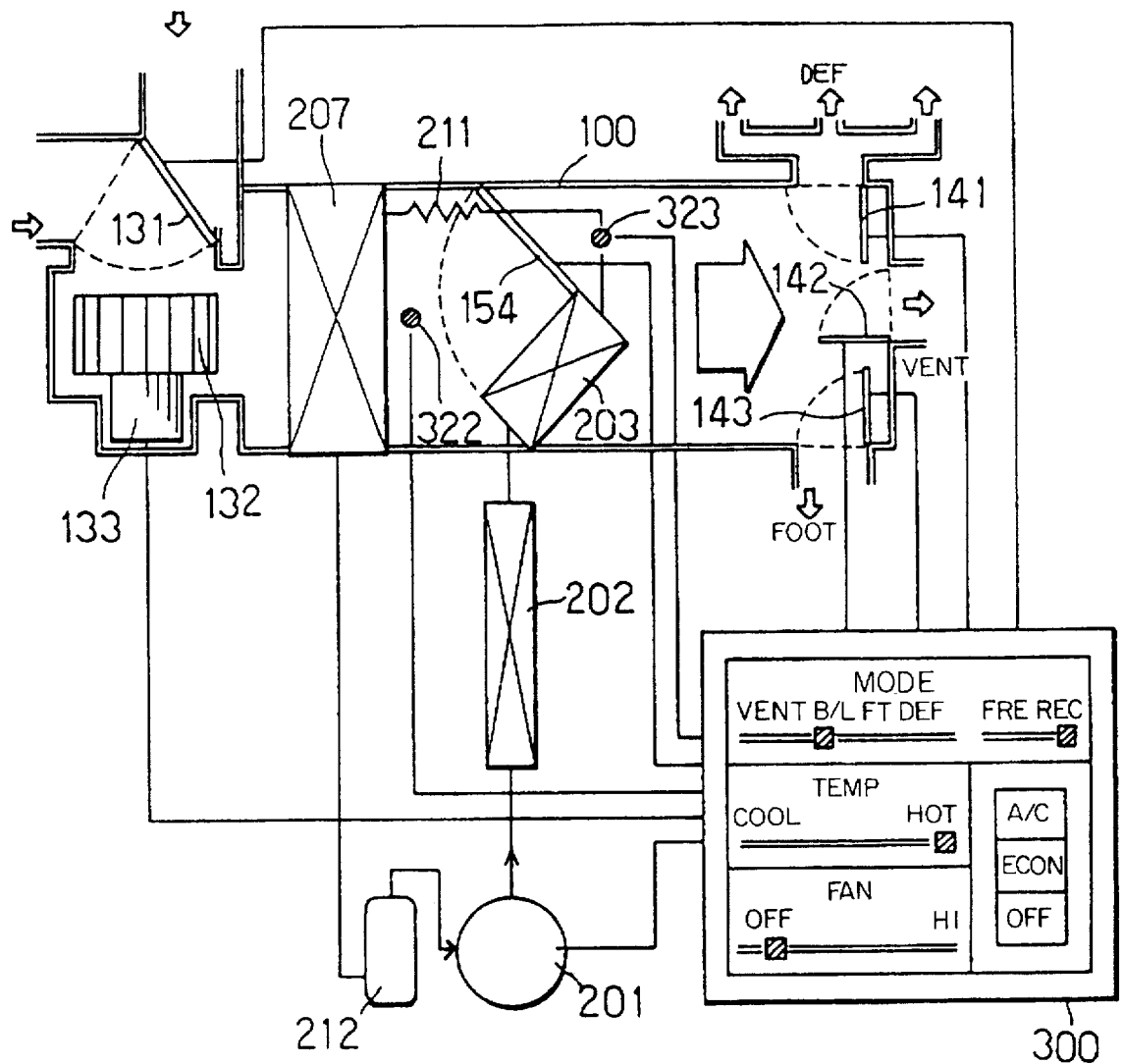
FIG. 5 is a diagrammatic view showing a further preferred embodiment of the present invention.

Referring now to FIG. 5, there is shown a further automotive air conditioner according to the present invention, in which the refrigerating cycle is an accumulator cycle. In particular, an accumulator 212 for accumulating refrigerant therein is installed on the exit side of the evaporator 207 and the sucking side of the compressor 201, and a capillary tube 211 of a fixed throttle is employed in place of the expansion valve as the expanding or decompressing means. In this instance, since the capillary tube 211 does not require an excessive installation area, it is disposed in the duct 100.

Figure 6:
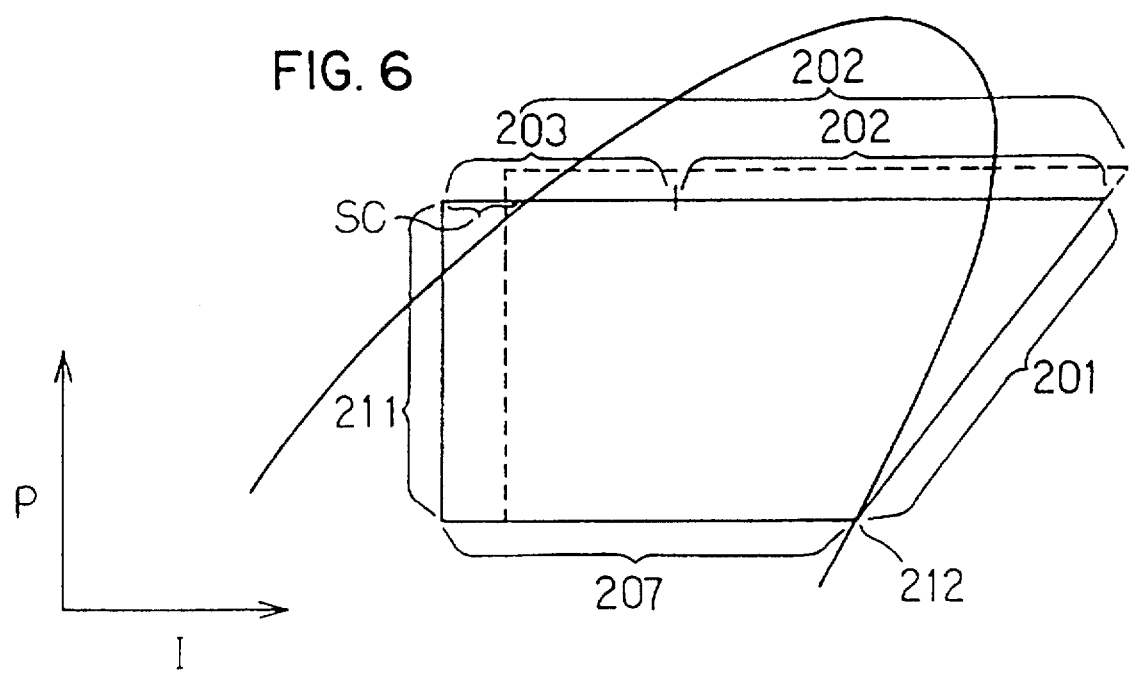
FIG. 6 is a Mollier chart illustrating an operation condition of the automotive air conditioner shown in FIG. 5.

FIG. 6 is a Mollier chart of the automotive air conditioner shown in FIG. 5. A solid line in FIG. 6 illustrates a condition wherein the air mixing damper 154 is opened fully so that cooling air is introduced into the compressor 203. Meanwhile, a broken line in FIG. 6 illustrates another example wherein the air mixing damper 154 is closed so that the condenser 203 may not substantially perform a condensing operation. Also with the present automotive air conditioner, it can be seen that, similarly as with the automotive air conditioners of the preceding embodiments described above, the pressure on the higher pressure side rises a little when the air mixing damper 154 is closed. Further, since the refrigerating cycle is an accumulator cycle, superheat is not taken on the exit side of the evaporator 207. Instead, a predetermined subcooling degree is obtained on the exit side of the condenser 203.

Figure 7:
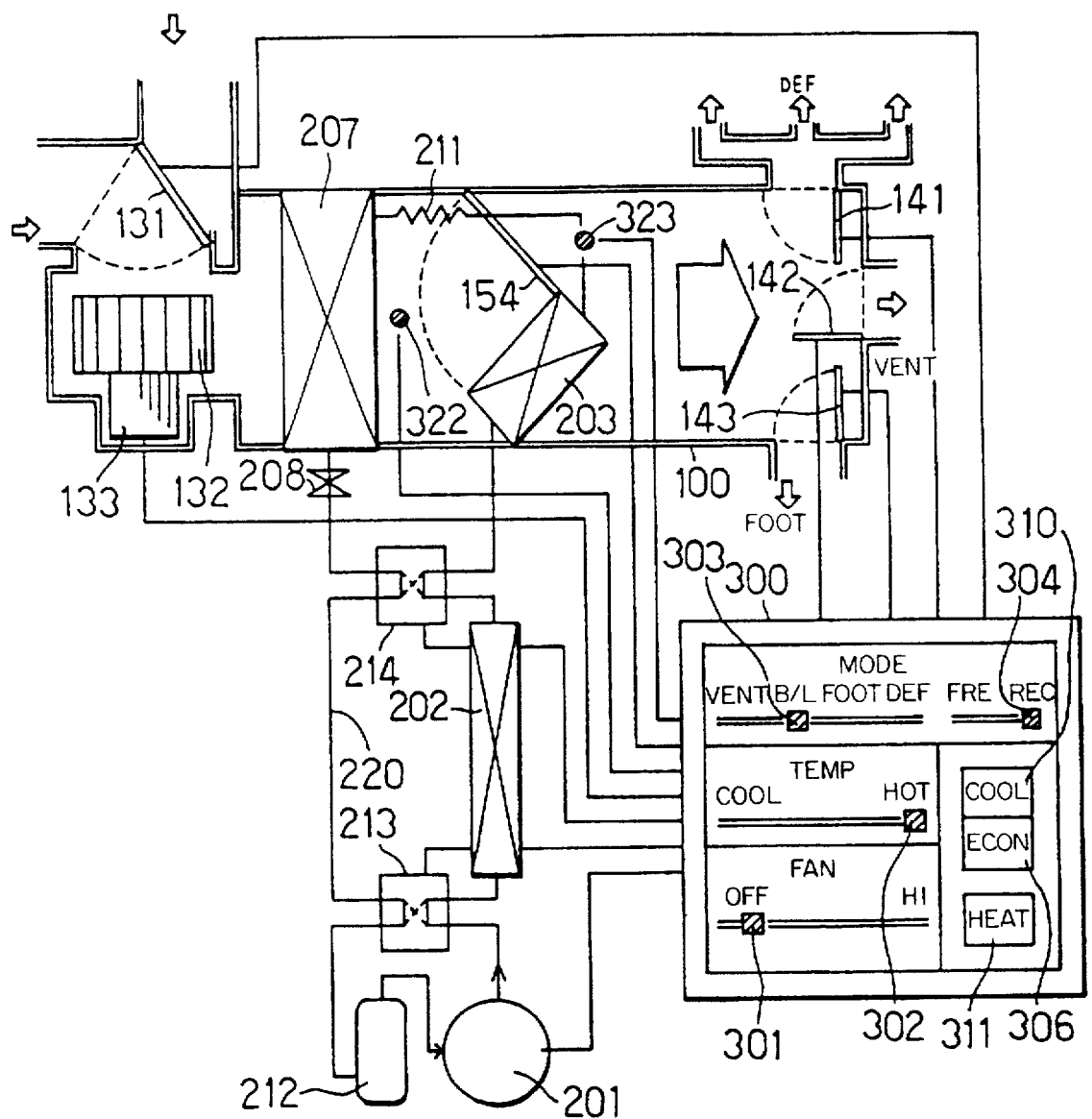
FIG. 7 is a diagrammatic view showing a still further preferred embodiment of the present invention.

FIG. 7 shows a still further automotive air conditioner of the present invention, in which the outside heat exchanger 202 can be changed over such that it is used as a condenser or as an evaporator in accordance with the necessity. In particular, referring to FIG. 7, a first four-way valve 213 and a second four-way valve 214 are disposed at the opposite end portions of the outside heat exchanger 202. The first four-way valve 213 is changed over between a first connecting condition (indicated by a solid line) wherein it interconnects the discharging side of the compressor 201 and the outside heat exchanger 202 and interconnects the suction side of the compressor 201 and the refrigerant pipe 220 and a second connecting condition (indicated by a broken line) wherein it interconnects the discharging side of the compressor 201 and the refrigerant pipe 220 and interconnects the outside heat exchanger 202 and the sucking side of the compressor 201.

Also the second four-way valve 214 is changed over between a first connecting condition indicated by a solid line in FIG. 7 and a second connecting condition indicated by a broken line in FIG. 7. In the first connecting condition, the second four-way valve 214 interconnects the outside heat exchanger 202 and the condenser 203 and interconnects the evaporator 207 and the sucking side of the compressor 201. On the other hand, in the second connecting condition, the second four-way valve 214 interconnects the refrigerant pipe 220 and the condenser 203 and interconnects the evaporator 207 and the outside heat exchanger 202.

It is to be noted that, in the automotive air conditioner shown in FIG. 7, since it has a condition wherein the evaporator 207 and the outside heat exchanger 202 are connected directly to each other, an evaporation pressure regulating valve 208 is disposed on the downstream of the evaporator 207.

Figure 8:
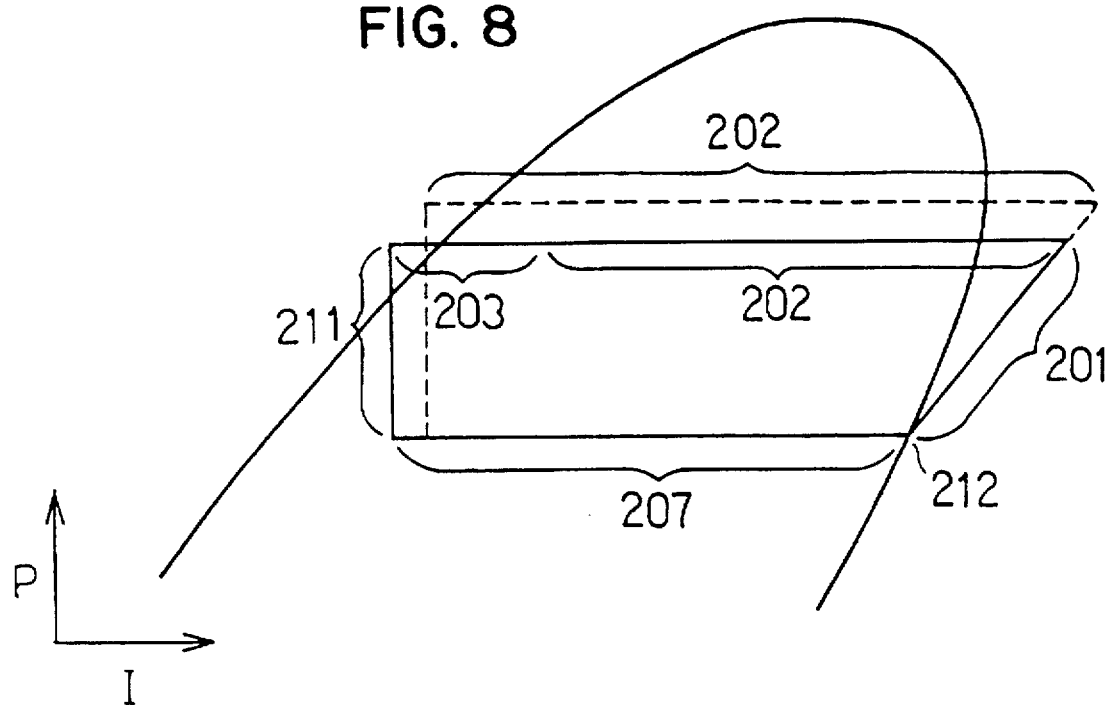
FIG. 8 is a Mollier chart illustrating operation of the automotive air conditioner shown in FIG. 7 in a cooling condition.

Subsequently, an operation condition of the automotive air condition shown in FIG. 7 will be described with reference to Mollier charts of FIGS. 8 and 9. FIG. 8 illustrates a condition wherein the first and second four-way valves 213 and 214 assume their respective first connecting conditions and the outside heat exchanger 202 acts as a condenser. The condition is used principally upon cooling operation in summer. The condition is basically similar to that of the Mollier chart shown in FIG. 6, and the variation in enthalpy at the condenser 203 is adjusted in response to the opening of the air mixing damper 154.

Figure 9:
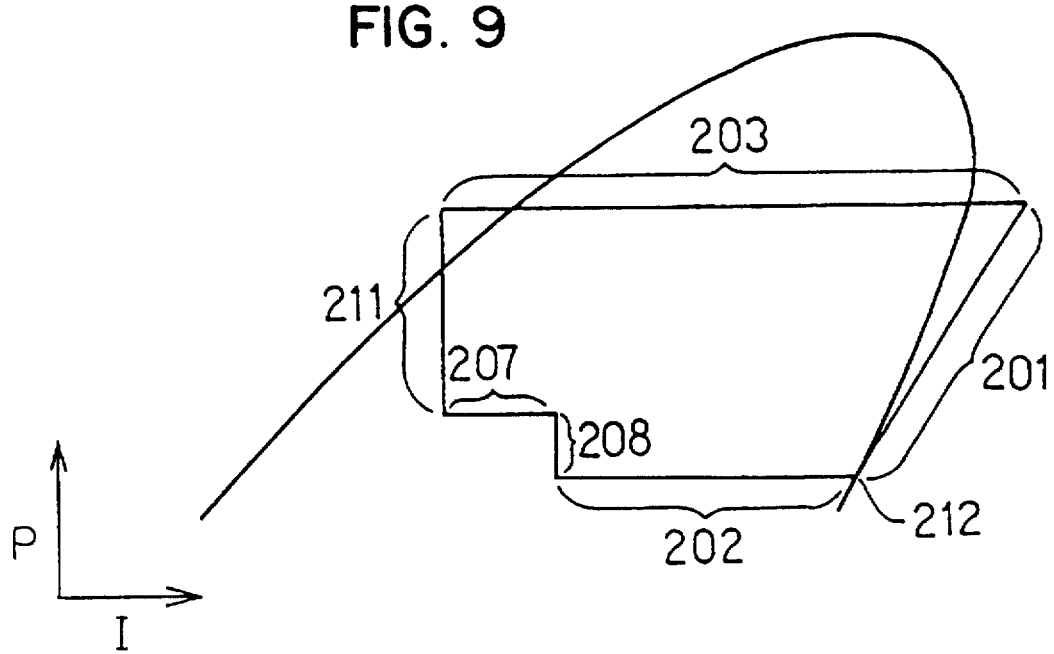
FIG. 9 is a Mollier chart illustrating operation of the automotive air conditioner shown in FIG. 7 in a heating condition.

FIG. 9 illustrates another condition wherein the first and second four-way valves 213 and 214 assume the respective second connecting conditions on the contrary. In the present condition, the outside heat exchanger 202 is used as an evaporator, and the present condition is used principally for heating operation in winter. In this instance, refrigerant discharged from the compressor 201 is supplied to the condenser 203 by way of the refrigerant pipe 220. Condensation of refrigerant is performed only by the condenser 203. Accordingly, a great enthalpy difference is obtained at the condenser 203, and consequently, a sufficient amount of heat can be radiated. Refrigerant condensed into liquid by the condenser 203 is decompressed and expanded when it passes the capillary tube 211 and is supplied in the form of mist into the evaporator 207. Evaporation of refrigerant is performed by the evaporator 207 and the outside heat exchanger 202.

It is to be noted, however, that the pressure of refrigerant in the evaporator 207 is maintained constant since the evaporation pressure regulating valve 208 is disposed on the downstream of the evaporator 207. In particular, it is prevented that the pressure of refrigerant in the evaporator 207 is lowered excessively so that the temperature at a surface of the evaporator 207 drops to a temperature lower than −2° C. to cause freezing of the surface of the evaporator 207. Particularly in winter, there is the possibility that, upon admission of outside air, the temperature of the evaporator 207 may be dropped excessively. However, where the evaporating pressure regulating valve 208 is disposed in this manner, otherwise possible freezing of the evaporator 207 can be prevented with certainty. On the contrary, when refrigerant passes the evaporating pressure regulating valve 208, the pressure thereof is further dropped such that the evaporating temperature in the outside heat exchanger 202 becomes lower than the freezing point. Consequently, freezing likely occurs at the outside heat exchanger 202. In order to prevent freezing at the outside heat exchanger 202, high temperature refrigerant on the discharging side of the compressor 201 should be supplied to the outside heat exchanger 202 at suitable time intervals.

It is to be noted that, in the automotive air conditioner shown in FIG. 7, the first and second four-way valves 213 and 214 are controlled by changing over of the switches 306, 310 and 311. In particular, in a condition wherein the cooler switch 310 or the economy switch 306 is on, the automotive air conditioner performs cooling operation with the first and second four-way valves 213 and 214 set to the respective first connecting conditions. On the other hand, in another condition wherein the heat switch 311 is on, the first and second four-way valves 213 and 214 assume the respective second connecting conditions, and the automotive air conditioner performs heating operation.

It is to be noted that it is also possible to modify the automotive air conditioner shown in FIG. 7 into an automatic automotive air conditioner employing a microcomputer. In this instance, sensors similar to those shown in FIG. 3 may be employed, and the discharging capacity of the compressor 201, the opening of the air mixing damper 154 and changing over operations of the first and second four-way valves 213 and 214 are controlled by way of the controller 300. Such control will be described with reference to FIG. 10. After an aimed blown out air temperature Tao is calculated at step 403 n accordance with inputs received at step 402 from the various sensors, it is judged at step 411 in accordance with the aimed blown out air temperature Tao whether cooling operation or heating operation should be performed. In case a cooler mode is determined, the first and second four-way valves 213 and 214 are changed over to the respective first connecting conditions indicated by solid lines in FIG. 10 at step 412. In the cooler mode, control of a blown out air temperature is executed using steps 405, 406, 407, 408, 409 and 410 similar to those of the cycle shown in FIG. 4.

Figure 10:
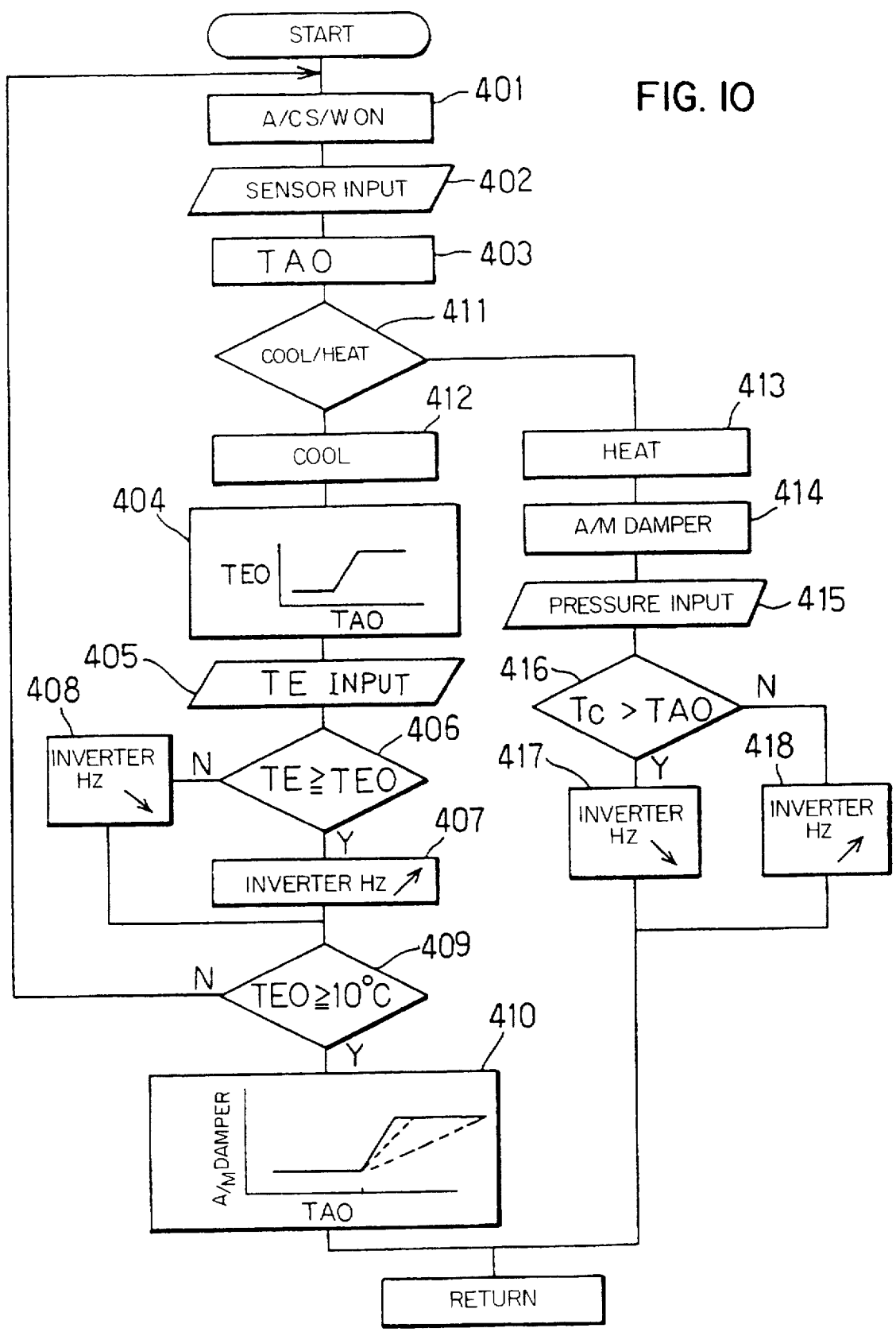
FIG. 10 is a flow chart illustrating an example of control of the automotive air conditioner shown in FIG. 7.

In case a heater mode is determined at step 411, the first and second four-wary valves 213 and 214 are changed over to the respective second connecting positions indicated by broken lines in FIG. 10 at step 413. In the heater mode, the air mixing damper 154 is basically held in a fully open condition, and to this end, an instruction is delivered at step 414 to fully open the air mixing damper 154. At step 415 after then, a pressure of refrigerant is inputted from the sensor 233 and a condensing temperature at the condenser 203 is calculated in accordance with the refrigerant pressure. Then, a condensing temperature Tc obtained from the sensor 365 is compared at step 416 with the aimed temperature Tao calculated at step 403. In case the condensing temperature Tao is higher, the control sequence advances to step 417, at which the frequency of the invertor is lowered to decrease the discharging capacity of the compressor 201. On the contrary in case the condensing temperature Tc is lower, the frequency of the invertor is raised at step 418 to increase the discharging capacity of the compressor 201. In this manner, in the operation illustrated in FIG. 10 of the automotive air conditioner, power saving operation of the compressor 201 by control of the invertor takes precedence in either of the cooler mode and the heater mode.

Figure 11:
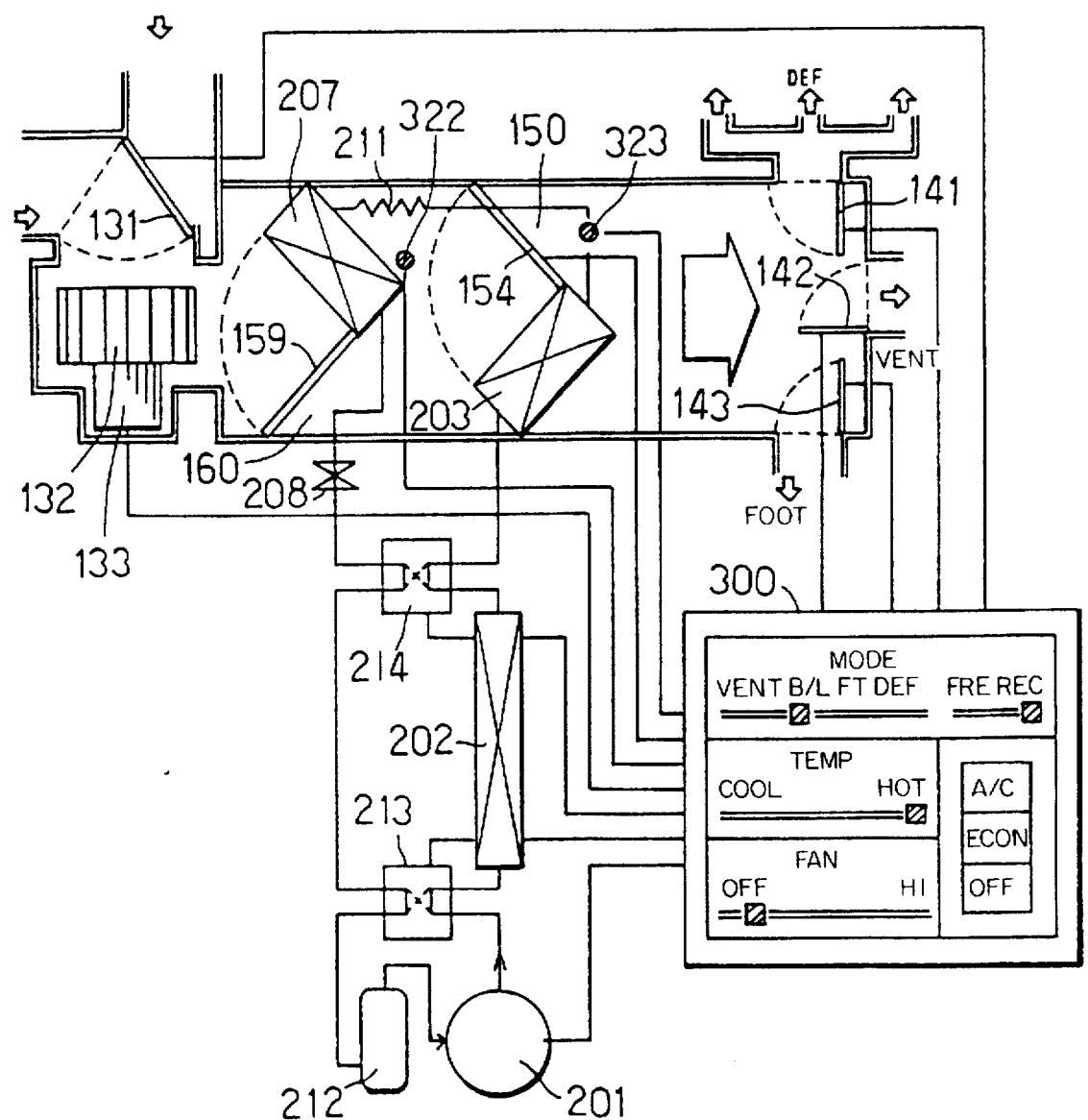
FIG. 11 is a diagrammatic view showing a yet further preferred embodiment of the present invention.

FIG. 11 shows a yet further automotive air conditioner according to the present invention. While the evaporator 207 in all of the automotive air conditioners described above is disposed such that it occupies the entire air passing position in the duct 100, it is disposed, in the present automotive air conditioner, such that a bypass passageway 160 may be formed sidewardly of the evaporator 207 in the duct 100. Further, a bypass damper 159 is disposed for pivotal motion in the duct 100 so that the rate between an amount of air flowing in the bypass passageway 160 and another amount of air flowing in the evaporator 207 may be controlled by means of the bypass damper 159. Construction of the other portion of the automotive air conditioner is similar to that of the automotive air conditioner described hereinabove with reference to FIG. 7.

Accordingly, in the automotive air conditioner shown in FIG. 11, the flow rate of air to flow into the evaporator 207 principally upon heating operation can be decreased by means of the damper 159. Since the blown out air temperature of the evaporator 207 is that for cooling of air even upon heating, if the flow rate of air to pass the evaporator 207 is decreased by means of the damper 159 in this manner, then the heating capacity is enhanced as much.

Figure 12:
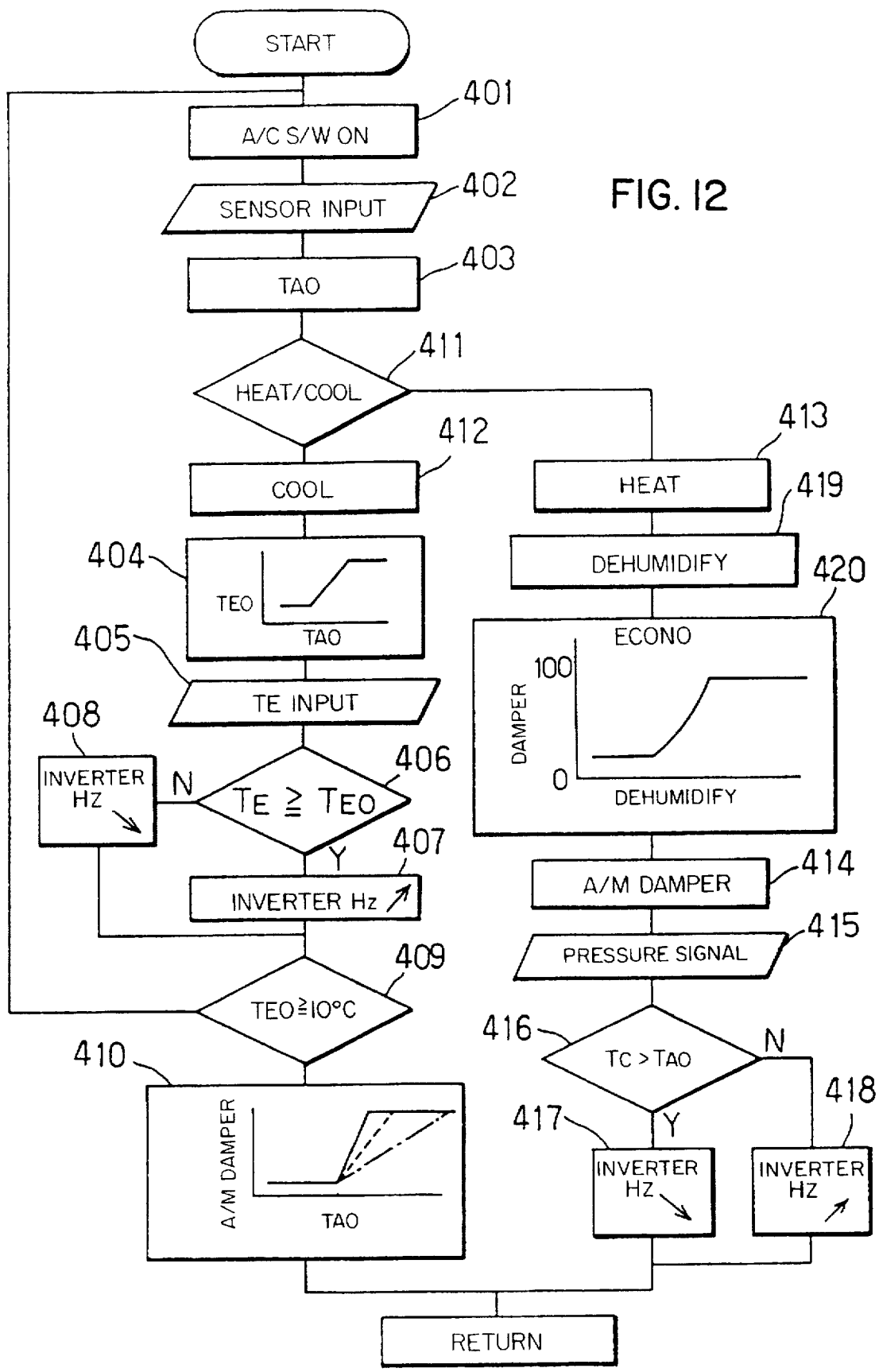
FIG. 12 is a flow chart illustrating an example of control of the automotive air conditioner shown in FIG. 11.

Subsequently, an example of control of the controller 300 in the automotive air conditioner shown in FIG. 11 will be described. The present control is characterized particularly in control of the opening of the damper 159. In the flow chart of FIG. 12, control of the damper 159 is executed when a heater mode is determined at step 411. In other words, in case a cooler mode is determined at step 411, the damper 159 closes the bypass passageway 160 so that the entire amount of air from the blower 132 may pass the evaporator 207.

When a heater mode is determined at step 411, a necessary dehumidifying amount is calculated at step 419. The necessary dehumidifying amount is calculated depending upon whether or not the inside/outside air changing over damper 131 is in an inside air admitting condition and in accordance with an amount of a wind of the blower 132, a relative humidity in the room of the automobile and so forth. Then, at step 420, the damper 159 is continuously controlled in accordance with the necessary dehumidifying amount. In particular, when the necessary dehumidifying amount is great, air is introduced into the evaporator 207 to increase the dehumidifying amount of the evaporator 207. Then, after pivoting control of the damper 159 is executed at step 420, the discharging capacity of the compressor 201 is varied by varying the frequency of the invertor similarly as in the control described hereinabove with reference to FIG. 4, thereby controlling the blown out air temperature. Also in this instance, the air mixing damper 154 is in the fully open condition so that the entire amount of air is flowed into the condenser 203.

Accordingly, with the automotive air conditioner shown in FIG. 11, cooling operation and heating operation can be performed well, and particularly upon heating operation, the heating efficiency can be enhanced by restricting the function of the evaporator 207 to a minimum limit necessary for dehumidification.

An automotive air conditioner according to a yet further embodiment of the present invention will be described subsequently with reference to FIG. 13. The present automotive air conditioner includes fourth check valves 216, 217, 218 and 219 in place of the second four-way valve 214 described hereinabove.

In the following, description will be given of functions of the check valves. When the first four-way valve 213 is at the first connecting position indicated by a solid line in FIG. 13, high pressure refrigerant discharged from the compressor 201 comes to the check valves 216 and 218 by way of the outside heat exchanger 202. Then, due to a function of the check valve 218, the refrigerant will not flow to the evaporation pressure regulating valve 208 side but will all flow to the condenser 203 side past the check valve 216. After then, the refrigerant is decompressed by the decompressing or expanding means 211 and introduced to the evaporation pressure regulating valve 208 and the check valve 219 by way of the evaporator 207. The check valve 218 on the downstream of the evaporation pressure regulating valve 208 can mechanically flow refrigerant therethrough toward the downstream of the evaporation pressure regulating valve 208. However, since the downstream of the check valve 218 is in a high pressure condition on the discharging side of the compressor 201 as described hereinabove, the low pressure refrigerant cannot pass the check valve 218. On the other hand, since the check valve 219 is communicated with the low pressure side of the compressor 201 by way of the accumulator 212, refrigerant can pass the check valve 219 readily. Accordingly, refrigerant will all be returned to the compressor 201 past the check valve 219.

Subsequently, a flow of refrigerant when the first four-way valve 213 is in the second connecting position indicated by a broken line in FIG. 13 will be described. In this instance, refrigerant in a high pressure condition discharged from the compressor 201 comes to the check valves 219 and 217. Then, the flow of refrigerant is stopped by the check valve 219, and consequently, all of the refrigerant flows to the check valve 217 side. Then, the flow of the refrigerant having passed the check valve 217 is stopped by the check valve 216, and consequently, all of the refrigerant flows to the condenser 203 side.

The refrigerant having flowed through the condenser 203 is then put into a low pressure condition when it passes the decompressing means 211 and then flows to the evaporation pressure regulating valve 208 side by way of the evaporator 207. Thus, since the check valve 219 is acted upon at an end thereof by a high pressure on the discharging side of the compressor 201, refrigerant after having passed the evaporator 207 cannot pass the check valve 219. Accordingly, all of the refrigerant passes the check valve 218 past the evaporation pressure regulating valve 208. The refrigerant having passed the check valve 218 will all flow into the outside heat exchanger 202. This is because the exit side of the check valve 216 is at a high pressure on the discharging side of the compressor 201 and the refrigerant cannot pass check valve 216. The refrigerant having passed the outside heat exchanger 202 will thereafter return to the suction side of the compressor 201 by way of the first four-way valve 213.

Figure 13:
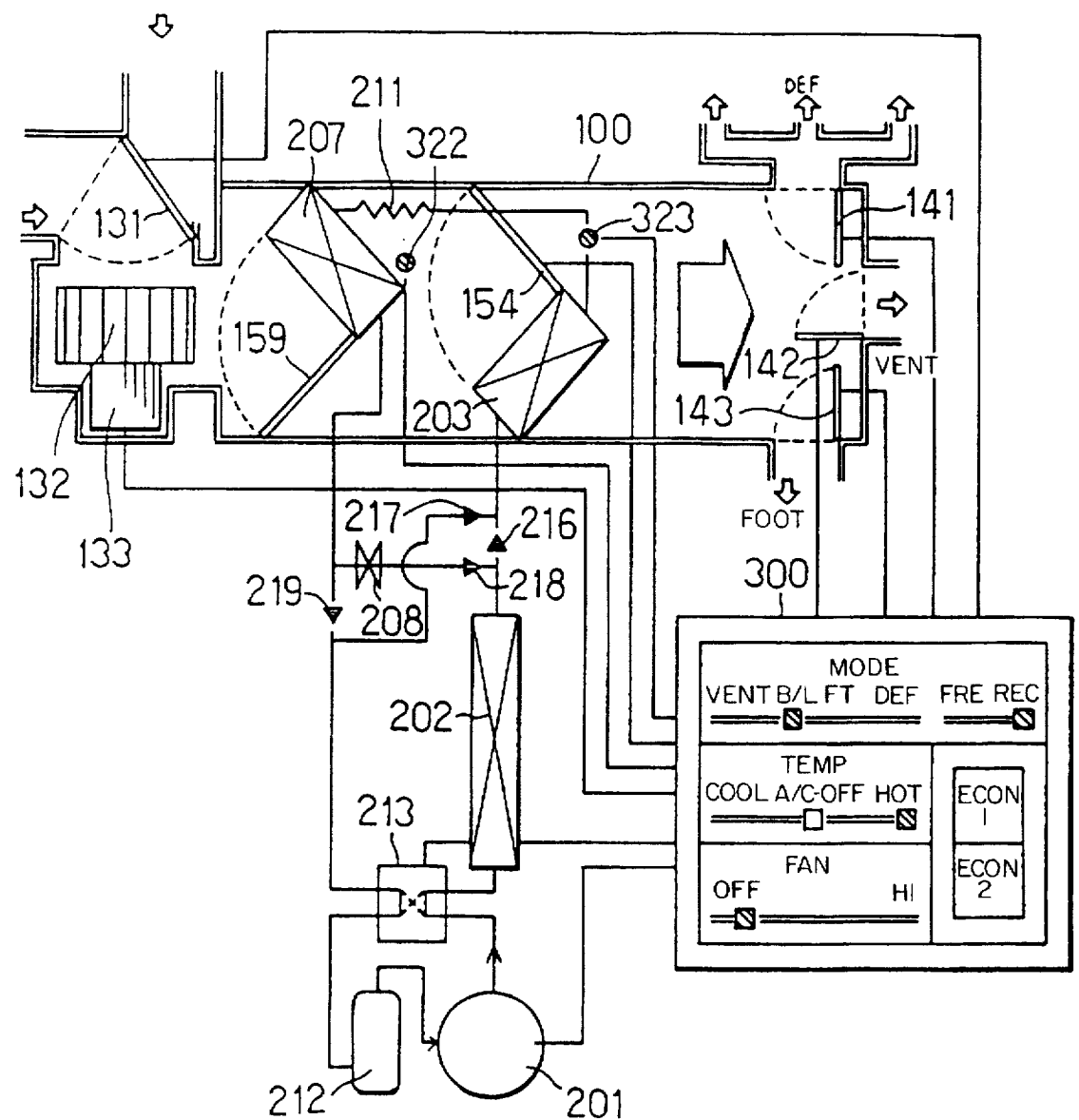
FIG. 13 is a diagrammatic view showing a yet further preferred embodiment of the present invention.

In this manner, with the automotive air conditioner shown in FIG. 13, the functions of the second four-way valve 213 are substituted by the four check valves 216, 217, 218 and 219. Accordingly, electric movable elements can be reduced, and consequently, the automotive air conditioner has an improved durability.

Subsequently, a yet further automotive air conditioner of the present invention will be described with reference to FIG. 14.

In the automotive air conditioners of the foregoing embodiments described hereinabove, only one outside heat exchanger, that is, the heat exchanger 202, is employed and is either used as a condenser (embodiments shown in FIGS. 1, 3 and 5) or is changed over between a function of a condenser and another function of an evaporator (embodiments shown in FIGS. 7, 11 and 13). However, in the automotive air conditioner of the embodiment shown in FIG. 14, two outside heat exchangers are provided including an outside condenser 202 and an outside evaporator 210. Besides, in the automatic air conditioner of the present embodiment, a condensing damper 253 is provided as condensing side varying means so that the flow rate of air to flow into the outside condenser 202 may be varied. Similarly, an evaporating side damper 254 is provided as evaporating side varying means so that the flow rate of air to be sucked into the outside evaporator 210 may be variably controlled.

Figure 14:
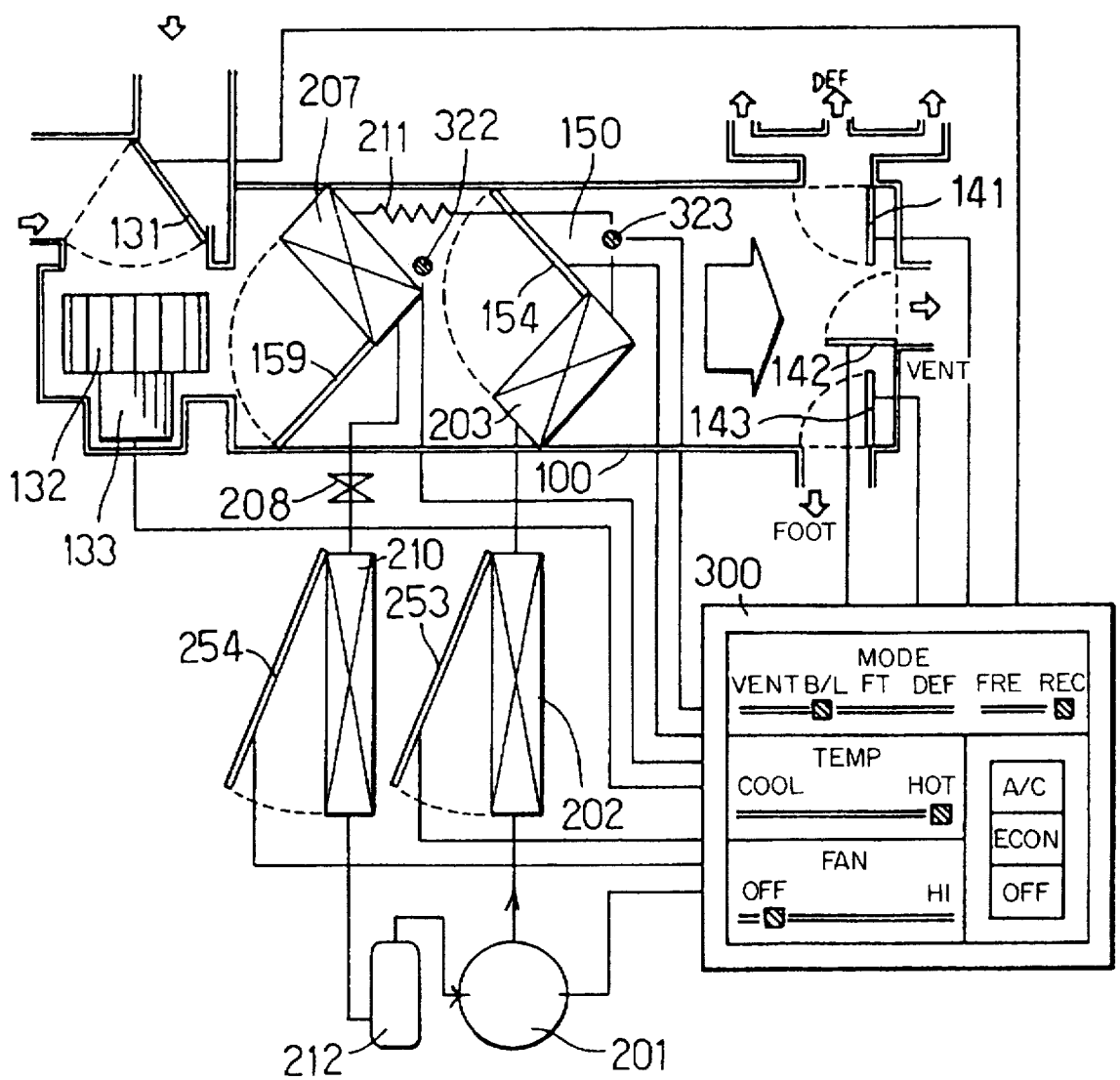
FIG. 14 is a diagrammatic view showing a yet further preferred embodiment of the present invention.

In this manner, in the automotive air conditioner of the embodiment shown in FIG. 14, the two outside heat exchangers are always used individually as a condenser (outside condenser 202) and an evaporator (outside evaporator 210). Here, the outside condenser 202 is used principally upon cooling operation to cool refrigerant into liquid. Accordingly, preferably the outside condenser 202 is installed, for example, at a front portion of the automobile so that it may meet with a driving wind of the automobile. In the meantime, the outside evaporator 210 is used to evaporate refrigerant principally upon heating. Preferably, the outside evaporator 210 is disposed such that, for evaporation of refrigerant upon heating, it may not meet with a driving wind of the automobile or the like when the temperature of outside air is low. More particularly, preferably the outside evaporator 210 exchanges heat with ventilation air from within the room of the automobile. Therefore, the outside evaporator 210 is disposed intermediately of a flow of ventilation air at a rear location of the room of the automobile.

In this manner, with the automotive air conditioner shown in FIG. 14, the outside condenser 202 and the outside evaporator 210 can both be disposed at respective optimum locations.

Further, since the dampers 253 and 254 are employed in the present automotive air conditioner, the heat exchanging capacities of the outside heat exchangers 202 and 210 for which no function is required for construction of a refrigerating cycle can be minimized. For example, it is demanded, upon cooling operation, that refrigerant be evaporated only at the evaporator 207, and in this instance, the evaporator damper 254 closes the outside evaporators 214 and 210 so that a flow of air may not flow into the outside evaporator 210. On the other hand, upon heating operation, it is desirable that condensation of refrigerant be performed in the condenser 203 disposed in the duct 100, and in this instance, the condensing damper 253 closes the outside condenser 202.

Figure 15:
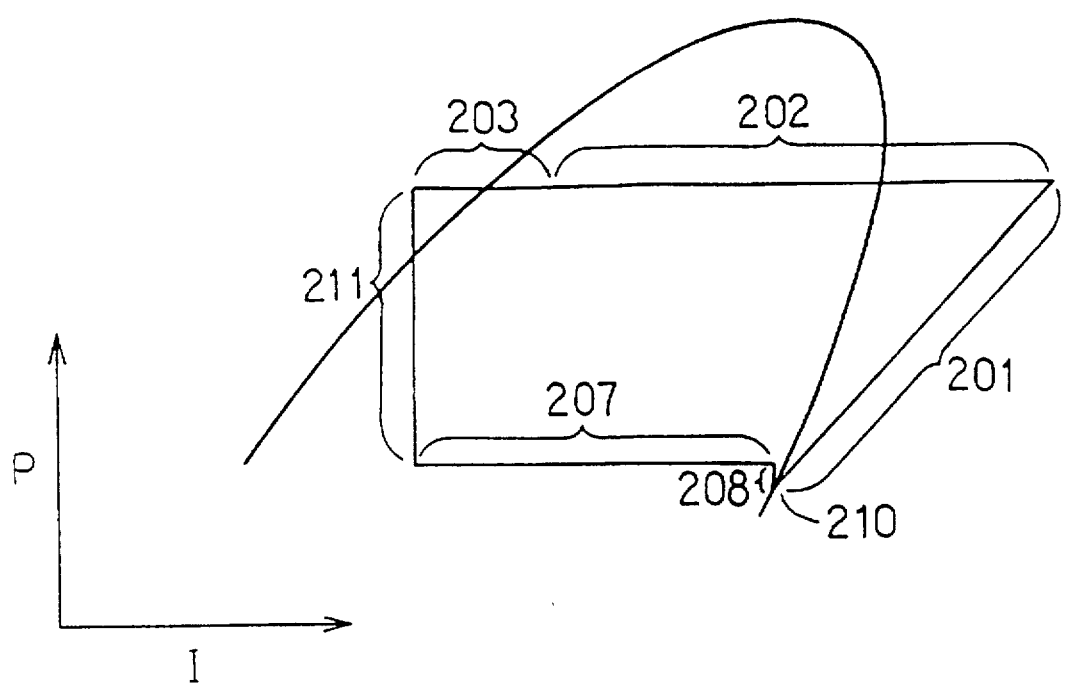
FIG. 15 is a Mollier chart illustrating an operation condition of the automotive air conditioner shown in FIG. 14 in cooling operation.

Those conditions will be described with reference to the Mollier charts of FIGS. 15 and 16. FIG. 15 illustrates a cooling condition, in which refrigerant compressed to a high pressure by the compressor 201 is first condensed by the outside condenser 202 and then condensed by the condenser 203 disposed in the duct 100. Further, in this condition, the outside evaporator 210 is substantially prevented from performing heat exchanging by the evaporation damper 254, and consequently, evaporation of refrigerant is performed only by the inside evaporator 207.

Figure 16:
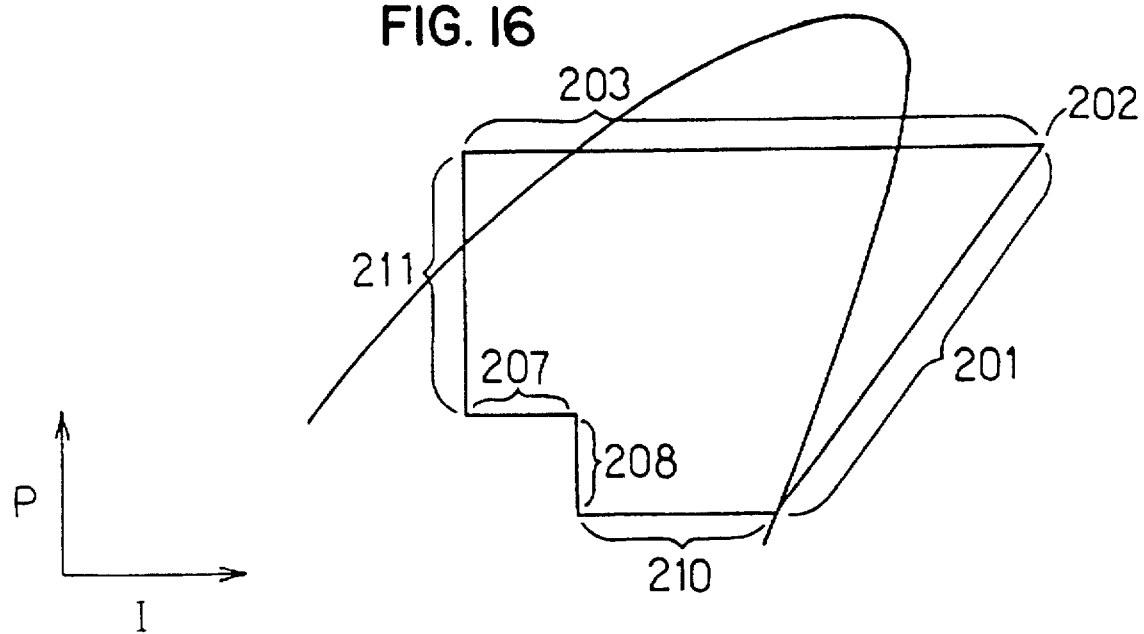
FIG. 16 is a Mollier chart illustrating an operation condition of the automotive air conditioner shown in FIG. 14 in a heating condition.

On the other hand, FIG. 16 shows a heating condition. In this condition, the condensing damper 253 closes the outside condenser 202, and consequently, condensation of refrigerant is performed only by the inside condenser 203. The evaporating pressure of the evaporator 207 is regulated by the evaporation pressure regulating valve 208, and evaporation of refrigerant which has been further decompressed upon passing through the evaporation pressure regulating valve 208 is performed by the outside evaporator 210.

Figure 17:
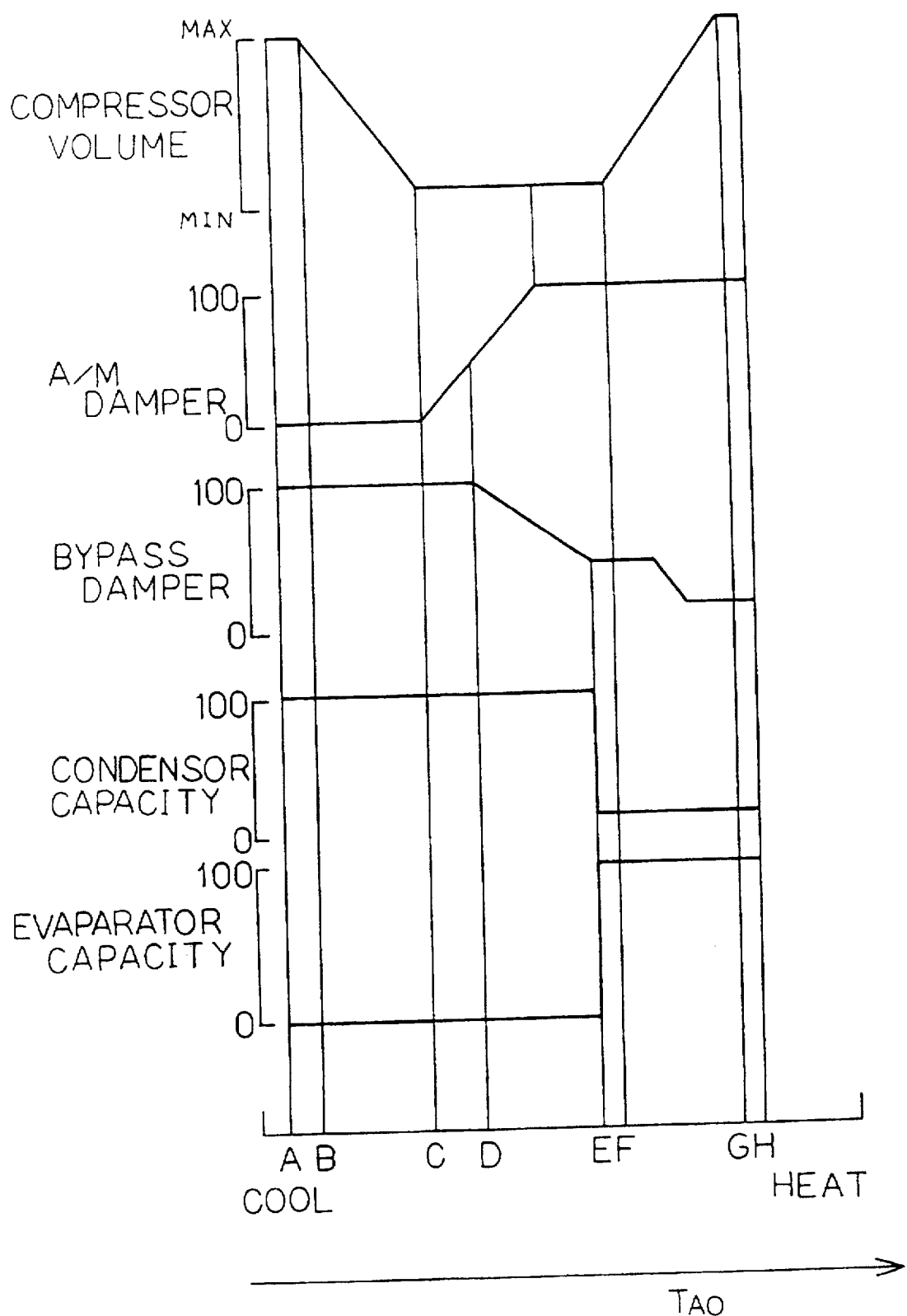
FIG. 17 is a diagram illustrating an example of control of the automotive air conditioner shown in FIG. 14.

In the automotive air conditioner shown in FIG. 14, in addition to the discharging capacity, of the compressor 210, the opening of the air mixing damper 154 and the opening of the bypass damper 159, also the openings of the condensing side damper 253 and the evaporating side damper 254 are controlled by the controller 300. The openings and the capacity are controlled principally in accordance with an aimed blown out air temperature Tao calculated in accordance with values inputted from the various sensors. A concept of the control is illustrated in FIG. 17. The axis of abscissa of FIG. 17 indicates the aimed blown out air temperature Tao, which increases in the rightward direction in FIG. 17. In particular, a heating condition is shown at a right-hand side portion while a cooling condition is shown at a left-hand side portion of FIG. 17.

The location A in FIG. 17 shows a maximum cooling condition, in which the capacity of the compressor 210 presents its maximum and the amount of pivotal motion of the air mixing damper 154 is 0, that is, no air is blown to the condenser 203. Meanwhile, the amount of pivotal motion of the bypass damper 159 is at its 100%, and consequently the entire amount of air passes the evaporator 207. Further, the condensing side varying means 253 is open to allow air to be admitted into the outside condenser 202. In the meantime, the damper 254 on the evaporating side varying means is closed so that no air is admitted into the outside evaporator 210. When the cooling capacity required for the automotive air conditioner decreases (point B in FIG. 17) as the cooling load decreases after then, the capacity of the compressor 201 is decreased first. In particular, the speed of rotation of the compressor driving motor is lowered to decrease the cooling capacity so that the temperature of air on the exit side of the evaporator 207 is raised. Consequently, power saving operation is achieved first. After the capacity of the compressor 210 is minimized, the air mixing damper 154 begins to open (point C in FIG. 17) so that air may be re-heated by the condenser 203.

As the aimed blown out air temperature Tao further rises (point D in FIG. 17), the bypass damper 159 begins to close so that air may be flowed to the condenser 203 side bypassing the evaporator 207. This condition corresponds to dehumidifying operation principally in autumn and winter and in an intermediate time.

As the aimed blown out air temperature Tao further rises (point E in FIG. 17) after then, the operation mode of the automotive air conditioner is changed over from cooling operation to heating operation. In particular, the damper 253 which is the condensing side varying means is closed to stop the function of the outside condenser 202. Meanwhile, the damper 254 which is the evaporating side varying means is opened to cause the outside evaporator 210 to function.

Then, the discharging capacity of the compressor 201 is raised as the aimed blown out air temperature Tao rises to raise the condensing temperature at the condenser 203 (points F to G in FIG. 17). It is to be noted that, in the heating condition, when the aimed blown out air temperature Tao is comparatively low, the bypass damper 159 is held in a somewhat open condition so that dehumidifying operation can be performed simultaneously.

Then, in maximum heating operation (point H in FIG. 17), the discharging capacity of the compressor 201 presents it maximum and the air mixing damper 154 introduces the entire amount of a flow of air into the condenser 203. Meanwhile, the bypass damper 159 closes the evaporator 207 so that air may be flowed to the condenser 203 side bypassing the evaporator 207. Further, the evaporating side varying means 253 stops the function of the outside condenser 202 while the evaporating side varying means 254 causes the outside evaporator 210 to function.

It is to be noted that, while, in the control described hereinabove with reference to FIG. 17, the condensing side damper 253 and the evaporating side damper 254 are individually changed over between the fully closed condition and the fully open condition, pivotal motion of the dampers 253 and 254 may otherwise be controlled continuously if necessary. Further, while, in the automotive air conditioner described above, the air mixing damper 154 begins to open after the discharging capacity of the compressor 201 has been minimized, the point of time at which the air mixing damper 154 begins to open may be advanced. In other words, the components described above can be changed suitably if necessary.

Figure 18:
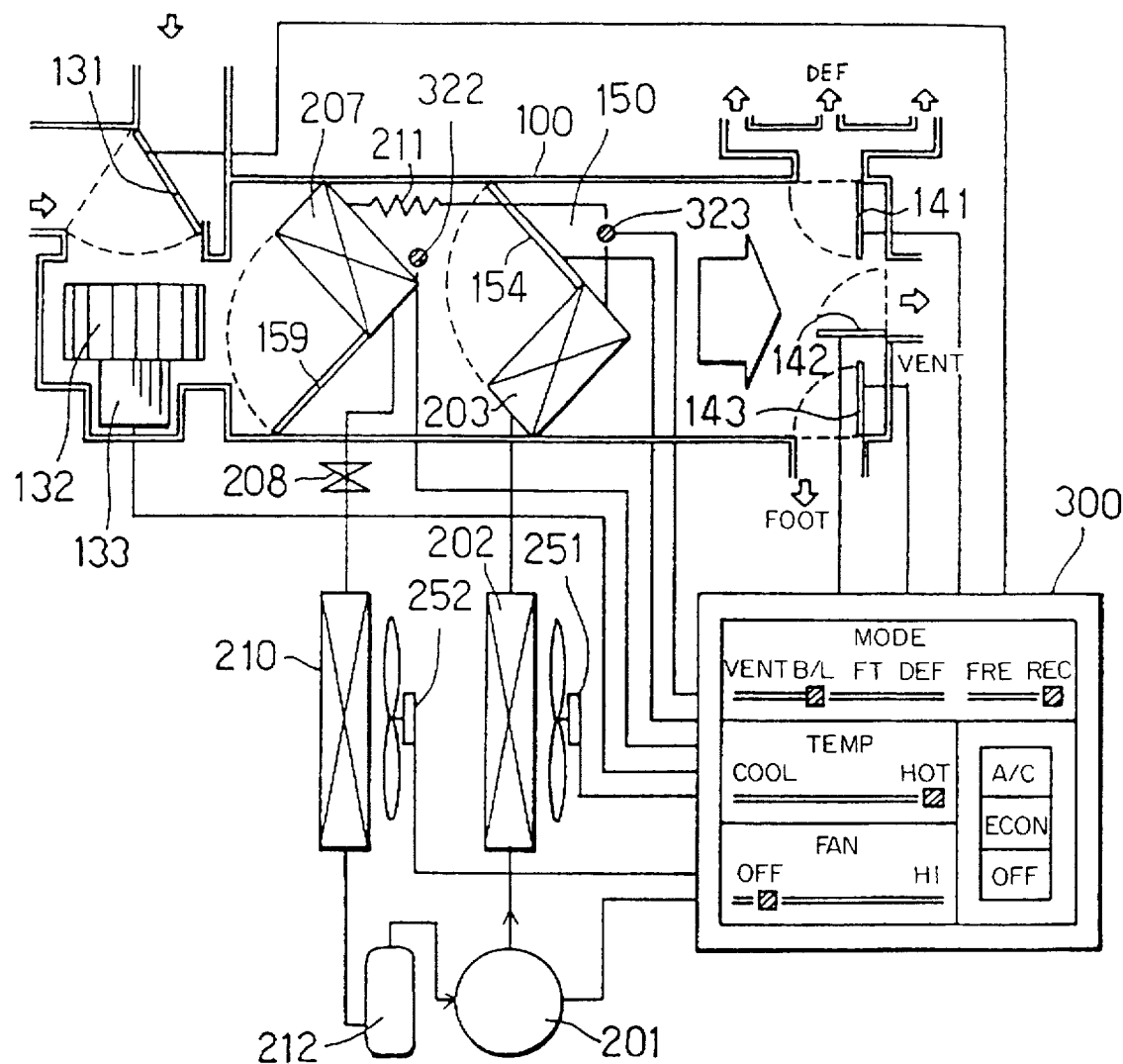
FIG. 18 is a diagrammatic view showing a yet further preferred embodiment of the present invention.

Further, while, in the automotive air conditioner shown in FIG. 14, the dampers 253 and 254 are employed as condensing side varying means and evaporating side varying means, respectively, alternatively a condensing fan 261 may be provided as condensing side varying means while an evaporating fan 252 is provided as evaporating side varying means as shown in FIG. 18. In particular, the heat exchanging functions of the outside condenser 202 and the outside evaporator 210 may be varied by controlling rotation of the fans 251 and 252, respectively.

Figure 20:
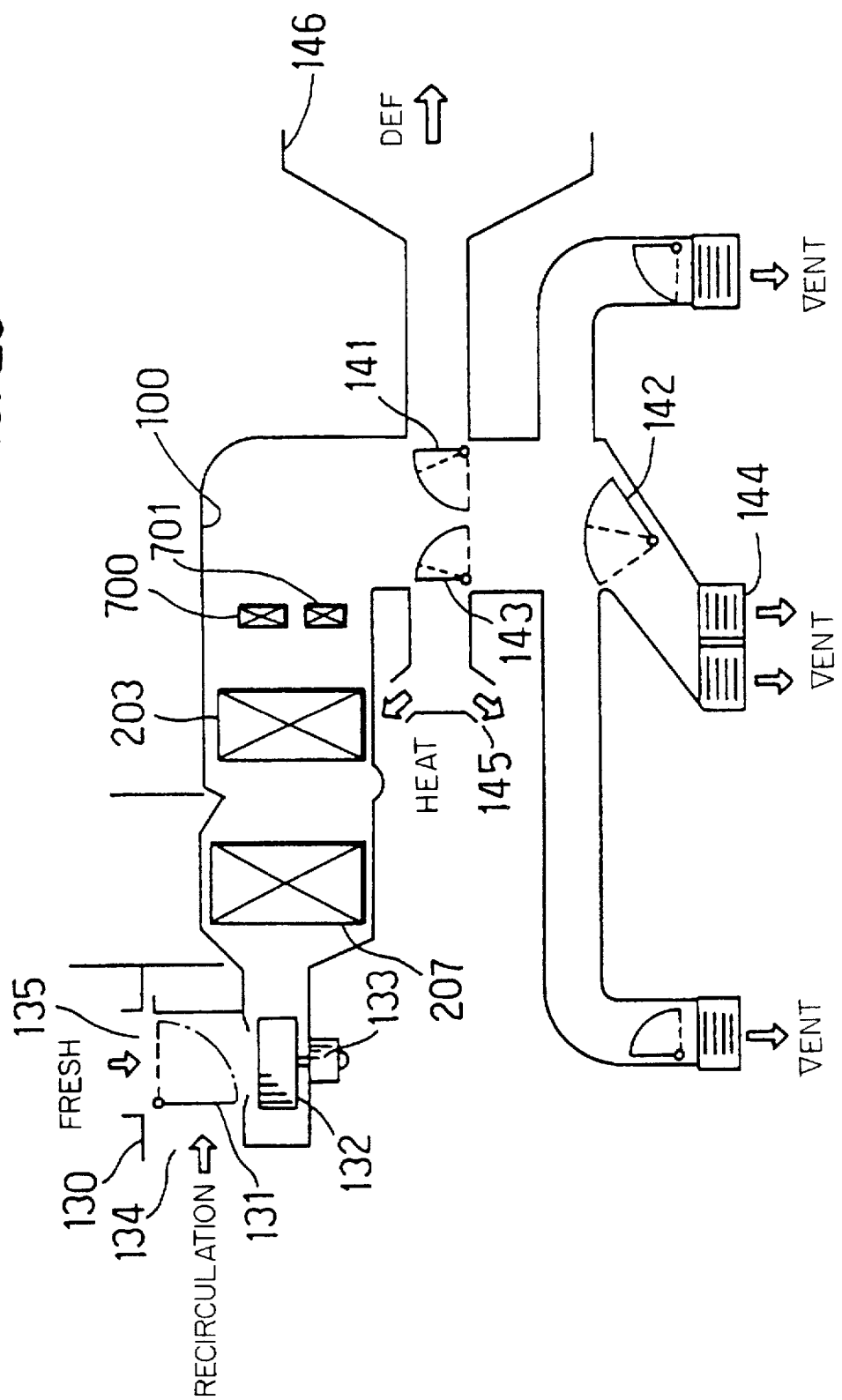
FIG. 20 is a diagrammatic view showing a yet further preferred embodiment of the present invention.

It is to be noted that, while the bypass passageway 150 is formed sidewardly of the condenser 203 in the automotive air conditioner described above, alternatively the entire amount of air in the duct 100 may pass the condenser 203 as seen from FIG. 20.

A pair of auxiliary heaters 700 and 701 are disposed on the downstream of the condenser 203 in the duct 100. Each of the auxiliary heaters 700 and 701 may be formed from a PCT heater or an electric heater. In the automotive air conditioner shown in FIG. 20, cooling operation, dehumidifying operation and heating operation are achieved individually by controlling flow rates of refrigerant into the evaporator 207 and the condenser 203 both disposed in the duct 100.

Figure 21:
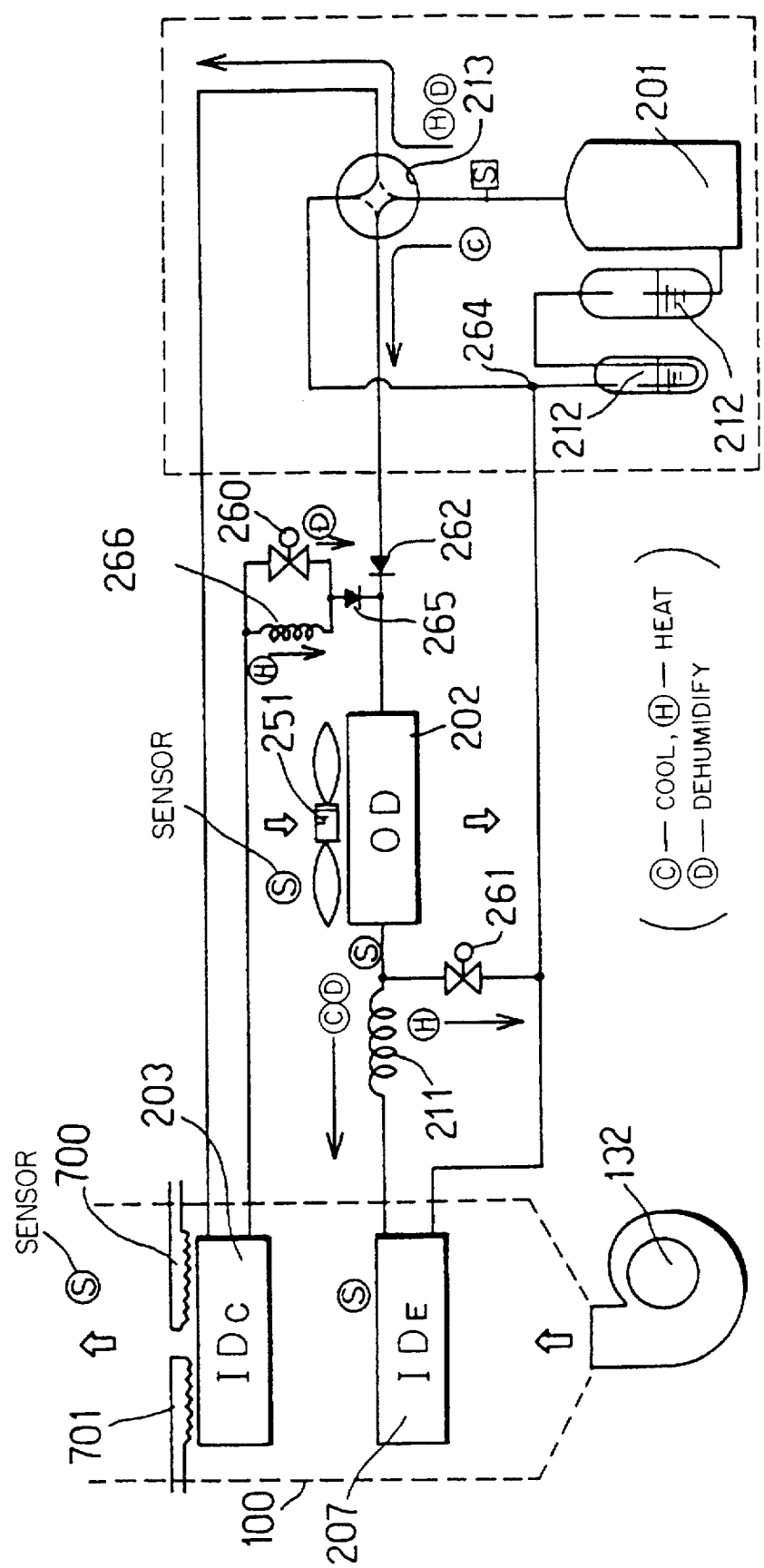
FIG. 21 is a diagrammatic view showing a yet further preferred embodiment of the present invention.

Referring now to FIG. 21, there is shown a refrigerating cycle of the automotive air conditioner shown in FIG. 20. In the refrigerating cycle shown, the four-way valve 213 changes over, upon energization thereof, the refrigerating passage in such a manner as indicated by a solid line, but changes over, upon deenergization thereof, to such a manner as indicated by a broken line. Further, the outside heat exchanger 202 includes a fan 251.

In the present refrigerating cycle, the four-way valve 213 and the solenoid valves 260 and 261 are suitably changed over to control a flow of refrigerant to achieve various air conditioning operation. First, a cooling operation condition will be described. In this condition, the four-way valve 213 is energized so that refrigerant discharged from the compressor 201 is flowed to the outside heat exchanger 202 side by way of the four-way valve 213 and the check valve 262. Here, the refrigerant meets with a wind from the fan 251 so that it is condensed in the outside heat exchanger 202 while remaining in a high temperature, high pressure condition. Meanwhile, the solenoid valve 261 remains closed in this condition, and accordingly, the refrigerant condensed in the outside heat exchanger 202 flows into the expanding means 211 and is decompressed and expanded into mist in a low temperature, low pressure condition when it passes the expanding means 211. The refrigerant in the form of mist then flows into the evaporator 207, in which it is evaporated, whereupon it takes heat of vaporization away from conditioning air to cool the air.

Then, the refrigerant evaporated in the evaporator 207 is sucked into the compressor 210 again by way of the accumulator 212. It is to be noted that, in this instance, since the refrigerant passage is communicated at a branching point 264 on the upstream of the accumulator 212 with the condenser 203 side by way of the four-way valve 213, the check valve 265 positioned on the downstream of the condenser 203 closes the refrigerating passage in accordance with a difference in pressure, and consequently, substantially no refrigerant will flow into the condenser 203.

It is to be noted that there is no possibility that part of refrigerant having flowed to the condenser 203 side may be liquefied and accumulated in the condenser 203. This is because refrigerant in the condenser 203 is sucked into the compressor 201 by way of the four-way valve 213.

Subsequently, a flow of refrigerant when the automotive air conditioner operates as a heating apparatus will be described. In this instance, the compressor 201 and the condenser 203 are communicated with each other by way of the four-way valve 213. Meanwhile, the solenoid valve 260 is closed to cause refrigerant to flow to a capillary element 266 side. Further, the solenoid valve 261 is opened to cause refrigerant from the outside heat exchanger 202 to flow to the accumulator 212 side.

Accordingly, upon heating operation, refrigerant put into a high temperature, high pressure condition by the compressor 201 flows by way of of the four-way valve 213 into the condenser 203, in which it exchanges heat with air from the blower 132. In this instance, since the condensing temperature is 40° to 60° C. or so, air passing in the duct 100 is heated when it passes the condenser 203. The refrigerant condensed in the condenser 203 is subsequently decompressed and expanded, when it passes the capillary element 266, into mist of a low temperature and a low pressure. The refrigerant mist then flows into the outside heat exchanger 202 by way of the check valve 265. The outside heat exchanger 202 acts as an evaporator, and in the outside heat exchanger 202, the refrigerant exchanges heat with air supplied thereto from the blower 251 so that it is evaporated. The refrigerant having passed the outside heat exchanger 202 can flow to both of the solenoid valve 261 side and the capillary tube 211 side, but since the communication resistance is higher on the capillary tube 211 side, the refrigerant flows, as a result, into the accumulator 212 by way of the solenoid valve 261 past the branching point 264. It is to be noted that, while the refrigerant passage is communicated with the four-way valve 213 at the branching point 264, the refrigerant will not circulate into the outside heat exchanger 202 again due to a difference in pressure.

Subsequently, a dehumidifying operation condition of the present automotive air conditioner will be described. In this instance, the solenoid valve 260 is opened and the solenoid valve 261 is closed in such a heating operation condition as described hereinabove. Consequently, refrigerant partially condensed in the outside heat exchanger 202 is decompressed at the capillary tube 211 and flows, in this condition, into the evaporator 207. Then, in the evaporator 207, the refrigerant will be evaporated to cool air blasted thereto from the blower 132.

Accordingly, in the dehumidifying operation, air is cooled once in the evaporator 207 and then heated in the condenser 203. Consequently, when the air passes the evaporator 207, the saturation evaporating temperature drops to cause moisture in the air to be condensed and adhere to a surface of the evaporator 207. Then, since the air is re-heated in this condition when it passes the condenser 203, the relative humidity is dropped remarkably, and consequently, good dehumidification is performed.

Figure 22:
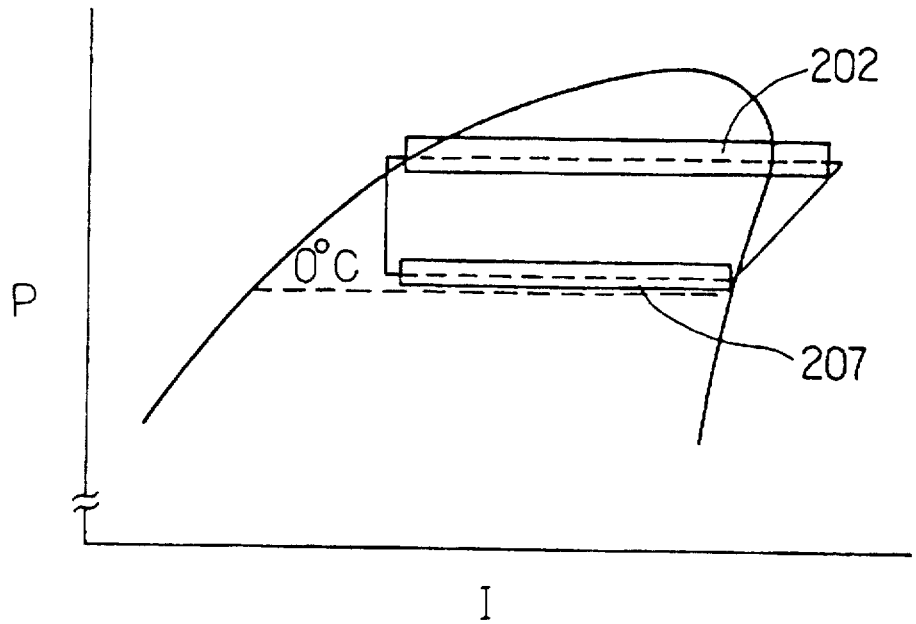
FIG. 22 is a Mollier chart illustrating operation of the automotive air conditioner shown in FIG. 21.
Figure 23:
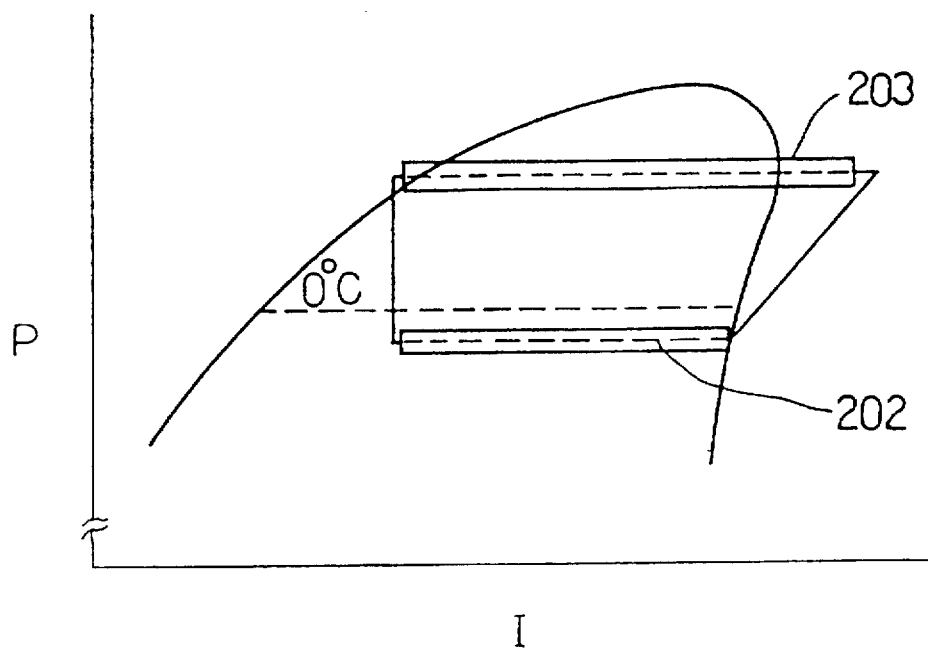
FIG. 23 is a Mollier chart illustrating another operation of the automotive air conditioner shown in FIG. 21.
Figure 24:
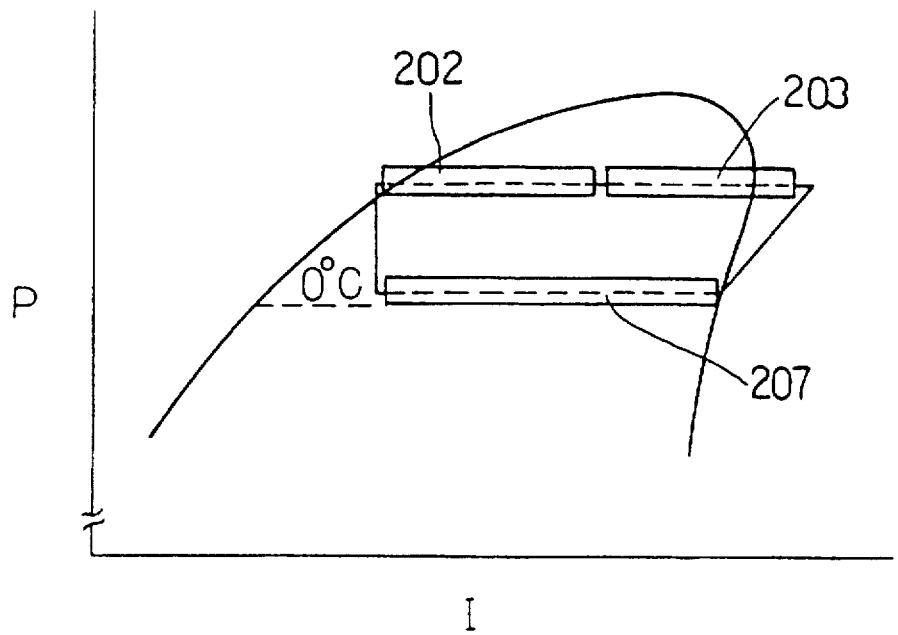
FIG. 24 is a Mollier chart illustrating a further operation of the automotive air conditioner shown in FIG. 21.

FIGS. 22, 23 and 24 are Mollier charts illustrating cooling operation, heating operation and dehumidifying operation, respectively, of the refrigerating cycle shown in FIG. 21. As described above, upon cooling operation, the outside heat exchanger 202 acts as a condenser while an evaporating action is performed in the evaporator 207. On the other hand, upon heating operation, refrigerant is condensed in the condenser 203 while the outside heat exchanger 202 acts as an evaporator.

It is to be noted that the difference in evaporating pressure between FIGS. 22 and 23 arises from the fact that the temperature of air flowing into the evaporator 207 upon cooling is higher than the temperature of air flowing into the outside heat exchanger 202 upon heating.

On the other hand, as seen from FIG. 24, upon dehumidifying operation, condensation of refrigerant is performed by the condenser 203 and the outside heat exchanger 202 while evaporation of refrigerant is performed by the evaporator 207. In this instance, the enthalpy is higher at the evaporator 207 than at the condenser 203, but since condensation of moisture in air proceeds in the evaporator 207, the temperature of air is not lowered very much when it passes the evaporator 207 due to latent heat involved in the condensation of water. Meanwhile, since the enthalpy of the condenser 203 is all used to raise the temperature of air, the temperature of air having passed both of the evaporator 207 and the condenser 203 either has a substantially same level or is raised as a result.

Figure 25:
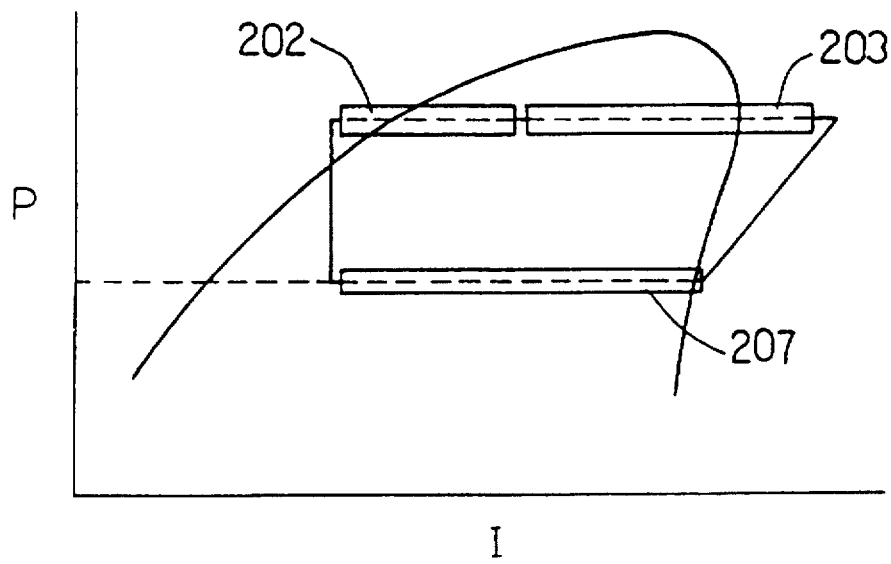
FIG. 25 is a Mollier chart illustrating a still further operation of the automotive air conditioner shown in FIG. 21.
Figure 26:
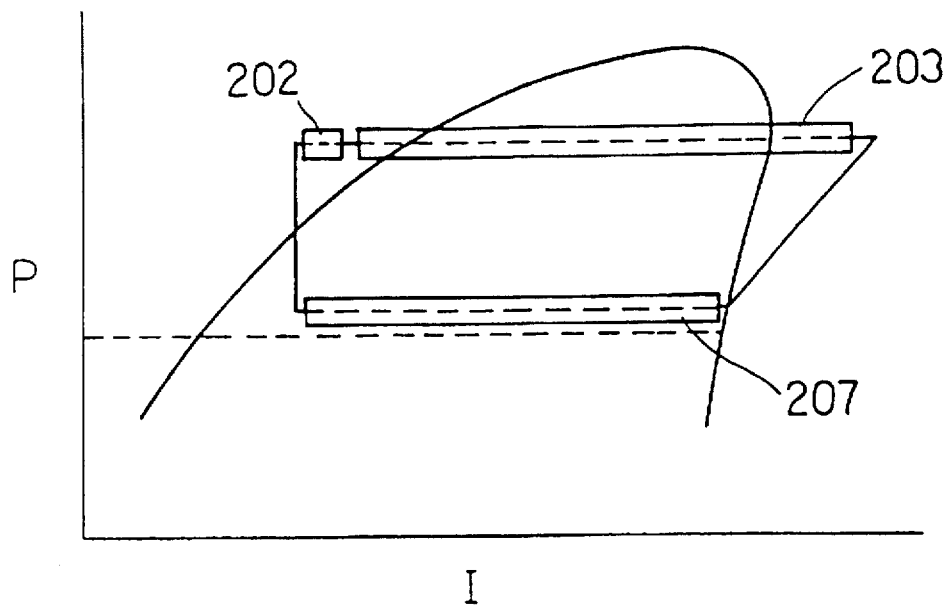
FIG. 26 is a Mollier chart illustrating a yet further operation of the automotive air conditioner shown in FIG. 21.
Figure 27:
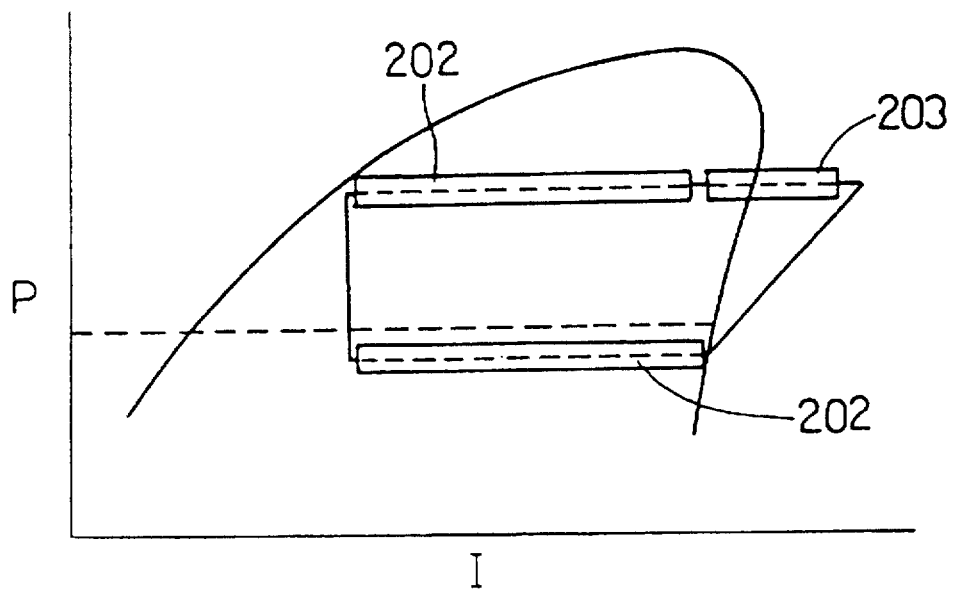
FIG. 27 is a Mollier chart illustrating a yet further operation of the automotive air conditioner shown in FIG. 21.

Subsequently, control of the temperature of air of the automotive air conditioner upon dehumidifying operation will be described. FIGS. 25, 26 and 27 are Mollier charts all illustrating operating conditions upon dehumidifying operation, and FIG. 25 shows a Mollier chart upon normal operation. In the normal operation, the blower 251 is rotated weakly so that a predetermined amount of air is blasted to the outside heat exchanger 202 to assure heat exchanging at the outside heat exchanger 202. As a result, the air temperature lowering capacity of the evaporator 207 substantially coincides with the air temperature raising capacity of the condenser 203, and air having passed both of the evaporator 207 and the condenser 203 raises its temperature a little.

FIG. 26 shows a condition wherein it is desired to raise the blown out air temperature in dehumidifying operation. In this instance, the blower 251 stops its action in order to reduce the heat exchanging capacity of the outside heat exchanger 202. As a result, the condensing capacity is decreased generally while the condensing pressure is increased. As the condensing pressure rises, the temperature of air when it passes the condenser will be raised.

FIG. 27 shows another condition wherein it is desired to lower the blown out air temperature in dehumidifying operation. In this instance, the blower 251 for the outside heat exchanger 202 is rotated at a high speed to raise the condensing capacity of the outside heat exchanger 202. As a result, the condensing pressure is lowered, and air cooled when it passes the evaporator 207 will be blown out into the room of the automobile without being heated very much.

It is to be noted that, in the case of FIG. 27, since the total condensing capacity of the outside heat exchanger 202 and the condenser 203 is increased, the condensing pressure in the refrigerating cycle is lowered, and as a result, also the evaporating pressure at the evaporator 207 is lowered. Consequently, there is the possibility that frost may appear on the evaporator 207. Therefore, in this instance, the speed of rotation of the compressor 201 is controlled so that dehumidifying operation may continuously proceed without lowering the pressure in the evaporator 207, that is, the sucking pressure of air into the compressor 201, very much.

Subsequently, defrosting of the outside heat exchanger 202 upon heating operation will be described. As described hereinabove, since the outside heat exchanger 202 functions as an evaporator in heating operation, particularly when the temperature of outside air is low, the temperature of a surface of the outside heat exchanger 202 becomes lower than the freezing point and frost adheres to the outside heat exchanger 202. Then, if frost adheres in this manner, the heat exchanging function of the outside heat exchanger 202 is deteriorated remarkably so that good operation of the refrigerating cycle cannot be achieved and consequently heating operation of the condenser 203 is not performed. Thus, in this instance, refrigerant in a high temperature, high pressure condition will be passed through the outside heat exchanger 202 to melt the frost adhering to the outside heat exchanger 202. In the dehumidifying operation, operation of the outside blower 251 is stopped first. Meanwhile, the inside blower 132 is rotated at a low speed. Then, the inside/outside air changing over damper 131 is put into an inside air admitting condition so that the temperature of blown out air from the duct 100 may not be lowered. Further, power is made available simultaneously to the auxiliary heater 700 and 701. In this condition, the solenoid valve 260 is opened while the solenoid valve 261 is closed. Consequently, refrigerant having passed the compressor 201 flows into the condenser 203 and the outside heat exchanger 202 while it remains in a high temperature, high pressure condition. As a result, the temperature of the outside heat exchanger 202 rises and frost adhering to the surface of the outside heat exchanger 202 will be melted. The refrigerant condensed in the outside heat exchanger 202 is then decompressed and expanded in the capillary tube 211 and then flows into the evaporator 207. As a result, the temperature of air in the duct 100 becomes low, but since, in this condition, the amount of a wind of the blower 132 is small and the auxiliary heaters 700 and 701 can work to the utmost, remarkable deterioration of the blown out air temperature can be prevented.

Further, in order to accomplish defrosting of the outside heat exchanger 202 in a short period of time, the compressor 201 has a capacity as high as possible and the invertor thereof has a frequency as high as possible.

It is to be noted that, when defrosting operation is proceeding in this manner, a lamp may be lit so that this may be recognized by a passenger of the automobile.

Further, when operation of the automotive air conditioner is automatic operation, changing over between heating operation and defrosting operation is performed in accordance with the following conditions:

(1) The temperature of the outside heat exchanger 202 is lower by 10° C. or more than the temperature of outside air;

(2) The temperature of the outside heat exchanger 202 is lower than −3° C. or so; and (3) Heating operation has continued for longer than a predetermined period of time (60 minutes).

Whether or not defrosting is required is judged in accordance with the conditions.

Figure 28:
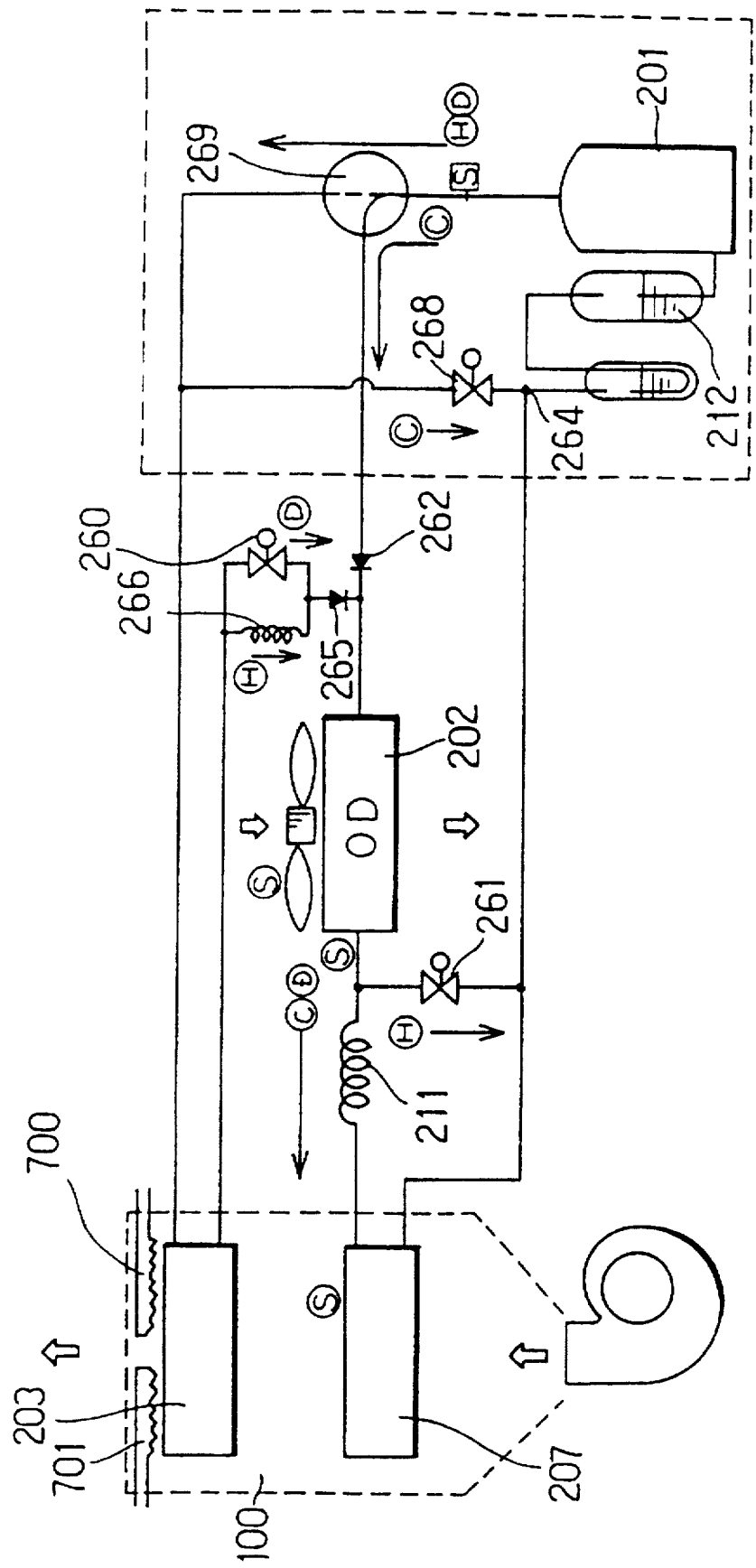
FIG. 28 is a diagrammatic view showing a yet further preferred embodiment of the present invention.

FIG. 28 shows a yet further automotive air conditioner according to the present invention. The present automotive air conditioner adopts a three-way valve 269 in place of the four-way valve 213 of the automotive air conditioner shown in FIG. 21. In addition, a solenoid valve 268 is disposed in a cooling pipe adjacent the branching point on the upstream of the accumulator 212.

Upon cooling operation, the three-way valve 269 is changed over to a position indicated by a solid line so that refrigerant discharged from the compressor 201 may be introduced to the outside heat exchanger 202. In this instance, the outside heat exchanger 202 acts as a condenser, and refrigerant decompressed and expanded in the capillary tube 211 is then supplied to the evaporator 207. The refrigerant evaporated in the evaporator 207 is fed back to the accumulator 212 side past the branching point 264. The solenoid valve 268 opens the refrigerant pipe upon cooling operation. Consequently, also refrigerant accumulated in the condenser 203 is supplied, due to sucking action of the compressor 201, from the refrigerant pipe to the compressor 201 side by way of the solenoid valve 268 and the branching point 264. In this instance, the pressure of refrigerant in the condenser 203 is decreased suddenly so that also the evaporating temperature of the refrigerant is lowered. Consequently, immediately after starting of cooling operation, also refrigerant accumulated in the condenser 203 is evaporated thereby to complement the cooling capacity. On the other hand, upon heating operation, the three-way valve 269 is changed over so that refrigerant discharged from the compressor 201 is now introduced into the condenser 203. Further, the solenoid valve 260 is closed so that refrigerant condensed in the condenser 203 is supplied to the outside heat exchanger 202 by way of the capillary element 266. Meanwhile, the solenoid valve 261 is opened so that refrigerant evaporated in the outside heat exchanger 202 is sucked from the solenoid valve 261 toward the accumulator 212 side. In this instance, the solenoid valve 268 is in a closed condition, and refrigerant discharged from the compressor 201 is prevented from being short-circuited to be sucked to the accumulator 212 side.

Upon dehumidifying operation, the three-way valve 296 introduces refrigerant discharged from the compressor 201 to the condenser 203. Meanwhile, the solenoid valve 260 opens the refrigerant passage so that refrigerant of a high pressure is supplied from the condenser 203 to the outside heat exchanger 202. Then, the solenoid valve 261 is closed so that refrigerant condensed by the condenser 203 and the outside heat exchanger 202 is supplied to the evaporator 207 by way of the capillary tube 211.

It is to be noted that actions in defrosting operation and dehumidifying operation of the automotive air conditioner of FIG. 28 are similar to those of the automotive air conditioner shown in FIG. 21.

Figure 29:
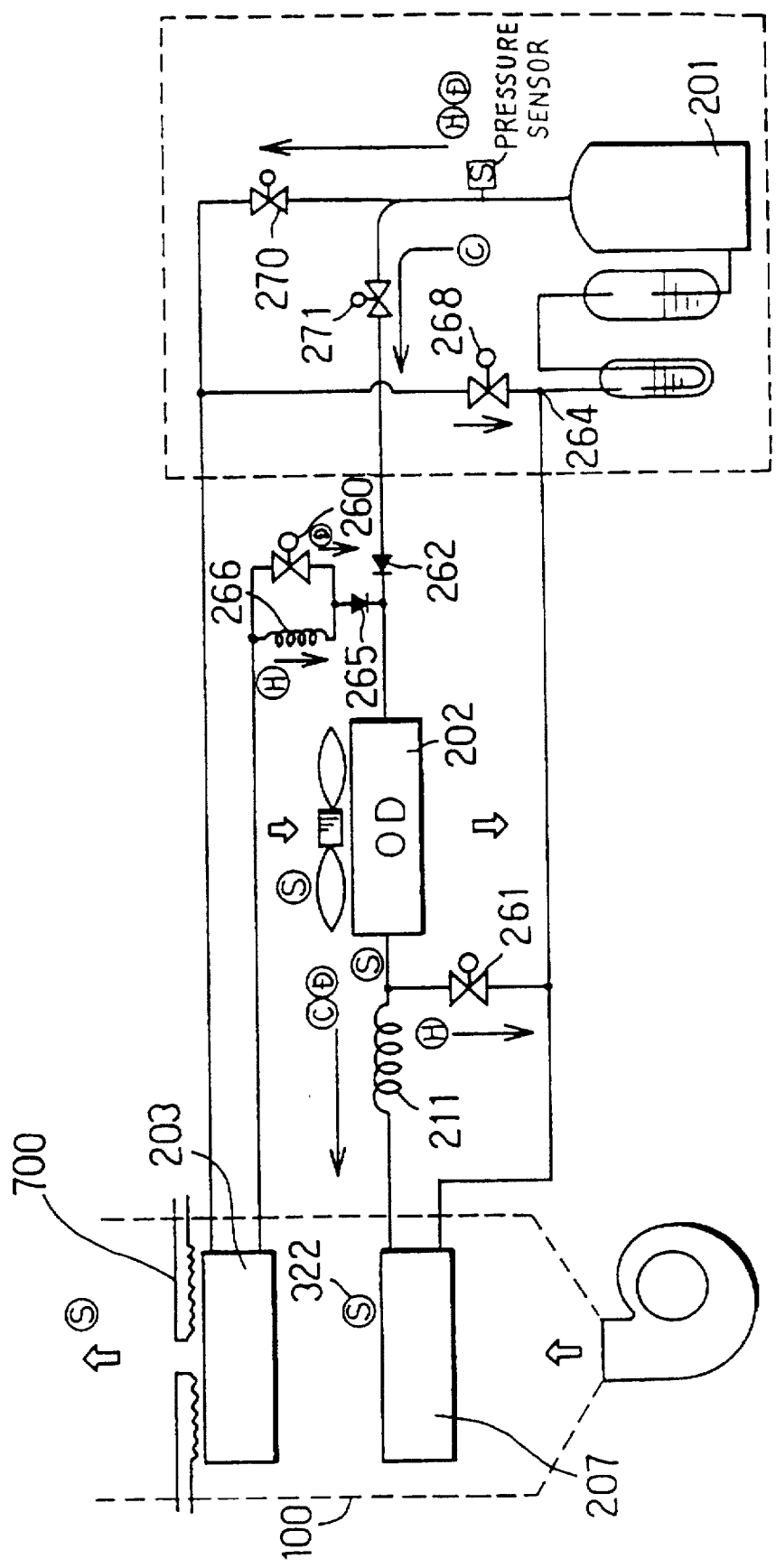
FIG. 29 is a diagrammatic view showing a yet further preferred embodiment of the present invention.

FIG. 29 shows a yet further automotive air conditioner according to the present invention. The present automotive air conditioner employs a pair of solenoid valves 270 and 271 in place of the three-way valve 269 of the automotive air conditioner of FIG. 28. Actions in cooling operation, heating operation and dehumidifying operation are similar to those of the automotive air conditioner of FIG. 28.

Figure 30:
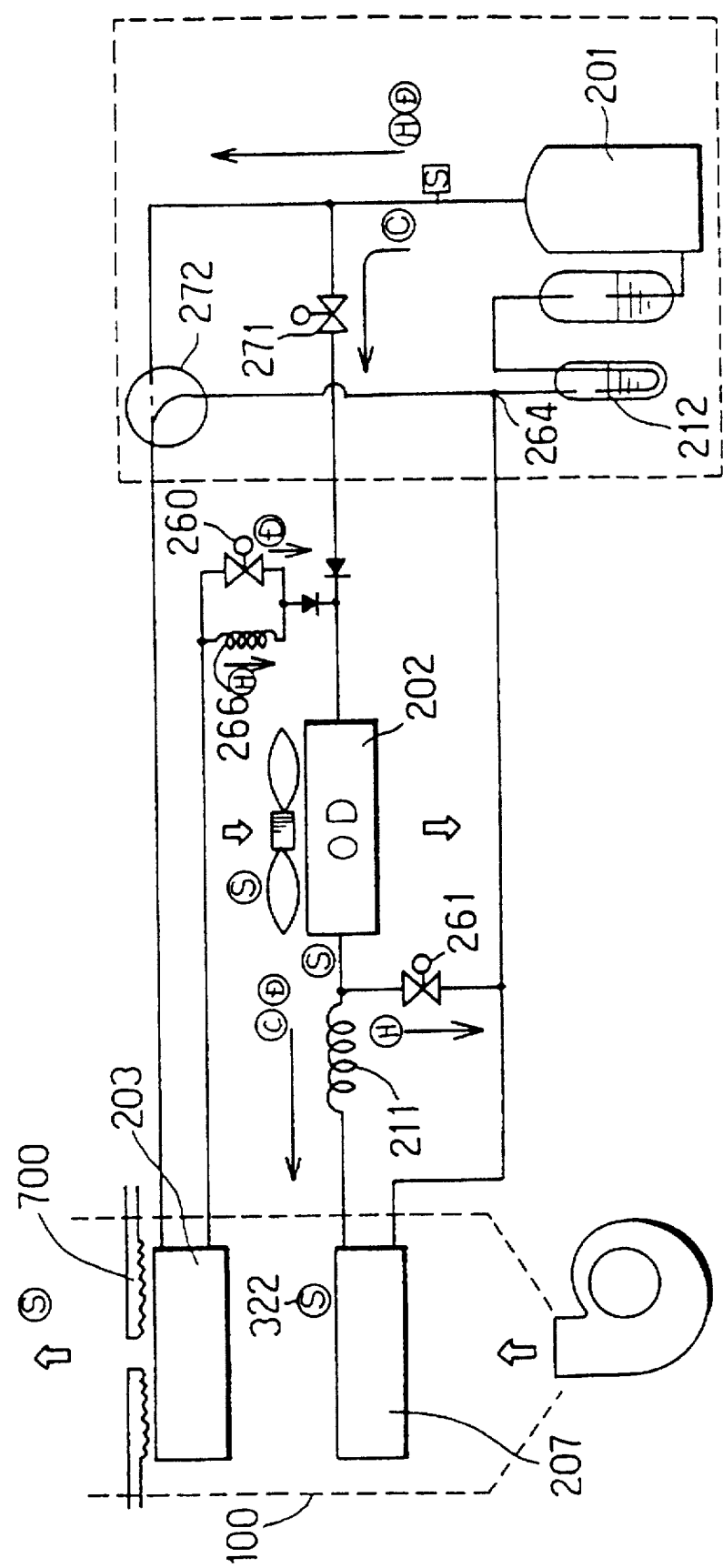
FIG. 30 is a diagrammatic view showing a yet further preferred embodiment of the present invention.

FIG. 30 shows a yet further automotive air conditioner according to the present invention. The present automotive air conditioner employs a single three-way valve 272 in place of the two solenoid valves 270 and 268 of the automotive air conditioner of FIG. 29.

Figure 31:
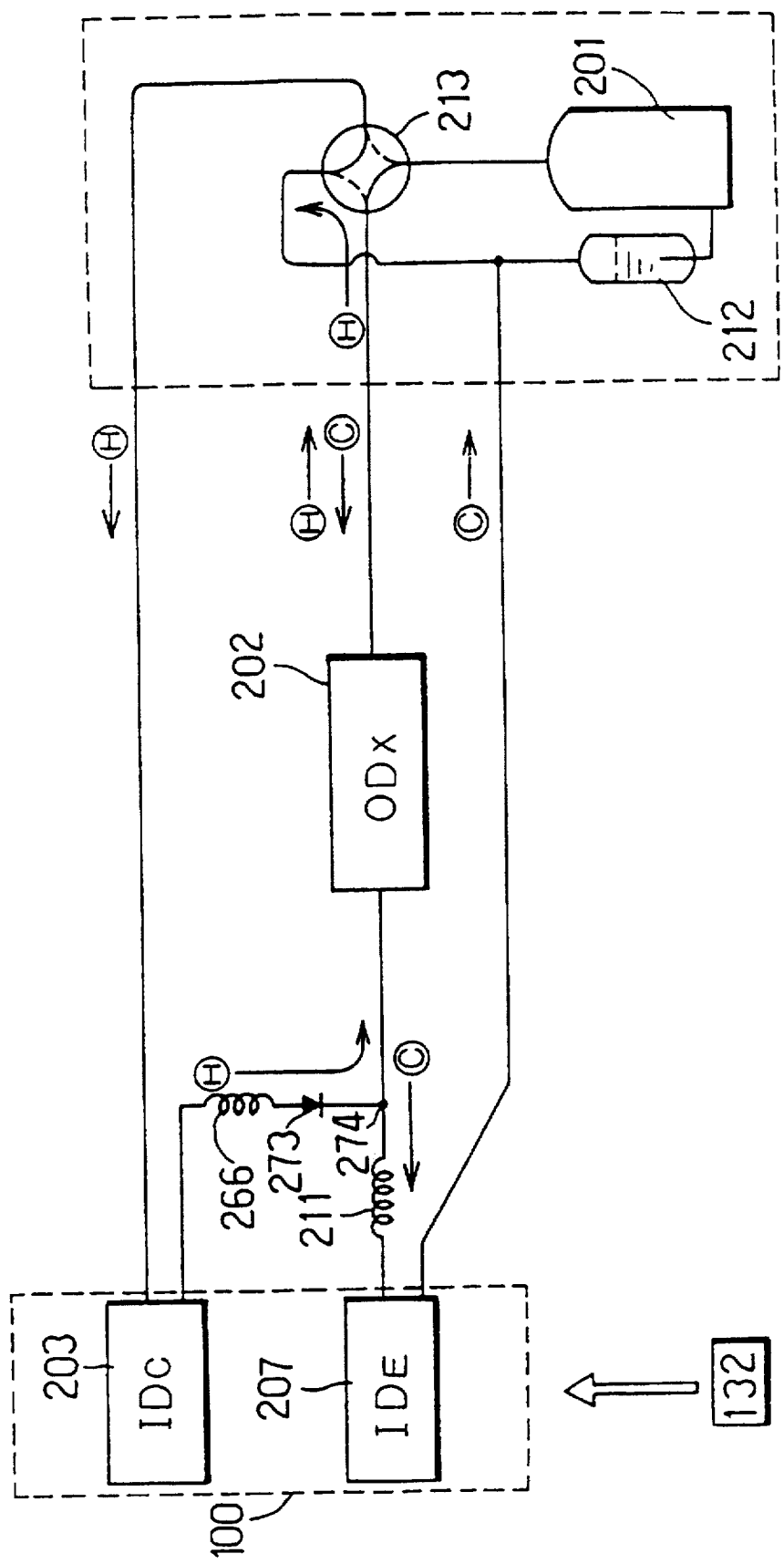
FIG. 31 is a diagrammatic view showing a yet further preferred embodiment of the present invention.

FIG. 31 shows a yet further automotive air conditioner according to the present invention. The present automotive air conditioner is constructed such that the operation thereof between cooling operation and heating operation is performed by changing over of the four-way valve 213.

In particular, upon cooling operation, the four-way valve 213 introduces high pressure refrigerant discharged from the compressor 201 into the outside heat exchanger 202. The refrigerant condensed in the outside heat exchanger 202 is decompressed and expanded in the capillary tube 211 and supplied to the evaporator 207. It is to be noted that a back flow of the refrigerant to the condenser 203 side then is prevented by a check valve 273. Then, the refrigerant evaporated in the evaporator 207 is sucked into the compressor 201 by way of the accumulator 212.

On the other hand, upon heating, the four-way valve 213 is changed over so that refrigerant discharged from the compressor 201 is supplied to the condenser 203. Then, the refrigerant condensed in the condenser 203 is decompressed and expanded when it passes the capillary element 266, and after then, it flows to the branching point 274 by way of the check valve 273. Most of the refrigerant coming to the branching point 274 flows to the outside heat exchanger 202 side due to a difference in pressure. Meanwhile, part of the refrigerant flows to the evaporator 207 by way of the capillary tube 211. Then, the refrigerant evaporated in the outside heat exchanger 202 and the evaporator 207 is supplied to the accumulator 213 and then fed back to the compressor 201.

In such heating operation, refrigerant will not flow much to the evaporator 207 side due to a resistance of the capillary tube 211. However, some refrigerant is supplied to the evaporator 207, at which part of the refrigerant is evaporated. Consequently, even during heating, some dehumidifying operation is achieved.

Figure 32:
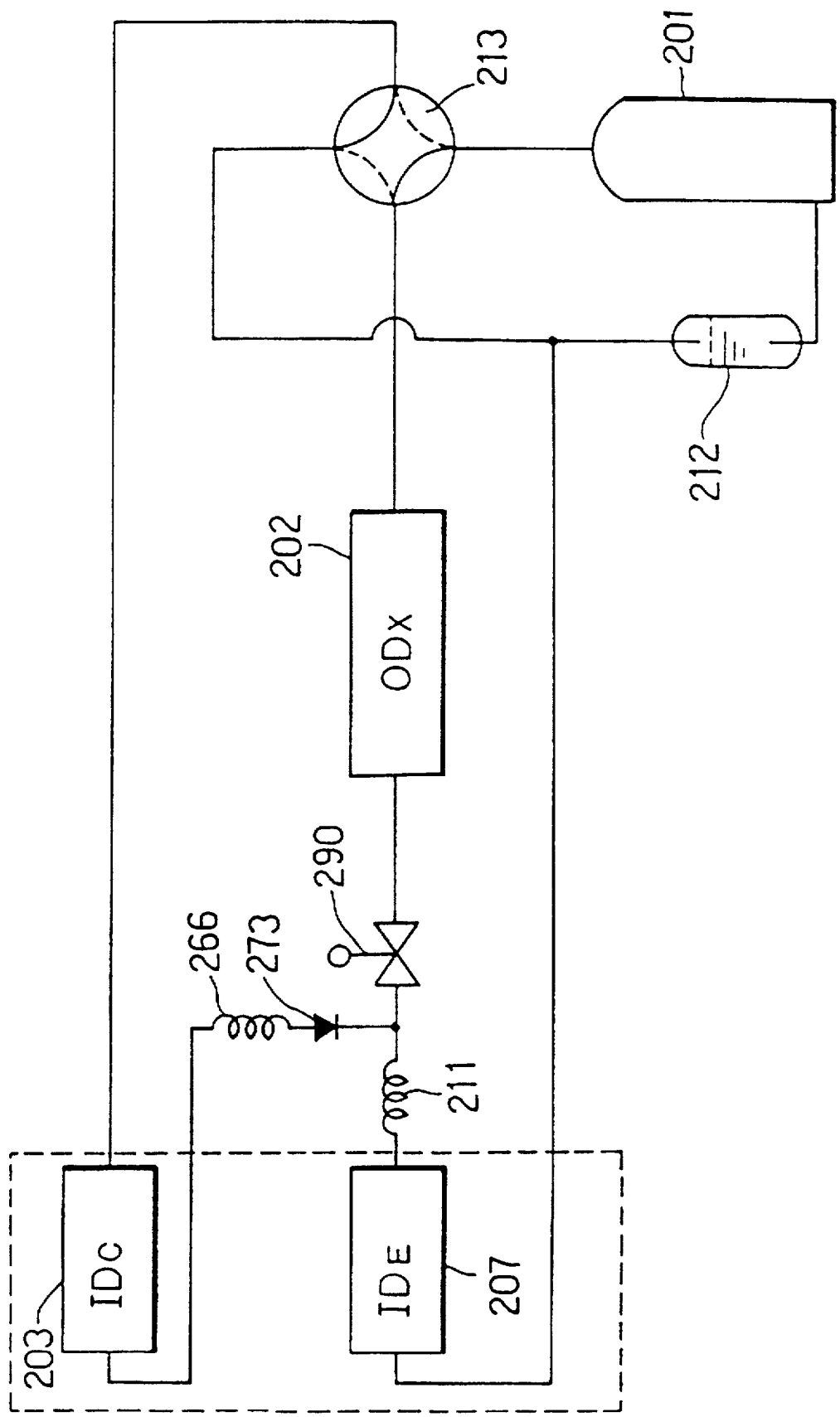
FIG. 32 is a diagrammatic view showing a yet further preferred embodiment of the present invention.

FIG. 32 shows a yet further automotive air conditioner according to the present invention. In the present automotive air conditioner, changing over of a cycle is performed by the single four-way valve 213 and a single on/off solenoid valve 290. Upon cooling operation, the four-way valve 213 is changed over to a position indicated by a solid line in FIG. 32 and the solenoid valve 290 is opened. As a result, refrigerant discharged from the compressor 201 is condensed in the outside heat exchanger 202 and then decompressed and expanded in the capillary tube 211, whereafter it flows into the evaporator 207. Then, the refrigerant cools air by an evaporating action of the evaporator 207. On the other hand, upon heating, the four-way valve 213 is changed over to another position indicated by a broken line in FIG. 32, and also the solenoid valve 290 is put into an open condition. As a result, refrigerant discharged from the compressor 201 is condensed in the condenser 203 and then decompressed and expanded in the capillary 266. After then, the refrigerant passes the check valve 273 and then flows mainly to the outside heat exchanger 202 side due to a difference in pressure. Meanwhile, part of the refrigerant flows into the evaporator 207 by way of the capillary tube 211. Then, the refrigerant having passed the outside heat exchanger 202 and the evaporator 207 is collected into the accumulator 212 and then fed back into the compressor 201. In this condition, since some refrigerant flows into the evaporator 207, dehumidifying operation is performed suitably upon heating.

Further, when dehumidifying operation is to be performed, the four-way valve 213 is changed over similarly as upon heating operation described above, and the solenoid valve 290 is opened and closed at suitable timings. When the solenoid valve 290 closes the refrigerant passage, refrigerant flows into the evaporator 207 by way of the capillary tube 211 so that the cooling capacity of the evaporator 207 is increased. Consequently, the dehumidifying function of the evaporator 207 is increased. Then, a required dehumidifying amount is obtained by suitably changing over the opening/closing operation of the solenoid valve 290 at a suitable duty ratio. Upon dehumidifying operation, the solenoid valve 290 may be held closed normally.

Figure 33:
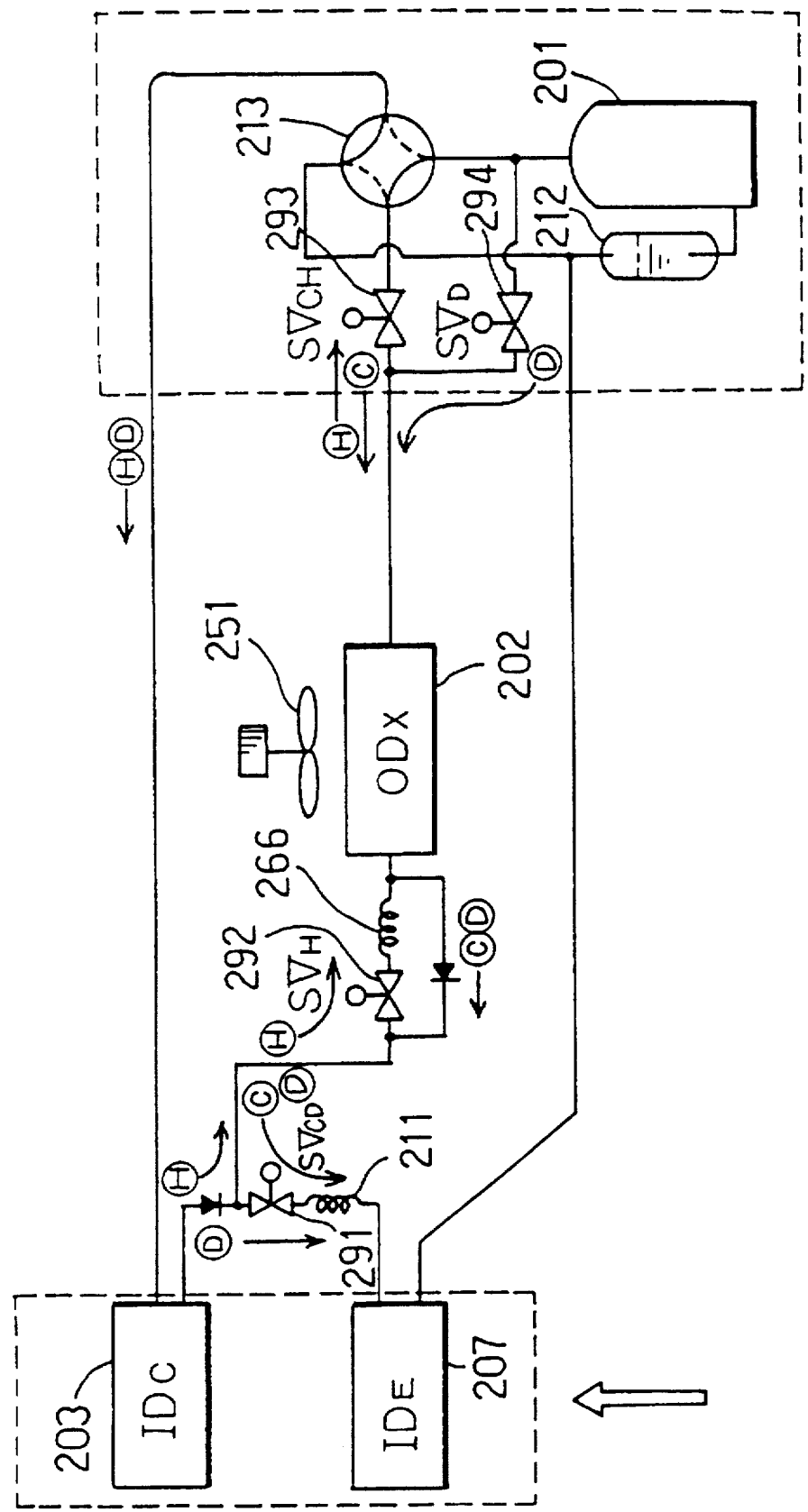
FIG. 33 is a diagrammatic view showing a yet further preferred embodiment of the present invention.

FIG. 33 shows a yet further automotive air conditioner according to the present invention. Upon cooling operation, the four-way valve 213 is changed over to a position indicated by a solid line in FIG. 33 and the solenoid valve 293 opens its refrigerant pipe while the solenoid valve 294 closes its refrigerant pipe. Meanwhile, the solenoid valve 291 opens its refrigerant pipe. It is to be noted that the solenoid valve 292 performs opening and closing operations of the refrigerant pipe suitably in accordance with a required cooling capacity. Accordingly, in this condition, refrigerant discharged from the compressor 201 flows into the outside heat exchanger 202 by way of the four-way valve 213 and the solenoid valve 293 and is condensed in the outside heat exchanger 202. After then, the refrigerant passes the solenoid valve 291 and is decompressed and expanded in the capillary tube 211, whereafter it is evaporated in the evaporator 207. After then, it passes the accumulator 212 and is fed back to the compressor 201.

Upon heating operation, the four-way valve 213 is changed over to another position indicated by a broken line in FIG. 33 and the solenoid valve 291 closes its refrigerant pipe. Meanwhile, the solenoid valve 292 opens its refrigerant pipe; the solenoid valve 293 opens its refrigerant pipe; and the solenoid valve 294 closes its refrigerant pipe. As a result, refrigerant discharged from the compressor 201 flows into the condenser 203 by way of the four-way valve 213 and is then decompressed and expanded in the capillary element 266, whereafter it is evaporated in the outside heat exchanger 202. After then, it is fed back to the compressor 201 by way of the solenoid valve 293, the four-way valve 213 and the accumulator 212.

Subsequently, dehumidifying operation will be described. In this instance, both of the solenoid valves 291 and 294 are opened. As a result, refrigerant discharged from the compressor 201 is divided into a flow which then is liquefied in the condenser 203 and flows to the evaporator 207 by way of the capillary 211 and another flow which then flows by way of the solenoid valve 294 into the outside heat exchanger 202, in which it is liquefied, whereafter it flows to the evaporator 207 by way of the solenoid valve 291 and the capillary tube 211. In particular, condensation of refrigerant is performed in parallel by the condenser 203 and the outside heat exchanger 202. Then, the refrigerant evaporated in the evaporator 207 flows into the accumulator 212 by way of the refrigerant pipe.

Here, upon such dehumidifying operation, the condensing pressure can be controlled by varying the heat exchanging capacity of the outside heat exchanger 202. The capacity control of the outside heat exchanger 202 is performed by varying the amount of blown out air by the blower 251. Alternatively, a damper for the outside heat exchanger 202 may be provided in place of the blower 251. Further, the opening and closing times of the solenoid valve 294 may be controlled to control the condensing pressure, that is, the blown out air temperature.

Figure 34:
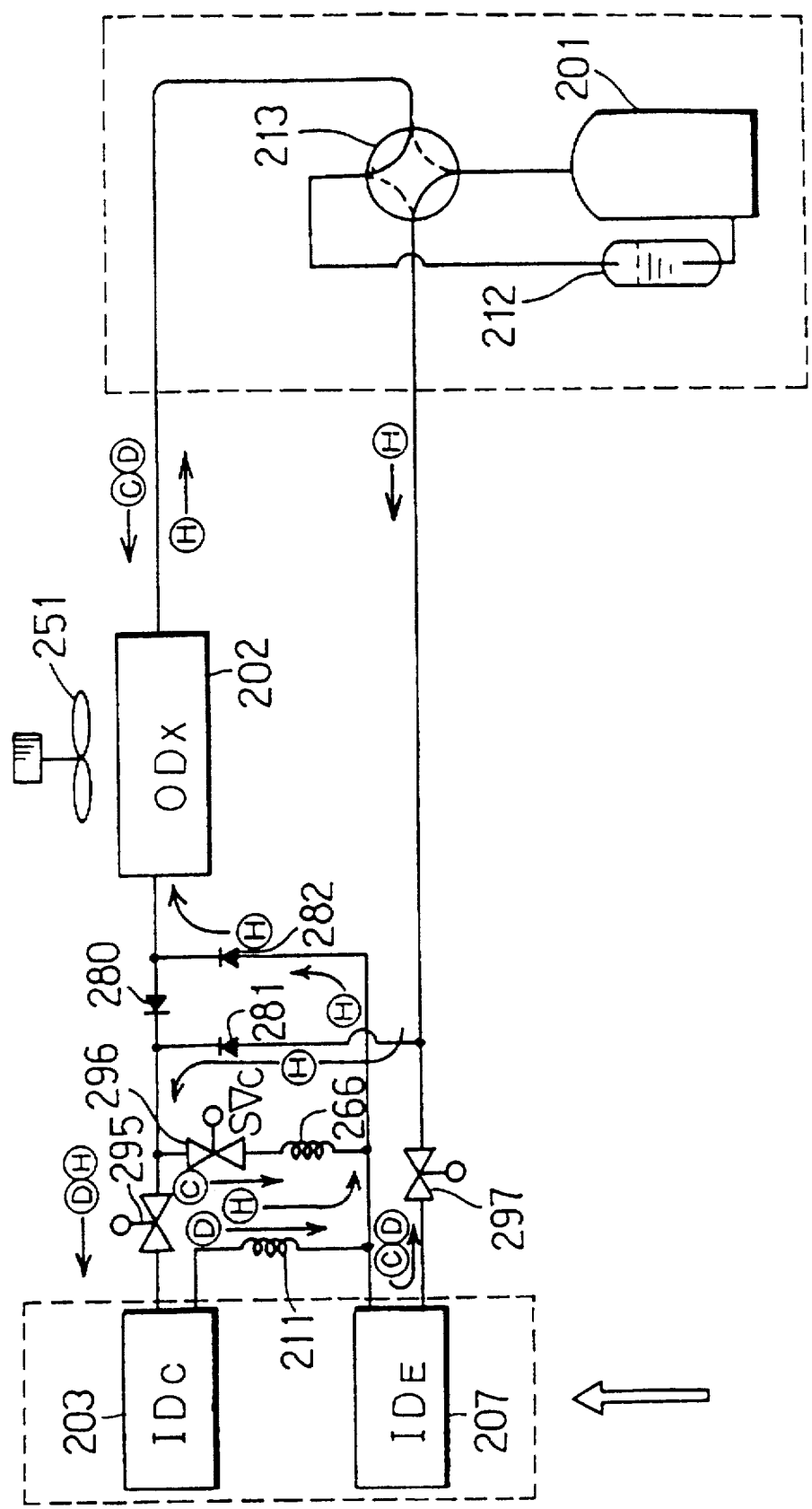
FIG. 34 is a diagrammatic view showing a yet further preferred embodiment of the present invention.

FIG. 34 shows a yet further automotive air conditioner according to the present invention. In the present automotive air conditioner, cooling operation, heating operation and dehumidifying operation are selectively performed by suitably changing over solenoid valves 295, 296 and 297. First, cooling operation will be described. In this instance, the solenoid valve 295 closes its refrigerant passage while the solenoid valve 296 opens its refrigerant passage and also the solenoid valve 297 opens its refrigerant passage. Further, the four-way valve 213 is changed over to a position indicated by a broken line. Consequently, refrigerant discharged from the compressor 201 flows by way of the four-way valve 213 into the outside heat exchanger 202, in which it exchanges heat with outside air so that it is condensed. The refrigerant then flows into the solenoid valve 296 by way of the check valve 280 and then passes the capillary element 266, whereupon it is decompressed and expanded. After then, the refrigerant flows into the evaporator 207, in which it takes heat of vaporization away from air so that is it evaporated. After then, the refrigerant flows into the accumulator 212 by way of the solenoid valve 297 and the four-way valve 213.

On the other hand, upon heating, the solenoid valve 295 opens its refrigerant pipe while the solenoid valve 296 closes its refrigerant pipe and also the solenoid valve 297 closes its refrigerant pipe. Further, the four-way valve 213 is changed over to another position indicated by a solid line in FIG. 34. Consequently, upon heating operation, refrigerant discharged from the compressor 201 successively passes the four-way valve 213, the check valve 281 and the solenoid valve 295 and is then condensed in the condenser 203. After then, the refrigerant is decompressed and expanded when it passes the capillary tube 211, and then flows into the outside heat exchanger 202 by way of the check valve 282. Then, the refrigerant is evaporated in the outside heat exchanger 202 and is fed back into the compressor 201 by way of the four-way valve 213 and the accumulator 212.

Subsequently, dehumidifying operation will be described. In this instance, the solenoid valve 295 is opened while the solenoid valve 296 is closed and also the solenoid valve 297 is closed. Then, the four-way valve 213 is changed over to the position indicated by the broken line in FIG. 34. Accordingly, refrigerant discharged from the compressor 201 flows by way of the four-way valve 213 into the outside heat exchanger 202, in which it is condensed. Further, the refrigerant flows by way of the check valve 280 and the solenoid valve 295 into the compressor 203, in which it is condensed. Then, when the refrigerant passes the capillary tube 211, it is decompressed and expanded into a low temperature, low pressure condition and then flows, in this condition, into the evaporator 207. The refrigerant is evaporated in the evaporator 207 and then fed back into the compressor 201 by way of the solenoid valve 297, the four-way valve 313 and the accumulator 212. Accordingly, in the automotive air conditioner shown in FIG. 34, upon dehumidifying operation, condensation of refrigerant is performed by the outside heat exchanger 202 and the condenser 203, and the blown out air temperature is controlled by controlling the amount of blown out air by the blower 251 to control the heat exchanging capacity of the outside heat exchanger 202 to vary the condensing pressure of the condenser 203.

In particular, in the automotive air conditioner shown in FIG. 34, upon dehumidifying operation, refrigerant flows first into the outside heat exchanger 202 and then into the condenser 203. On the other hand, in the automotive air conditioner shown in FIG. 21, refrigerant flows first into the condenser 203 and then into the outside heat exchanger 202. Here, in case refrigerant flows first into the condenser 203, the refrigerant having high superheat immediately after discharged from the compressor 201 flows into the condenser 203, and consequently, the blown out air temperature from the condenser 203 becomes higher and dehumidification having some heating effect can be performed.

Figure 35:
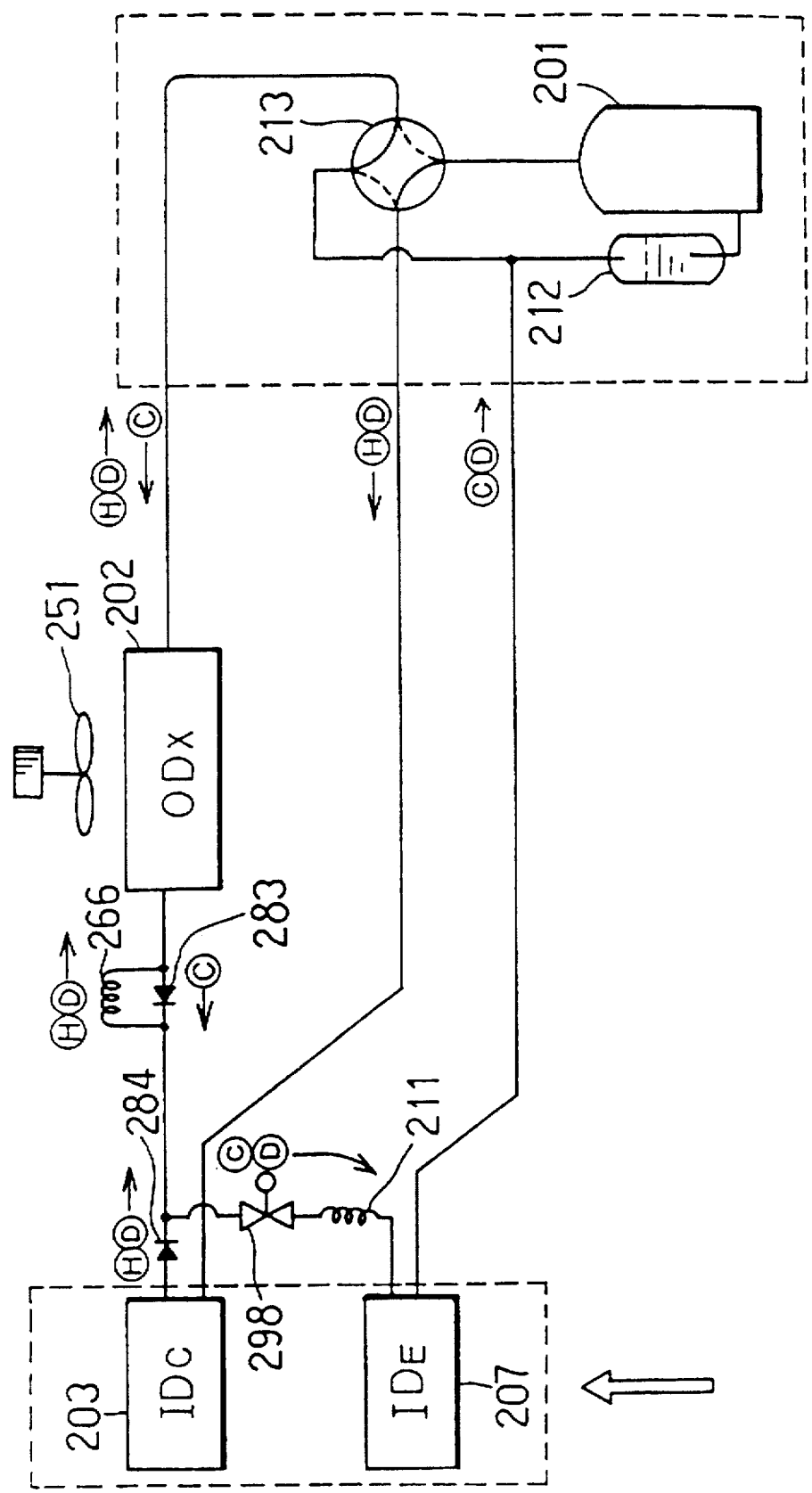
FIG. 35 is a diagrammatic view showing a yet further preferred embodiment of the present invention.

FIG. 35 shows a yet further automotive air conditioner according to the present invention. In the present automotive air conditioner, the operation is changed over among cooling operation, heating operation and dehumidifying operation by means of the four-way valve 213 and a solenoid valve 298.

First, in cooling operation, the four-way valve 213 is changed over to a position indicated by a broken line in FIG. 35, and the solenoid valve 298 opens its passage. As a result, refrigerant discharged from the compressor 201 flows by way of the four-way valve 213 into the outside heat exchanger 202, in which it is condensed. Then, the condensed refrigerant passes the check valve 283 and the solenoid valve 298 and is then decompressed and expanded in the capillary tube 211. After then, the refrigerant is evaporated in the evaporator 207 and is fed back into the compressor 201 by way of the accumulator 212.

On the other hand, upon heating operation, the four-way valve 213 is changed over to another position indicated by a solid line in FIG. 35, and the solenoid valve 298 closes its refrigerant pipe. Accordingly, refrigerant discharged from the compressor 201 flows by way of the four-way valve 213 into the condenser 203, in which it is condensed. After then, the refrigerant flows by way of the check valve 294 into the capillary element 266, in which it is decompressed and expanded, whereafter it flows into the outside heat exchanger 202. Then, the refrigerant is evaporated in the outside heat exchanger 202 and then is fed back into the compressor 201 by way of the four-way valve 213 and the accumulator 212.

Upon dehumidifying operation, the four-way valve 213 is changed over similarly to the position indicated by the solid line in FIG. 35, and the solenoid valve 298 opens its refrigerant pipe. Consequently, refrigerant discharged from the compressor 201 flows into the condenser 203, in which it is condensed and liquefied. The refrigerant liquefied in the condenser 203 is then divided into a flow which flows into the outside heat exchanger 202 by way of the capillary 266 and another flow which flows into the evaporator 207 by way of the solenoid valve 298 and the capillary tube 211. Thus, the refrigerant is evaporated in the outside heat exchanger 202 and the evaporator 207. The thus evaporated refrigerant is collected into the accumulator 212 again and is then fed back into the compressor 201. In this manner, upon dehumidifying operation, refrigerant flows in parallel through the outside heat exchanger 202 and the evaporator 207, and control of the dehumidifying capacity then is achieved by controlling the blower 251 to vary the heat exchanging capacity of the outside heat exchanger 202.

Figure 36:
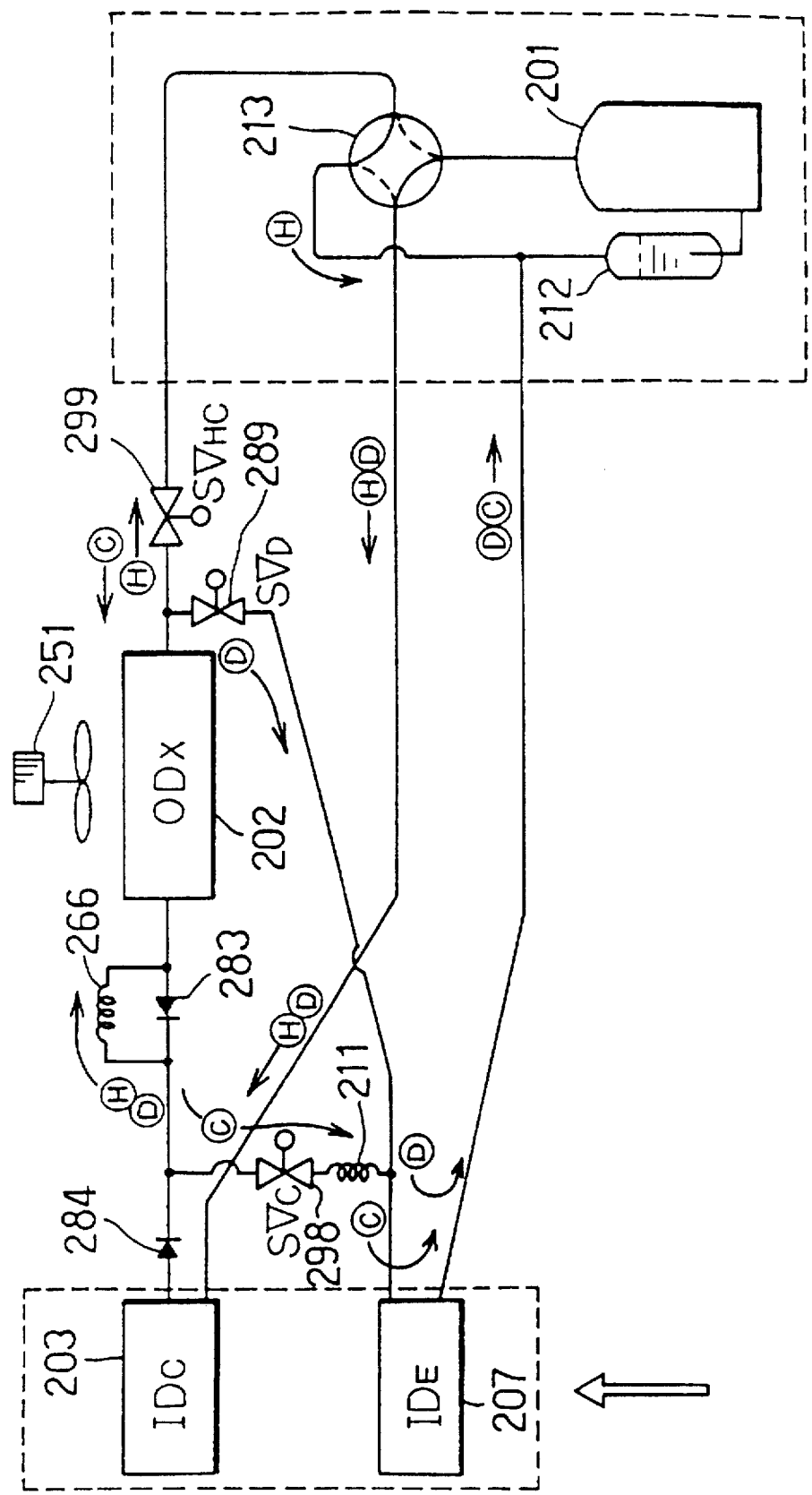
FIG. 36 is a diagrammatic view showing a yet further preferred embodiment of the present invention.

FIG. 36 shows a yet further automotive air conditioner according to the present invention. The present automotive air conditioner is a modification to the automotive air conditioner shown in FIG. 35 in that it additionally includes a refrigerant pipe which interconnects, upon dehumidifying operation, the downstream of the outside heat exchanger 202 and the evaporator 207 and further includes a solenoid valve 299 and another solenoid valve 289 for controlling flows of refrigerant. Operations upon cooling operation and heating operation are similar to those of the refrigerating cycle described hereinabove with reference to FIG. 35. Upon dehumidifying operation, the solenoid valve 299 is opened while the solenoid valve 289 is closed, and in this instance, refrigerant is evaporated in both of the outside heat exchanger 202 and the evaporator 207 similarly as in the refrigerating cycle shown in FIG. 35. However, in case, upon dehumidifying operation, the solenoid valve 298 is closed and also the solenoid valve 299 is closed while the solenoid valve 289 is opened, refrigerant flows in series through the outside heat exchanger 202 and the evaporator 207. In particular, in this condition, refrigerant discharged from the compressor 201 flows by way of the four-way valve 213 into the condenser 203, in which it is condensed. The thus condensed refrigerant flows by way of the check valve 284 into the capillary element 266, in which it is decompressed and expanded, whereafter it is evaporated in the outside heat exchanger 202. After then, the refrigerant flows by way of the solenoid valve 289 into the evaporator 207, in which It is evaporated similarly. Then, the thus evaporated refrigerant is fed back into the compressor 201 again by way of the accumulator 212. In this manner, the cycle shown in FIG. 36 can be changed over, upon dehumidifying operation, between a condition wherein refrigerant condensed by the condenser 203 is admitted in parallel into both of the evaporator 207 and the outside heat exchanger 202 and another condition wherein the outside heat exchanger 202 and the evaporator 207 are disposed in series so that refrigerant is evaporated in both of them.

Figure 37:
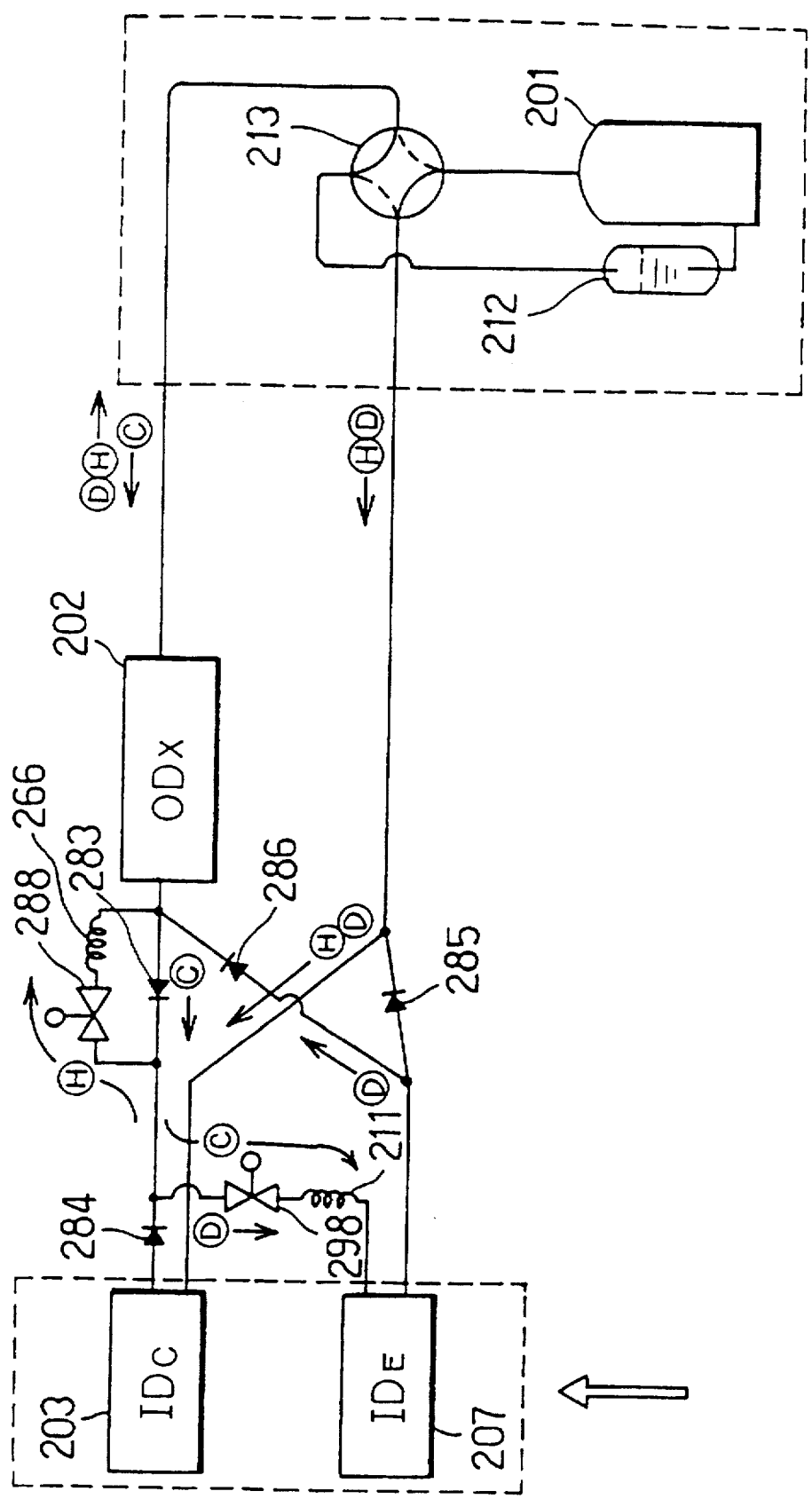
FIG. 37 is a diagrammatic view showing a yet further preferred embodiment of the present invention.

FIG. 37 shows a yet further automotive air conditioner according to the present invention. In the present automotive air conditioner, the evaporator 207 and the outside heat exchanger 202 are also disposed in series upon dehumidifying operation, but the order in arrangement of them is reverse to that in the automotive air conditioner shown in FIG. 36. In particular, while, in the refrigerating cycle shown in FIG. 36, the outside heat exchanger 202 and the evaporator 207 are connected in series upon dehumidifying operation such that the outside heat exchanger 202 may be positioned on the upstream side, in the refrigerating cycle shown in FIG. 37, the evaporator 207 and the outside heat exchanger 202 are connected such that the evaporator 207 may be positioned on the upstream side of the outside heat exchanger 202.

Subsequently, the refrigerating cycle shown in FIG. 37 will be described. First, upon cooling operation, the four-way valve 213 is changed over to a position indicated by a broken line in FIG. 37, and the solenoid valve 288 closes its refrigerant passage while the solenoid valve 298 opens its refrigerant passage. Accordingly, refrigerant discharged from the compressor 201 flows by way of the four-way valve 213 into the outside heat exchanger 202, in which it is condensed. The thus liquefied refrigerant flows through the check valve 213 and the solenoid valve 298 into the capillary tube 211, and it is decompressed and expanded when it passes the capillary tube 211. Then, the refrigerant is evaporated in the evaporator 207 and then flows into the accumulator 212 by way of the four-way valve 213, whereafter it is fed back into the compressor 201.

On the other hand, upon heating operation, the four-way valve 213 is changed over to another position indicated by a solid line in FIG. 37, and the solenoid valve 288 is opened while the solenoid valve 298 is closed. Accordingly, in this condition, refrigerant discharged from the compressor 201 flows into the condenser 203 by way of the four-way valve 213. Then, the refrigerant condensed in the condenser 203 flows into the capillary element 266 by way of the solenoid valve 288 and is decompressed and expanded when it passes the capillary element 266. After then, the refrigerant is evaporated in the outside heat exchanger 202, and then the thus evaporated refrigerant flows into the accumulator 212 by way of the four-way valve 213, whereafter it is fed back to the compressor 201 again.

Further, upon dehumidifying operation, the four-way valve 213 is changed over to the position indicated by the solid line in FIG. 37 and the solenoid valve 298 is opened while the solenoid valve 288 is closed. Accordingly, refrigerant discharged from the compressor 201 flows through the four-way valve 213 into the condenser 203, in which it is condensed and liquefied. After then, the refrigerant flows through the solenoid valve 298 into the capillary tube 211 and is decompressed and expanded when it passes the capillary tube 211. After then, the refrigerant flows into the evaporator 207, in which it is evaporated. After then, the refrigerant flows through the check valve 286 into the outside heat exchanger 202, in which it is further evaporated. Then, the refrigerant is fed back into the compressor 201 by way of the four-way valve 213 and the accumulator 212. Accordingly, upon such dehumidifying operation, refrigerant is evaporated in both of the evaporator 207 and the outside heat exchanger 202, and besides the evaporator 207 is located on the upstream side of the outside heat exchanger 202.

Here, it is suitably selected in accordance with the necessity, when the outside heat exchanger 202 and the evaporator 207 are disposed in series upon dehumidifying operation, which one of them is located on the upstream side. However, in a cycle which includes the accumulator 212, there is no significant difference in function whichever one of them is disposed on the upstream side. In particular, since the outside heat exchanger 202 and the evaporator 207 do not present different evaporating pressures while the temperatures of air admitted into them are different from each other, the evaporating capacity of the evaporator 207 is equal whether it is located on the upstream side or on the downstream side.

Figure 38:
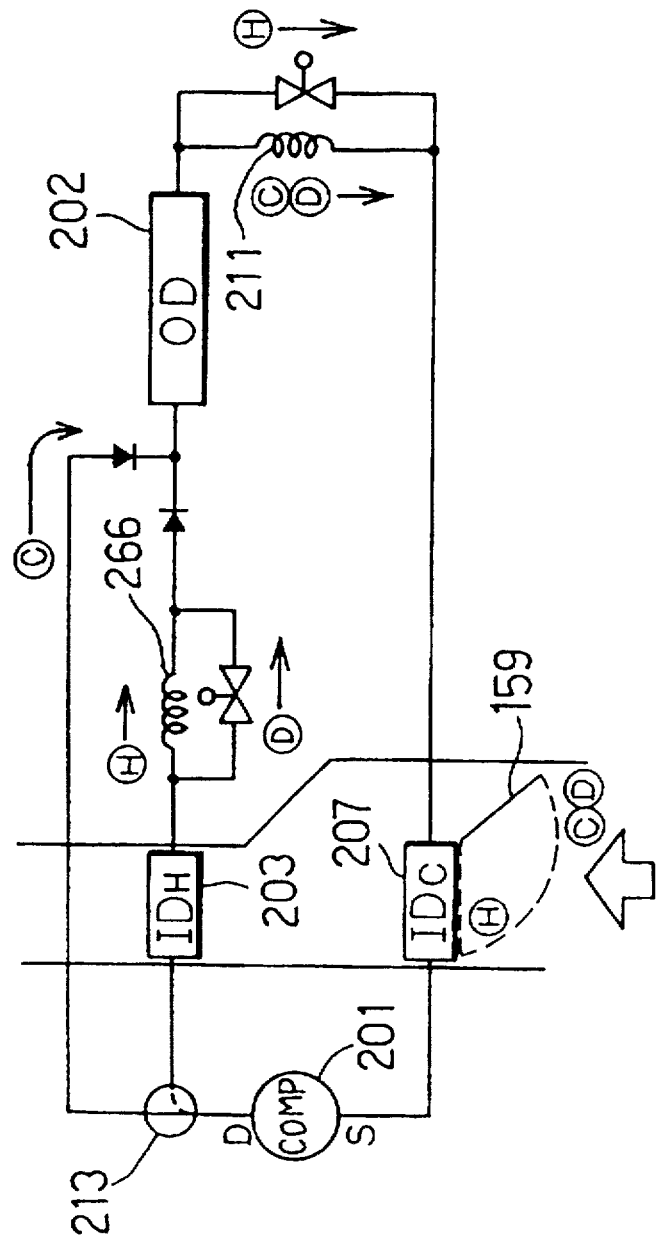
FIG. 38 is a diagrammatic view showing a yet further preferred embodiment of the present invention.

FIG. 38 shows a yet further automatic air conditioner according to the present invention. In the present automotive air conditioner, the evaporator 207 includes a damper 159 having a variable capacity. Upon cooling operation and upon dehumidifying operation, the damper 159 opens the duct 100 so that air may be admitted into the evaporator 207, but upon heating operation, the damper 159 is closed so that air may not be admitted into the evaporator 207. Meanwhile, a flow of refrigerant to the condenser 203 is changed over by the three-way valve 213 and the solenoid valve such that refrigerant may be condensed, upon heating operation and upon dehumidifying operation, in the condenser 203, but refrigerant may flow, upon cooling operation, directly to the outside heat exchanger 202 bypassing the condenser 203.

Figure 39:
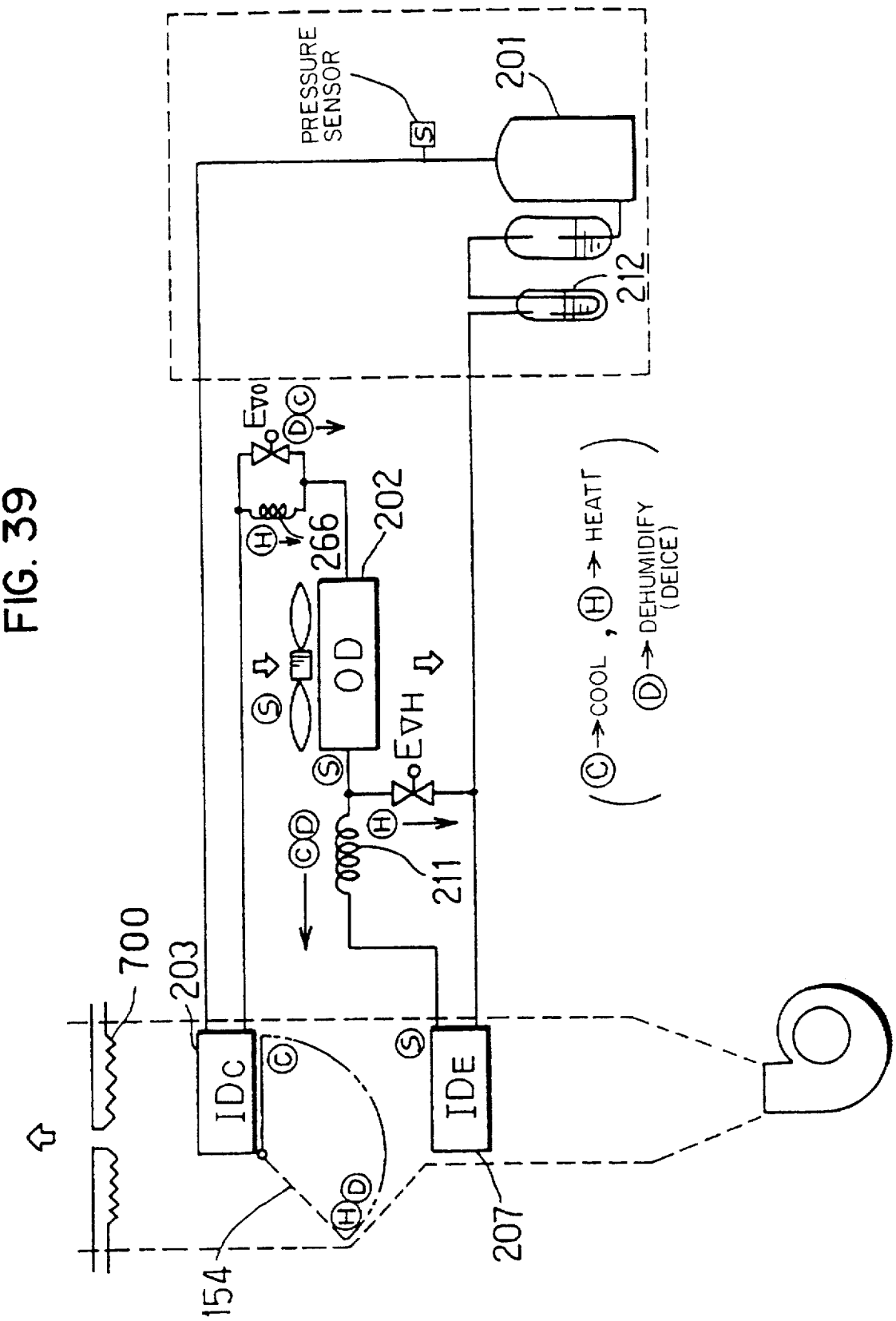
FIG. 39 is a diagrammatic view showing a yet further preferred embodiment of the present invention.

FIG. 39 shows a yet further automatic air conditioner according to the present invention. While a flow of refrigerant is changed over, in the automatic air conditioner shown in FIG. 38, between the condenser 203 side and the other side bypassing the condenser 203, in the automatic air conditioner shown in FIG. 39, the capacity of the condenser 203 is changed over by means of the damper 154. In particular, upon dehumidifying operation and upon heating, the damper 154 opens the duct 100 so that air may be admitted into the condenser 203, but upon cooling operation, the damper 154 is closed so that air may not be admitted into the condenser 203. However, even during cooling operation, when the damper 154 operates as an air mixing damper for varying the blown out air temperature, the damper 154 opens its passage in response to a necessary blown out air temperature so that part of air may be re-heated.

Figure 40:
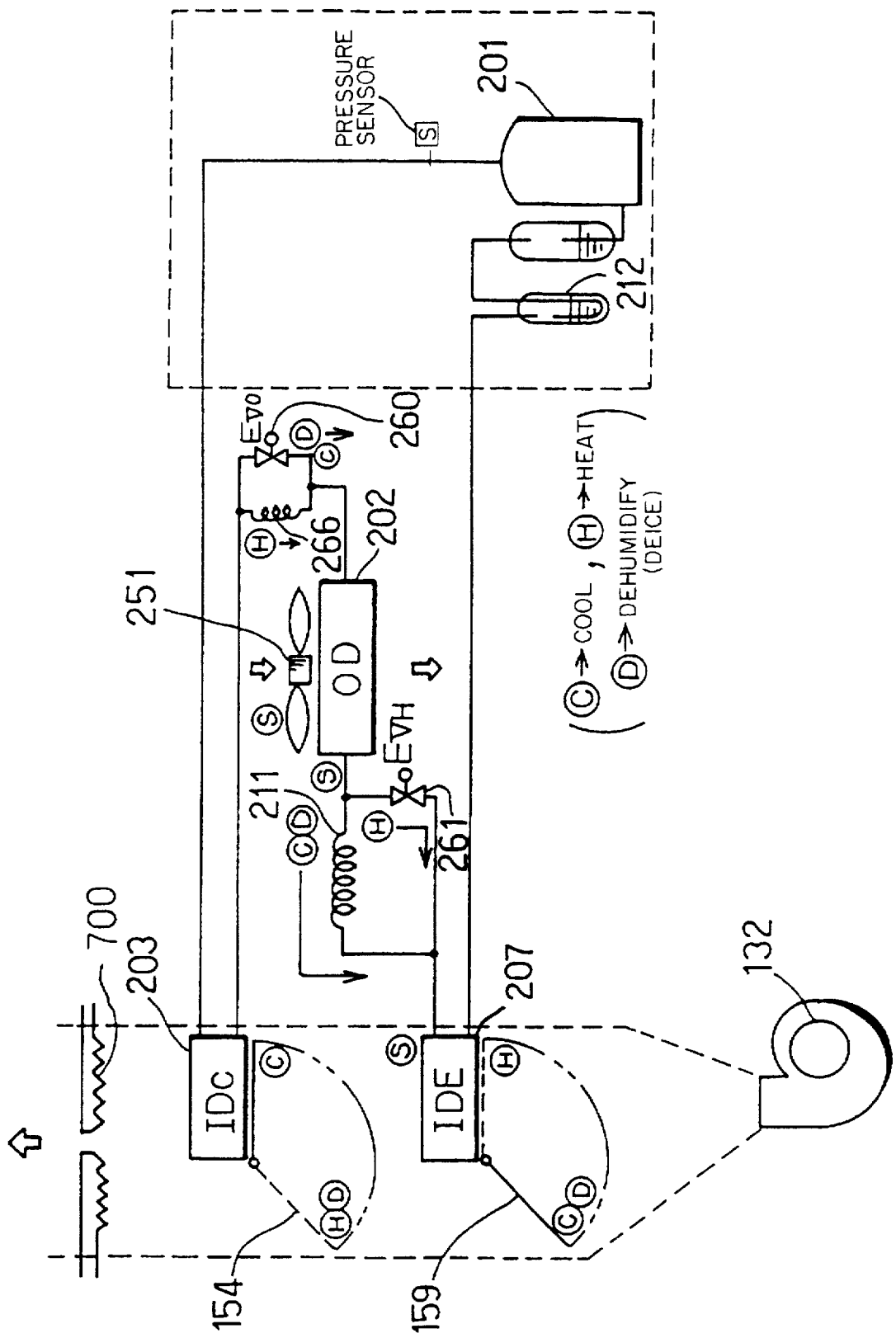
FIG. 40 is a diagrammatic view showing a yet further preferred embodiment of the present invention.

FIG. 40 shows a yet further automatic air conditioner according to the present invention. The present automatic air conditioner includes, similarly to the automatic air conditioner described hereinabove with reference to FIG. 13, the dampers 154 and 159 for both of the condenser 203 and the evaporator 207, respectively. However, the present automatic air conditioner is different in circuit of the refrigerating cycle from the automatic air conditioner shown in FIG. 13. A flow of refrigerant is controlled in the refrigerating cycle by changing over of the solenoid valves 260 and 261. Upon heating operation, the solenoid valve 260 is opened while the solenoid valve 261 is closed. Consequently, refrigerant discharged from the compressor 201 flows through the condenser 203 and the solenoid valve 260 into the outside heat exchanger 202, in which it is evaporated. It is to be noted that, in this instance, the condenser 203 does not perform a condensing action in principle as the damper 154 is held closed. Then, the refrigerant condensed in the outside heat exchanger 202 is decompressed and expanded when it passes the capillary tube 211, and consequently, the refrigerant in a low temperature, low pressure condition flows into the evaporator 207. In this condition, the damper 159 holds the duct 100 in a closed condition, and consequently, air from the blower 132 flows into the evaporator 207 to evaporate the refrigerant. The thus evaporated refrigerant is then fed back into the compressor 201 by way of the accumulator 212.

On the other hand, upon heating operation, the solenoid valve 260 is closed while the solenoid valve 261 is opened. In this condition, refrigerant discharged from the compressor 201 flows into the condenser 203, in which it is condensed. In particular, in this condition, the damper 154 is opened so that air may be admitted into the condenser 203. After then, the refrigerant is decompressed and expanded when it passes the capillary element 266, and is then evaporated in the outside heat exchanger 202. The thus evaporated refrigerant is fed back into the compressor 201 by way of the solenoid valve 261 and the evaporator 207. In this condition, the evaporator 207 is closed by the damper 159, and consequently, refrigerant is little evaporated in the evaporator 207.

Subsequently, upon dehumidifying operation, the solenoid valve 260 is opened while the solenoid valve 261 is closed. Accordingly, refrigerant discharged from the compressor 201 flows into the condenser 203, in which it is condensed. The refrigerant then flows through the solenoid valve 260 into the outside heat exchanger 202, also which accomplishes a condensing function to condense the refrigerant. After then, the refrigerant is decompressed and expanded when it passes the capillary tube 211, and is then evaporated in the evaporator 207. Then, the refrigerant thus evaporated in the evaporator 207 is fed back to the compressor 201 by way of the accumulator 212. In this condition, the evaporating capacity of the evaporator 207 and the condensing capacity of the condenser 203 are variably controlled by adjusting the circuits of the dampers 159 and 154, respectively. Further, in order to control the condensing capacity of the condenser 203, the condensing capacity control of the outside heat exchanger 202 by control of the amount of air of the fan 151 for the outside heat exchanger 202 or the like may be employed additionally similarly as in the case of the automotive air conditioner shown in FIG. 21.

As described so far, with the automotive air conditioner of the present invention, the operation can be changed over among cooling operation, heating operation and dehumidifying operation by controlling the routes of flows of refrigerant through the compressor 201, the outside heat exchanger 202, the condenser 203, the evaporator 207 and the decompressing or expanding means 211. Further, according to the present invention, further advantageous air conditioning operation described below can be achieved by suitably controlling changing over particularly between a dehumidifying operation condition and a heating operation condition.

In case fogging of the windshield of the automobile is forecast or detected in a heating operation condition, the condition of the windshield can be prevented well by changing over the flow of refrigerant into that of a dehumidifying operation condition. Particularly upon dehumidifying operation, since the drop in temperature of blown out air at the evaporator 207 is greater than the rise at the condenser 203 as described above, dehumidification having somewhat heating effect can be achieved. Accordingly, even if the operation is changed over from a heating operation condition to a humidifying operation condition, the temperature of blown out air will not be lowered remarkably, and consequently, good heating can be achieved.

Meanwhile, in a humidifying operation condition, since the evaporator 207 performs an evaporating action, particularly when the temperature of air sucked into the evaporator 207 is low as in winter, there is the possibility that the evaporator 207 may be frozen. Thus, in such a case, otherwise possible freezing of the evaporator 207 can be prevented well by changing over the operation from the dehumidifying operation to a heating operation.

Figure 41:
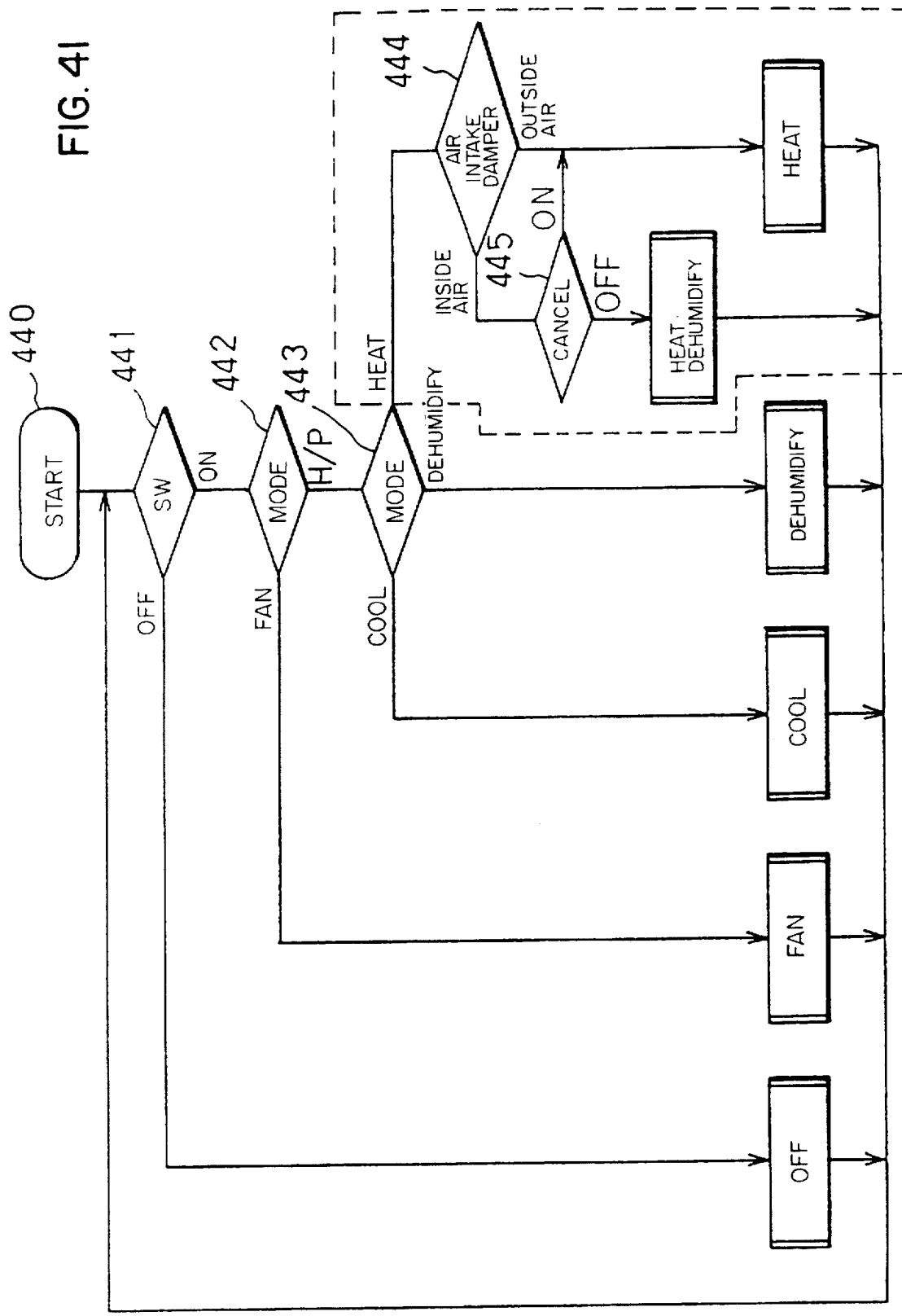
FIG. 41 is a flow chart illustrating an example of refrigerating cycle control of the present invention.

FIG. 41 shows a flow chart when the operation is changed over from a heating operation condition to a dehumidifying operation condition. The present flow chart is used to control changing over of the solenoid valves of the refrigerating cycle described hereinabove. After operation is started at step 440, it is judged at step 441 whether or not the air conditioner switch 305 is on or off. In case the air conditioner switch 305 is on, it is then judged at step 442 whether or not the refrigerating cycle is in an operation condition wherein it blows out only a weak wind or in an air conditioning operation condition wherein the compressor 201 is operating. If an air conditioning operation condition is judged at step 442, judgment of a cooling operation condition, a dehumidifying operation or a heating operation condition is performed at step 443.

As described hereinabove, in any of the refrigerating cycles, in a cooling operation condition, refrigerant discharged from the compressor 201 is condensed in the outside heat exchanger 202, and then decompressed and expanded, whereafter it is supplied into the evaporator 207. Then, the refrigerant takes heat of vaporization away from air in the evaporator 207 to cool the air. On the other hand, in a heating operation condition, refrigerant discharged from the compressor 201 flows into the condenser 203, in which it radiates heat of condensation into air to heat the air. After then, the refrigerant is decompressed and expanded, and then it is evaporated in the outside heat exchanger 202 and fed back into the compressor 201 again.

Upon dehumidifying operation, the manner of use of the outside heat exchanger 202 is different among the different refrigerating cycles, but the condenser 203 performs a condensing function to radiate heat of condensation into air to heat the air. Further, the evaporator 207 performs an evaporating action to cool air by heat of vaporization to condense moisture from within the air. Then, the outside heat exchanger 202 acts as an evaporator or a condenser depending upon a circuit of the refrigerating cycle. Further, as described already, a flow of refrigerant flowing to the outside heat exchanger 202 may flow in series to the condenser 203 or in parallel to the condenser 203. In particular, in a first condition, refrigerant discharged from the compressor 201 first flows into the condenser 203 and then into the outside heat exchanger 202 so that it may undergo a condensing action by both of condenser 203 and the outside heat exchanger 202, whereafter it flows into the evaporator 207 by way of the capillary tube 211. On the other hand, in a second condition, refrigerant discharged from the compressor 201 is supplied in parallel into both of the condenser 203 and the outside heat exchanger 202, and then the refrigerant condensed in both of the condenser 203 and the outside heat exchanger 202 is supplied into the evaporator 207 by way of the capillary tube 211.

Further, also when the outside heat exchanger 202 acts as an evaporator upon dehumidifying operation, similarly two cases are available including a first case wherein refrigerant flows in series and a second case wherein refrigerant flows in parallel. In particular, in the first case, refrigerant condensed in the condenser 203 flows, after passing the capillary tube 212, in series through the outside heat exchanger 202 and the evaporator 207 such that an evaporating action is achieved by both of the outside heat exchanger 202 and the evaporator 207, whereafter the refrigerant is sucked into the compressor 201. Particularly in this instance, either the evaporator 207 may be located on the upstream side of the outside heat exchanger 202 or the outside heat exchanger 202 may be located on the upstream side of the evaporator 207.

Meanwhile, in the second case, liquid refrigerant condensed in the condenser 203 is supplied, after passing the capillary tube 211, in parallel to both of the outside heat exchanger 202 and the evaporator 207.

In the present flow chart of FIG. 41, it is judged, at step 444, in accordance with a changed over condition of the inside/outside air changing over damper 131 whether a heating operation or a dehumidifying operation should be performed in a heating operation condition. Then, in case an outside air admitting condition is detected at step 444, the heating operation condition is maintained. This is because, normally in an outside air introducing condition, ventilation of the room of the automobile is performed and the windshield is not likely fogged.

In case it is judged at step 444 that the inside/outside air changing over damper 131 is in an inside air admitting condition, it is judged subsequently at step 445 whether or not a cancelling switch is on or off.

The cancelling switch is provided, though not shown, on the control panel for preventing, by manual operation thereof, operation of the automatic air conditioner from automatically changing over from a heating operation condition to dehumidifying operation. However, in case the cancelling switch is on, even if it is forecast at step 444 that the windshield may be fogged, heating operation will still be continued.

Only when the cancelling switch is not on, dehumidifying operation is performed in case fogging of the windshield is forecast at step 444. Preferably, the dehumidifying operation here is dehumidifying operation having some heating effect. This is achieved by lowering, in the refrigerating cycle in which the outside heat exchanger acts as a condenser, the heat exchanging function of the outside heat exchanger. It is to be noted that such dehumidifying operation having some heating effect will be hereinafter described.

Figure 42:
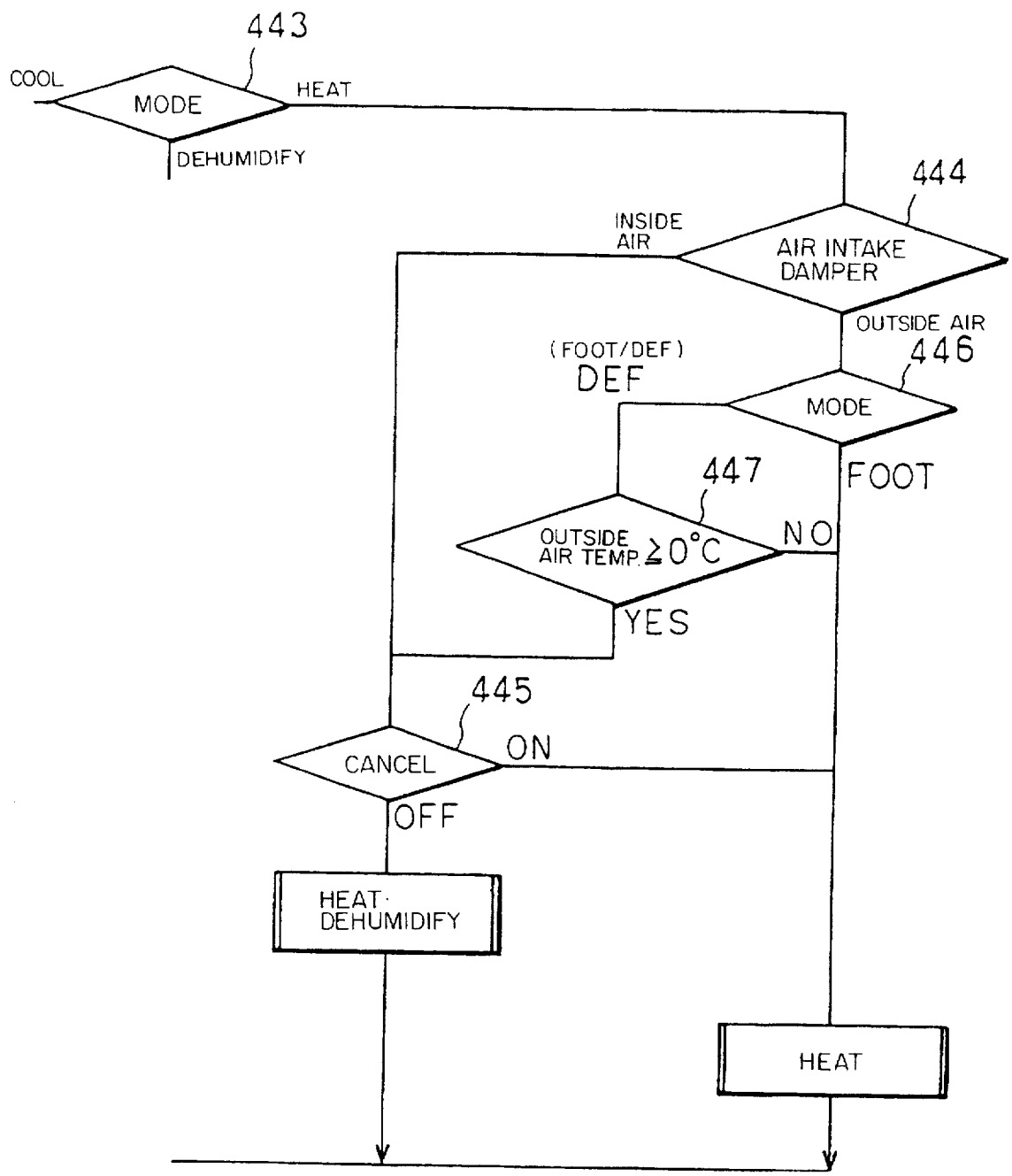
FIG. 42 is a flow chart showing another form of the flow chart shown in FIG. 41.

It is to be noted that, while, in the flow chart of FIG. 41, a fogged condition of the windshield is judged in accordance with a changing over condition of the inside/outside changing over damper 131, changing over may otherwise be performed in accordance with a blowing out mode or an outside air condition as seen from the flow chart shown in FIG. 42.

In particular, even if an outside air admitting condition is detected at step 444, if it is judged at step 446 that air flows to the def spit hole 146, then it is determined that the passenger requires dehumidification, and consequently, the operation is changed over to the dehumidifying operation side. It is to be noted that judgment of a mode at step 444 and judgment of changing over between spit holes at step 446 are different from each other as described subsequently. In particular, the judgment of a mode at step 444 is made principally based on a necessary blown out air temperature Tao while changing over of a mode at step 446 is performed by selection of the passenger.

At step 447, it is judged whether or not the temperature of outside air is equal to or higher than 0° C. Here, in case it is judged that the outside air temperature is lower than 0° C. heating operation is selected because, otherwise if dehumidifying operation is performed, then there is the possibility that the evaporator 207 may be frozen. Then, when the outside air temperature is equal to or higher than 0° C. and there is no possibility that the evaporator 207 may be frozen, dehumidifying operation is selected.

The DEF mode at step 446 mentioned above denotes a condition wherein air flows to the def spit hole 146 and includes not only a case wherein the entire amount of air flows to the def spit hole 146 but also another case wherein air flows to both of the def spit hole 146 and the foot spit hole 145.

Figure 43:
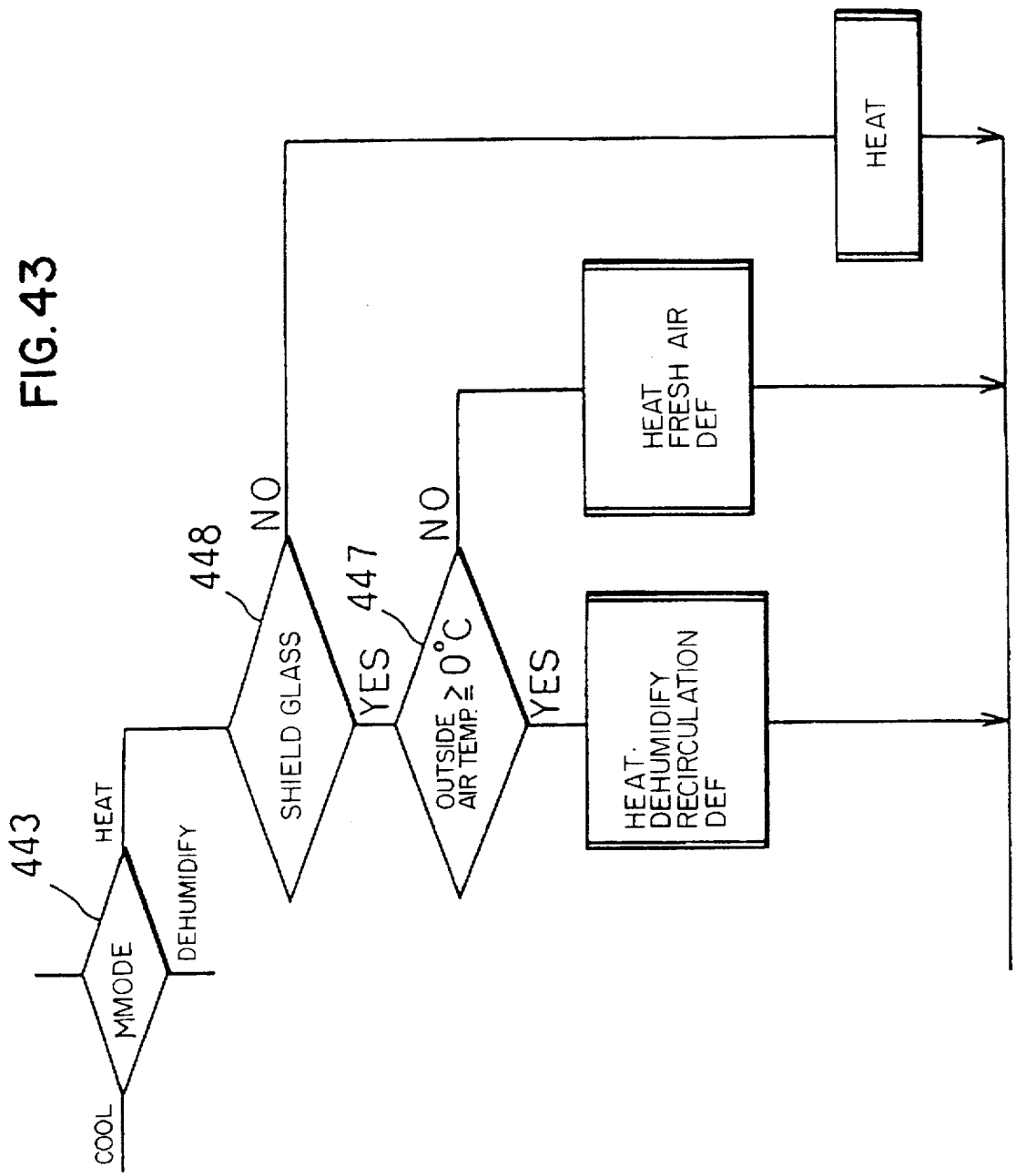
FIG. 43 is a flow chart showing a further form of the flow chart shown in FIG. 41.

FIG. 43 shows another flow chart of changing over between heating operation and dehumidifying operation. In the flow chart of FIG. 43, fogging of the windshield is judged at step 448. The judgment is performed using a dewing sensor not shown. The dewing sensor identifies from a temperature of a glass portion and a humidity of air whether or not the surface of the glass is lower than a dew point of moisture in the air in order to forecast occurrence of fogging. Then, in case occurrence of fogging is not detected or forecast at step 448, the automotive air conditioner enters heating operation.

In case occurrence of fogging is forecast at step 448, a temperature of outside air is detected at step 447, and if the outside air temperature is equal to or higher than 0° C., then dehumidifying operation having some heating effect is selected. In this instance, the inside/outside air changing over damper is put into an inside air admitting condition in order to achieve a high heating efficiency while the damper 141 is opened so that warm air may advance from the def spit hole 146 toward the windshield.

In case a temperature of outside air equal to or higher than 0° C. is detected at step 447, heating operation is selected in order to prevent freezing of the evaporator 207. However, since this condition is a condition wherein fogging of the windshield is forecast, the inside/outside air changing over damper 131 is put into the outside air admitting condition. Further, the damper 141 opens the def passage 146 so that air warmed by heating operation may be blown out from the def spit hole 146 toward the windshield.

In case it is judged at step 447 that the outside air temperature is equal to or higher than 0° C. dehumidifying operation having some heating effect is performed. In this instance, the inside/outside air changing over damper 131 is changed over to the inside air admitting condition in order to lower the heating load. Further, the def spit hole 146 is opened so that fogging of the windshield may be prevented well.

Figure 44:
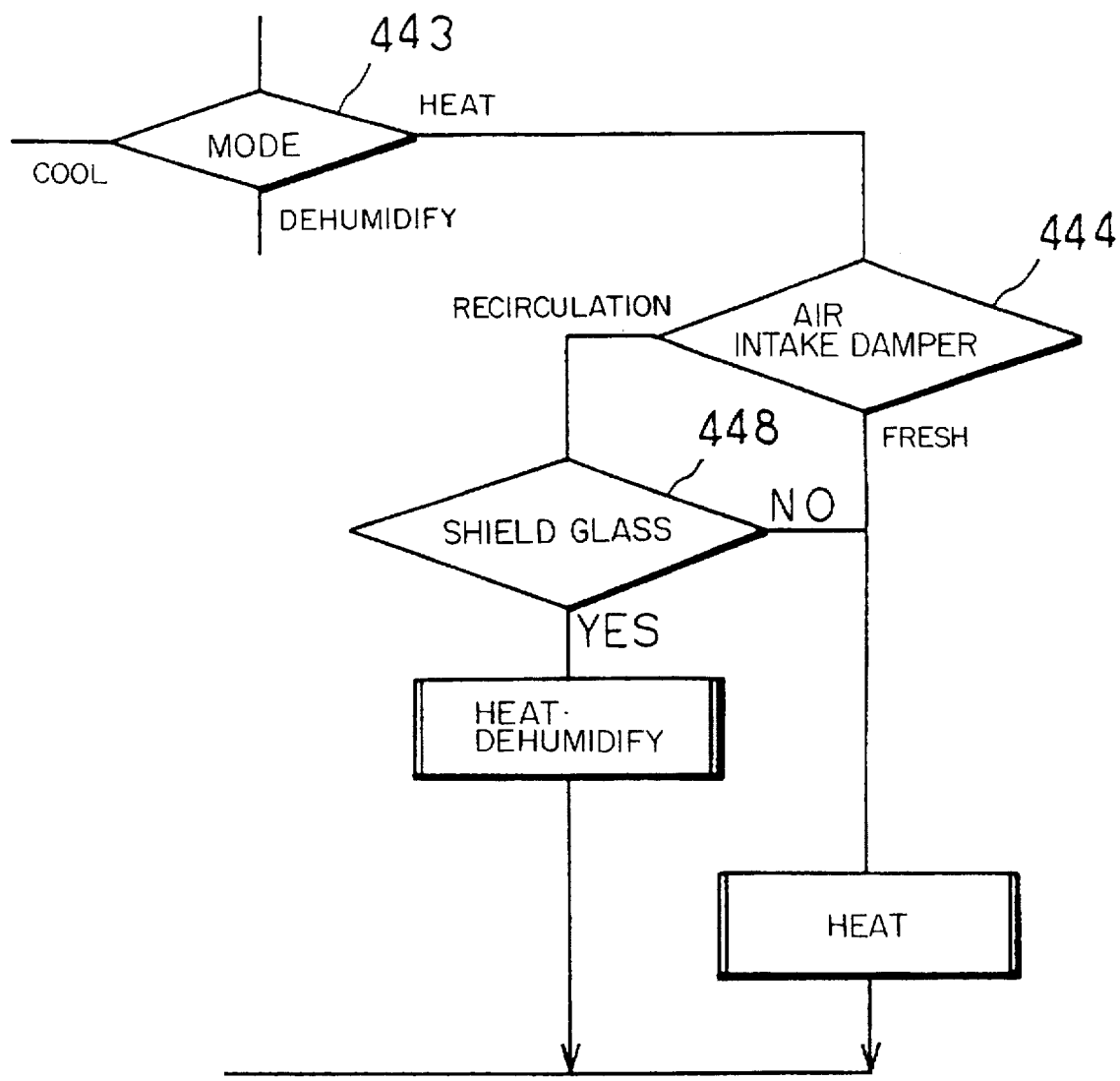
FIG. 44 is a flow chart showing a still further form of the flow chart shown in FIG. 41.

FIG. 44 is a flow chart illustrating a further control for the prevention of fogging of the windshield.

In the present flow chart, detection of occurrence of fogging is executed in accordance with the position of the inside/outside air changing over damper 131 (step 444). Then, in case an inside air admitting condition is judged at step 444, since this is a condition wherein fogging of the windshield is forecast, an actual situation of the windshield is judged at step 448. Then, in case it is detected that the windshield is actually fogged or is entering into a fogged condition, dehumidifying operation having some heating effect is selected. On the contrary if fogging of the windshield is not detected at step 448, even if an inside air admitting condition is judged at step 444, heating operation will be continued.

Figure 45:
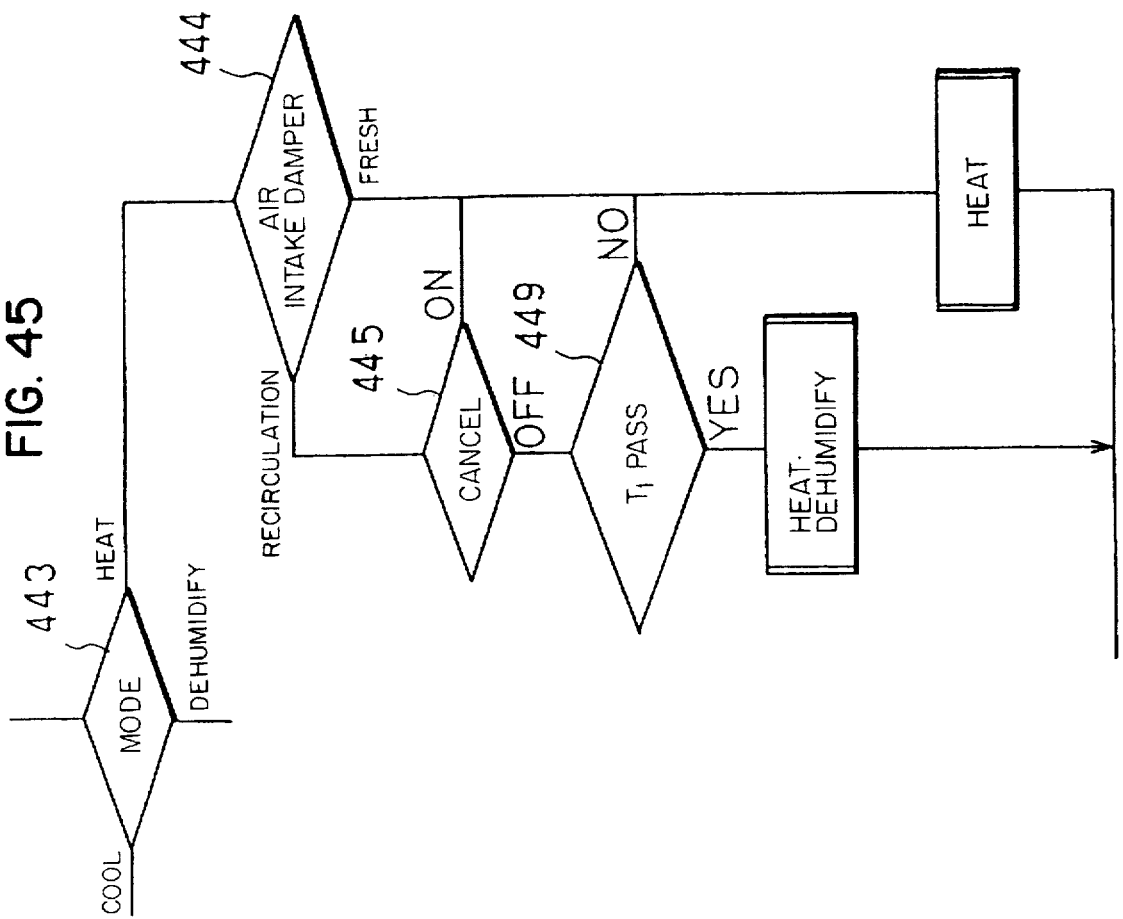
FIG. 45 is a flow chart showing a yet further form of the flow chart shown in FIG. 41.

FIG. 45 shows a flow chart of another example of controlling changing over between dehumidifying operation having some heating effect and heating operation. In the present example, a changed over position of the inside/outside air changing over damper 131 is judged at step 444 and the changing over is controlled in accordance with the judgment similarly as in the flow chart described hereinabove. However, even when an inside air admitting condition is detected at step 444, when the cancelling switch is in an on-state, heating operation is continued (step 445) similarly as in the flow chart shown in FIG. 42. Further, in the flow chart shown in FIG. 45, a step 449 is added so that an elapsed time after the inside/outside changing over damper 131 has been changed over to the inside air admitting condition may be judged. This is because, even if the inside/outside air changing over damper 131 is changed over to the inside air admitting condition, this will not immediately result in fogging of the windshield. Thus, in case it is judged at step 449 that the inside air admitting condition has continued for a predetermined period of time, for example, for 1 to 3 minutes or so, dehumidifying operation having some heating effect is entered.

On the other hand, in case it is detected at step 449 that the inside air admitting condition has continued but for a period of time shorter than the predetermined period of time, for example, 1 to 3 minutes, heating operation will be continued. This is because, depending upon a driving condition of the automobile, the automotive air conditioner is sometimes used in such a manner that the admitting time of inside air comes to an end after a comparatively short period of time such that the inside air admitting condition may be entered and continued only while the automobile is driving, for example, in a tunnel.

Figure 46:
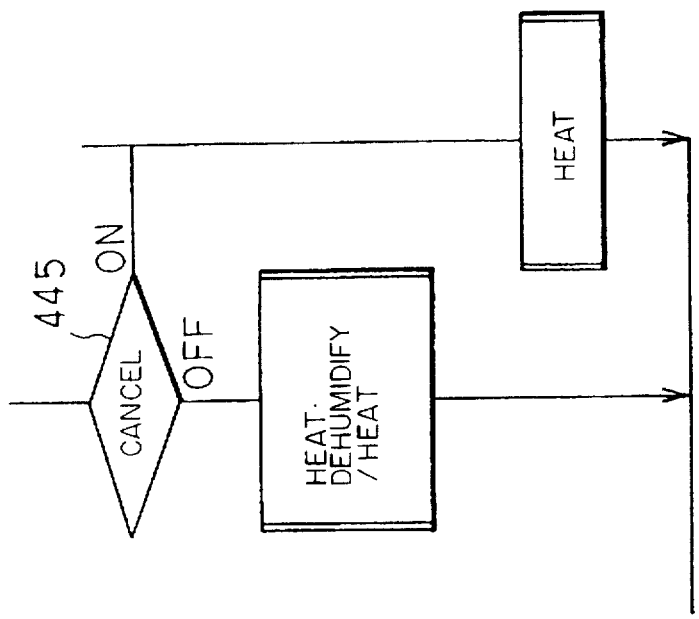
FIG. 46 is a flow chart showing a yet further form of the flow chart shown in FIG. 41.

It is to be noted that, while, in the flow chart shown in FIG. 45, dehumidifying operation having some heating effect is performed if dehumidification is necessary when heating operation is selected at step 443, alternatively dehumidifying operation having some heating effect and heating operation may be performed alternately as seen from FIG. 46. In this instance, such alternate operation may be performed at intervals of 5 to 10 minutes or so. Consequently, even upon dehumidifying operation, heating of the room of the automobile can be performed well.

A flow chart of control wherein, when dehumidifying operation is selected at step 443, the operation is changed over to heating operation is shown in FIG. 47.

This is because, since the evaporator 207 operates, in a dehumidifying operation condition, so that cool air is normally admitted into the evaporator 207 from outside the automobile as described above, there is the possibility that the evaporator 207 may be frozen. If the evaporator 207 is frozen, then the ventilation resistance is increased and the heat exchanging efficiency is deteriorated.

Therefore, in the flow chart of FIG. 47, a frozen condition of the evaporator 207 is judged at step 450. The judgment at step 450 determines a frozen condition of the evaporator 207 when the detection temperature signal from the temperature sensor for detecting a temperature of the surface of the evaporator 207 is lower than 0° C. and the temperature of air having passed the evaporator 207 is lowered to 0° C. or so.

If a frozen condition of the evaporator 207 is not determined at step 450, dehumidifying operation is performed. However, when a frozen condition of the evaporator 207 is detected at step 450, the control sequence advances to step 451. At step 451, it is judged whether or not the room temperature is equal to or higher than a preset temperature. Then, if a condition wherein the room temperature is equal to or higher than the preset temperature is determined at step 451, then this is a condition wherein no heating is required for the room of the automobile. Accordingly, in this instance, the operation is not changed over to heating operation. However, since a frozen condition of the evaporator 207 has been determined at step 450, the discharging capacity of the evaporator 201 is lowered in order to cancel the frozen condition. Consequently, the evaporating capacity of the evaporator 207 is lowered so that at least freezing at the evaporator 207 may not proceed any more.

If a condition wherein the room temperature is lower than the preset temperature is determined at step 451, then since heating operation will not cause the passenger to have a disagreeable feeling in this condition, the operation is changed over to heating operation.

It is to be noted that it is naturally possible to eliminate the step 451 in the control flow chart of FIG. 45. In other words, the operation may be changed over to heating operation if freezing at the evaporator 207 is detected at step 450.

Subsequently, control when a frosted condition of the outside heat exchanger 202 is detected in a heating operation condition and the operation is changed over to dehumidifying operation will be described. Referring to the flow chart of FIG. 48, when a heating mode is selected at step 443, a frosted condition of the outside heat exchanger 202 is detected at subsequent step 452.

This is because, since the outside heat exchanger 202 operates as an evaporator in a heating operation condition as described hereinabove, there is the possibility that frost may appear on the surface of the outside heat exchanger 202 when the temperature of of outside air is low. The judgment at step 452 is performed in the following conditions. First, it is judged whether or not the heating operation time in a condition wherein the temperature of the outside heat exchanger 202 is lower then -3° C. has continued for more than one hour, and then it is judged whether or not the temperature of the outside heat exchanger 202 is lower by 12° C. or more than the temperature of outside air. When the temperature of the outside heat exchanger 202 is not lower than -3° C., this indicates that the temperature of the surface of the outside heat exchanger 202 is not so low as will lead to frosting, and when the temperature of the outside heat exchanger 202 is not lower by 12° C. or more than the temperature of outside air, this indicates that a sufficient evaporating function is assured with the outside heat exchanger 202. In other words, if frost appears on the surface of the outside heat exchanger 202, then passage of heat is obstructed, and as a result, the evaporating action of the outside heat exchanger 202 is deteriorated. Therefore, the evaporating pressure of refrigerant is decreased in order to maintain the function of the refrigerating cycle. Then, refrigerant having such a decreased evaporating pressure exhibits further decrease of the evaporating temperature, and as a result, the temperature of the outside heat exchanger 202 becomes lower by 12° C. or more than the temperature of outside air supplied to the outside heat exchanger 202.

Further, the reason why it is judged whether or not the refrigerant supplying time to the outside heat exchanger 202 has elapsed for more than one hour is that normally it is a phenomenon which appears after continuous operation for more than one hour that frost appears on the outside heat exchanger 202 to such a degree that it has a significant effect on the heating performance of the outside heat exchanger 202.

Figure 52:
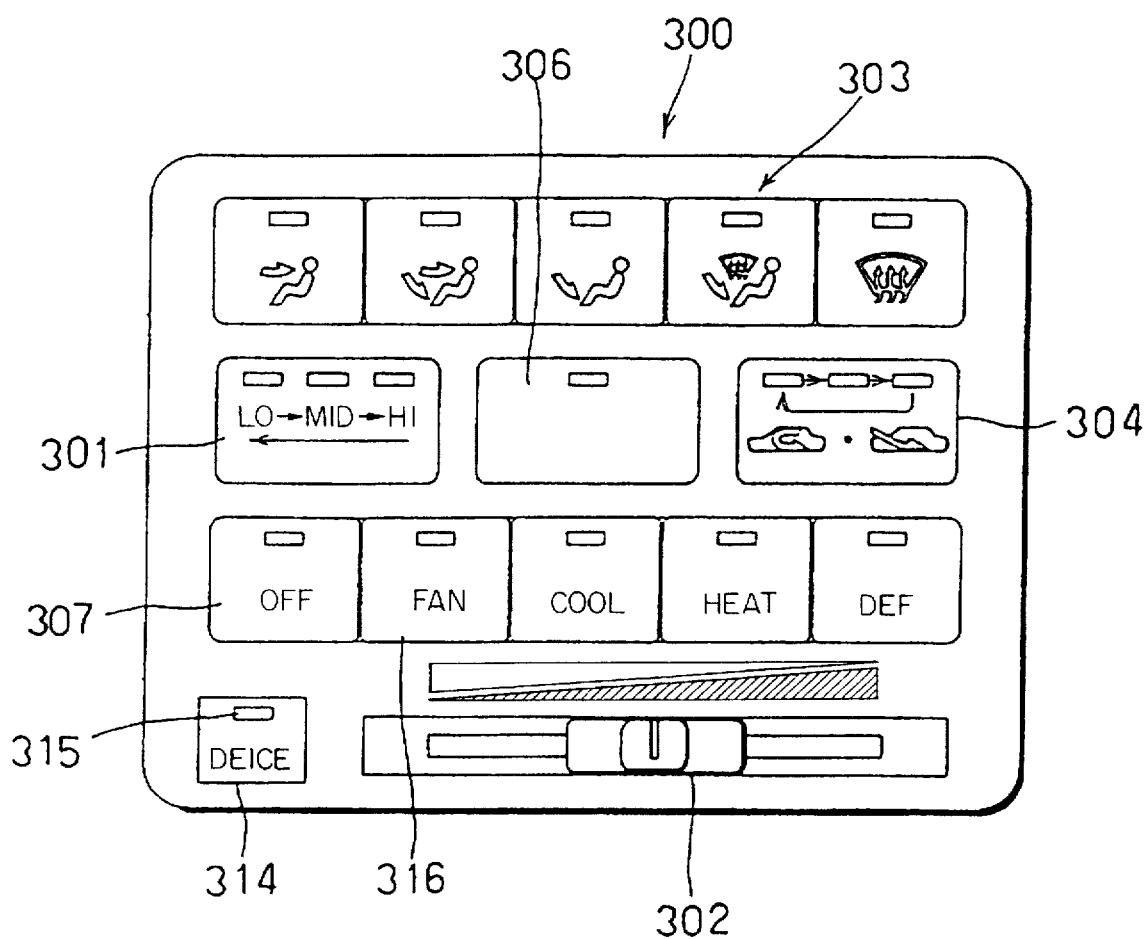
FIG. 52 is a front elevational view showing an example of operation panel used in the present invention.

A condition of the outside heat exchanger 202 is detected in this manner at step 452, and if no frost is determined, then heating operation is continued. On the contrary if a frosted condition is determined at step 452, then a display of such frosting is provided at step 452. The passenger can find the necessity of defrosting from the frosting display. FIG. 52 shows an example of an operation panel which includes an LED 315 for displaying a frosted condition. The operation panel further includes a defrosting switch 314 for starting defrosting, and if the defrosting switch 314 is switched on, then this is detected at step 453. In response to such detection, the operation of the automotive air conditioner is changed over to dehumidifying operation. It is to be noted that the dehumidifying operation in this instance is a refrigerating cycle wherein the outside heat exchanger 202 acts as a condenser. In other words, even in dehumidifying operation, a cycle wherein the outside heat exchanger 202 acts as an evaporator is excepted in the present control.

It is to be noted that, with the operation panel shown in FIG. 52, not only operation of the automotive air condition but also operation of the blower 132 are stopped simultaneously by means of a stop switch 307. When only the blower 132 is to operate, a blower switch 316 will be switched on. Changing over of the capacity of the blower 132 upon air blasting is performed by way of the switch 301.

In order to facilitate defrosting, the compressor 201 has a great capacity. Further, the inside/outside air changing over damper 131 is changed over to an inside air mode position so that the heating capacity may not be deteriorated when dehumidifying operation is entered. Further, the auxiliary heaters 700 and 701 are rendered operative if necessary. Besides, the blowing air amount of the blower 132 is decreased to prevent a drop of the blown out air temperature. In addition, the blower 251 for the outside heat exchanger 202 is stopped.

As a result, high pressure refrigerant discharged from the compressor 201 is supplied into the outside heat exchanger 202 so that frost adhering closely to the surface of the outside heat exchanger 202 can be melted by heat of the refrigerant.

Figure 49:
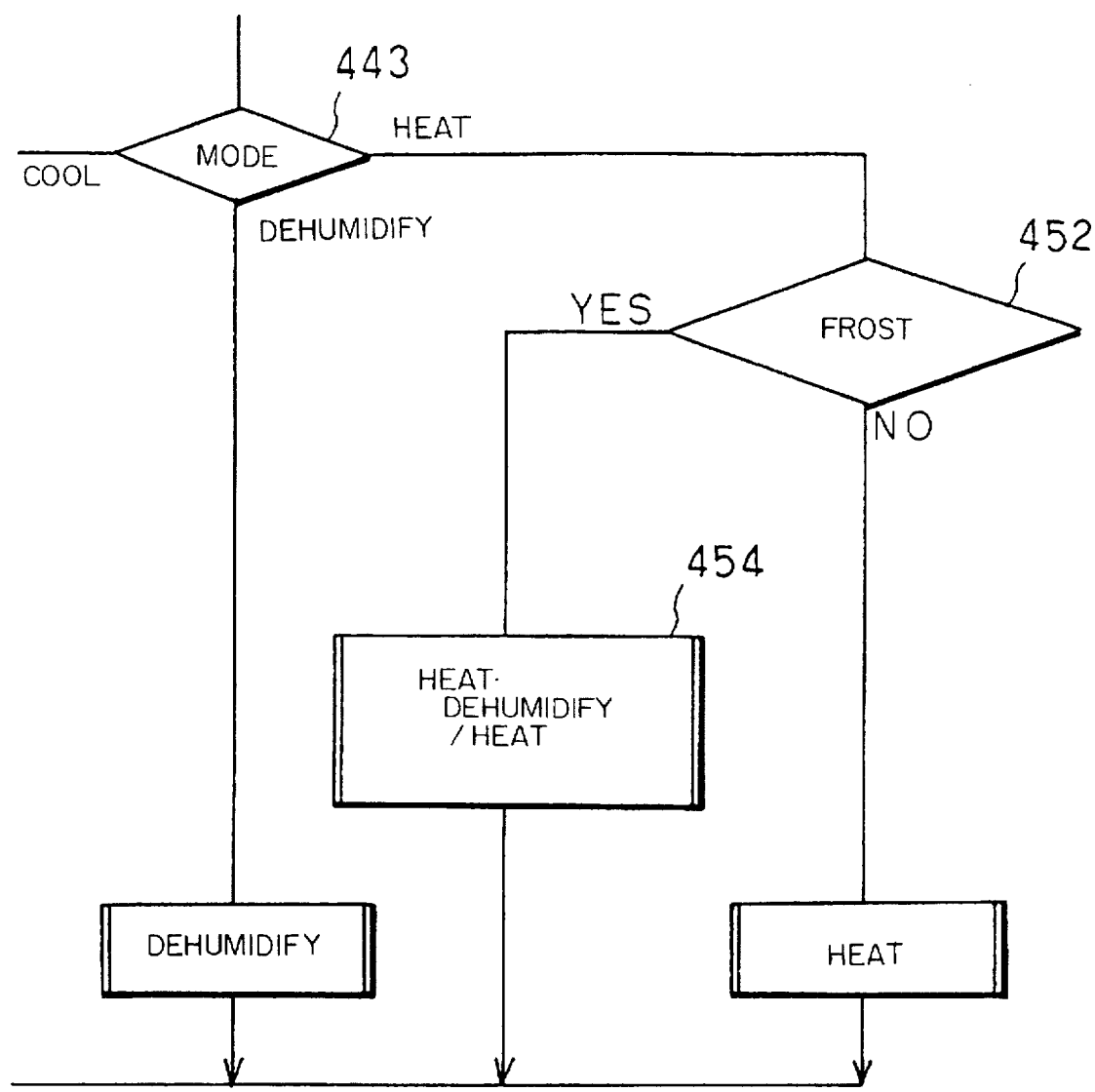
FIG. 49 is a flow chart showing another form of the flow chart shown in FIG. 48.

It is to be noted that, while, in the flow chart shown in FIG. 48, dehumidifying operation is performed when defrosting is required, alternatively dehumidifying operation having some heating effect and heating operation may be performed alternately as seen from the flow chart shown in FIG. 49. In particular, as seen at step 454 of FIG. 49, dehumidifying operation and heating operation may be performed alternately in such a manner that dehumidifying operation is performed for a predetermined period of time, for example, for 1 to 5 minutes or so after heating operation has been performed for another predetermined period of time, for example, for 30 minutes to one hour.

It is to be noted that, in this instance, the condition whether or not the function of the outside heat exchanger 202 as an evaporator has continued for more than one hour is eliminated from the conditions for detection of frosting at step 452. In other words, presence or absence of frost is judged depending upon whether or not the temperature of the outside heat exchanger 202 is lower by more than the predetermined temperature than the temperature of outside air and whether or not the temperature of the outside heat exchanger 202 is lower than −3° C. Here, the temperature difference between the temperature of the outside heat exchanger 202 and the temperature of outside air is not set to 12° C. or more as at step 452 of the flow chart shown in FIG. 48 but set to 8° C. or more at step 452 of the flow chart shown in FIG. 49. This is because it is intended to precautionarily detect possible or forecast frost on the outside heat exchanger 202 before the outside heat exchanger 202 is completely frosted.

Further, in the present flow chart, in dehumidifying operation having some heating effect at step 454, the inside/outside air changing over damper 131 need not completely be changed over to its inside air admitting position but may be set to another position at which both of inside air and outside air can be admitted.

Subsequently, dehumidifying operation having some heating effect described in the control above will be described.

In dehumidifying operation, air is first cooled in the evaporator 207 and then heated in the condenser 203, but since heat is used for sensible heat for condensing moisture in air in the evaporator 207 as described hereinabove, the temperature of the air is not lowered very much, and as a result, the temperature of air having passed both of the evaporator 207 and the condenser 203 rises. Further, since dehumidifying operation involves at least three heat exchangers including the condenser 203, the evaporator 207 and the outside heat exchanger 202, the refrigerant condensing pressure, that is, the condensing temperature, of the condenser 203 can be variably controlled by variably controlling the heat exchanging capacity of the outside heat exchanger 202. For example, when both of the condenser 203 and the outside heat exchanger 202 perform a condensing action in such a refrigerating cycle as shown in FIG. 21, the condensing capacity as a refrigerating cycle can be varied by controlling the blower 251 for the outside heat exchanger 202. When the blower 251 operates to blast a great amount of air, the condensing capacity is increased, and as a result, the condensing pressure of refrigerant is lowered. This signifies a drop of the condensing temperature of refrigerant and will cause a drop of the temperature of the condenser 203.

On the contrary when the blower 251 stops its operation, the heat exchanging capacity of the outside heat exchanger 202 is lowered, and as a result, the condensing capacity of the refrigerating cycle is lowered. Consequently, the condensing pressure of refrigerant is increased and the condensing temperature of refrigerant in the condenser 203 is raised. This will raise the temperature of the condenser 203, thereby achieving dehumidifying operation having some heating effect.

Various means for varying the condensing capacity of the outside air conditioner may be available in addition to such control of the blower 251 as described above.

For example, in a refrigerating cycle which employs a damper such as the refrigerating cycle shown in FIG. 14 which employs the damper 253, the circuit of the damper 253 may be controlled so as to regulate the amount of air to be admitted into the outside heat exchanger 202 thereby to vary the heat exchanging capacity of the outside heat exchanger 202. Further, where the outside heat exchanger 202 is divided into a plurality of outside heat exchangers, the heat exchanging capacity may be controlled by controlling the effective heat exchanging area of the outside heat exchanger 202. Further, if necessary, coolant such as water is flowed into the outside heat exchanger, and the amount of the coolant may be controlled to control the heat exchanging capacity of the outside heat exchanger 202.

Further, in an apparatus wherein air to be admitted into the outside heat exchanger 202 is changed over between outside air and air in the room of the automobile, the temperature of air to be admitted into the outside heat exchanger 202 may be varied to control the heat exchanging capacity of the outside heat exchanger 202.

Further, in such an apparatus as shown in FIG. 33 wherein refrigerant discharged, upon dehumidifying operation, from the compressor 201 is supplied in parallel to both of the condenser 203 and the outside heat exchanger 202, the flow rate of refrigerant to be supplied to the heat exchanger 202 may be varied by opening/closing control of the valve 294. In particular, when the valve 294 is in an open condition, refrigerant flows to both of the outside heat exchanger 202 and the condenser 203 so that a sufficient condensing action is performed by the two heat exchangers 202 and 203. On the contrary when the valve 294 is closed, a condensing action is performed only in the condenser 203, and consequently, the condensing capacity is low.

The capacity controls of the outside heat exchanger 202 described above may be used not only for dehumidifying operation having some heating effect but also for control of the an entire refrigerating cycle. For example, when the pressure of the high pressure side refrigerant rises abnormally during dehumidifying operation, the capacity of the outside heat exchanger 202 may be varied in order to protect the refrigerating cycle.

Figure 50:
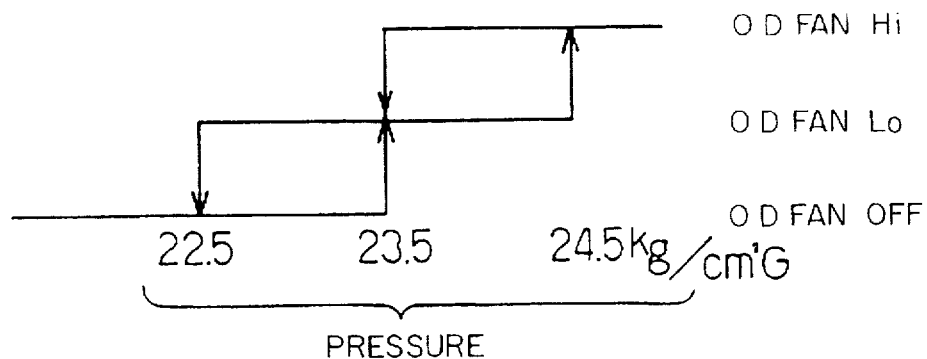
FIG. 50 is a diagram illustrating a form of control of a blower for an outside heat exchanger of a refrigerating cycle of the present invention.

FIG. 50 shows a flow chart of operation for controlling the blower 251 for the outside heat exchanger 202 for the object described just above. Where fleon R22 is employed as refrigerant, when the high pressure side refrigerant pressure becomes higher than 24.5 kg/cm² G, the blower 251 is rotated at a high speed. On the contrary when the high pressure side refrigerant temperature becomes lower than 22.5 kg/cm² G, the blower 251 is stopped. In an intermediate region between them, the blower 251 is rotated at a low speed with some predetermined hysteresis.

Figure 51:
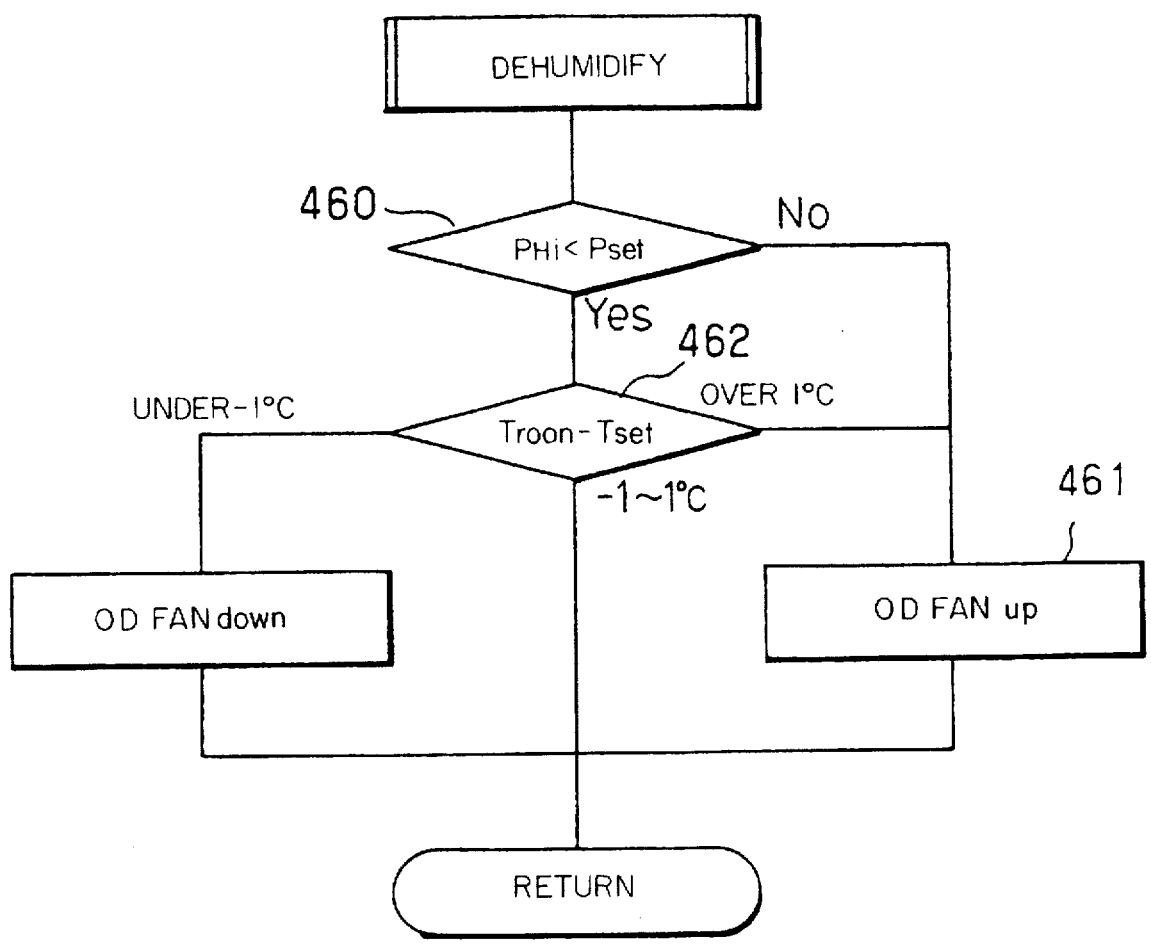
FIG. 51 is a flow chart illustrating an example of control when a refrigerating cycle of the present invention is used in dehumidifying operation.

FIG. 51 shows a control flow chart when capacity control of the outside heat exchanger 202 is executed in order to achieve both of protection of the refrigerating cycle and achievement of agreeability in operation. Upon dehumidifying operation, a pressure on the high pressure side of the refrigerating cycle is compared with a preset value at step 460. If the high pressure side pressure is higher than the preset value, for example, 24.5 kg/cm² G, then the capacity of the blower 251 for the outside heat exchanger 202 is increased at step 461. Consequently, the condensing capacity is enhanced and a rise in pressure to a high pressure in the refrigerating cycle is prevented.

In case it is determined that the high pressure side pressure is not higher than the preset value, a room temperature is compared with a preset temperature subsequently at step 462.

In case the room temperature is higher by 1° C. or more than the preset temperature, it is determined that the heating capacity is not required very much any more, and the amount of air of the blower 251 is increased to increase the condensing capacity. On the contrary, when the room temperature is lower by 1° C. or more than the preset temperature, it is determined that an increase of the heating capacity is required, and the amount of air to be blasted from the blower 251 is decreased. Consequently, the condensing capacity of the outside heat exchanger 202 is decreased thereby to increase the condensing pressure and the condensing temperature of the condenser 203.

If the room temperature is within ±1° C. of the preset temperature, the current condition of the blower 251 is maintained after then.

Figure 53:
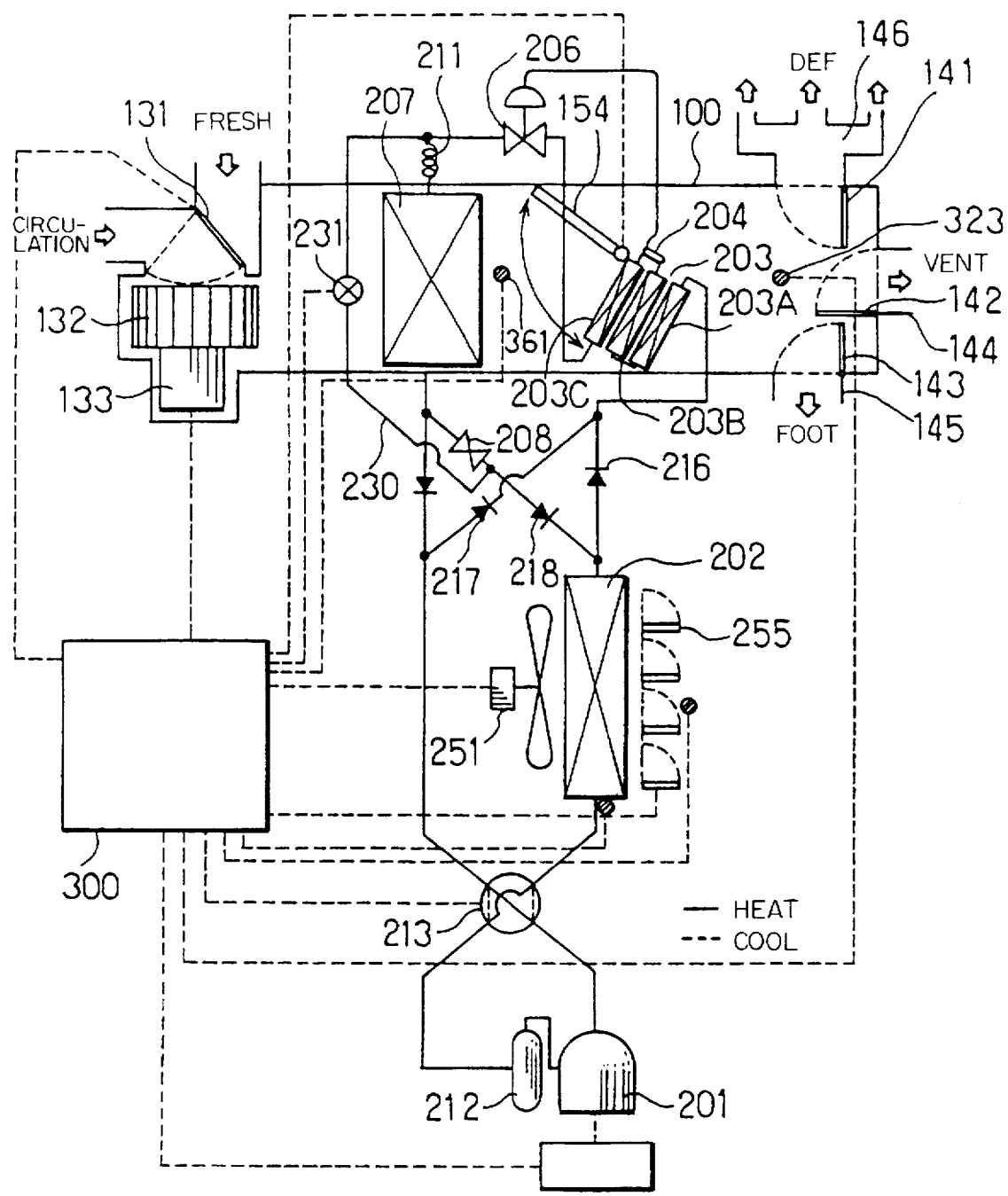
FIG. 53 is a diagrammatic view showing a yet further preferred embodiment of the present invention.

FIG. 53 shows a yet further automotive air conditioner according to the present invention. In the present automotive air conditioner, three heaters 203 are arranged in series at three stages in the direction of a flow of air in the duct 100. A temperature sensing tube 204 is disposed at a refrigerant pipe on the upstream side of the subcooler 203c which is positioned on the most upstream side in the direction of a flow of air among the heaters 203, and the expansion valve 206 variably controls the refrigerating passage so that refrigerant may present a predetermined temperature at the entrance of the subcooler 203c.

In the present automotive air conditioner, the expansion valve 206 controls the refrigerant passage so that refrigerant having passed the condenser 203b has a subcooling degree of 2° to 3° C. When the temperature of air which passes the heaters 203 is low or when the flow rate of air is high, refrigerant is liable to be condensed in the heaters 203 and refrigerant having passed the condenser 203b may possibly have a sufficient subcooling degree. In this instance, a drop of the temperature of refrigerant is detected by the temperature sensing tube 204 and fed back to the expansion valve 206, and consequently, the expansion valve 206 varies the refrigerating passage in an expanding direction. As a result, the pressure of refrigerant on the heaters 203 side is dropped, and the subcooling degree of refrigerant upon passage of the condenser 203b is decreased.

On the contrary when the flow rate of air to be admitted into the heaters 203 is low or the like, sufficient radiation of heat cannot be performed with the condensers 203a and 203b. As a result, even after refrigerant passes the condenser 203b, a sufficient subcooling degree of refrigerant cannot be achieved. In this condition, the temperature of refrigerant at the heat sensing tube 204 rises, and a signal thereof is fed back to the expansion valve 206. Consequently, the expansion valve 206 varies the refrigerating passage in a narrowing direction. As a result, the pressure of refrigerant in the heaters 203 on the downstream side of the expansion valve 206 is raised, and refrigerant becomes liable to be condensed. In other words, it becomes liable to achieve subcooling with an equal flow rate of air.

In this manner, the subcooling degree of refrigerant at the location of the temperature sensing tube 204 can be maintained to a predetermined value by variably controlling the passage of refrigerant by means of the expansion valve 206 in response to the temperature sensing tube 204.

Since, in the present automotive air conditioner, refrigerant at the location of the temperature sensing tube 204 has the subcooling degree of 2° to 3° C. as described above, the subcooler 203c located on the downstream side of the temperature sensing tube 204 in a flow of refrigerant can provide a subcooling degree of refrigerant with certainty.

In particular, since the subcooler 203c admits on the entrance side thereof refrigerant which already has a predetermined (2° to 3° C.) subcooling degree, refrigerant after passing the subcooler 203c has a higher subcooling degree. While the width of the subcooling degree is not fixed depending upon the temperature and/or the flow rate of air admitted into the subcooler 203c, the subcooling degree can be increased with certainty.

To increase the subcooling degree leads to an increase of the enthalpy of refrigerant on the heat radiation side and hence to enhancement of the operation efficiency of the refrigerating cycle.

Particularly in the present automotive air conditioner, since the subcooler 203c is disposed on the downstream side of the location of the temperature sensing tube 204, improvement in operation efficiency of the refrigerating cycle can be achieved with certainty by subcooling by the subcooler 203c. Particularly where the subcooler 203c is used together with the air mixing damper 154 as in an automotive air conditioner, the flow rate of air flowing into the heaters 203 side varies to a great extent in response to the opening of the air mixing damper 154. Further, the temperature of air flowing into the heater 203 is different to a great extent between that when refrigerant flows through the evaporator 207 and that when refrigerant flows along the bypass passageway 230 bypassing the evaporator 207.

In this manner, in an automotive air conditioner, since the flow rate and the temperature of air flowing into the heaters 203 vary to a great extent, in order to assure a subcooling degree in any operating condition, preferably the subcooler 203c is disposed on the downstream side of the temperature sensing tube 204 as in the present automotive air conditioner.

Further, in the automotive air conditioner of FIG. 53, a shutter 255 for limiting admission of air is provided forwardly of the outside heat exchanger 202. The shutter 255 corresponds to the function of the damper 253 in the automotive air conditioner shown in FIG. 14, and the occupying area can be reduced by provision of the shutter 255 shown in FIG. 53 in place of the damper 253. Further, the automotive air conditioner shown in FIG. 53 includes, similarly to the automotive air conditioner shown in FIG. 18, a fan 251 for electrically controlling air to be admitted into the outside heat exchanger 202.

The shutter 255 described above is particularly effective upon defrosting operation of the refrigerating cycle. The defrosting operation is operation wherein refrigerant in a high temperature, high pressure condition is admitted, when frost on the outside heat exchanger 202 is detected during heating operation, into the outside heat exchanger 202 to raise the temperature of the outside heat exchanger 202 to melt the frost frozen on the outside heat exchanger 202. Since defrosting operation is performed during heating operation wherein the temperature of outside air is low in this manner, if a large amount of outside air is admitted into the outside heat exchanger during defrosting operation, then much time is required for such defrosting and defrosting may sometimes be impossible. Particularly with an automotive heat exchanger, since the outside heat exchanger 202 is disposed at a position at which it likely meets with a driving wind of the vehicle, it will have a significant influence upon defrosting operation that the outside heat exchanger 202 is cooled by a driving wind during running of the automobile.

Thus, with the present automotive air conditioner, upon defrosting operation, the shutter 255 is closed to prevent a driving wind from being admitted into the outside heat exchanger 202, and also operation of the fan 251 for the outside heat exchanger 202 is stopped.

Subsequently, a controlling method for the refrigerating cycle shown in FIG. 53 will be described. Judgment whether the refrigerating cycle should operate in heating operation, dehumidifying heating operation, dehumidifying operation, cooling operation or defrosting operation for the outside heat exchanger is made in accordance with a flow of operations similar to that of the control shown in FIG. 48. The four-way valve 213, solenoid valve 231 and shutter 255 are opened and closed in the individual modes in such a manner as seen from FIG. 54.

It is to be noted that the four-way valve 213 is changed over, similarly as in the automotive air conditioners described hereinabove, between a position (cooler condition) in which refrigerant discharged from the compressor 201 flows to the outside heat exchanger 202 side and returning refrigerant from the evaporator 207 side is sucked into the compressor 201 and another position (heater condition) in which refrigerant discharged from the compressor 201 flows to the heaters 203 side and returning refrigerant is sucked from the outside heat exchanger 202 into the compressor 201.

Meanwhile, the solenoid valve 231 opens or closes the bypass passageway 230 for flowing refrigerant bypassing the evaporator 207 therethrough. Accordingly, when the solenoid valve 231 is open, refrigerant flows through the bypass passageway 230 and does not substantially flow to the evaporator 207 side. On the contrary, when the solenoid valve 231 is in a closed condition, refrigerant flows to the evaporator 207 side.

Figure 54:
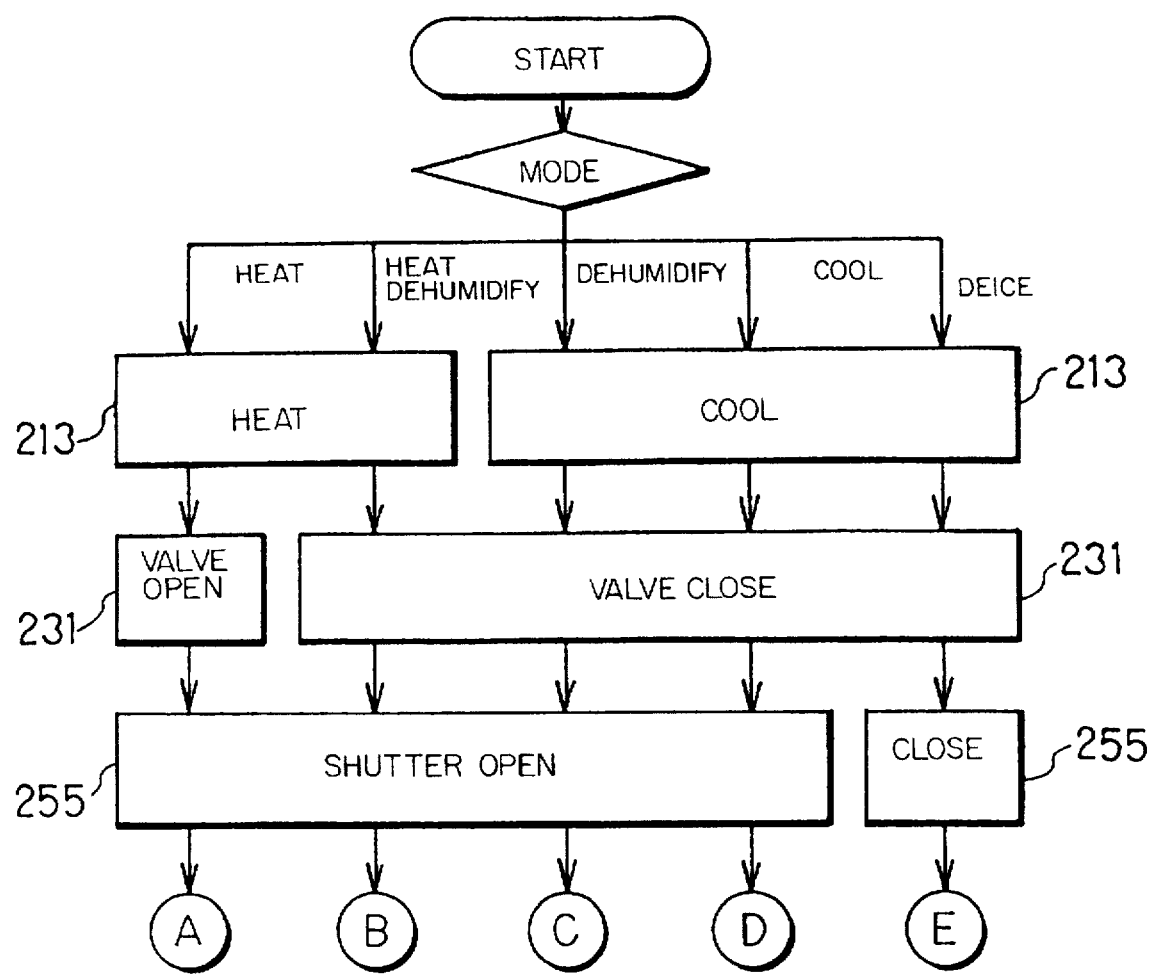
FIG. 54 is a flow chart illustrating an example of control of the automotive air conditioner shown in FIG. 53.

As seen from the control illustrated in FIG. 54, upon heating operation and upon dehumidifying heating operation, the four-way valve 213 is changed over to the heater condition, in which refrigerant in a high temperature, high pressure condition is supplied to the heaters 203. On the other hand, upon dehumidifying operation, upon cooling operation and upon defrosting operation, the four-way valve 213 is changed over to the cooler condition wherein refrigerant in a high temperature, high pressure condition is supplied to the outside heat exchanger 202.

The solenoid valve 231 is opened only upon heating operation but is closed in any other mode. In particular, only upon heating operation, refrigerant flows bypassing the evaporator 207. As a result, upon heating operation, the evaporator 207 does not function, and air flowing in the duct 100 is not cooled by the evaporator 207 at all. In any other operation condition, refrigerant is supplied into the evaporator 207 after passing the capillary tube 211, and the evaporator 207 functions as a cooler for air.

The shutter 255 is closed only upon defrosting of the outside heat exchanger 202 as described above but is open in any other operation condition.

Figure 55:
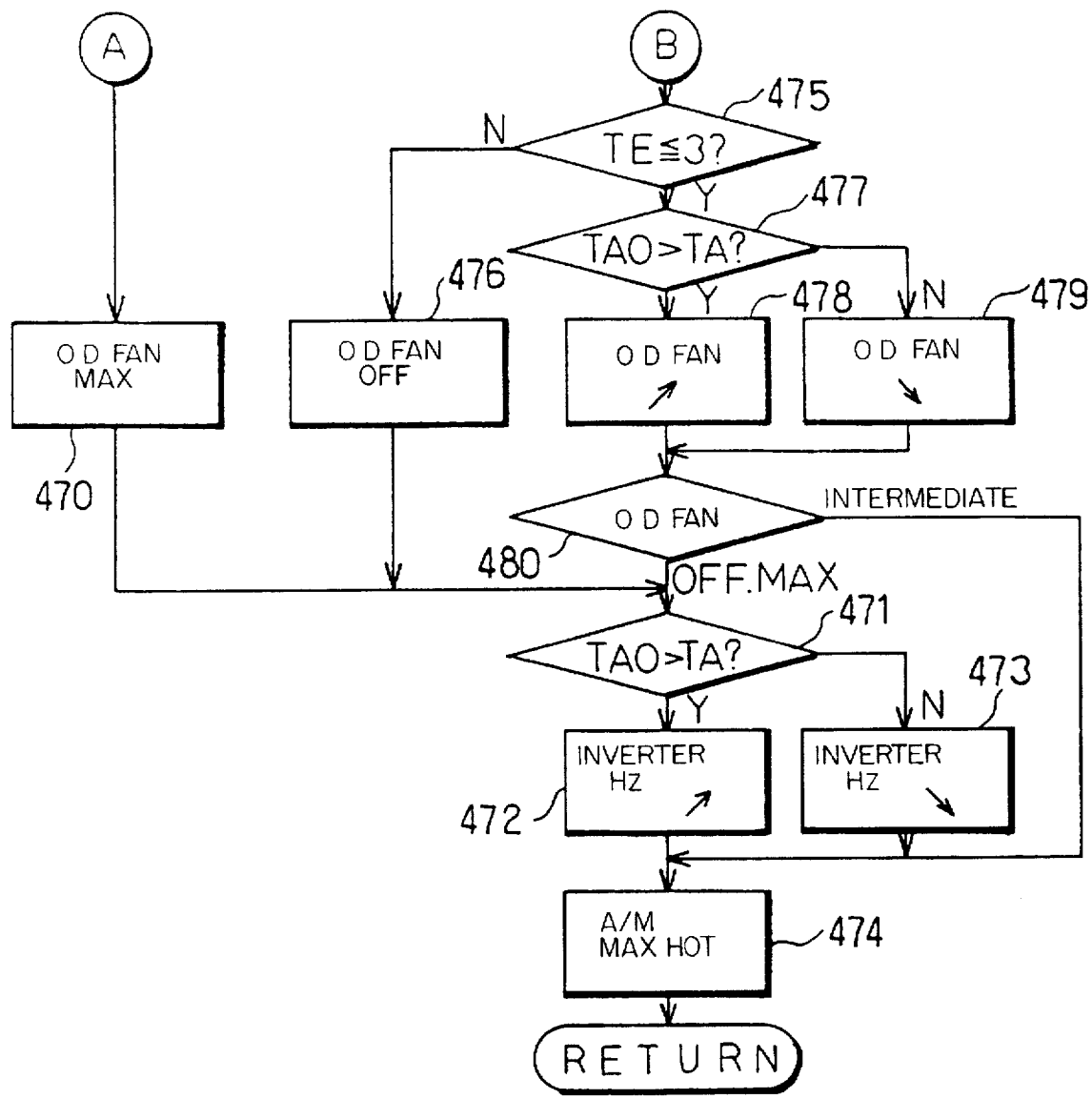
FIG. 55 is a flow chart illustrating another example of control of the automotive air conditioner shown in FIG. 53.
Figure 56:
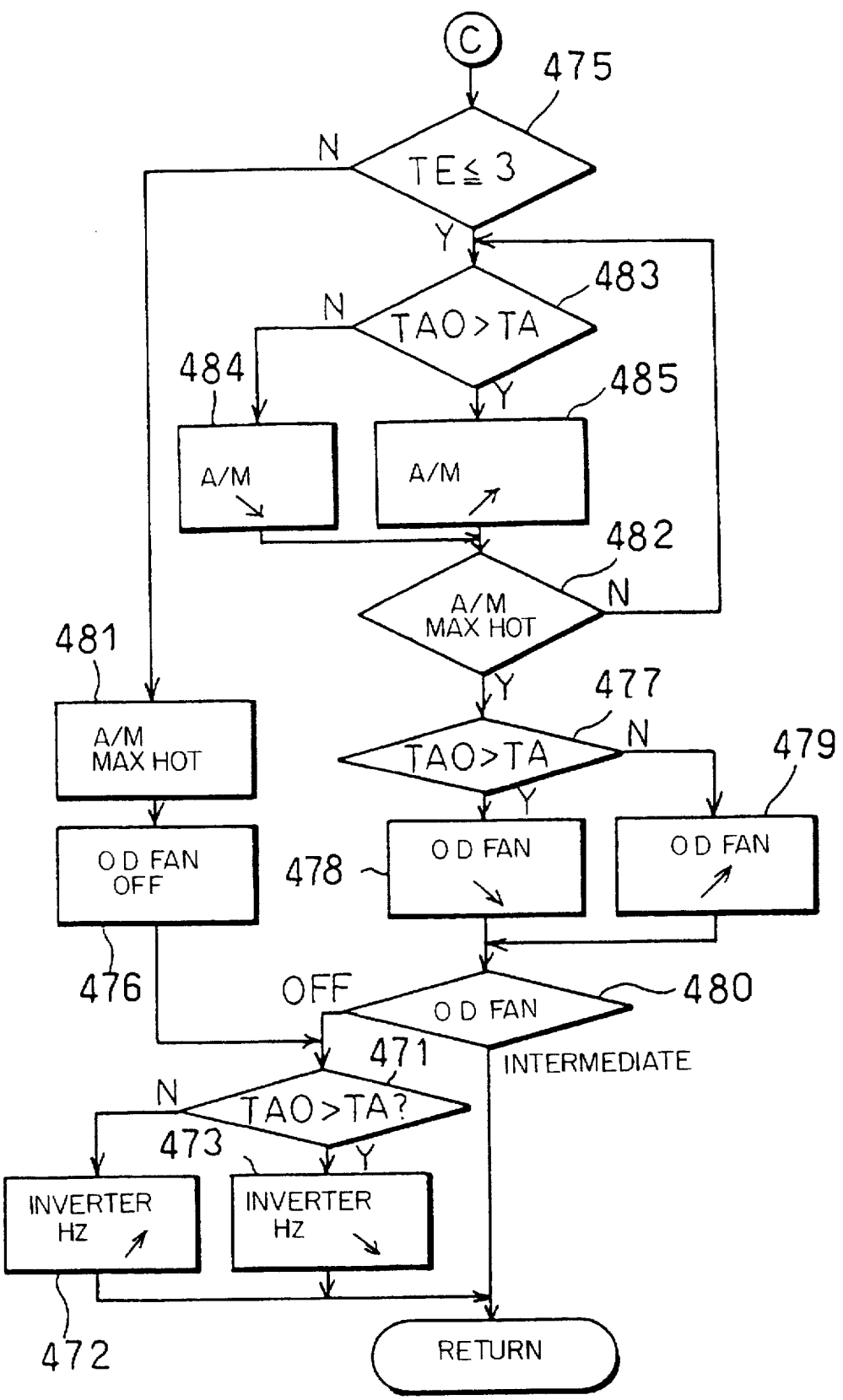
FIG. 56 is a flow chart illustrating a further example of control of the automotive air conditioner shown in FIG. 53.

In a heating condition A and a dehumidifying heating condition B of FIG. 54, such control as illustrated in FIG. 55 is executed. In particular, referring to FIG. 55, in a heating operation condition, the fan 251 for the outside heat exchanger 202 is rotated at its maximum speed at step 470. Consequently, when the heat pump is operated, absorption of heat from outside air is maximized.

In particular, upon heating operation, refrigerant discharged from the compressor 201 flows through the four-way valve 213 into the heaters 203, in which it is condensed and liquefied, whereafter it flows through the expansion valve 206 and the bypass passageway 230 into the outside heat exchanger 203. Thus, the outside heat exchanger 202 acts as an evaporator to evaporate the refrigerant, and after then, the refrigerant is fed back to the compressor 201 by way of the four-way valve 203. Accordingly, since, upon heating operation, refrigerant is evaporated in the outside heat exchanger 202 to absorb heat from outside air, also the outside heat exchanger 201 to maximize the amount of heat to be absorbed is rotated at its maximum speed.

The speed of rotation of the compressor 201 is determined from a result of comparison between an aimed blown out air temperature TAO and a blown out air temperature TA. The blown out air temperature TA is determined in accordance with a signal from the blown out air temperature sensor 323. The blown out air temperature sensor 323 is disposed at a position at which a warm wind having passed the heaters 203 and a cool wind having bypassed the heaters 203 are mixed with each other. When the aimed blown out air temperature is higher than the actual blown out air temperature, this condition is determined at step 471, and the frequency of the invertor is increased at step 472. On the contrary when the actual blown out air temperature TA is higher than the aimed blown out air temperature TAO, the frequency of the invertor is decreased at step 473.

The air mixing damper 154 is positioned at step 474 such that the entire amount of air is not flown to the heaters 203 side in order to prevent a cool wind from being blown out into the room of the automobile upon heating operation and also upon dehumidifying heating operation described below.

Subsequently, control of dehumidifying heating operation B of FIG. 54 will be described.

In dehumidifying heating operation, the solenoid valve 231 is closed so that refrigerant flows to the evaporator 207 side. In particular, in this condition, the heater 204 acts as a condenser while both of the evaporator 207 and the outside heat exchanger 202 operate as evaporators.

It is judged at step 475 whether or not the temperature of air having passed the evaporator 207 is equal to or lower than 3° C. It is to be noted that the air temperature is judged in accordance with a signal from a temperature sensor 361 disposed on the downstream side of the evaporator 207. When the air temperature is higher than 3° C., the heat exchanging capacity of the outside heat exchanger 202 is lowered and the fan 251 for the outside heat exchanger 202 is stopped in order to lower the evaporating pressures in the evaporator 207 and the outside heat exchanger 202 at step 276.

In any other condition, the speed of rotation of the fan 251 for the outside heat exchanger 202 is controlled in accordance with a result of comparison between the aimed blown out air temperature and the actual blown out air temperature. In case the aimed blown out air temperature is higher than the actual blown out air temperature TA, this condition is detected at step 477, and the speed of rotation of the fan 251 for the outside heat exchanger 202 is raised at step 478. Consequently, the amount of heat to be absorbed in the outside heat exchanger 202 is increased to raise the blown out air temperature. On the contrary, when the actual blown out air temperature TA is higher than the aimed blown out air temperature TAO, the speed of rotation of the fan 251 is lowered so as to lower the amount of heat to be absorbed in the outside heat exchanger 202.

While rotation of the fan 251 for the outside heat exchanger 202 is controlled in response to the aimed blown out air temperature TAO in this manner, when the rotation is in an intermediate region or is advancing from a maximum or minimum region to the intermediate region, this condition is detected at step 480, and the air mixing damper 154 is opened to its maximum opening at step 474. In any other condition, the control sequence advances to step 471 to control rotation of the invertor for the compressor 201.

In particular, in the control illustrated in FIG. 55, control of the capacity of the refrigerating cycle upon dehumidifying heating is first executed by the fan 251 for the outside heat exchanger 202, and only after rotation of the fan 251 for the outside heat exchanger 202 becomes equal to its maximum or minimum, control of the discharging capacity of the compressor 201 by the invertor is executed.

Subsequently, dehumidifying operation C shown in FIG. 54 will be described.

In such dehumidifying operation, the four-way valve 213 is changed over so that the outside heat exchanger 202 and the heaters 203 act as condensers and evaporation of refrigerant is performed in the evaporator 207.

Also upon dehumidifying operation, it is judged at step 475 whether or not the temperature of outside air is equal to or lower than 3° C., and in case the outside air temperature is equal to or lower than 3° C., the fan 251 for the outside heat exchanger 202 is stopped at step 476. Further, in this instance, the circuit of the air mixing damper 154 is changed over at step 481 to a condition wherein the entire amount of air flows to the heaters 203 side.

Temperature control of the refrigerating cycle when the outside air temperature is higher than 3° C. is performed first by the air mixing damper 154 and then by the fan 251 for the outside heat exchanger 251 and finally by capacity control of the compressor 281. The capacity controls of the outside heat exchanger and the compressor are similar to those in a dehumidifying heating operation condition described hereinabove.

In the control by the air mixing damper 154, before it is detected at step 482 whether or not the air mixing damper 154 is at its maximum heating position, the aimed blown out air temperature TAO and the actual blown out air temperature TA are compared with each other at step 483 and then the opening of the air mixing damper 154 is regulated at step 484 or 485.

Figure 57:
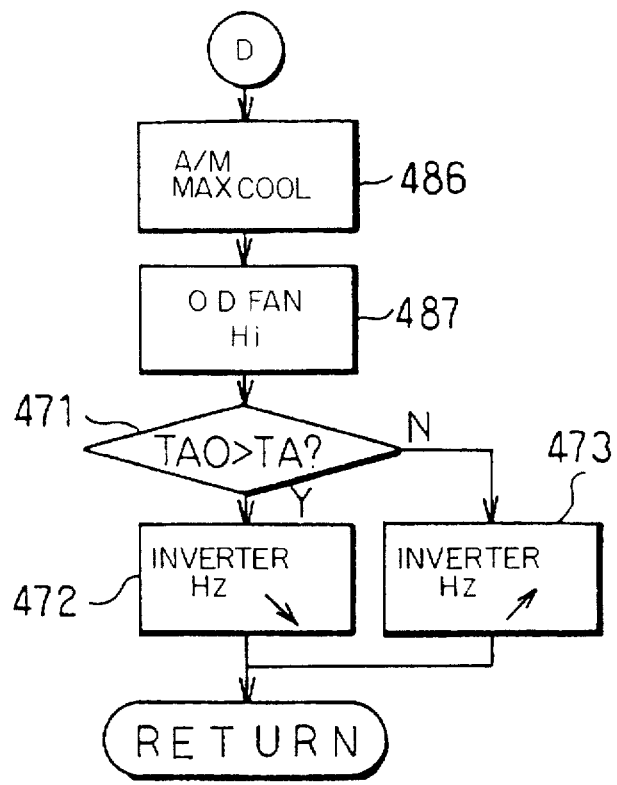
FIG. 57 is a flow chart illustrating a still further example of control of the automotive air conditioner shown in FIG. 53.

Subsequently, cooling operation D in FIG. 54 will be described with reference to FIG. 57.

Upon cooling operation, refrigerant first flows into the outside heat exchanger 202 and is then decompressed and expanded in the expansion valve 206 after passing the heaters 203, whereafter it flows into the evaporator 207. The refrigerant is thus evaporated in the evaporator 207 and then returns to the compressor 207 by way of the accumulator 212. Upon such heating operation, since air is not heated by the heaters 203, the air mixing damper 154 is displaced at step 486 to a position at which it closes the heaters 203. Meanwhile, since the outside heat exchanger 202 operates as a condenser, rotation of the fan 251 for the outside heat exchanger 202 is raised to its maximum in order to maximize the heat radiating capacity of the condenser 202 at step 487. In this condition, control of the cooling capacity is performed by varying the discharging capacity of the compressor 201 at steps 471 and 272 or 473.

Figure 58:
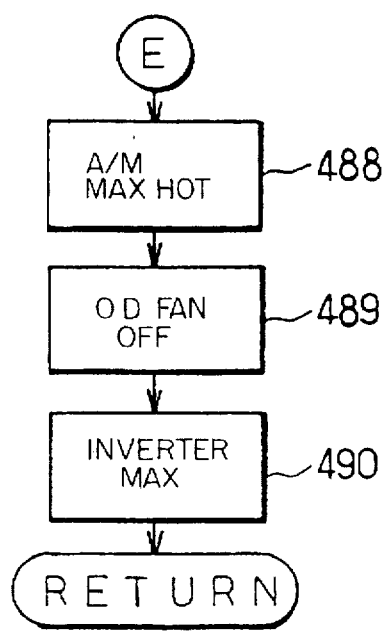
FIG. 58 is a flow chart illustrating a yet further example of control of the automotive air conditioner shown in FIG. 53.

Subsequently, defrosting operation E in FIG. 54 will be described with reference to FIG. 58.

In defrosting operation, a flow of refrigerant is basically similar to that in cooling operation, and refrigerant in a high temperature, high pressure condition flows into the outside heat exchanger 202. However, in order to quicken defrosting, the shutter 255 is closed as described hereinabove. Further, since this condition is basically a condition wherein heating is required, the air mixing damper 154 is displaced at step 488 to a position at which the entire amount of air flows to the heaters 203 side. Further, the fan 251 for the outside heat exchanger 202 is stopped or kept inoperative at step 489 so that a cool wind may not come to the outside heat exchanger 202. Further, in order to complete defrosting in a short interval of time, the invertor is controlled to maximize the discharging capacity of the compressor 201 at step 490.

Figure 59:
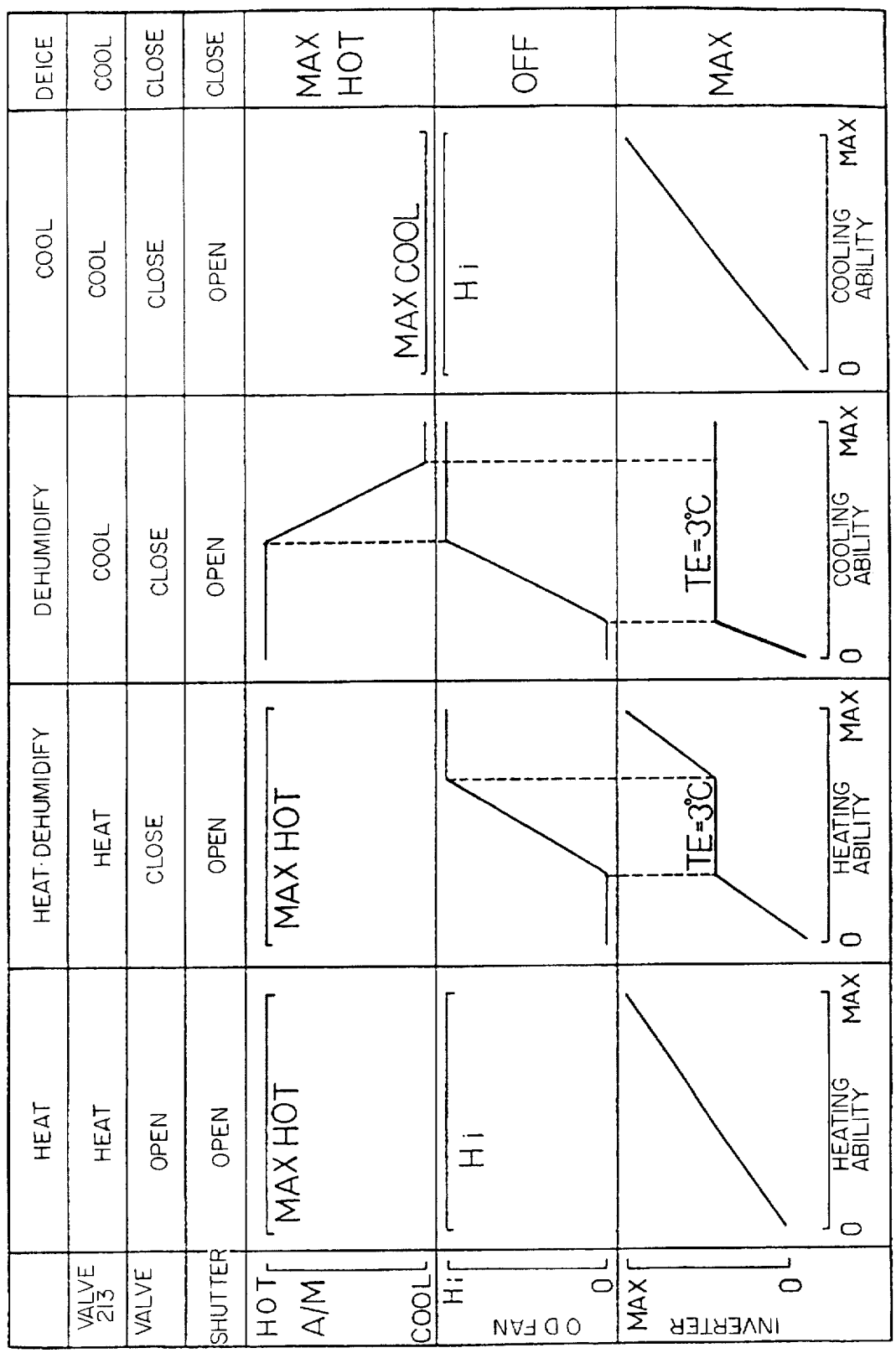
FIG. 59 is a table illustrating operation modes of the automotive air conditioner shown in FIG. 53 and operating conditions of components of the same.

Operating conditions of the four-way valve 213, the solenoid valve 231, the shutter 255, the air mixing damper 154, the fan 251 for the outside heat exchanger 202 and the invertor for controlling the discharging amount of the compressor 201 in the various operation conditions described above are listed up in the table shown in FIG. 59.

Further, directions of flows of refrigerant in the heating operation condition, the dehumidifying heating operation condition, the heating operation condition and the defrosting operation condition described above are shown in FIGS. 60 to 63, respectively. A flow of refrigerant is indicated by a thick line in each of FIGS. 60 to 63.

Figure 60:
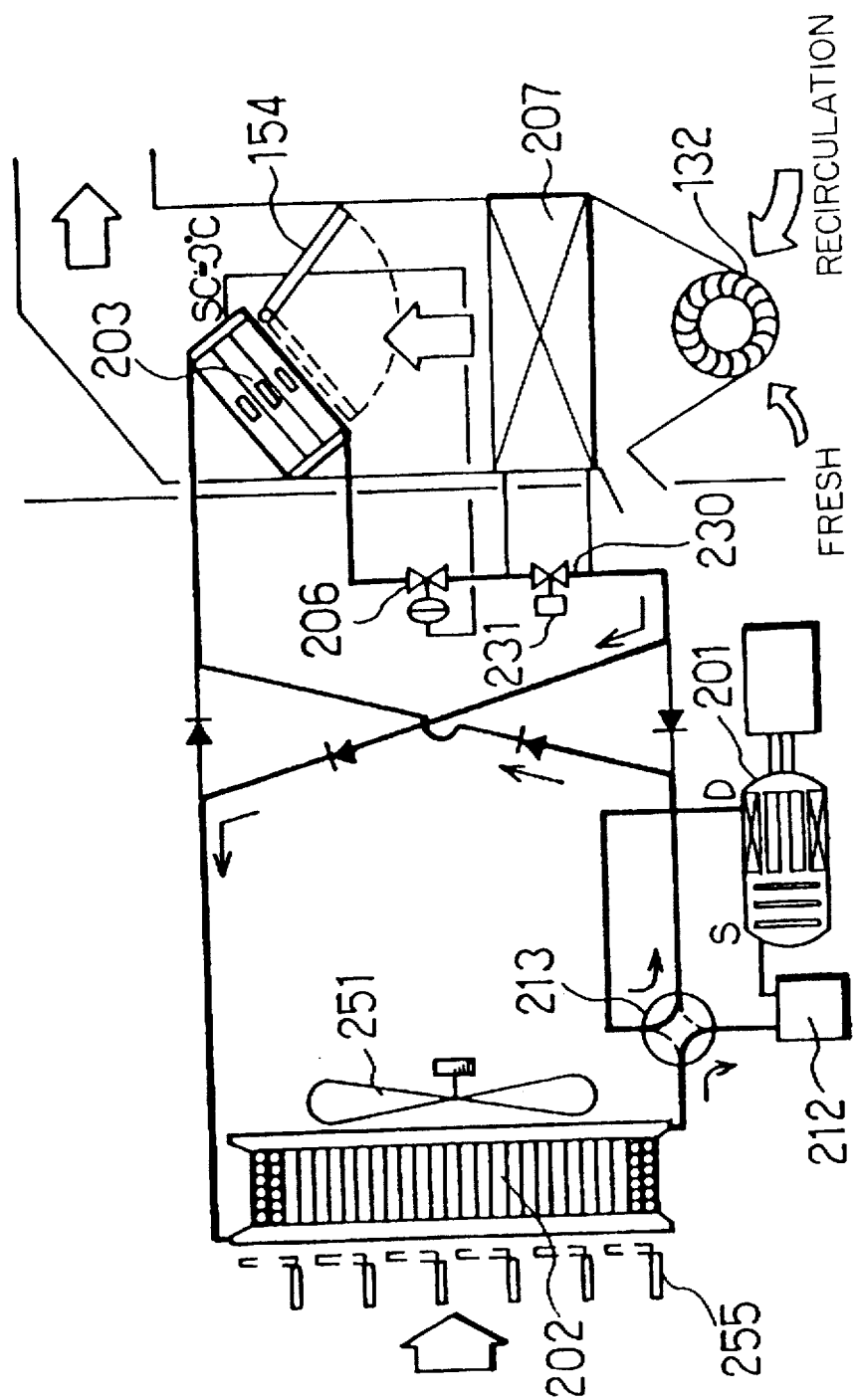
FIG. 60 is a diagrammatic schematic view showing a flow of refrigerant upon heating operation of the automotive air conditioner shown in FIG. 53.

In the heating operation condition shown in FIG. 60, the heaters 203 operate as condensers and a subcooler; the outside heat exchanger 202 operates as an evaporator; and the evaporator 207 disposed in the duct 100 does not operate. This is intended to prevent cooling of air in the duct 100 upon heating by keeping the evaporator 207 inoperative.

Figure 61:
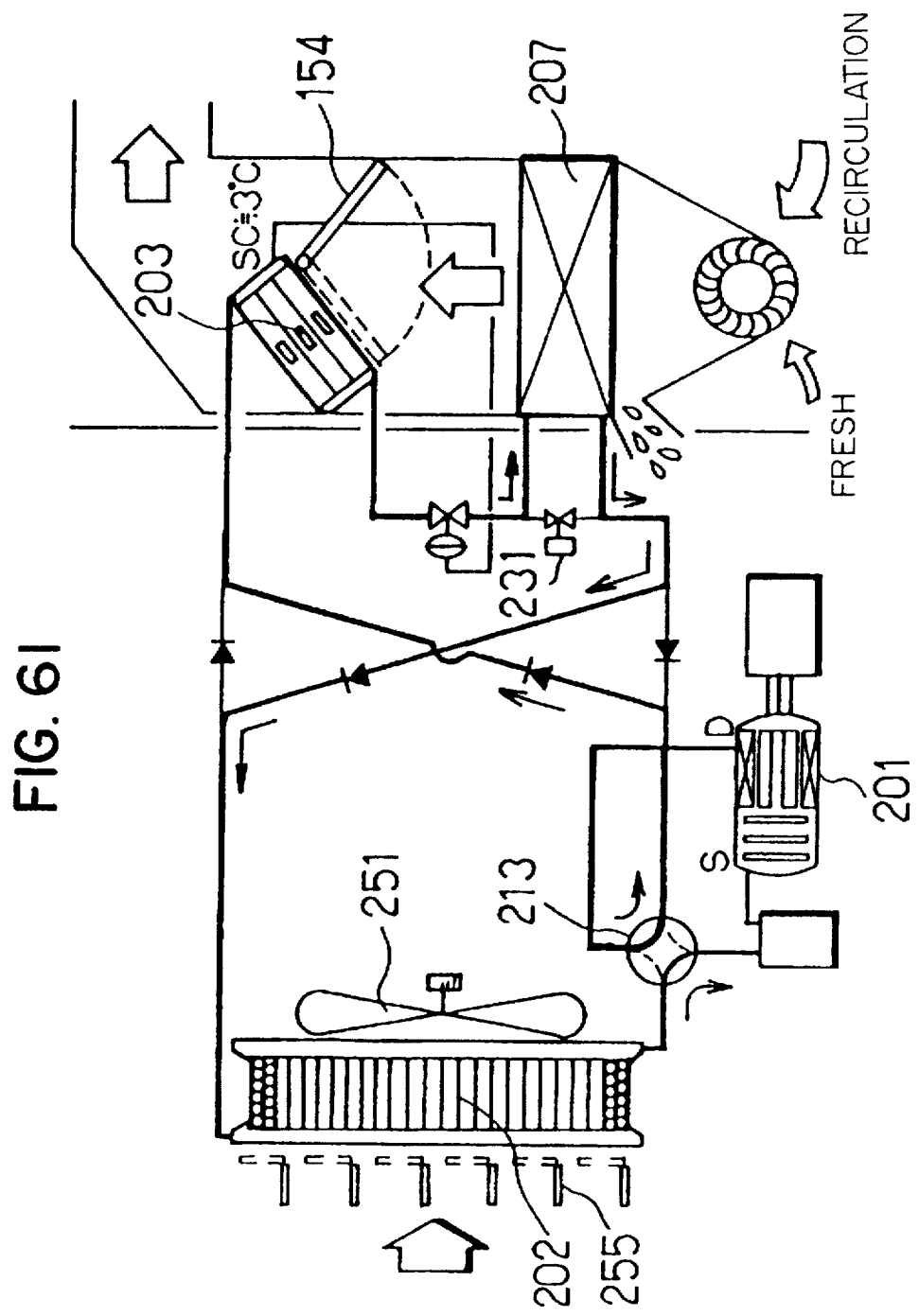
FIG. 61 is a diagrammatic schematic view showing a flow of refrigerant upon dehumidifying heating operation of the automotive air conditioner shown in FIG. 53.
Figure 62:
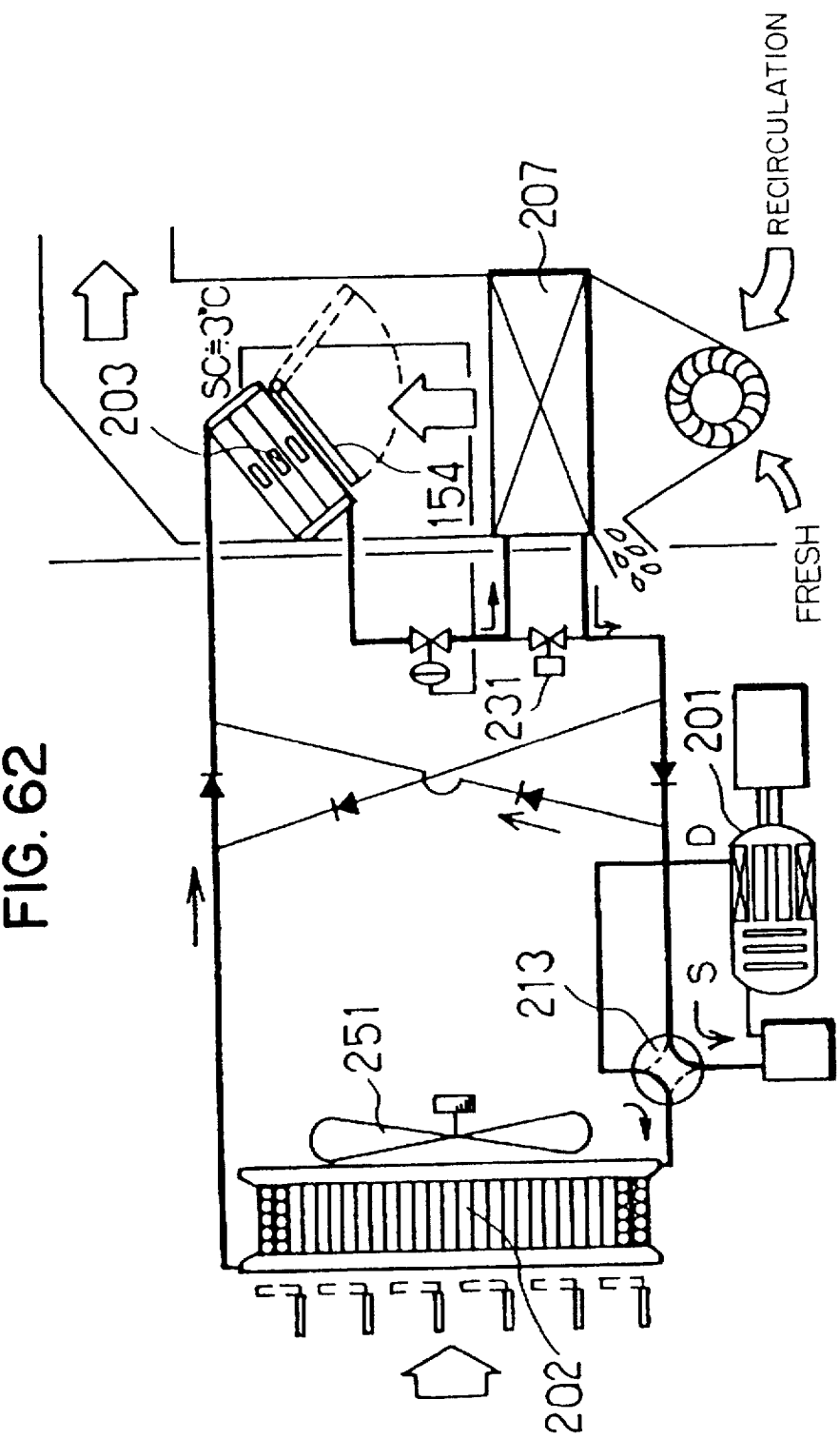
FIG. 62 is a diagrammatic schematic view showing a flow of refrigerant upon cooling operation of the automotive air conditioner shown in FIG. 53.

However, when the heating load is particularly high such as upon warming up immediately after starting of heating, the refrigerating cycle is set similarly as in dehumidifying heating operation shown in FIG. 61 such that refrigerant flows also to the evaporator 207 so that the evaporator 207 may operate as a heat sink.

This arises from the facts that, since the temperature of air sucked is low when the heating load is high in this manner, a drop of the temperature of air by the evaporator 207 does not matter very much, that absorption of heat at the evaporator 207 is cancelled by a variation of visible heat of air and the temperature of air itself does not drop very much, and that, since absorption of heat in the entire refrigerating cycle is performed in both of the evaporator 207 and the outside heat exchanger 202, the amount of absorbed heat is increased and as a result the amount of heat radiation from the heaters 203 is increased.

In particular, while heat of air sucked into the evaporator 207 is absorbed in the evaporator 207, heat absorption then is performed first by condensation of water in air, and consequently, the temperature of the air is not lowered very much even after it passes the evaporator 207. Rather, a rise of the amount of heat radiation of the heater s 203 acts effectively upon a rise of the temperature. In particular, the amount of heat radiation of the heaters 203 results immediately in a rise of the temperature of air passing the heaters 203, and there is no variation in latent heat.

Besides, since absorption of heat is performed in both of the evaporator 207 and the outside heat exchanger 202, the amount of heat absorption is increased and as a result, the evaporating pressure of refrigerant is raised. As the evaporating pressure rises, the specific volume of refrigerant sucked into the compressor 201 is decreased, and consequently, the flow rate by weight of recirculating refrigerant by the compressor is increased. In this manner, also the amount of heat of refrigerant supplied to the heaters 203 is increased and the amount of heat radiation by the heaters 203 is increased.

However, since t he operation condition requires higher power for the compressor 201, such a flow of refrigerant as shown in FIG. 60 is taken in normal heating operation as described hereinabove.

Figure 64:
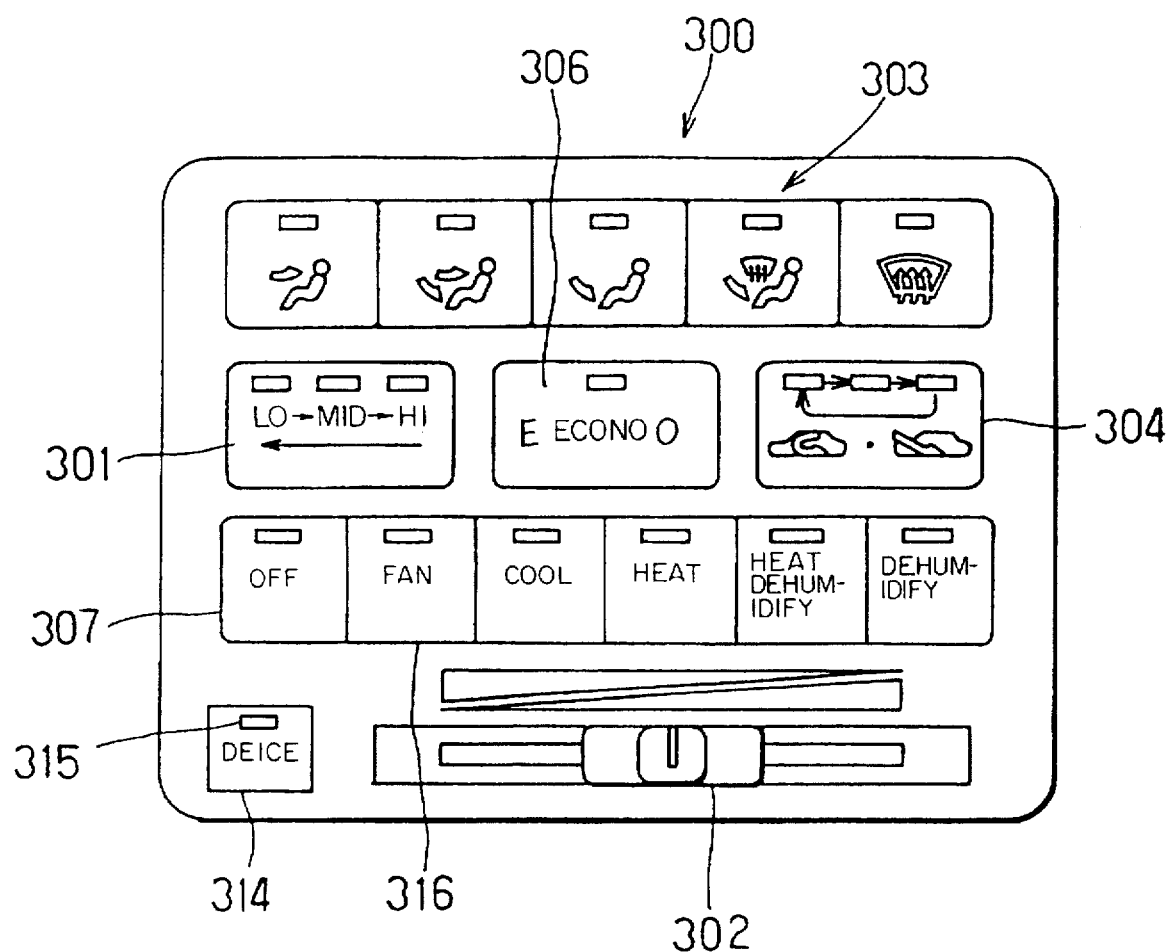
FIG. 64 is a front elevational view showing an example of operation panel of the automotive air conditioner shown in FIG. 53.

FIG. 64 shows an example of a controlling operation panel for the cycle of the automotive air conditioner shown in FIG. 53. Since the automotive air conditioner shown in FIG. 53 has a dehumidifying heating operation mode as described hereinabove, a switch for dehumidifying heating is additionally provided comparing with the panel shown in FIG. 52.

A yet further automotive air conditioner according to the present invention will be described with reference to FIG. 65. The automotive air conditioner shown in FIG. 65 eliminates the evaporating pressure regulating valve 208 comparing with the automotive air conditioner shown in FIG. 53.

Prior to description of control of the automotive air conditioner shown in FIG. 65, a function of the evaporating pressure regulating valve 208 will be described first with reference to FIG. 53. The evaporating pressure regulating valve 208 is provided to prevent frosting on the surface of the evaporator 207 when, particularly upon dehumidifying heating operation, both of the evaporator 207 and the outside heat exchanger 202 serve as heat sinks to effect evaporation of refrigerant.

In particular, since there is the possibility that frost may adhere to the surface of the evaporator 207 when the evaporating pressure of refrigerant in the evaporator 207 is excessively lowered until the refrigerant evaporation temperature becomes lower than the freezing point, the pressure of refrigerant at the exit of the evaporator 207 is kept higher than a predetermined value by means of the evaporating pressure regulating valve 208 in order to prevent such possible frosting.

Figure 65:
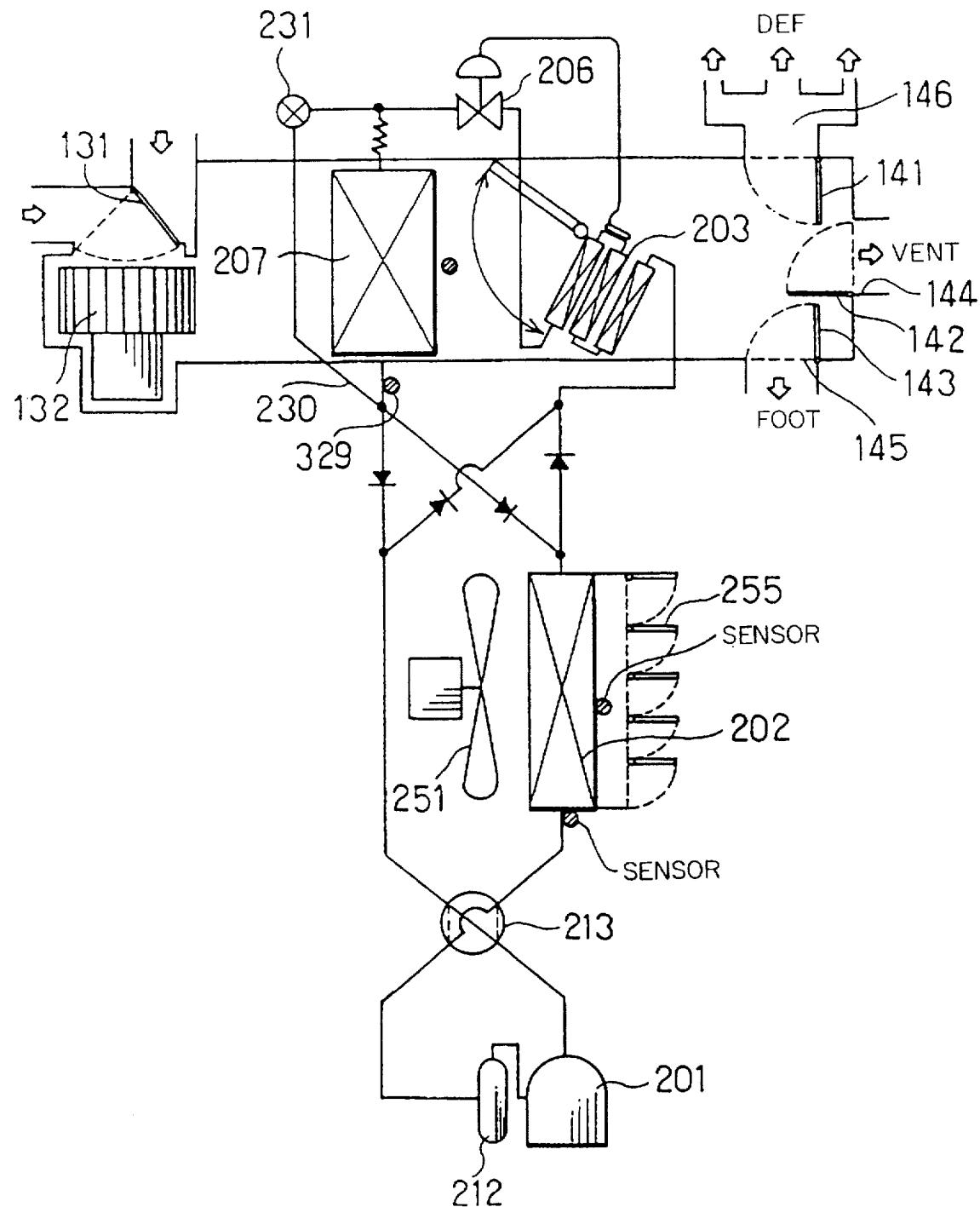
FIG. 65 is a diagrammatic view showing a yet further preferred embodiment of the present invention.

In the automotive air conditioner shown in FIG. 65, the function of the evaporating pressure regulating valve 208 is achieved by opening/closing movement of the bypass passageway 230. In particular, also in the present automotive air conditioner, both of the evaporator 207 and the outside heat exchanger 202 operate, upon dehumidifying heating operation, as heat sinks to effect evaporation of refrigerant similarly as in the automotive air conditioner described hereinabove with reference to FIG. 53. In this instance, when the pressure of refrigerant in the evaporator 207 is lowered below a predetermined value, this condition is detected by means of a temperature sensor 329 disposed on a refrigerant pipe on the exit side of the evaporator 207 and the solenoid valve 231 is opened. Since the communication resistance to refrigerant is lower in the bypass passageway 230 than in the evaporator 207, when the solenoid valve 231 is opened, refrigerant flows to the bypass passageway 230 while admission thereof into the evaporator 207 side is limited. Due to the limit in supply amount of refrigerant, evaporation of refrigerant does not occur in the evaporator 207, and as a result, the cooling capacity of the evaporator 207 is decreased remarkably. In the meantime, since the temperature of air admitted into the evaporator 207 is equal to a room temperature, if operation is continued in the condition wherein the cooling capacity is decreased remarkably, then frost appearing on the surface of the evaporator 207 will be melted.

In this manner, the evaporation temperature of refrigerant in the evaporator 207 can be restricted within a predetermined width by controlling opening/closing movement of the solenoid valve 231 in response to a temperature of refrigerant on the exit side of the evaporator 207 in this manner, and as a result, a function similar to that of the evaporating pressure regulating valve described hereinabove can be achieved.

Figure 66:
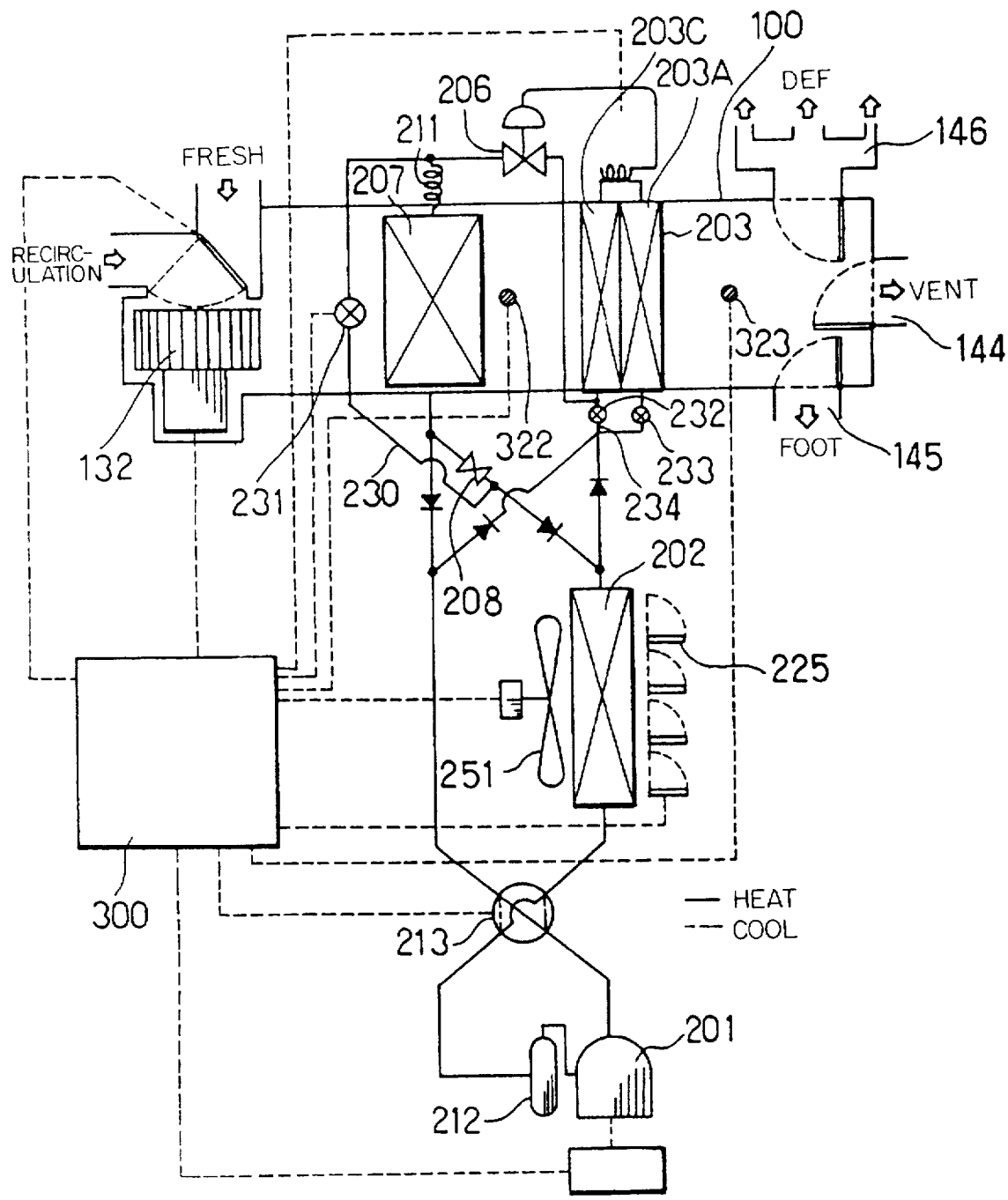
FIG. 66 is a diagrammatic view showing a yet further preferred embodiment of the present invention.

A yet further automotive air conditioner according to the present invention will be described with reference to FIG. 66. While, in the automotive air conditioner shown in FIG. 53, the bypass passageway is provided sidewardly of the heaters 203 and, upon cooling, the air mixing damper 154 closes the heaters 203 so that air may flow along the bypass passageway, the heaters 203 in the automotive air conditioner shown in FIG. 66 is disposed over the entire area in the duct 100.

Then, upon cooling, a bypass passageway 234 is opened so that refrigerant may not flow to the heaters 203. The bypass passageway 234 is provided to communicate a refrigerant pipe on the entrance side and another refrigerant pipe on the exit side of the heaters 203 with each other, and a solenoid valve 232 for opening or closing the bypass passageway 234 is disposed intermediately of the bypass passageway 234.

Accordingly, upon cooling operation, the solenoid valve 232 is opened to open the bypass passageway 234. Simultaneously, another solenoid valve 233 provided in the entrance side refrigerant pipe is closed so that refrigerant may not flow to the heaters 203.

Accordingly, upon cooling, refrigerant is not supplied to the heaters 203, and refrigerant accumulated in the heaters 203 will have a high subcooling degree. Since the expansion valve 206 is controlled so that refrigerant on the entrance side of the subcooler 203c may have a predetermined subcooling degree as described hereinabove, in a condition wherein refrigerant is not supplied any more and has a predetermined subcooling degree in this manner, such signal is inputted to the expansion valve 206 and consequently, the expansion valve 206 is opened until its opening area presents its maximum in order to maximize the flow rate of refrigerant. Accordingly, suitable cooling operation cannot be performed in this condition. However, in the present automotive air conditioner, since the capillary tube 211 is provided in series to the expansion valve 206, refrigerant is decompressed and expanded suitably by the capillary tube 211 even in such a condition as described just above.

Subsequently, a yet further automotive air conditioner according to the present invention will be described with reference to FIG. 67. The automotive air conditioner shown in FIG. 67 employs a receiver 205 similarly to the automotive air conditioner shown in FIG. 3. In the present automotive air conditioner, however, the receiver 205 is disposed between the exit side of the condenser 203b and the entrance side of the subcooler 203c of the heaters 203.

Since the receiver 205 has a gas/liquid interface and only delivers liquid refrigerant, liquid refrigerant is supplied with certainty to the subcooler 203c. Consequently, the subcooler 203c can provide a subcooling degree of refrigerant with certainty.

As described hereinabove, when the air conditioner is used as an automotive air conditioner, the variation in amount of air admitted into the heaters 203 when the air mixing damper 154 is opened and closed and the variation in temperature of air when the evaporator 207 operates and does not operate are great, but where the subcooler 203c is disposed on the downstream of the receiver 205 as in the present automotive air conditioner, a sufficient subcooling degree can be obtained with certainty in any operation condition.

Further, in the present automotive air conditioner, the expansion valve 206 varies the throttling amount of the refrigerant pipe so that a predetermined dryness may be obtained for refrigerant on the sucking side of the compressor 201.

In particular, since the temperature sensing tube for the expansion valve 206 is disposed between the four-valve 214 and the compressor 201, to whichever position the four-way valve 214 is changed over, a temperature of suction refrigerant returning to the compressor 201 can always be detected.

Figure 67:
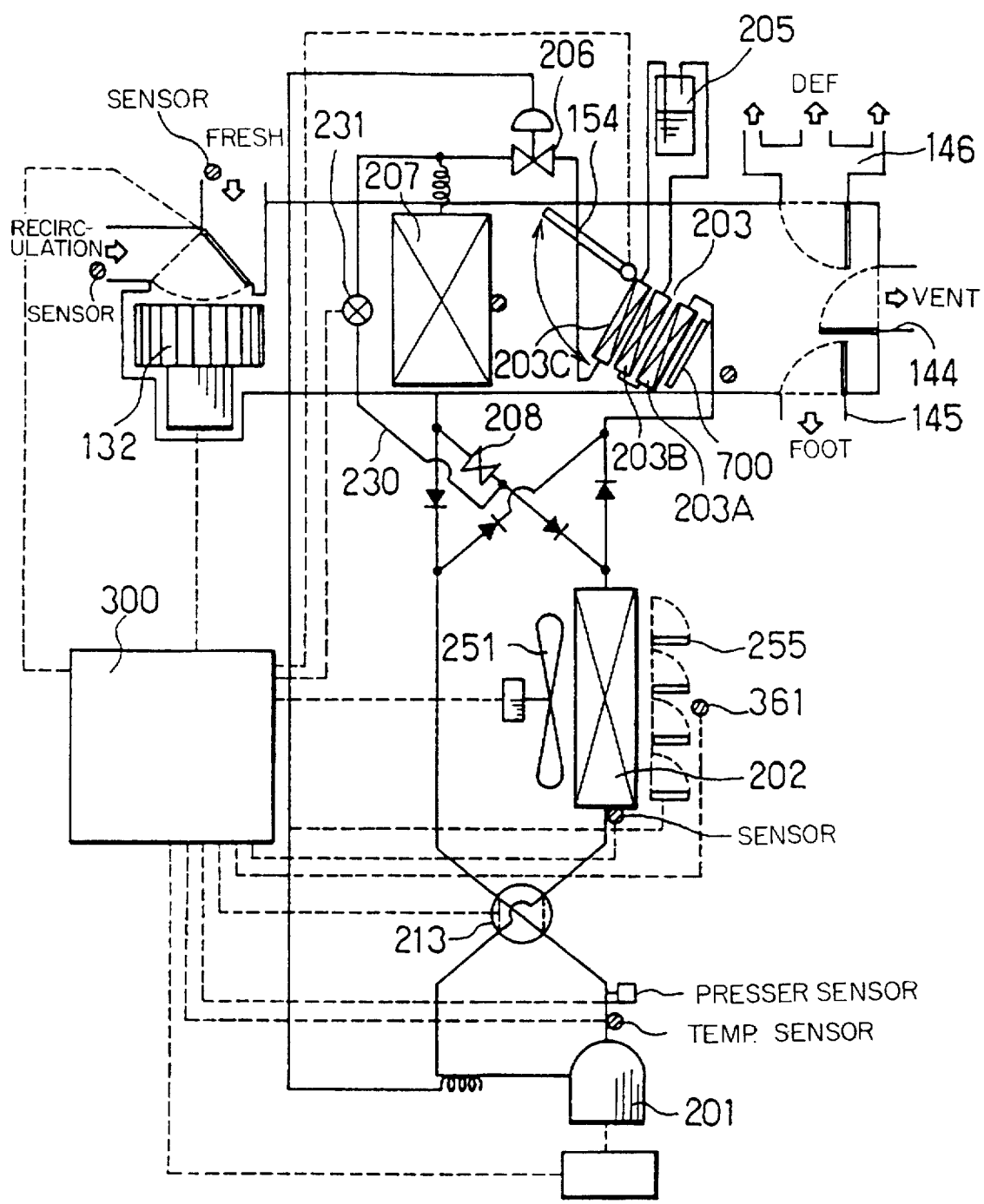
FIG. 67 is a diagrammatic view showing a yet further preferred embodiment of the present invention.

It is to be noted that, in the automotive air conditioner shown in FIG. 67, the auxiliary heater 700 is disposed on the downstream side of the heaters 203 in a flow of air in order to complement the heating capacity upon heating or upon dehumidifying heating.

Figure 68:
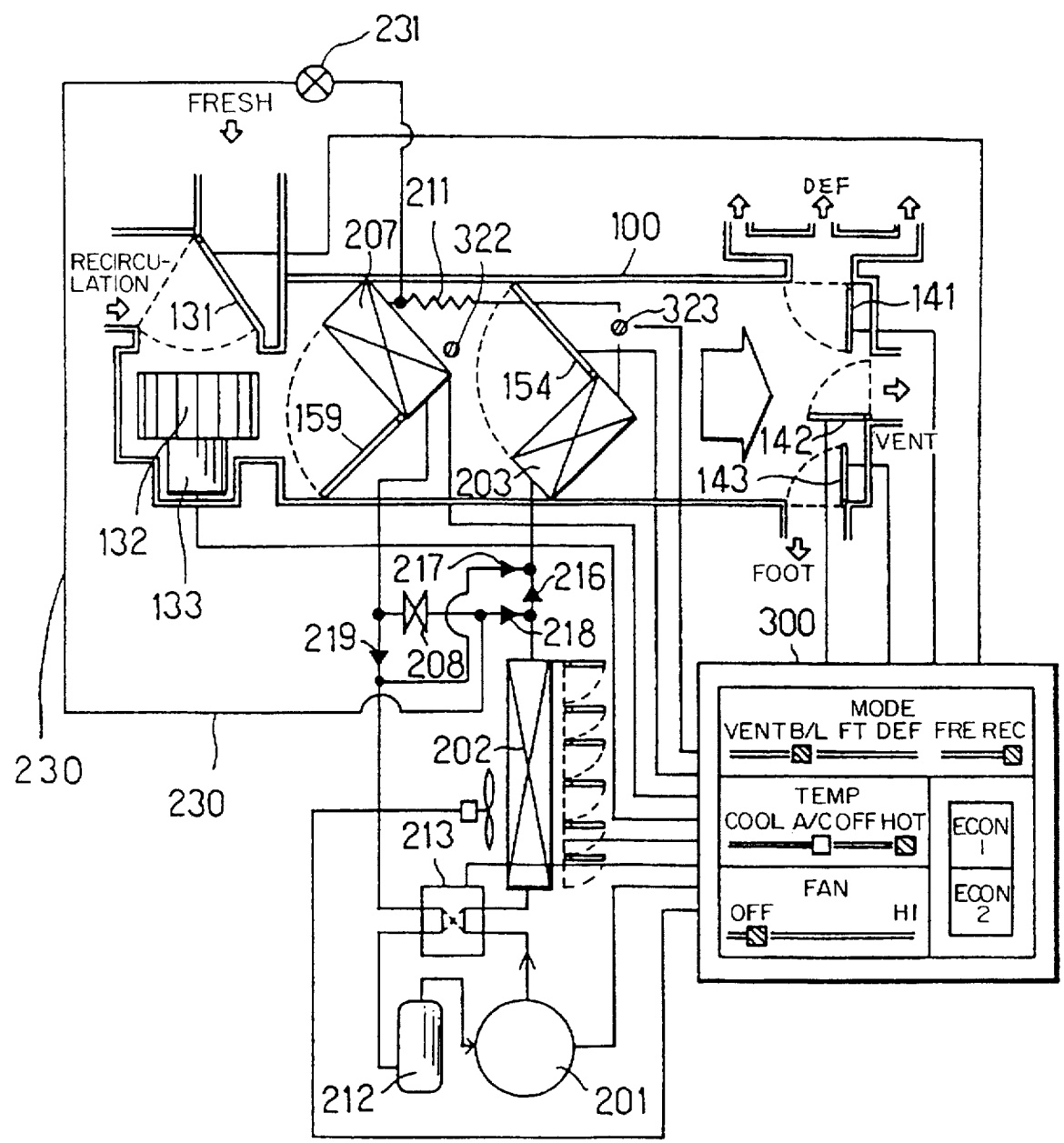
FIG. 68 is a diagrammatic view showing a yet further preferred embodiment of the present invention.

A yet further automotive air conditioner according to the present invention will be described subsequently with reference to FIG. 68. The automotive air conditioner shown in FIG. 68 solves a disadvantage when an evaporating pressure regulating valve of the fully closed type is employed as the evaporating pressure regulating valve 208.

When the evaporating pressure regulating valve 208 is of the fully closed type, if cold air flows into the evaporator 207 as upon, for example, starting at a low temperature, the temperature of refrigerant on the exit side of the evaporator 207 is lowered below a predetermined value and consequently the evaporating pressure regulating valve 208 will close the refrigerant pipe. If the refrigerant pipe is closed in this manner, refrigerant will not return to the compressor 201, and consequently, such a disadvantage as seizure of the compressor 201 may take place.

Therefore, in an operation condition wherein the evaporation pressure regulating valve 208 closes the refrigerant passage in this manner, the solenoid valve 231 is opened temporarily so that refrigerant may flow to the downstream side of the evaporating pressure regulating valve 208 by way of the bypass passageway 230 bypassing the evaporating pressure regulating valve 208. While, in this condition, the evaporator 207 does not function temporarily, if air to be sucked into the duct 100 is changed over to inside air and the temperature of air passing the duct 100 rises, then also the temperature of refrigerant in the evaporator 207 rises, and consequently, the evaporating pressure regulating valve 208 will open the refrigerant passage. Accordingly, after then, the bypass passageway 230 can be closed to flow refrigerant to the evaporator 207 side.

Accordingly, in the present automotive air conditioner, the bypass passageway 230 is only required to bypass the evaporating pressure regulating valve 208 and need not necessarily bypass the evaporator 207.

Further, if the evaporating pressure regulating valve 208 is of the type which can pass a predetermined amount of refrigerant even when it assumes its minimum throttling condition, the bypass passageway 230 need not necessarily be provided.

Subsequently, a yet further automatic air conditioner according to the present invention will be described with reference to FIG. 69. The automotive air conditioner shown in FIG. 69 can achieve defrosting of the outside heat exchanger 202 during heating operation and during dehumidifying heating operation without considerable deterioration of the dehumidifying heating function. To this end, in the automatic air conditioner shown in FIG. 69, the three-way valves 275, 276 and 277 are changed over to change over a sequence of a flow of refrigerant.

In particular, in any of heating operation and dehumidifying heating operation in which defrosting is involved, refrigerant in a high temperature, high pressure condition is supplied from the compressor 201 into the heater 203, which thus operates as a heat radiator. Further, refrigerant in a low temperature, low pressure condition is supplied to both of the evaporator 207 and the outside heat exchanger 202, which both operate thus as heat sinks.

However, in heating operation and in dehumidifying heating operation in which defrosting is involved, refrigerant flows in different orders through the evaporator 207 and the outside heat exchanger 202. Upon dehumidifying heating operation, refrigerant condensed by the heater 203 flows, after passing the expanding means 206, first into the evaporator 207 and then into the outside heat exchanger 202.

This is intended, because it is normally forecast that the temperature of outside air is low upon dehumidifying heating operation, to assure operation of the automotive air conditioner even in such condition. In particular, when the outside air temperature is, for example, lower than 0° C., the evaporating temperature of refrigerant is lower than the freezing point and lower than the outside air temperature so that refrigerant may be evaporated in the outside heat exchanger 202 in such outside air temperature condition. Here, if the evaporator 207 is disposed on the downstream side of the outside heat exchanger 202 in a flow of refrigerant, then the evaporating temperature of refrigerant in the evaporator 207 will be lower than the evaporating temperature of refrigerant in the outside heat exchanger 202 and lower than the freezing point. Consequently, frosting takes place on the surface of the evaporator 207 and the ventilation resistance in the duct 100 is increased. As a result, good dehumidifying heating operation cannot be achieved.

On the other hand, if the evaporator 207 is disposed on the upstream side of the outside heat exchanger 202 in a flow of refrigerant, then the evaporating temperature of refrigerant in the evaporator 207 can be made higher than the evaporating temperature of refrigerant in the outside heat exchanger 202. Consequently, the refrigerant temperature of refrigerant in the evaporator 207 can always be held to a predetermined temperature of 2° to 3° C.

In this instance, frosting of the outside heat exchanger 202 seems to matter. However, since the disadvantage by frosting is more serious with the evaporator 207 than with the outside heat exchanger 202, the evaporator 207 is disposed on the upstream side in a flow of refrigerant upon normal dehumidifying heating operation.

Then, in case frosting of the outside heat exchanger 202 becomes particularly significant in such operation condition, the flow of refrigerant is changed over so that refrigerant having passed the heater 203 first flows into the outside heat exchanger 202. Consequently, refrigerant in a high temperature, high pressure condition is supplied into the outside heat exchanger 202 to raise the temperature of the surface of the outside heat exchanger 202. As a result, frost appearing on the surface of the outside heat exchanger 202 is melted. In this operation condition, operation of the fan 251 for the outside heat exchanger 202 is stopped in order to accelerate defrosting. Then, the refrigerant having passed the outside heat exchanger 202 is decompressed and expanded in the capillary tube 211 and then flows into the evaporator 207. Further, as described hereinabove, preferably an inside air mode is entered to set the amount of a wind of the inside blower to the Lo position.

Figure 69:
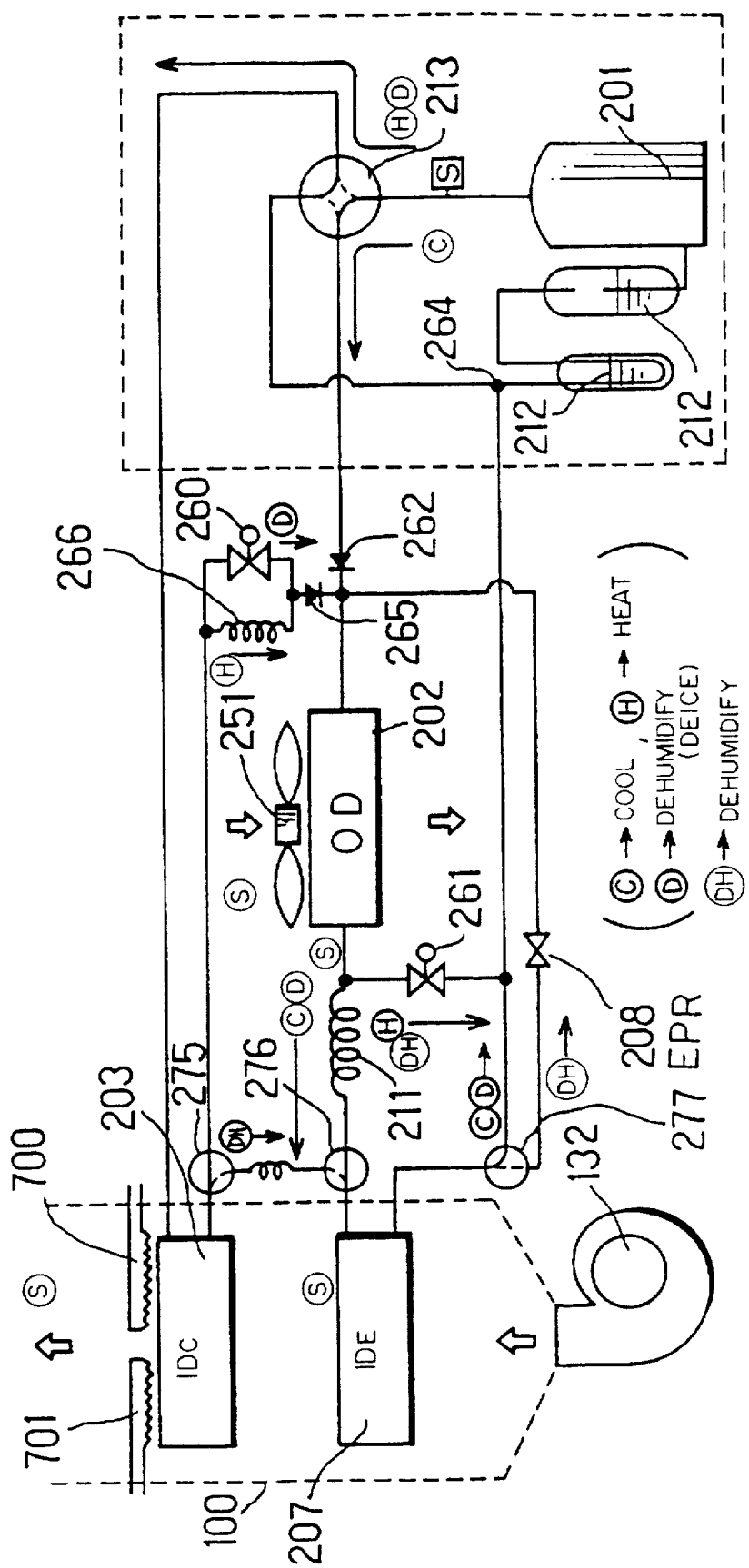
FIG. 69 is a diagrammatic view showing a yet further preferred embodiment of the present invention.
Figure 70:
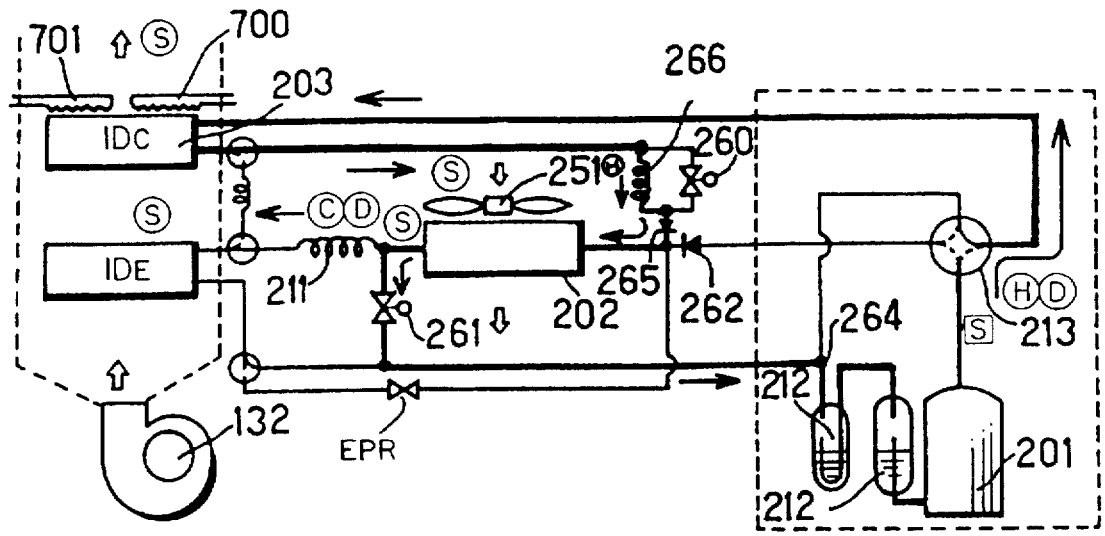
FIG. 70 is a diagrammatic schematic view showing a flow of refrigerant upon heating operation of the automotive air conditioner shown in FIG. 69.
Figure 71:
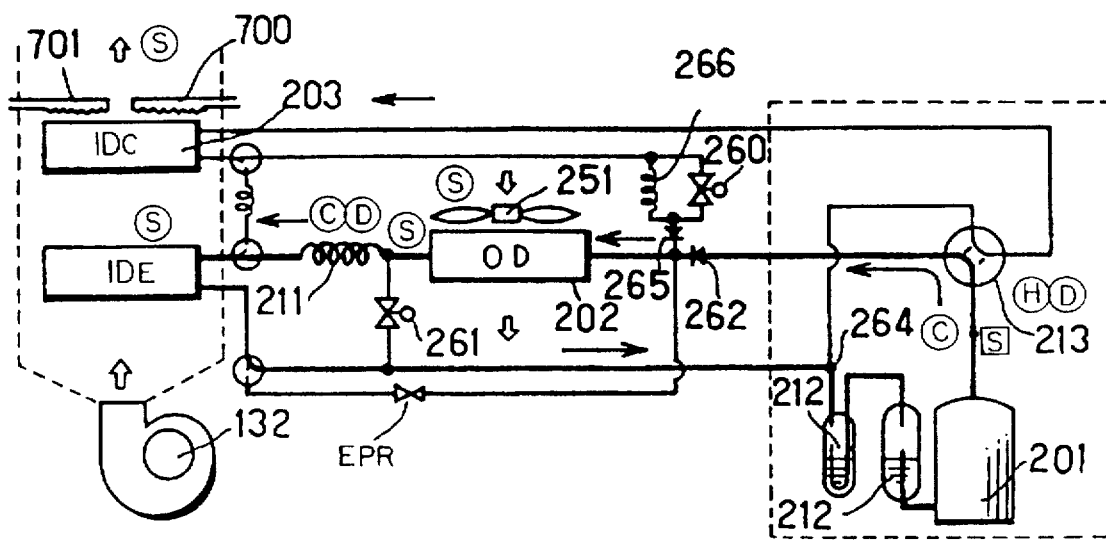
FIG. 71 is a diagrammatic schematic view showing a flow of refrigerant upon cooling operation of the automotive air conditioner shown in FIG. 69.
Figure 72:
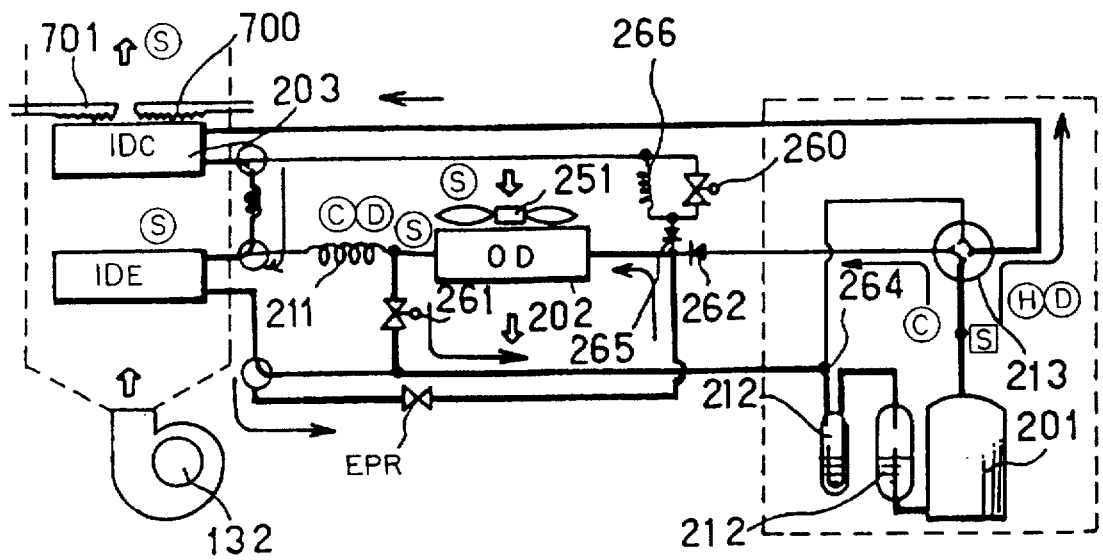
FIG. 72 is a diagrammatic schematic view showing a flow of refrigerant upon dehumidifying heating operation of the automotive air conditioner shown in FIG. 69.
Figure 73:
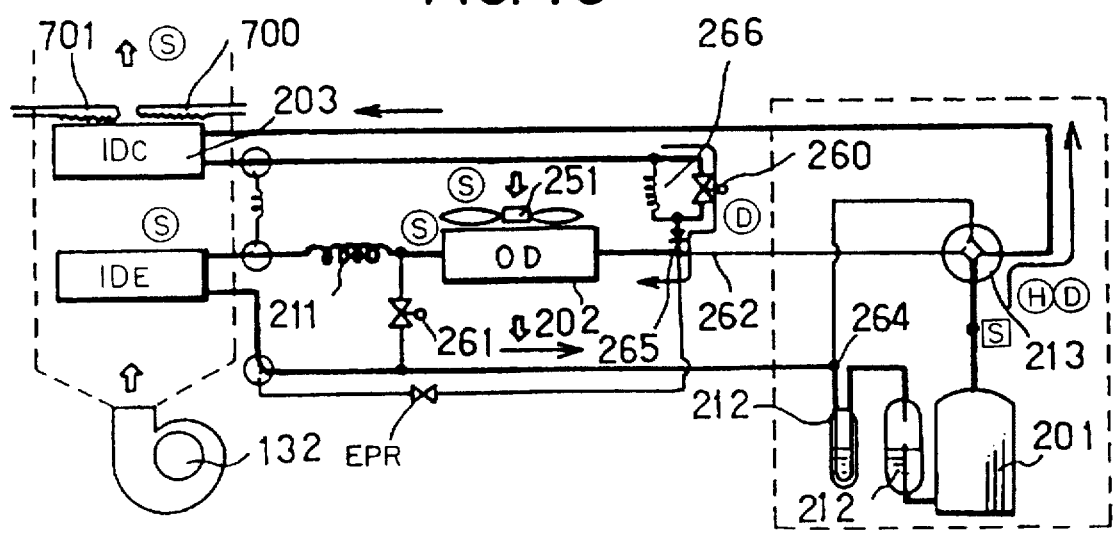
FIG. 73 is a diagrammatic schematic view showing a flow of refrigerant upon dehumidifying defrosting operation of the automotive air conditioner shown in FIG. 69.

FIGS. 70 to 73 show flows of refrigerant in the automatic air conditioner shown in FIG. 69. In particular, FIG. 70 shows a heating operation condition and FIG. 71 shows a cooling operation condition. Further, FIG. 72 shows a dehumidifying heating operation condition, and FIG. 73 shows a condition wherein defrosting of the outside heat exchanger 202 is performed. In all of FIGS. 70 and 73, only a pipe in which refrigerant flows is indicated with a thick line.

Subsequently, a yet further automotive air conditioner according to the present invention will be described with reference to FIG. 74. The refrigerating cycle shown in FIG. 74 is an accumulator cycle which additionally includes, comparing with the cycle shown in FIG. 21, a passageway 297 bypassing the capillary tube 211 and a solenoid valve 298 for opening or closing the passageway 297.

Refrigerant flow passage changing over means changes over flowing directions of refrigerant upon cooling operation, upon heating operation, upon dehumidifying operation, and upon defrosting operation during dehumidifying operation (hereinafter referred to as defrosting operation). Similarly as in the automotive air conditioner described hereinabove, the refrigerant flow passage changing over means includes a four-way valve 213 for changing over the discharging direction of the refrigerant compressor 201 between that upon cooling operation and that upon any other operation, a first solenoid opening/closing valve 201 for bypassing, upon heating operation, the first decompressing apparatus 211 and the evaporator 207 on the upstream side, a second solenoid opening/closing valve 260 for bypassing, upon dehumidifying operation, the second decompressing apparatus 266, and a third solenoid opening/closing valve 298 for bypassing, upon defrosting operation, the first decompressing apparatus 211. A pair of check valves 262 and 265 for controlling flowing directions of refrigerant are also provided.

The flow passage changing over means changes over a flow of refrigerant in the following manner upon cooling operation, upon heating operation, upon dehumidifying operation and upon defrosting operation.

Figure 74:
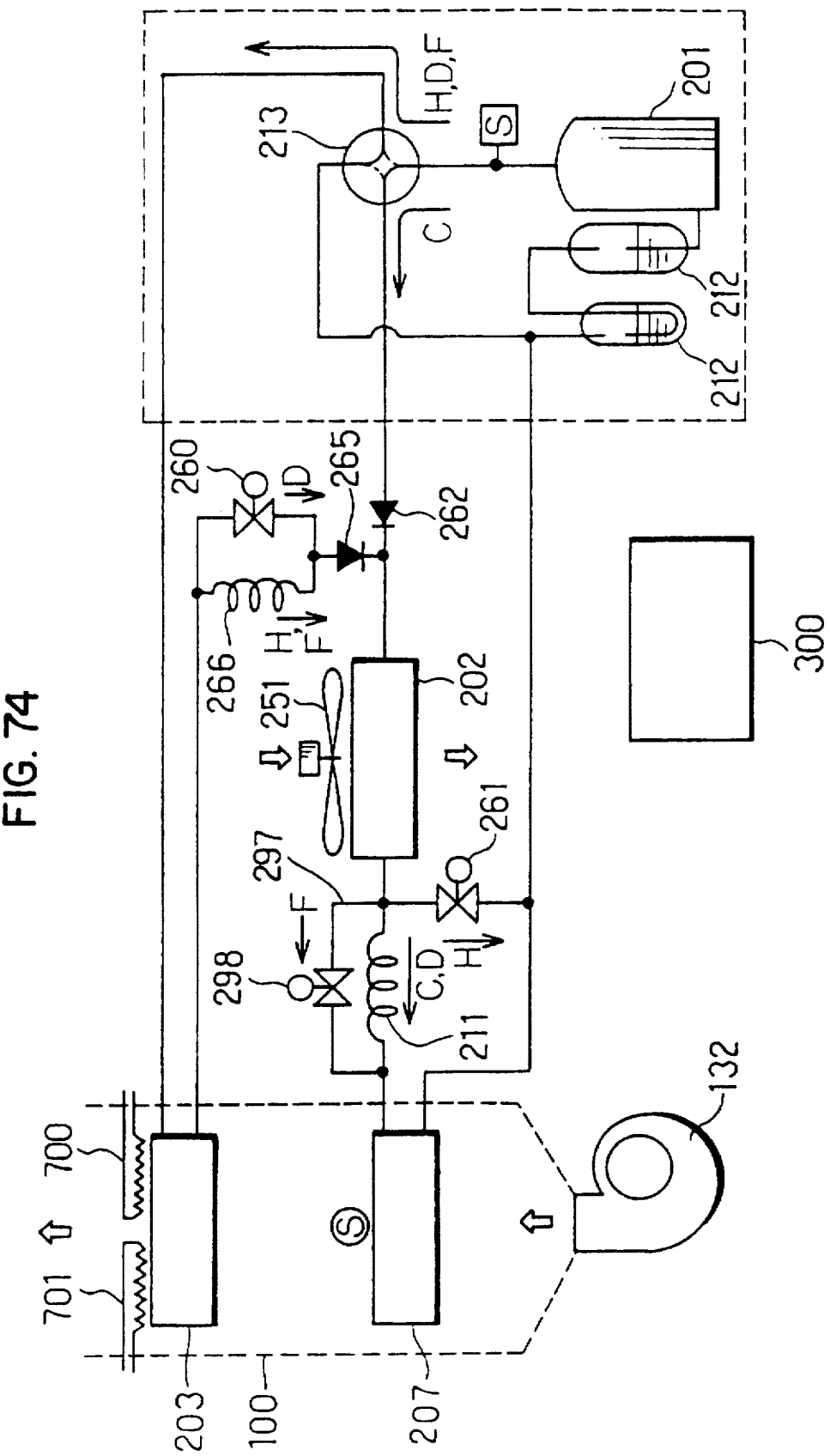
FIG. 74 is a refrigerant circuit diagram of an air conditioner according to a yet further embodiment of the present invention.

Upon cooling operation, refrigerant discharged from the refrigerant compressor 201 flows in the order of four-way valve 213→outside heat exchanger 202→first decompressing apparatus 211→evaporator 207→accumulator 212→refrigerant compressor 201 (refer to arrow marks C in FIG. 74).

Upon heating operation, refrigerant discharged from the refrigerant compressor 201 flows in the order of four-way valve 213→heater 203→second decompressing apparatus 266→outside heat exchanger 202→first solenoid opening/closing valve 261→accumulator 212→refrigerant compressor 201 (refer to arrow marks H in FIG. 74).

Upon dehumidifying operation, refrigerant discharged from the refrigerant compressor 201 flows in the order of four-way valve 213→heater 203→second solenoid opening/closing valve 260→outside heat exchanger 202 (the outside blower 251 is inoperative then)→first decompressing apparatus 211→evaporator 207→accumulator 212→refrigerant compressor 201 (refer to arrow marks D in FIG. 74).

Upon defrosting operation wherein defrosting of the evaporator 207 is performed in a dehumidifying operation condition, refrigerant discharged from the refrigerant compressor 201 flows in the order of four-way valve 213→heater 203→second decompressing apparatus 266→outside heat exchanger 202 (the outside blower 251 is operative then)→third solenoid opening/closing valve 298→evaporator 207→accumulator 212→refrigerant compressor 201 (refer to arrow marks F in FIG. 74).

As can be understood from the foregoing and the following, outside heat exchanger 202 alternately functions as an outside condenser or an outside evaporator.

The controlling apparatus 300 includes a temperature sensor for detecting a temperature of a fin or a tube of the evaporator 207 or a temperature of air having passed the evaporator 207. The temperature sensor is provided to detect frost on the evaporator 207, and when the temperature of the fin of the evaporator 207 detected by the temperature sensor is lowered to 0° C., the controlling apparatus 300 forecasts frosting and executes defrosting of the evaporator 207 in order to prevent frosting.

Subsequently, defrosting operation during dehumidifying operation of the automotive air conditioner shown in FIG. 74 will be described.

If the temperature detected by the temperature sensor during dehumidifying operation becomes lower than 0° C., then the controlling apparatus 300 closes the second solenoid opening/closing valve 260, opens the third solenoid opening/closing valve 298 and renders the outside blower 251 operative to effect defrosting operation. Then, if the temperature detected by the temperature sensor rises higher than 1° C., then the controlling apparatus 300 opens the second solenoid opening/closing valve 260, closes the third solenoid opening/closing valve 298 and renders the outside blower 251 inoperative to return the operation to dehumidifying operation.

If dehumidification is set by means of the air conditioning mode setting switch 314 of the operation panel by the passenger, then outside air or inside air selected by the inside/outside air changing over means 131 is sucked into the duct 100 by the blower 132, passes through the evaporator 207, the heater 203 and the auxiliary heaters 700 and 701 and is blown out into the room of the automobile from a spit hole set by the blowing mode changing over switch 303. The amount of a wind then is set by means of the wind amount setting switch 301.

In the refrigerating cycle upon dehumidifying operation, refrigerant in a high temperature, high pressure condition discharged from the refrigerant compressor 201 is introduced into the heater 203 by means of the four-way valve 213. Here, the refrigerant exchanges heat with air flowing in the duct 100 to heat the air in the duct 100 while it is condensed and liquefied in the heater 203. The thus liquefied refrigerant then flows into the outside heat exchanger 202 by way of the second solenoid opening/closing valve 260. In this instance, since the outside blower 251 is inoperative, the liquefied refrigerant passes through the outside heat exchanger 202 and is then decompressed and expanded into low temperature, low pressure mist in the first decompressing apparatus 211. The refrigerant in the form of mist flows into the evaporator 207, in which it takes heat away from air flowing in the duct 100 so that it is evaporated. Then, the thus evaporated refrigerant is re-sucked into the refrigerant compressor 210 by way of the accumulator 212.

Air sucked into the duct 100 is lowered in temperature when it passes the evaporator 203, and consequently, saturated vapor in the air is condensed and adheres to the evaporator 207. After then, the air is heated when it passes the heater 203, and consequently, the moisture in the air decreases remarkably. As a result, good dehumidifying operation is performed.

If the temperature of air sucked into the duct 100 during dehumidifying operation becomes so low that the temperature of the evaporator 207 detected by the temperature sensor is lower than 0° C., then the controlling apparatus 300 controls the flow passage changing over means to change over the refrigerant flow passage of the refrigerating cycle to that for dehumidifying operation. In short, the second solenoid opening/closing valve 260 is closed while the third solenoid opening/closing valve 298 is opened. Consequently, refrigerant condensed and liquefied in the heater 203 is decompressed and expanded into low temperature, low pressure mist in the first decompressing apparatus 266, and then flows into the outside heat exchanger 202. In this instance, since the outside blower 251 is operating, the outside heat exchanger 202 functions as a refrigerant evaporator together with the evaporator 207. The refrigerant admitted into the evaporator 207 by way of the outside heat exchanger 202 and the third solenoid opening/closing valve 298 exchanges heat with outside air passing the outside heat exchanger 202 and also with air flowing in the duct 100 and passing the evaporator 207 so that it is evaporated. The thus evaporated refrigerant is then re-sucked into the refrigerant compressor 201 by way of the accumulator 212.

The evaporating pressure is raised by using the outside heat exchanger 202 as a refrigerant evaporator together with the evaporator 207. Consequently, while the evaporator 207 functions as a refrigerant evaporator, the temperature of the evaporator 207 rises and as a result, frosting of the evaporator 207 can be prevented.

Then, if the temperature of the fin of the evaporator 207 detected by the temperature sensor becomes higher than 1° C., then the controlling apparatus 100 controls the flow passage changing over means to open the second solenoid opening/closing valve 260 and close the third solenoid opening/closing valve 298 to change over the refrigerant flow passage of the refrigerating cycle to that for dehumidifying operation. Further, the outside blower 251 is rendered inoperative, thereby performing dehumidifying operation described hereinabove. In the automotive air conditioner shown in FIG. 74, since the evaporator 207 in the duct 100 always functions, upon dehumidifying operation, as a refrigerant evaporator such that dehumidifying operation is maintained even in defrosting operation as described hereinabove, the temperature in the room of the automobile can normally be kept low. Further, since defrosting can be performed without lowering the capacity of the refrigerant compressor 201, no drop in blown out air temperature is invited upon defrosting operation.

Figure 75:
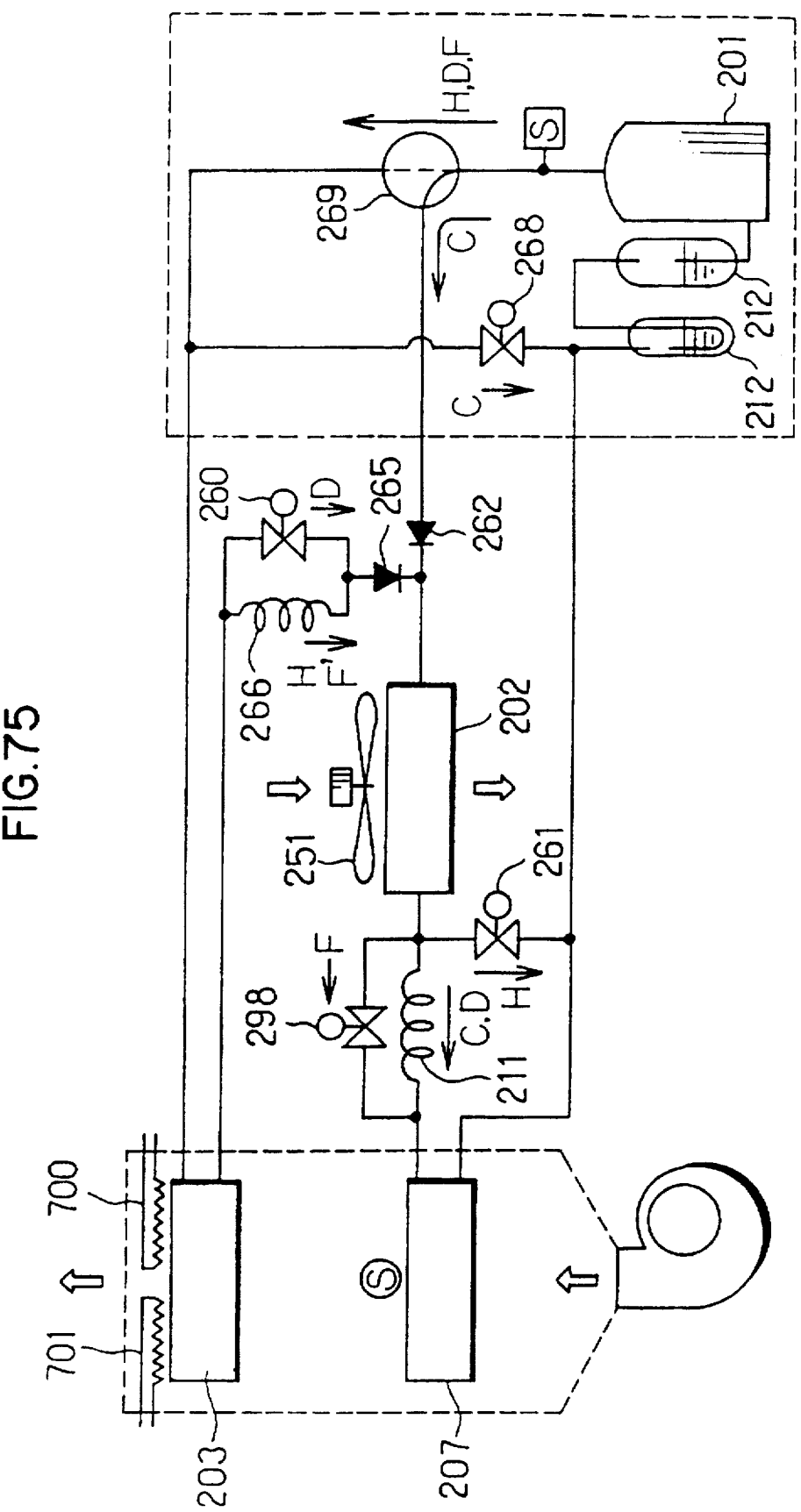
FIG. 75 is a refrigerant circuit diagram of an air conditioner according to a yet further embodiment of the present invention.

FIG. 75 is a refrigerant circuit diagram of a yet further automotive air conditioner according to the present invention. The present automotive air conditioner includes a three-way valve 269 in place of the four-way valve 213 of the automotive air conditioner shown in FIG. 74 and additionally includes a fourth solenoid opening/closing valve 268 for returning, upon cooling operation, refrigerant accumulated in the heater 203 to the accumulator 212.

Figure 76:
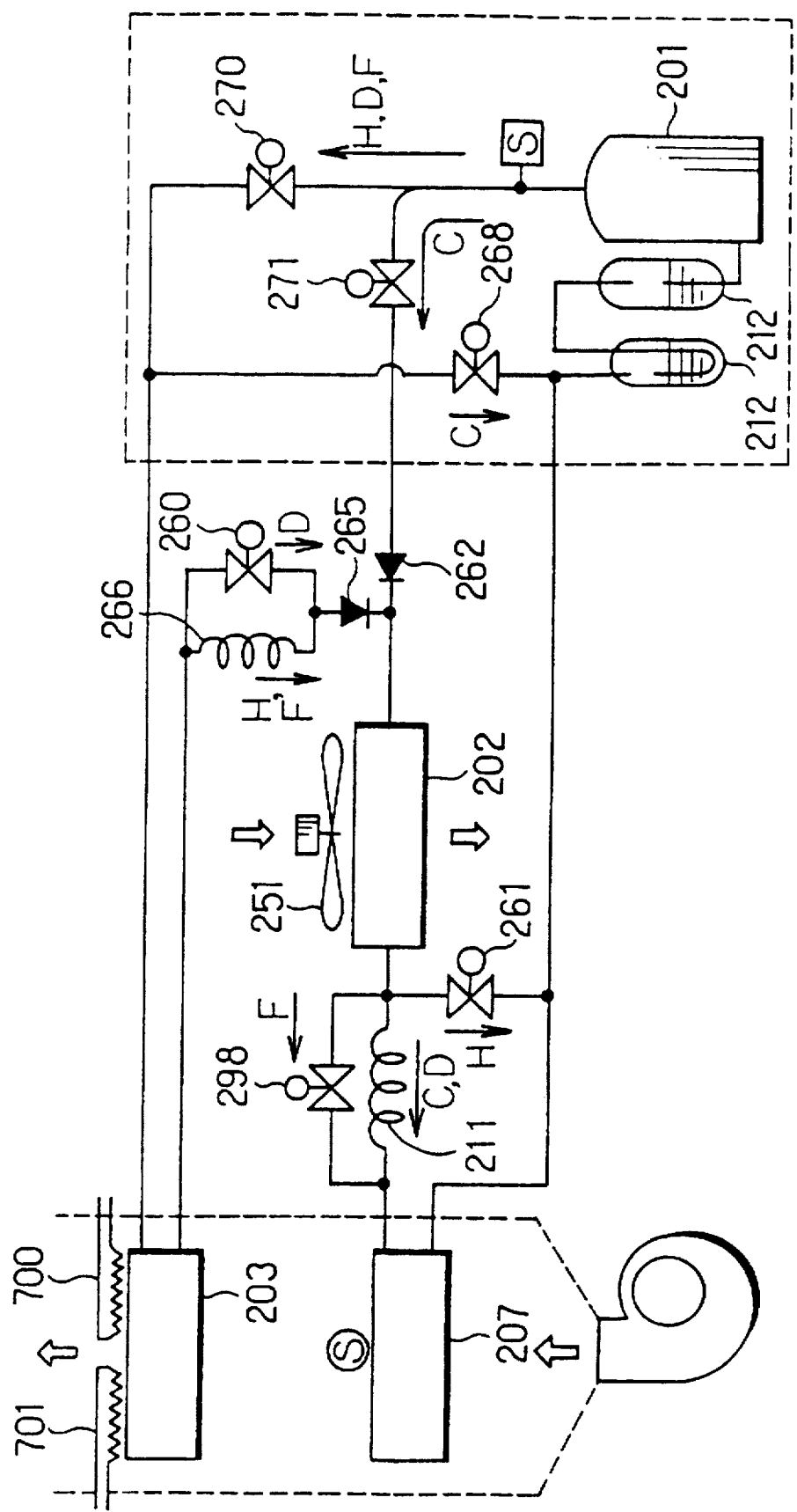
FIG. 76 is a refrigerant circuit diagram of an air conditioner according to a yet further embodiment of the present invention.

FIG. 76 is a refrigerant circuit diagram of a yet further automotive air conditioner according to the present invention. The present automotive air conditioner includes two fifth and sixth solenoid opening/closing valves 270 and 271 in place of the three-way valve 269 of the automotive air conditioner shown in FIG. 75.

Figure 77:
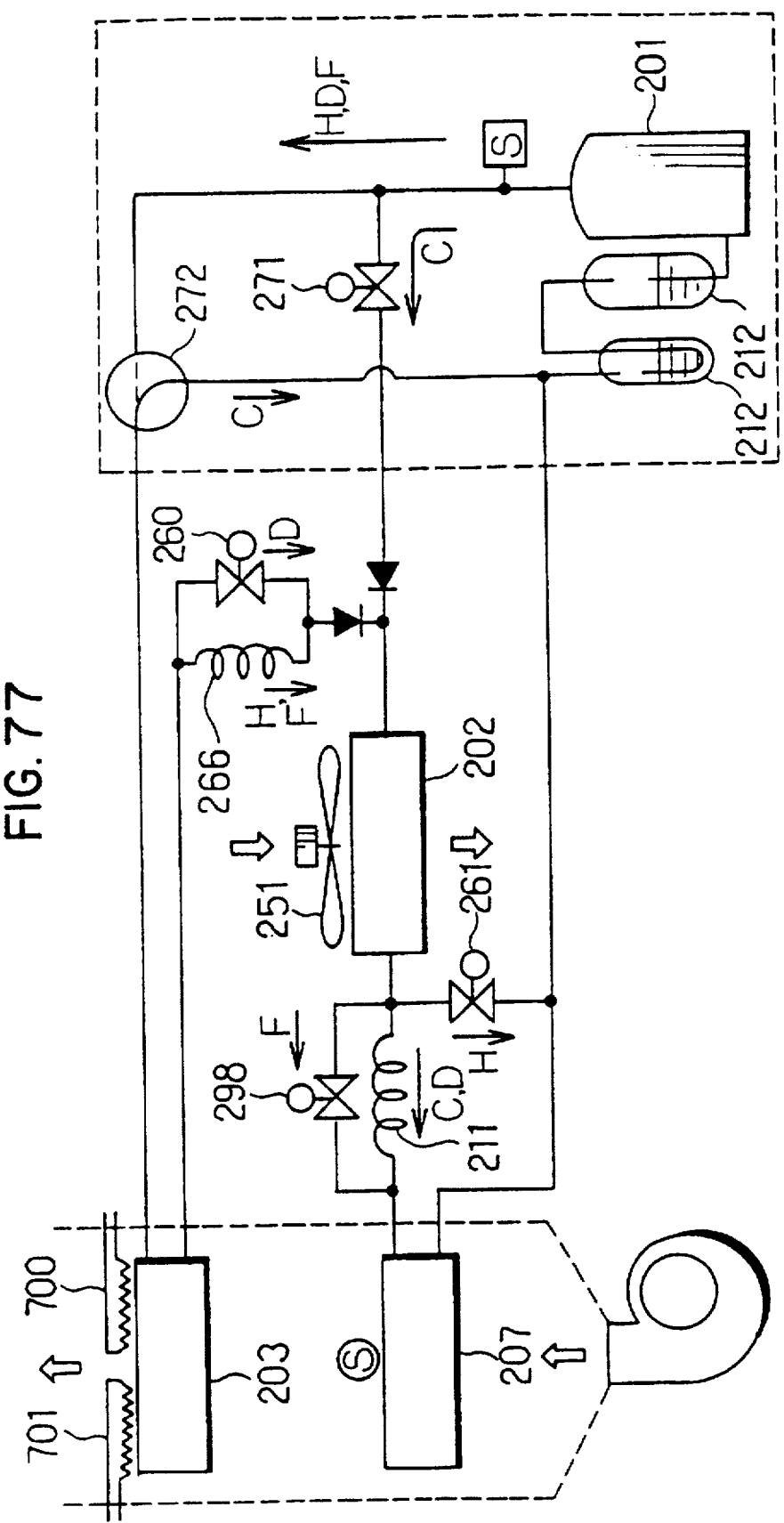
FIG. 77 is a refrigerant circuit diagram of an air conditioner according to a yet further embodiment of the present invention.

FIG. 77 is a refrigerant circuit diagram of a yet further automotive air conditioner according to the present invention. The present automotive air conditioner includes a three-way valve 272 in place of the fifth solenoid opening valve 270 for changing over the discharging direction of the refrigerant compressor 201 in the automotive air conditioner shown in FIG. 76 and the fourth solenoid opening/closing valve 268 for returning, upon cooling operation, refrigerant accumulated in the heater 203 to the accumulator 212.

Figure 78:
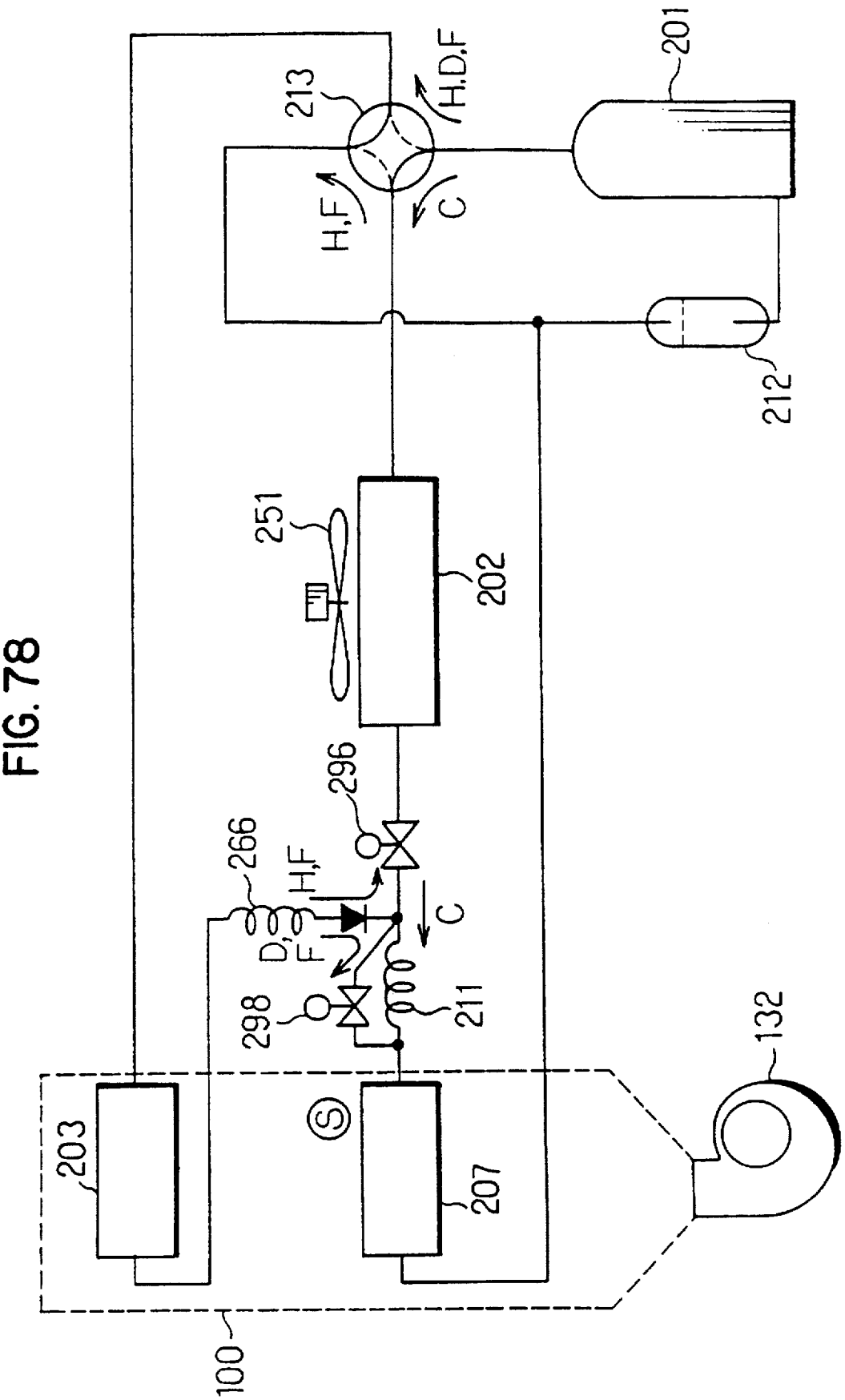
FIG. 78 is a refrigerant circuit diagram of an air conditioner according to a yet further embodiment of the present invention.

FIG. 78 is a refrigerant circuit diagram of a yet further automotive air conditioner according to the present invention. The refrigerating cycle of the present automotive air conditioner is changed over in the following manner in accordance with various operation modes by flow passage changing over means.

Upon cooling operation, refrigerant discharged from the refrigerant compressor 201 flows in the order of the four-way valve 213→outside heat exchanger 202→seventh solenoid opening/closing valve 296→first decompressing apparatus 211→evaporator 207→accumulator 212→refrigerant compressor 201 (refer to arrow marks C in FIG. 78).

Upon heating operation, refrigerant discharged from the refrigerant compressor 201 flows in the order of the four-way valve 213→heater 203→second decompressing apparatus 266→seventh solenoid opening/closing valve 296→outside heat exchanger 202→four-way valve 213→accumulator 212→refrigerant compressor 201 (refer to arrow marks H in FIG. 78).

Upon dehumidifying operation, refrigerant discharged from the refrigerant compressor 201 flows in the order of the four-way valve 213→heater 203→second decompressing apparatus 266→eighth solenoid opening/closing valve 298→evaporator 207→accumulator 212→refrigerant compressor 201 (refer to arrow marks D in FIG. 78).

Upon defrosting operation, refrigerant discharged from the refrigerant compressor 201 passes in the order of the four-way valve 213→heater 203→second decompressing apparatus 266. The refrigerant having passed the second decompressing apparatus 266 is divided into two flows. In one of the two flows, the refrigerant flows in the order of the eighth solenoid opening/closing valve 298→evaporator 207→accumulator 212→refrigerant compressor 201. Meanwhile, in the other flow, the refrigerant flows in the order of the seventh solenoid opening/closing valve 296→outside heat exchanger 202→four-way valve 213→accumulator 212→refrigerant compressor 201 (refer to arrow marks F in FIG. 78).

Figure 79:
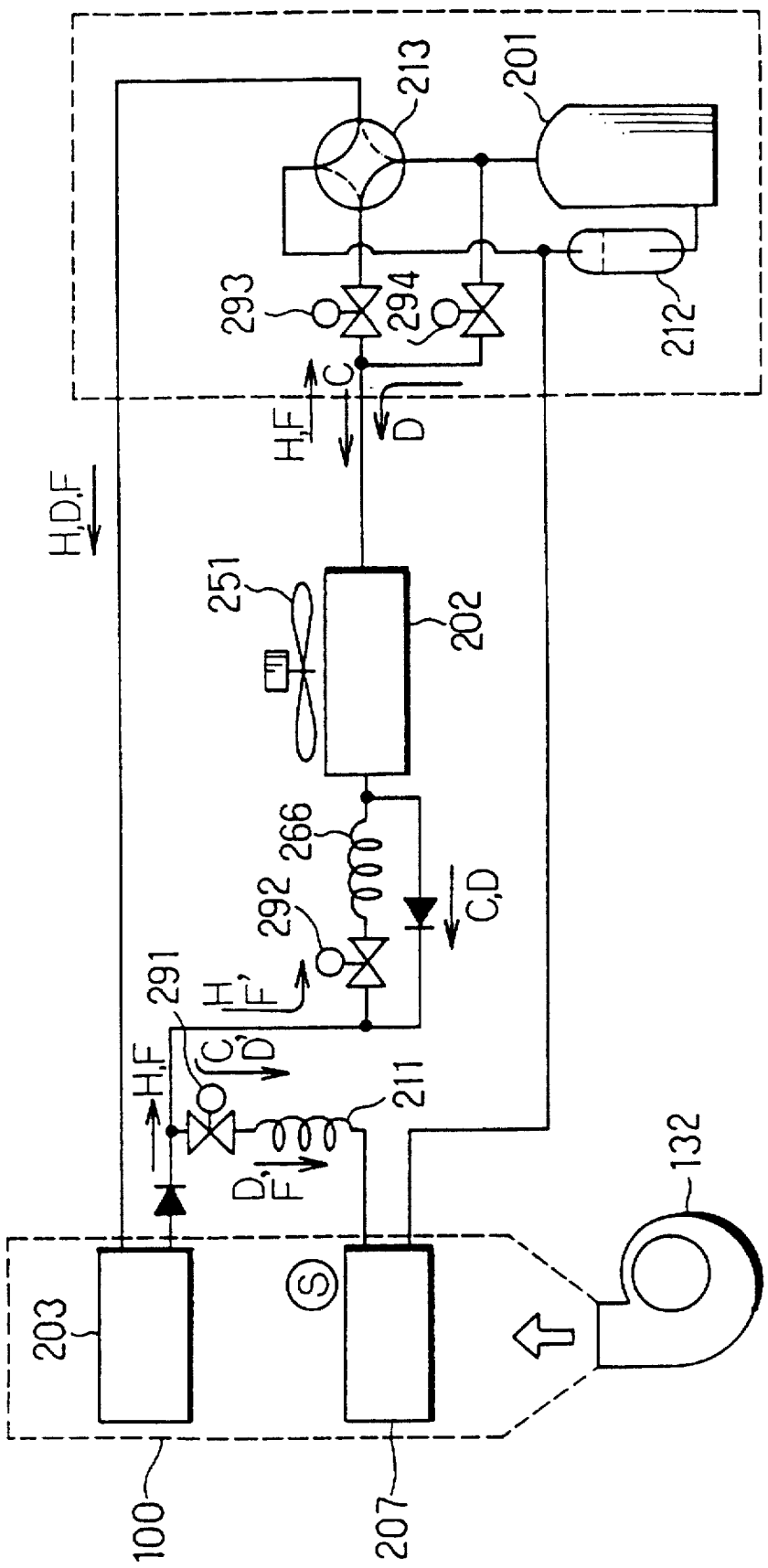
FIG. 79 is a refrigerant circuit diagram of an air conditioner according to a yet further embodiment of the present invention.

FIG. 79 shows a refrigerant circuit diagram of a yet further automotive air conditioner according to the present invention. The refrigerating cycle of the present automotive air conditioner is changed over in the following manner in accordance with various operation modes by flow passage changing over means.

Upon cooling operation, refrigerant discharged from the refrigerant compressor 201 flows in the order of the four-way valve 213→ninth solenoid opening/closing valve 295→outside heat exchanger 202→tenth solenoid opening/closing valve 291→first decompressing apparatus 211→evaporator 207→accumulator 212→refrigerant compressor 201.

Upon heating operation, refrigerant discharged from the refrigerant compressor 201 flows in the order of the four-way valve 213→heater 203→eleventh solenoid opening/closing valve 292→second decompressing apparatus 266→outside heat exchanger 202→ninth solenoid opening/closing valve 293→four-way valve 213→accumulator 212→refrigerant compressor 201.

Upon dehumidifying operation, refrigerant discharged from the refrigerant compressor 201 is divided into two flows one of which flows to the four-way valve 213 and the other of which flows to a twelfth solenoid opening/closing valve 294. The refrigerant flowing to the four-way valve 213 flows in the order of the four-way valve 213→heater 203→tenth solenoid opening/closing valve 291→first decompressing apparatus 211→evaporator 207→accumulator 212→refrigerant compressor 201. On the other hand, the refrigerant flowing to the twelfth solenoid opening/closing valve 294 flows in the order of the twelfth solenoid opening/closing valve 294→outside heat exchanger 202→tenth solenoid opening/closing valve 291→first decompressing apparatus 211→evaporator 207→accumulator 212→refrigerant compressor 212.

Upon defrosting operation, refrigerant discharged from the refrigerant compressor 201 passes in the order of the four-way valve 213→heater 203. The refrigerant having passed the heater 203 is divided into two flows. In one of the two flows, the refrigerant flows in the order of the tenth solenoid opening/closing valve 291→first decompressing apparatus 211→evaporator 207→accumulator 212→refrigerant compressor 201. Meanwhile, in the other flow, the refrigerant flows in the order of the eleventh solenoid opening/closing valve 292→second decompressing apparatus 266→outside heat exchanger 202→ninth solenoid opening/closing valve 293→four-way valve 213→accumulator 212→refrigerant compressor 201.

Figure 80:
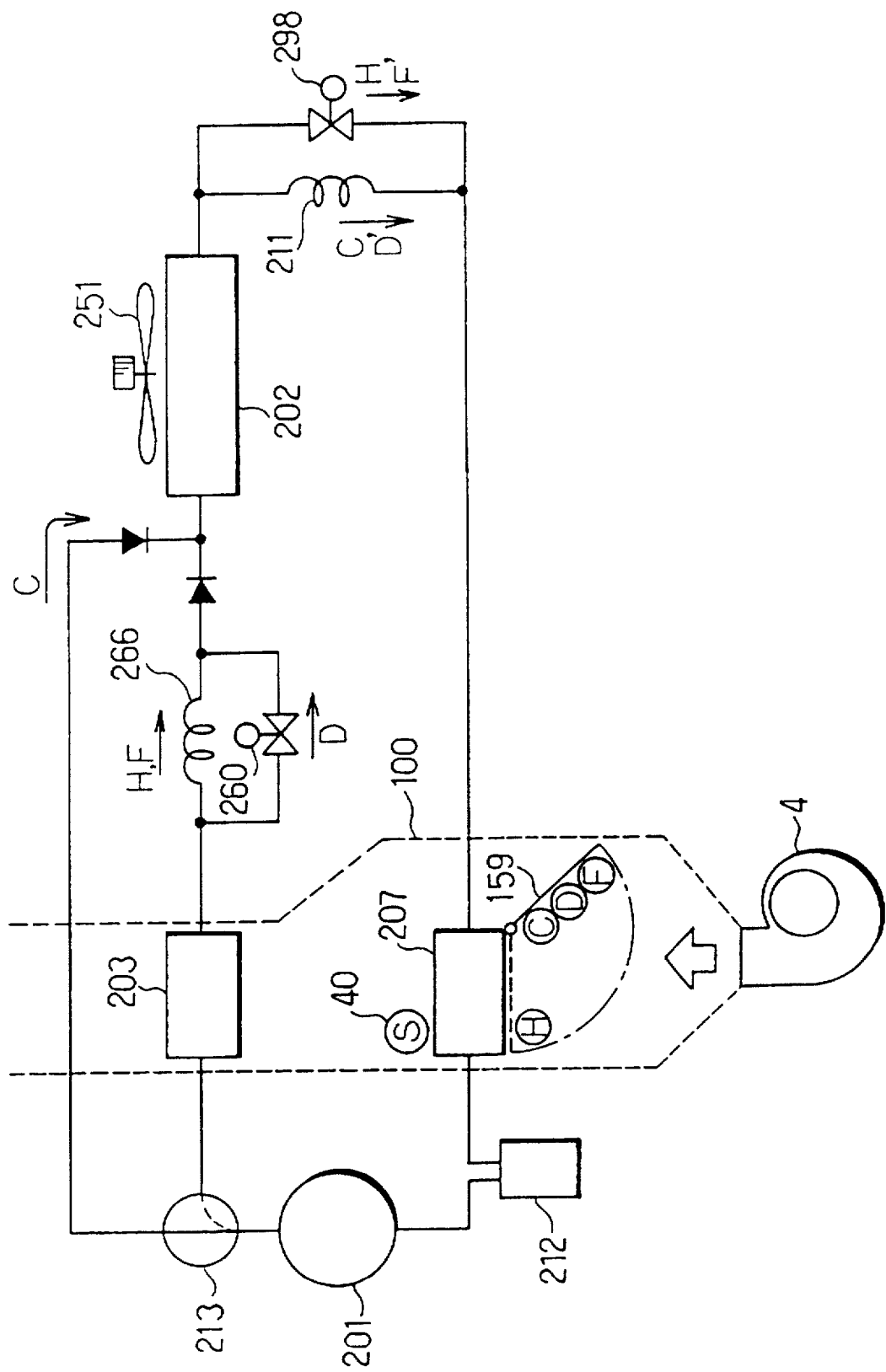
FIG. 80 is a refrigerant circuit diagram of an air conditioner according to a yet further embodiment of the present invention.

FIG. 80 is a refrigerant circuit diagram of a yet further automotive air conditioner according to the present invention. The present automotive air conditioner adopts the construction wherein refrigerant always flows in the evaporator 207. Thus, a bypass wind passageway for flowing air bypassing the evaporator 207 is provided in the duct 100, and upon heating operation, the evaporator 207 is closed by the damper 159 on the upstream side so that refrigerant may not exchange heat with air in the duct 100.

The refrigerating cycle of the present automotive air conditioner is changed over in the following manner in accordance with various operation modes by flow passage changing over means.

Upon cooling operation, refrigerant discharged from the refrigerant compressor 201 flows in the order of the four-way valve 213 4 outside heat exchanger 202→first decompressing apparatus 211→evaporator 207→accumulator 212→refrigerant compressor 201.

Upon heating operation, refrigerant discharged from the refrigerant compressor 201 flows in the order of the four-way valve 213→heater 203→second decompressing apparatus 266→outside heat exchanger 202→solenoid opening/closing valve 298→evaporator 207→accumulator 212→refrigerant compressor 201.

Upon dehumidifying operation, refrigerant discharged from the refrigerant compressor 201 flows in the order of the four-way valve 213→heater 203→solenoid opening/closing valve 260→outside heat exchanger 201→first decompressing apparatus 211→evaporator 207→accumulator 212→refrigerant compressor 201.

Upon defrosting operation, refrigerant discharged from the refrigerant compressor 201 flows in the order of the four-way valve 213→heater 203→second decompressing apparatus 266→outside heat exchanger 202→solenoid opening/closing valve 298→evaporator 207→accumulator 212→refrigerant compressor 201.

Figure 81:
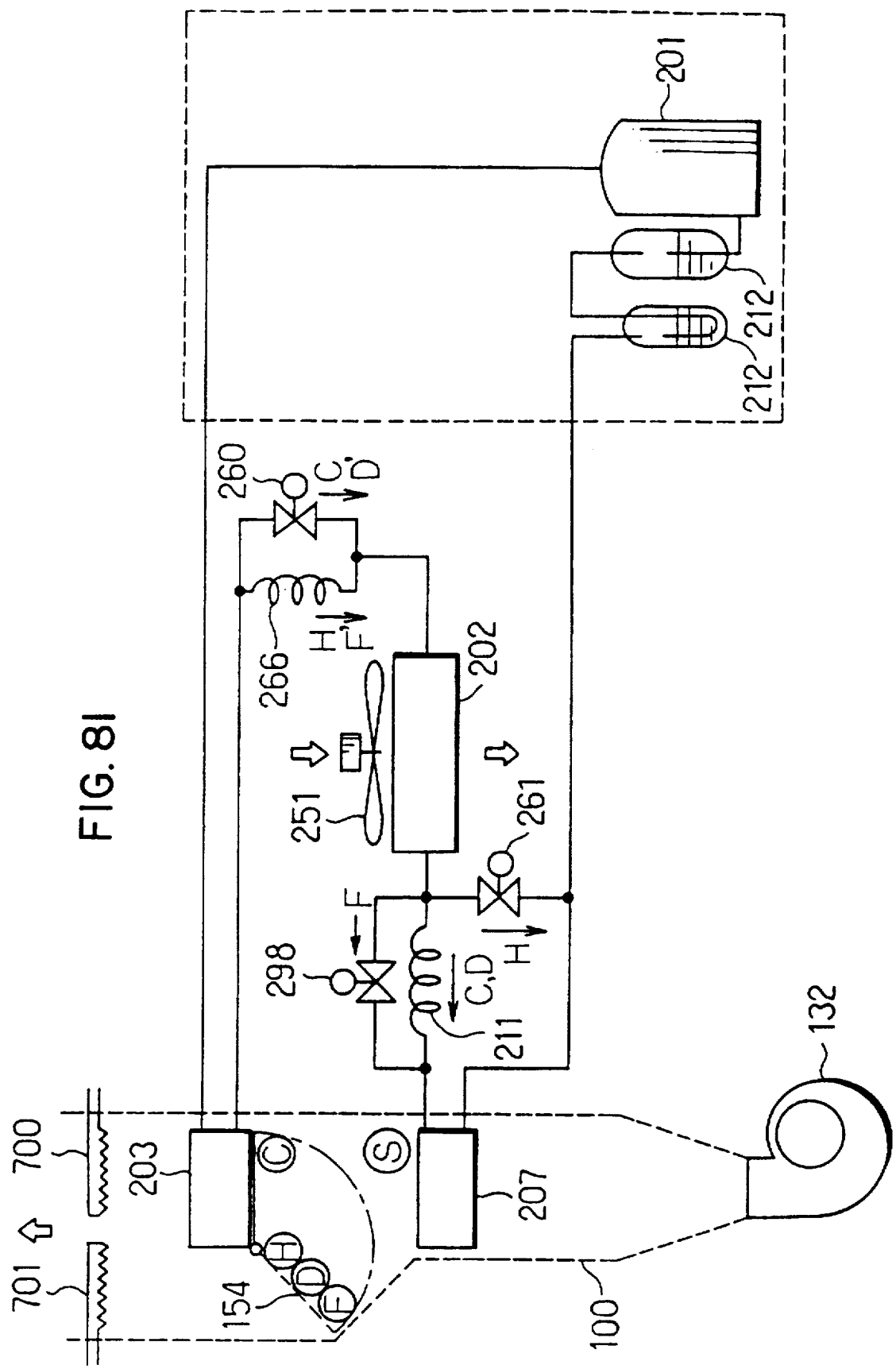
FIG. 81 is a refrigerant circuit diagram of an air conditioner according to a yet further embodiment of the present invention.
Figure 82:
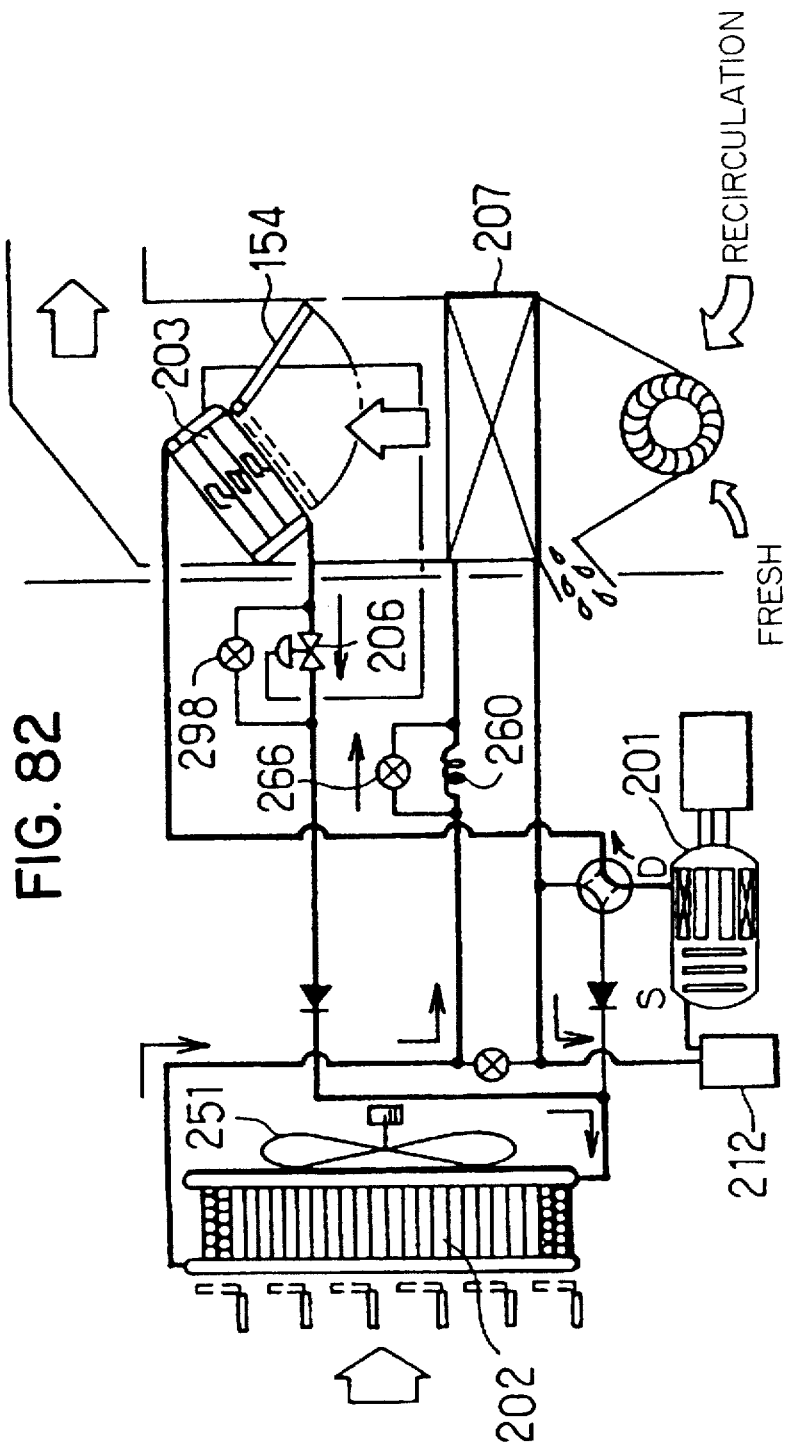
FIG. 82 is a refrigerant circuit diagram of an air conditioner according to a yet further embodiment of the present invention.
Figure 83:
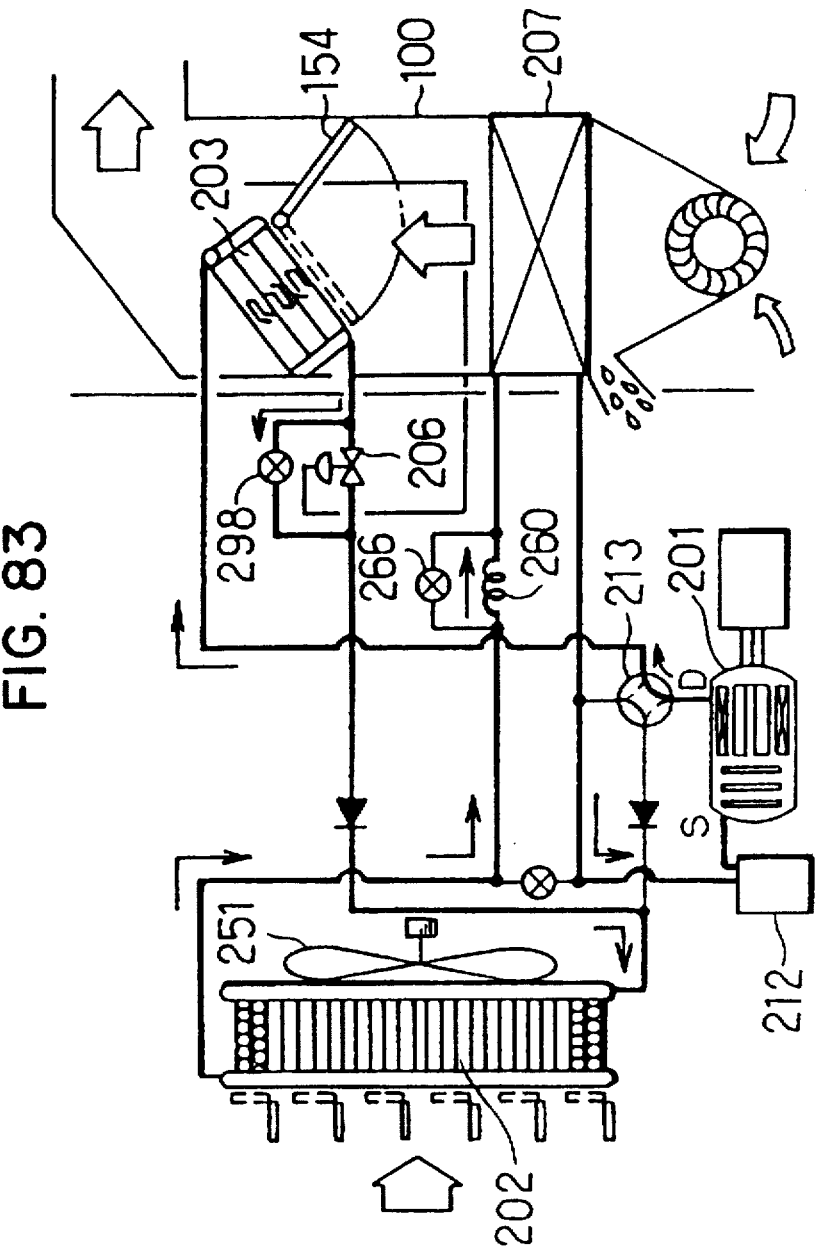
FIG. 83 is a refrigerant circuit diagram of an air conditioner according to a yet further embodiment of the present invention.
Figure 84:
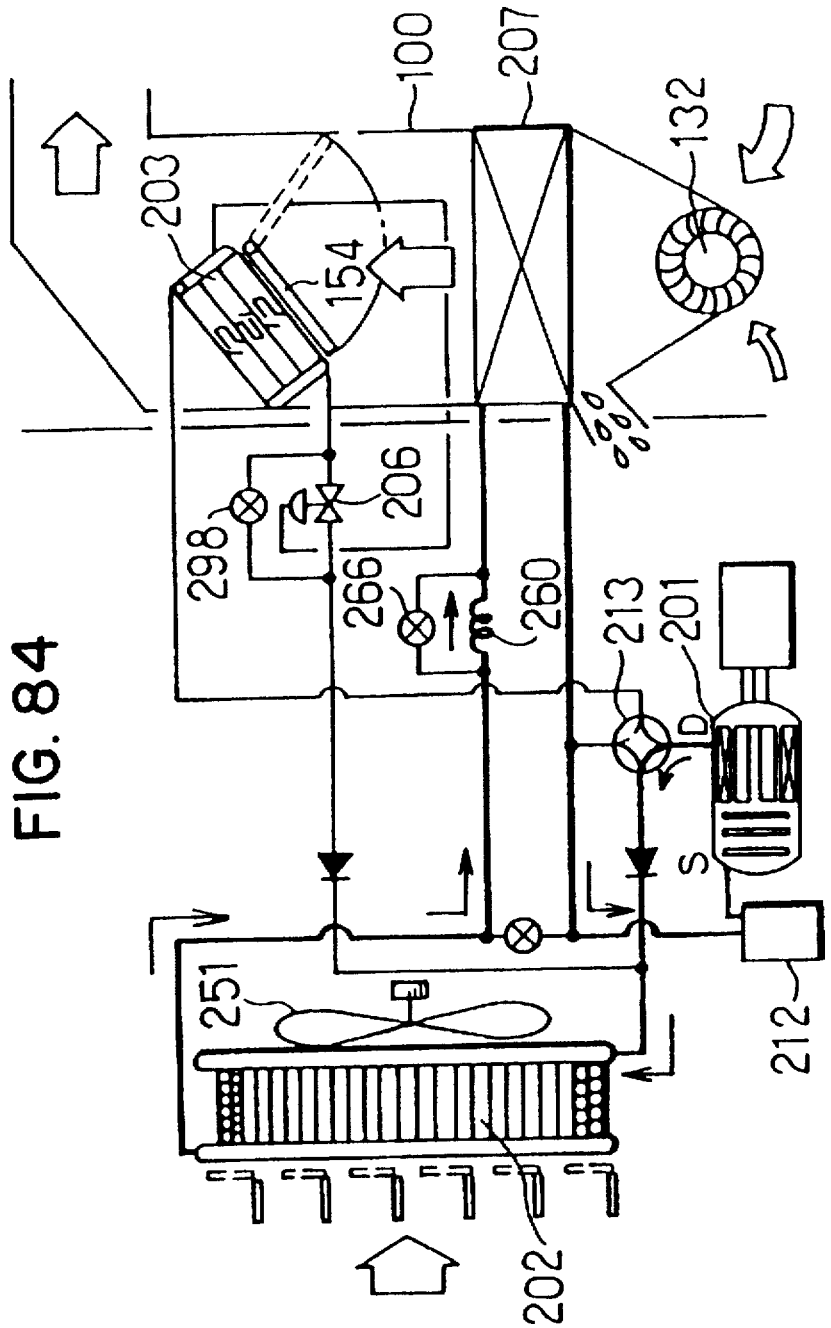
FIG. 84 is a refrigerant circuit diagram of an air conditioner according to a yet further embodiment of the present invention.

FIG. 81 is a refrigerant circuit diagram of a yet further automotive air conditioner according to the present invention. The present automotive air conditioner adopts the construction wherein refrigerant always flows in the evaporator 207. Thus, a bypass wind passageway for flowing air bypassing the heater 203 is provided in the duct 100, and upon cooling operation, the heater 203 is closed by the damper 154 on the downstream side so that refrigerant and air in the duct 100 may not exchange heat in the heater 203.

The refrigerating cycle of the present automotive air conditioner is changed over in the following manner in accordance with various operation modes by flow passage changing over means.

Upon cooling operation, refrigerant discharged from the refrigerant compressor 201 flows in the order of the heater 203→solenoid opening/closing valve 260→outside heat exchanger 202→first decompressing apparatus 211→evaporator 207 accumulator 212→refrigerant compressor 201.

Upon heating operation, refrigerant discharged from the refrigerant compressor 201 flows in the order of the heater 203→second decompressing apparatus 266 outside heat exchanger 202→solenoid opening/closing valve 261→accumulator 212→refrigerant compressor 201.

Upon dehumidifying operation, refrigerant discharged from the refrigerant compressor 201 flows in the order of the heater 203→solenoid opening/closing valve 260→outside heat exchanger 202→first decompressing apparatus 211→evaporator 207→accumulator 212→refrigerant compressor 201.

Upon defrosting operation, refrigerant discharged from the refrigerant compressor 201 flows in the order of the heater 203→second decompressing apparatus 266→outside heat exchanger 202→solenoid opening/closing valve 298→evaporator 207→accumulator 212→refrigerant compressor 201.

A yet further automotive air conditioner according to the present invention can be attained by a circuit similar to the refrigerating circuit shown in FIG. 40. The present automotive air conditioner will thus be described with reference to FIG. 40. The present automotive air conditioner adopts the construction wherein refrigerant always flows in the evaporator 207 and the heater 203. Thus, a bypass wind passageway for flowing air bypassing the evaporator 207 and another bypass wind passageway for flowing air bypassing the heater 203 are provided in the duct 100, and upon heating operation, the evaporator 207 is closed by the damper 159 on the upstream side, but upon cooling operation, the heater 203 is closed by the damper 154 on the downstream side.

The refrigerating cycle of the present automotive air conditioner is changed over in the following manner in accordance with various operation modes by flow passage changing over means.

Upon cooling operation, refrigerant discharged from the refrigerant compressor 201 flows in the order of the heater 203→solenoid opening/closing valve 260→outside heat exchanger 202→first decompressing apparatus 211→evaporator 207→accumulator 212→refrigerant compressor 201.

Upon heating operation, refrigerant discharged from the refrigerant compressor 201 flows in the order of the heater 203→second decompressing apparatus 266→outside heat exchanger 202→solenoid opening/closing valve 261→evaporator 207→accumulator 212→refrigerant compressor 201.

Upon dehumidifying operation, refrigerant discharged from the refrigerant compressor 201 flows in the order of the heater 203→solenoid opening/closing valve 260→outside heat exchanger 202→first decompressing apparatus 211→evaporator 207→accumulator 212→refrigerant compressor 201.

Upon defrosting operation, refrigerant discharged from the refrigerant compressor 201 flows in the order of the heater 203→second decompressing apparatus 266→outside heat exchanger 202→solenoid opening/closing valve 261→evaporator 207→accumulator 212→refrigerant compressor 201.

A yet further automotive air conditioner according to the present invention can be attained by a circuit similar to the refrigerating circuit shown in FIG. 7. The present automotive air conditioner will thus be described with reference to FIG. 7. The present automotive air conditioner adopts the construction wherein refrigerant always flows in the evaporator 207 and the heater 203. Thus, a bypass wind passageway for flowing air bypassing the heater 203 is provided in the duct 100, and the opening of the damper 154 on the downstream side is varied to adjust the mount of air to pass the heater 203 and the amount of air to pass the bypass passageway to adjust the blown out air temperature.

The refrigerating cycle of the present automotive air conditioner is changed over in the following manner by flow passage changing over means which employs two four-way valves 213 and 214.

Upon cooling operation and upon defrosting operation, refrigerant discharged from the refrigerant compressor 201 flows in the order of the four-way valve 213→outside heat exchanger 202→four-way valve 214→heater 203→first decompressing apparatus 211→evaporator 207→four-way valve 213→accumulator 212→refrigerant compressor 201.

Upon heating operation and upon defrosting operation, refrigerant discharged from the refrigerant compressor 201 flows in the order of the four-way valve 213→four-way valve 214→heater 203→first decompressing apparatus 211→evaporator 207→four-way valve 214→outside heat exchanger 203→four-way valve 213→accumulator 212→refrigerant compressor 201.

Further, dehumidifying operation and defrosting operation can be achieved even with such a construction as shown in FIG. 11 wherein a bypass wind passageway is formed sidewardly of the evaporator 207.

Further, dehumidifying operation and defrosting operation can be achieved similarly even with a construction wherein the four-way valve 214 is replaced by four check valves 216, 217, 218 and 219 as shown in FIG. 13.

Further, while a temperature sensor is employed as a sensor for detecting frost on the evaporator in the automotive air conditioners described hereinabove, not a temperature but a pressure of refrigerant in the pipe on the exit side of the evaporator may alternatively be detected to forecast frosting from an evaporating temperature of refrigerant. Or else, a sensor for detecting a loss in pressure of the evaporator may be used to detect frosting from a variation in loss in pressure of a wing passing the evaporator.

FIGS. 82 to 85 show refrigerating cycles of a yet further automotive air conditioner according to the present invention. In particular, FIGS. 82 to 85 illustrate cooling, heating, dehumidifying heating and defrosting conditions, respectively, and indicate a pipe in which refrigerant flows by a thick line. The expansion pipe 206 employed here is a temperature differential expansion valve which varies the throttling amount of the refrigerant flow passage so that refrigerant on the exit side of the heater 203 adjacent the condenser may have a predetermined subcooling degree.

Upon cooling operation, refrigerant discharged from the refrigerant compressor 201 flows in the order of the four-way valve 213→outside heat exchanger 202→expanding means 260→evaporator 207→accumulator 212→refrigerant compressor 201.

Upon heating operation, refrigerant flows in the order of the compressor 201→four-way valve 213→heater 203→expansion valve 206→outside heat exchanger 202→accumulator 212→refrigerant compressor 201.

When there is the possibility upon heating that the windshield may be fogged, dehumidifying heating operation is performed, and in this instance, refrigerant flows in the order of the compressor 201→heater 203→expansion valve 206→outside heat exchanger 202→solenoid opening/closing valve 266→evaporator 207→accumulator 212→refrigerant compressor 201.

In case the surface of the outside heat exchanger 202 is frozen upon heating, the condition of the outside heat exchanger 202 is detected and defrosting operation is started. Upon defrosting operation, refrigerant circulates in the refrigerant cycle in the order of the refrigerant compressor 201 heater 203→solenoid valve 298→outside heat exchanger 202→expanding capillary tube 260→evaporator 207→accumulator 212→compressor 201.

Figure 63:
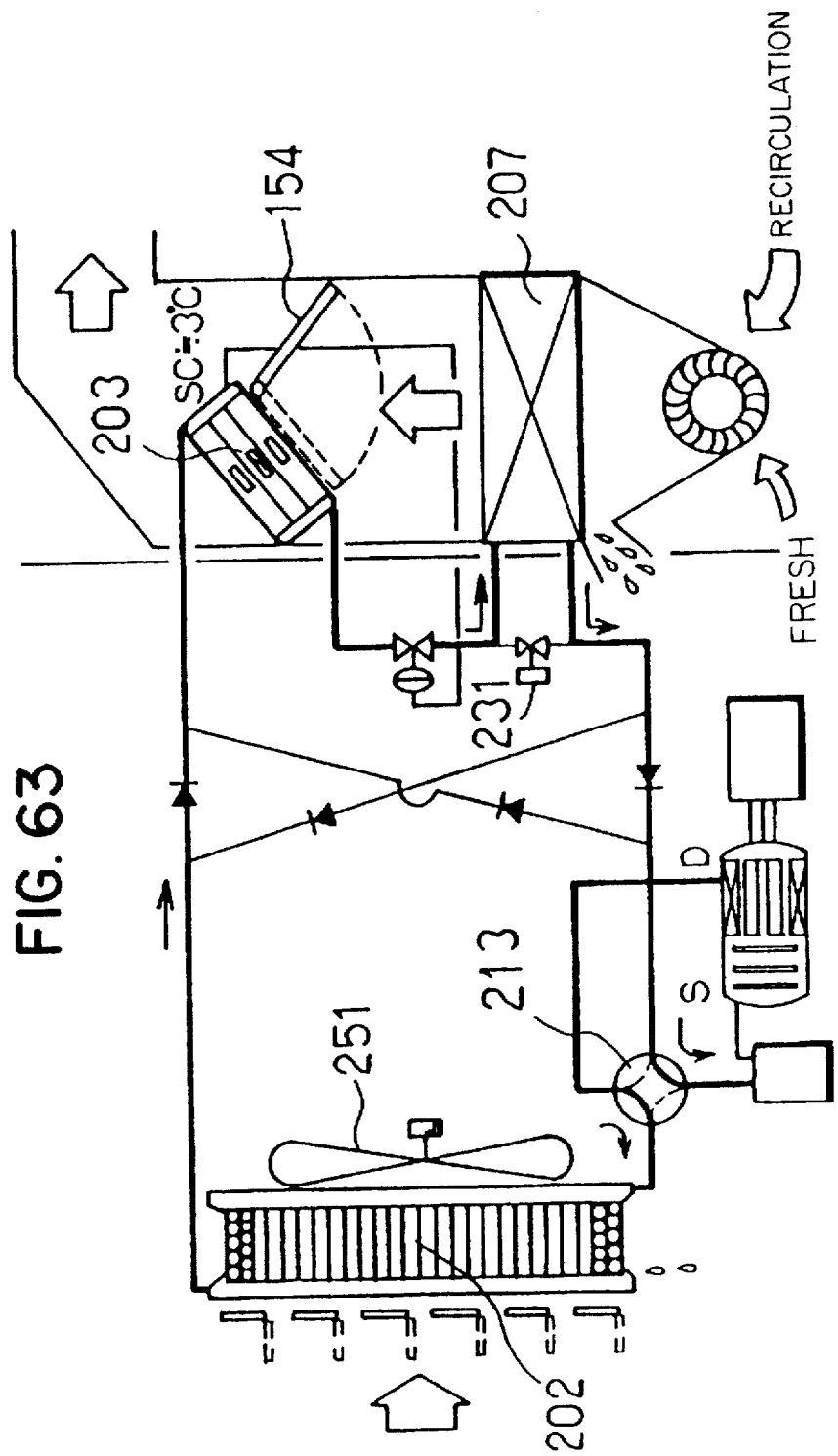
FIG. 63 is a diagrammatic schematic view showing a flow of refrigerant upon defrosting operation of the automotive air conditioner shown in FIG. 53.

The difference of the refrigerating cycles from those of the automotive air conditioner shown in FIG. 63 is that, while refrigerant flows, upon defrosting operation, in the order of the outside heat exchanger 202→heater 203 in the automotive air conditioner shown in FIG. 63, refrigerant flows in the reverse order of the heater 203→outside heat exchanger 202 in the present automotive air conditioner. When discharged refrigerant flows, upon defrosting operation, first into the heater 203 as in the present automotive air conditioner, a predetermined subcooling degree can always be obtained at the heater 203.

This will be described subsequently. Since, in the automotive air conditioner shown in FIG. 63, refrigerant is condensed first in the outside heat exchanger 202, when the temperature of outside air is low at 0° C. or so, it is forecast that refrigerant after passing the outside heat exchanger 202 may be cooled to 10° C. or so and condensed. Here, if it is assumed that the refrigerant has a subcooling degree of 2° to 3° C. or so when it passes the outside heat exchanger 202, the temperature corresponding to a condensing pressure of the refrigerant when it passes the outside heat exchanger 202 is 12° to 13° C. or so. On the other hand, for a while after the operation is changed over from heating operation to defrosting operation, air is not cooled sufficiently in the evaporator 207 and comparatively warm air of a temperature equal to the room temperature or so will flow into the heater 203. The air temperature is in most cases 12° to 13° C. or more and may sometimes be higher than a temperature corresponding to the condensing pressure described above. In this instance, refrigerant condensed once in the outside heat exchanger 202 will be evaporated again when it passes the heater 203. The refrigerant does not have a subcooling degree at least when it passes the condenser portion of the heater 203. As a result, the expansion valve 206 of the temperature differential type will throttle the flow rate of refrigerant so as to obtain a subcooling degree, and consequently, the amount of refrigerant which circulates in the cycle will be reduced remarkably.

Figure 85:
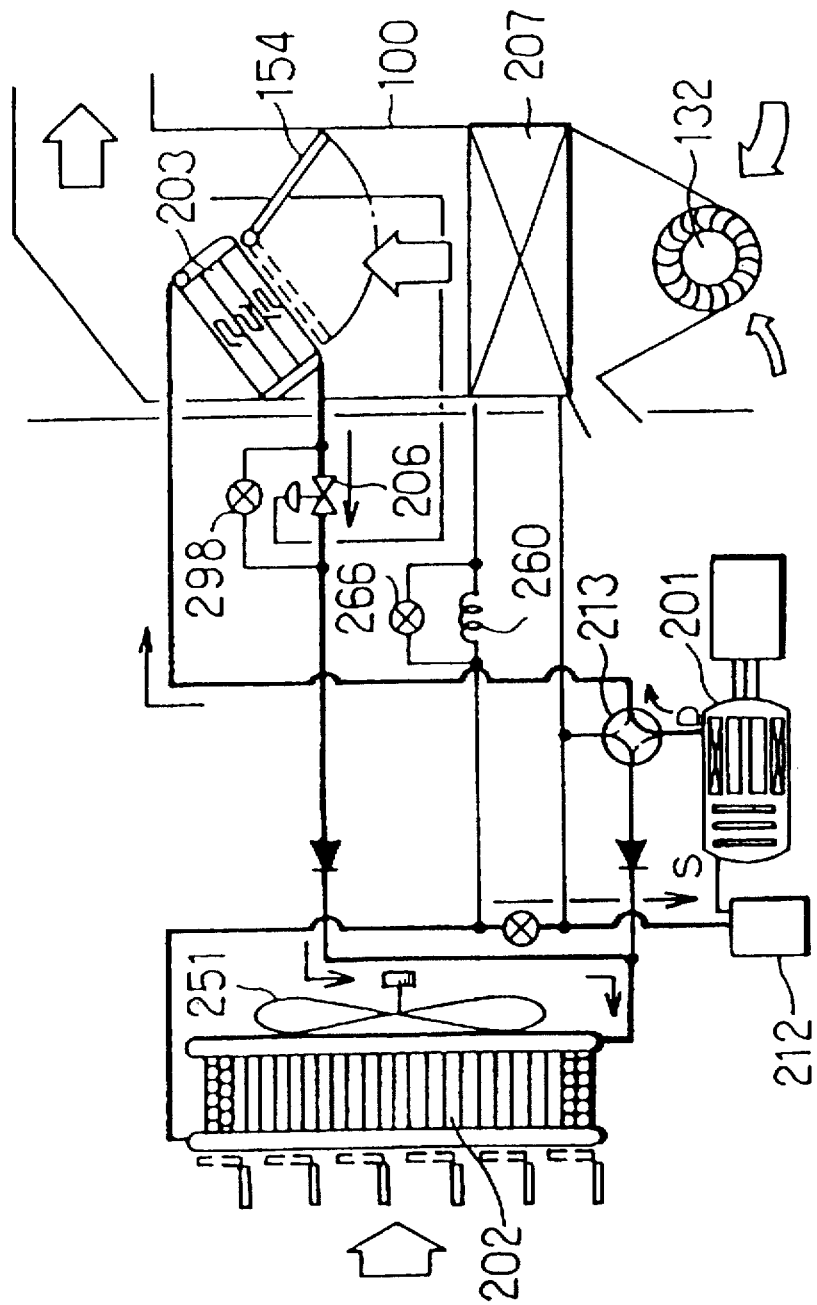
FIG. 85 is a refrigerant circuit diagram of an air conditioner according to a yet further embodiment of the present invention.

On the other hand, in the automotive air conditioner shown in FIG. 85, since refrigerant discharged from the compressor 201 flows, even upon defrosting operation, similarly as upon heating operation, first into the heater 203, such a disadvantage as described above does not occur even upon changing over from heating operation to defrosting operation. In the present automotive air conditioner, refrigerant having passed the heater 203 after defrosting is lowered in temperature, and while the temperature of refrigerant in the outside heat exchanger 202 is low comparing with that of refrigerant which advances from the compressor 201 directly to the outside heat exchanger 202, since refrigerant of a temperature higher than 0° C. flows any way into the outside heat exchanger 202, defrosting operation is achieved well.

It is to be noted that, while, in the automotive air conditioners described above, the compressor 201 is driven by means of an electric motor and the discharging capacity of the compressor 201 is controlled by varying the speed of rotation of the motor, the compressor 201 may otherwise be of another type which does not have a variable discharging capacity. Further, the compressor 201 need not necessarily be driven by an electric motor but may be driven by an engine or the like.

Further, while, in the automotive air conditioners described above, a temperature differential expansion valve or a capillary tube is employed as expanding means, alternatively an electric expansion valve which varies a throttling amount in response to an electric signal may be employed.

Further, an automotive air conditioner according to the present invention may be used not only for air conditioning of a room of an electric automobile but also for air conditioning of a room of an ordinary automobile employing an internal combustion engine and any other common vehicle. However, an automotive air conditioner according to the present invention is most effective for use with a vehicle which does not have an auxiliary heat source such as an electric automobile.

As described so far, according to the present invention, since a heater and an evaporator which constitute a refrigerating cycle is disposed in a duct and air is heated by radiation of heat from the heater, the temperature of air to be blown out can be controlled in a wider range.

Further, according to the present invention, since heat exchangers disposed in a duct have individually specified functions as a heater and an evaporator, even upon changing over from cooling operation to heating operation, the heat exchangers can maintain the respective functions thereof, and sudden fogging of the windshield and so forth can be prevented.

Further, according to the present invention, since the discharging capacity of a compressor can be varied by controlling rotation of an electric motor and a bypass passageway is provided sidewardly of a heater such that the flow rate of air may be controlled by means of an air mixing damper, the temperature of air to be blown out can be controlled very finely by combination of control of the discharging amount of the compressor and control of pivotal motion of the air mixing damper.

Further, according to the present invention, since the function of an outside heat exchanger is changed over between a condenser function and an evaporator function in response to changing over between cooling operation and heating operation, the refrigerating cycle can be operated efficiently in any of cooling operation, heating operation and dehumidifying operation.

Further, according to the present invention, since two outside heat exchangers are used including an outside condenser which serves only as a condenser and an outside evaporator which serves only as an evaporator, the outside condenser and the outside evaporator can be located at respective optimum positions, and the refrigerating cycle can be achieved efficiently.

Further, according to the present invention, since the operation can be changed over successively between dehumidifying operation and heating operation in accordance with an application, prevention of fogging of the windshield upon heating operation, prevention of freezing of an evaporator upon dehumidifying operation and defrosting of an outside heat exchanger upon heating operation can be performed well.

Further, according to the present invention, making use of the fact that three heat exchangers are used upon dehumidifying operation including an outside heat exchanger, a condenser and an evaporator, the heat radiating capacity of the condenser can be controlled by varying the heat exchanging capacity of the outside heat exchanger. Consequently, dehumidification can be changed over between ordinary dehumidification and dehumidification having some heating effect. In addition, protection of the refrigerating cycle against a high pressure upon dehumidifying operation can be achieved well.

Further, according to the present invention, while both of an evaporator and an outside heat exchanger are used as heat sinks to evaporate refrigerant upon dehumidifying operation, since an evaporating pressure regulating valve is disposed on the downstream side of the evaporator, even when the temperature of outside air is low, dehumidifying operation can be performed while preventing frosting of the evaporator well.

Further, according to the present invention, since a bypass passageway for flowing refrigerant bypassing an evaporator is provided and opening/closing movement of the bypass passageway is controlled by means of a solenoid valve, the evaporating temperature of refrigerant in the evaporator can be controlled by suitably changing over between a condition wherein refrigerant flows into the evaporator and another condition wherein refrigerant flows into the bypass passageway.

Further, according to the present invention, since a heater disposed in a duct is divided into a condenser for condensing refrigerant and a subcooler for subcooling condensed liquid refrigerant, refrigerant can have a subcooling degree with certainty even if the flow rate or the temperature of air to be admitted into the heater varies. Consequently, according to the present invention, the refrigerating cycle can always be operated while refrigerant has a sufficient subcooling degree, and efficient operation can be achieved.

Further, according to the present invention, since the heat absorbing condition upon heating operation is changed over between a condition wherein heat is absorbed only by means of an outside heat exchanger and another condition wherein heat is absorbed by means of both of the outside heat exchanger and an evaporator, when the heating load is particularly high such as upon warming up, heat is absorbed also from the evaporator side and heating can be achieved quickly.

What is claimed is:

1. An automotive air conditioner, comprising:
   a compressor for compressing and discharging refrigerant;
   an outside condenser for causing compressed refrigerant from said compressor and air to exchange heat with each other;
   condensing side varying means for varying the condensing capacity of said outside condenser;
   an inside heater for causing refrigerant having by-passed said outside condenser and air to exchange heat with each other;
   expanding means for decompressing and expanding refrigerant having by-passed said inside heater;
   an inside evaporator for causing refrigerant decompressed and expanded by said expanding means and air to exchange heat with each other;
   an outside evaporator for causing refrigerant having by passed said inside evaporator and air to exchange heat with each other;
   evaporating side varying means for varying the evaporating capacity of said outside evaporator; and
   refrigerant pipe means for interconnecting the above-mentioned elements such that refrigerant may circulate among them.

2. An automotive air conditioner according to claim 1, wherein said condensing side varying means includes a damper for variably controlling the flow rate of air to be admitted into said outside condenser.

3. An automotive air conditioner according to claim 1, wherein said evaporating side varying means includes a damper for varying the flow rate of air to be admitted into said outside evaporator.

4. An automotive air conditioner according to claim 1, wherein said condensing side varying means includes a condenser fan for varying the flow rate of air to be admitted into said outside condenser.

5. An automotive air conditioner according to claim 1, wherein said evaporating side varying means includes an evaporator fan which varies the flow rate of air to be admitted into said outside evaporator.

6. An automotive air conditioner according to claim 1, wherein said inside evaporator and said inside heater are both disposed in a duct which defines an air passageway, and an evaporator side bypass passageway which bypasses said inside evaporator is formed sidewardly of said inside evaporator in said duct, and further comprising a damper for varying the ratio of a flow rate of air passing said evaporator side bypass passageway to a flow rate of air passing said inside evaporator.

7. An automotive air conditioner according to claim 1, wherein said inside evaporator and said inside heater are both disposed in a duct which defines an air passageway, and a heater side bypass passageway for flowing air bypassing said inside heater is formed in said duct, and further comprising an air mixing damper for varying the ratio of a flow rate of air flowing through said condenser side bypass passageway to a flow rate of air flowing through said inside heater.

8. An automotive air conditioner, comprising:
   a duct defining a passageway for conditioned air to a room of an automobile;
   a blower for blasting air toward the room of the automobile by way of said duct;
   an evaporator disposed in said duct for evaporating refrigerant to cool air;
   a heater disposed on the downstream side of said evaporator in said duct for causing refrigerant of a high temperature and air to exchange heat with each other to heat the air;
   a compressor for compressing and discharging refrigerant;
   an outside heat exchanger disposed outside said duct for causing air outside said duct and refrigerant to exchange heat with each other;
   expanding means disposed between said heater and said evaporator for decompressing and expanding refrigerant;
   changing over means for changing over a flow passage of refrigerant flowing to said evaporator, said heater and said outside heat exchanger;
   said changing over means performing changing over at least between heating operation wherein refrigerant circulates in the order of said compressor, said heater, said decompressing means and said outside heat exchanger and dehumidifying operation wherein refrigerant circulates in the order of said compressor, said heater, said outside heat exchanger, said decompressing means and said evaporator; and
   controlling means for controlling changing over of said changing over means.

9. An automotive air conditioner according to claim 8, wherein said controlling means changes over said changing over means to a dehumidifying operation condition when a fogged condition of the windshield of the room of the automobile is detected upon heating operation.

10. An automotive air conditioner according to claim 9, wherein said duct selectively admits air in the room of the automobile and air outside the room of the automobile, and said controlling means effects changing over control of said changing over means to dehumidifying operation when air in the room of the automobile is admitted into said duct upon heating operation.

11. An automotive air conditioner according to claim 9, wherein said duct blows out conditioned air selectively to one or more of the windshield side of the room of the automobile, the head and breast portion side of a passenger in the room of the automobile and the foot portion side of the passenger in the room of the automobile, and said controlling means drives said changing over means to effect changing over control from a heating operation condition to a dehumidifying operation condition when air blown out from said duct is changed over to a condition wherein it is directed to the windshield side of the room of the automobile or another condition wherein it is directed to both of the windshield side of the room of the automobile and the foot portion of the passenger.

12. An automotive air conditioner according to claim 9, further comprising a detector for detecting a fogged condition of the windshield of the room of the automobile, and wherein said controlling means drives said changing over means to effect changing over control from a heating operation condition to a dehumidifying operation condition in response to a signal from said detector.

13. An automotive air conditioner according to claim 8, wherein said changing over means effects changing over control of a flow of refrigerant upon dehumidifying operation such that refrigerant discharged from said compressor flows into both of said heater and said outside heat exchanger; the refrigerant having passed said heater and said outside heat exchanger is collectively supplied into said decompressing means; the refrigerant having passed said decompressing means flows into said evaporator; and the refrigerant having flowed into said evaporator is sucked into said compressor.

14. An automotive air conditioner, comprising:

a duct defining a passageway for conditioned air to a room of an automobile;

an evaporator disposed in said duct for evaporating refrigerant to cool air;

a heater disposed in said duct for causing refrigerant of a high temperature and air to exchange heat with each other to heat the air;

a compressor for compressing and discharging refrigerant:

an outside heat exchanger disposed outside said duct for causing air outside said duct and refrigerant to exchange heat with each other;

expanding means disposed on the upstream side of said evaporator for decompressing and expanding refrigerant to flow into said evaporator;

a bypass passageway for flowing refrigerant bypassing said expanding means and said evaporator;

a valve element for performing changing over control of a flow of refrigerant between a flow which flows to said decompressing means and said evaporator side and another flow which flows to said bypass passageway side; and controlling means for controlling changing over of said valve element;

said controlling means causing, when a temperature or a pressure corresponding to a condition of refrigerant in said evaporator becomes lower than a predetermined value, refrigerant to flow to said bypass passageway side so that the temperature or the pressure corresponding to the condition of refrigerant in said evaporator may not become lower than the predetermined value.

15. An automotive air conditioner according to claim 14, wherein said automotive air conditioner renders said controlling means operative when refrigerant discharged from said compressor flows into said outside heat exchanger after having passed said evaporator.

* * * * *